(12) United States Patent
Wuerfel

(10) Patent No.: US 10,500,657 B2
(45) Date of Patent: Dec. 10, 2019

(54) METHOD OF PRODUCING ONE OR MORE WORKPIECES

(71) Applicant: Liebherr-Verzahntechnik GmbH, Kempten/Allgaeu (DE)

(72) Inventor: Robert Wuerfel, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 386 days.

(21) Appl. No.: 15/207,442

(22) Filed: Jul. 11, 2016

(65) Prior Publication Data

US 2017/0008104 A1 Jan. 12, 2017

(30) Foreign Application Priority Data

Jul. 10, 2015 (DE) .................. 10 2015 008 972

(51) Int. Cl.
*B23F 19/10* (2006.01)
*B24B 53/07* (2006.01)
*G05B 19/404* (2006.01)
*G05B 19/18* (2006.01)

(52) U.S. Cl.
CPC .............. *B23F 19/10* (2013.01); *B24B 53/07* (2013.01); *G05B 19/404* (2013.01); *G05B 19/186* (2013.01); *G05B 2219/49171* (2013.01)

(58) Field of Classification Search
CPC ....... B23F 19/10; B24B 53/07; G05B 19/404; G05B 19/186; G05B 2219/49171
See application file for complete search history.

(56) References Cited

U.S. PATENT DOCUMENTS

| | | |
|---|---|---|
| 4,374,513 A | 2/1983 | Wiener |
| 4,393,625 A | 7/1983 | Bloch et al. |
| 4,400,916 A | 8/1983 | Bloch et al. |
| 4,850,155 A | 7/1989 | Sulzer |
| 4,954,027 A | 9/1990 | Faulstich |
| 4,961,289 A * | 10/1990 | Sulzer ............... B23F 5/04 409/11 |

(Continued)

FOREIGN PATENT DOCUMENTS

| | | |
|---|---|---|
| CH | 706303 A2 | 9/2013 |
| CH | 709478 A1 | 10/2015 |

(Continued)

OTHER PUBLICATIONS

Lopez, J., "Effizient und produktiv mit technologischer Flexibilitat," WB Werkstatt + Betrieb, Oct. 2012, 6 pages. (See p. 1, English Explanation of Relevance).

(Continued)

Primary Examiner — Dung Van Nguyen
(74) Attorney, Agent, or Firm — McCoy Russell LLP

(57) ABSTRACT

One or more workpieces having a desired gear geometry may be produced by means of a suitably dressed tool which is respectively dressed by a dresser after the carrying out of one or more machining steps before further machining steps are carried out at the same workpiece or at further workpieces. A relative position between the dresser and the tool may be changed by a corresponding additional adjustment of the axes of movement of the dressing machine in a later dressing process with respect to an earlier dressing process in addition to the smaller center distance resulting from the smaller tool diameter.

15 Claims, 40 Drawing Sheets

(56) References Cited

U.S. PATENT DOCUMENTS

| | | | |
|---|---|---|---|
| 5,083,474 A | | 1/1992 | Rouverol |
| 5,443,338 A | * | 8/1995 | Huber .................. B23F 19/007 409/37 |
| 5,802,921 A | | 9/1998 | Rouverol |
| 6,217,409 B1 | * | 4/2001 | Stadtfeld .................. B23F 5/04 451/147 |
| 6,422,924 B1 | | 7/2002 | Faulstich et al. |
| 6,752,695 B2 | | 6/2004 | Schmid |
| 7,198,543 B2 | * | 4/2007 | Yanase ................ B23F 23/1225 451/21 |
| 7,341,501 B2 | * | 3/2008 | Yanase ................ B23F 23/1225 451/10 |
| 8,147,296 B2 | * | 4/2012 | Lopez .................. B24B 53/085 125/11.03 |
| 8,882,564 B2 | * | 11/2014 | Kobialka ................ B24B 53/06 451/10 |
| 8,944,890 B2 | * | 2/2015 | Ochi ........................ B23F 5/04 451/47 |
| 9,266,179 B2 | * | 2/2016 | Geiser ................ B23F 23/1225 |
| 2013/0280990 A1 | | 10/2013 | Geiser et al. |
| 2015/0011142 A1 | | 1/2015 | Breith et al. |
| 2015/0217389 A1 | | 8/2015 | Schieke |
| 2015/0349470 A1 | | 12/2015 | Horiuchi |

FOREIGN PATENT DOCUMENTS

| | | |
|---|---|---|
| DE | 1527157 | 7/1969 |
| DE | 3704607 A1 | 8/1988 |
| DE | 3816270 A1 | 11/1989 |
| DE | 279627 A1 | 6/1990 |
| DE | 4112122 A1 | 10/1991 |
| DE | 4302353 A1 | 8/1993 |
| DE | 19624842 A1 | 1/1998 |
| DE | 69221489 T2 | 3/1998 |
| DE | 19706867 A1 | 8/1998 |
| DE | 19624842 C2 | 8/2000 |
| DE | 19911235 A1 | 9/2000 |
| DE | 10208531 A1 | 9/2003 |
| DE | 102005030846 A1 | 2/2006 |
| DE | 102006061759 A1 | 8/2007 |
| DE | 102007009359 A1 | 8/2008 |
| DE | 102007043404 A1 | 3/2009 |
| DE | 102012006581 A1 | 10/2013 |
| DE | 102012015846 A1 | 10/2013 |
| DE | 102012017840 B3 | 12/2013 |
| DE | 102012108717 A1 | 3/2014 |
| DE | 102013011048 A1 | 1/2015 |
| DE | 102015006581 A1 | 12/2015 |
| EP | 0021329 A1 | 1/1981 |
| EP | 1995010 A1 | 11/2008 |
| WO | 2010060596 A1 | 6/2010 |
| WO | 2015154925 A1 | 10/2015 |

OTHER PUBLICATIONS

Lopez, J., "Verfahren zum topologischen Verzahnungsschleifen und deren Einsatzgebiete," GETPRO Kongress 05./06., Mar. 2013, Wurzburg, Germany, 25 pages. (See p. 1, English Explanation of Relevance).

Wuerfel, Robert, "Method of Producing a Toothed Workpiece Having a Modified Surface Geometry," U.S. Appl. No. 15/207,339, filed Jul. 11, 2016, 191 pages.

Wuerfel, Robert, "Method of Producing a Toothed Workpiece Having a Modified Surface Geometry," U.S. Appl. No. 15/207,350, filed Jul. 11, 2016, 195 pages.

Wuerfel, Robert, "Method of Producing a Toothed Workpiece Having a Modified Surface Geometry," U.S. Appl. No. 15/207,424, filed Jul. 11, 2016, 186 pages.

Wuerfel, Robert, "Method of Dressing a Tool," U.S. Appl. No. 15/207,450, filed Jul. 11, 2016, 189 pages.

Wuerfel, Robert, "Method of Producing a Workpiece Having a Desired Gear Geometry," U.S. Appl. No. 15/207,454, filed Jul. 11, 2016, 183 pages.

Wuerfel, Robert, "Method of Dressing a Tool," U.S. Appl. No. 15/207,461, filed Jul. 11, 2016, 193 pages.

* cited by examiner

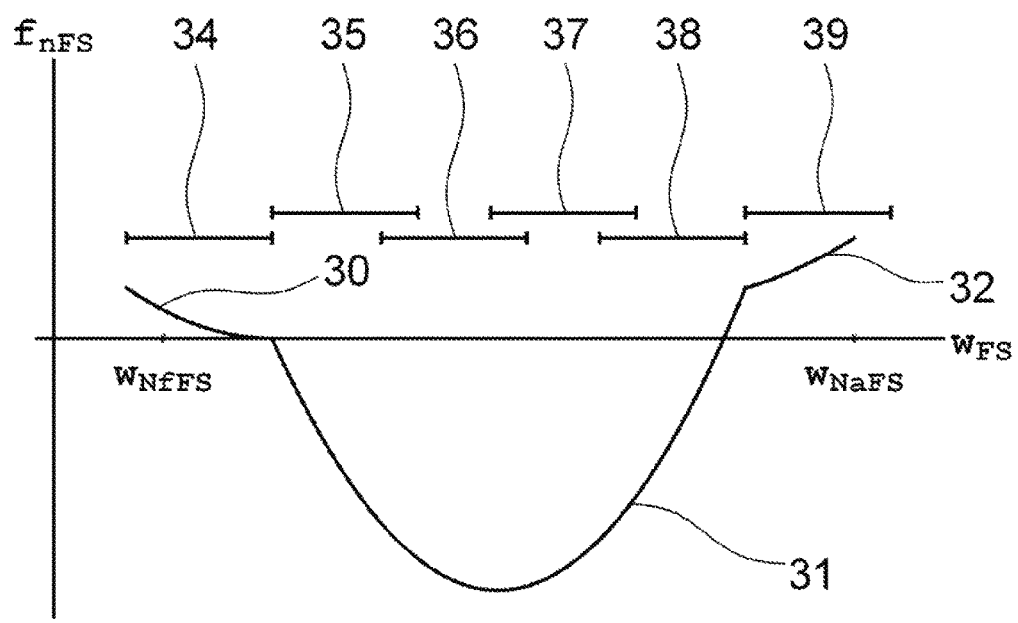
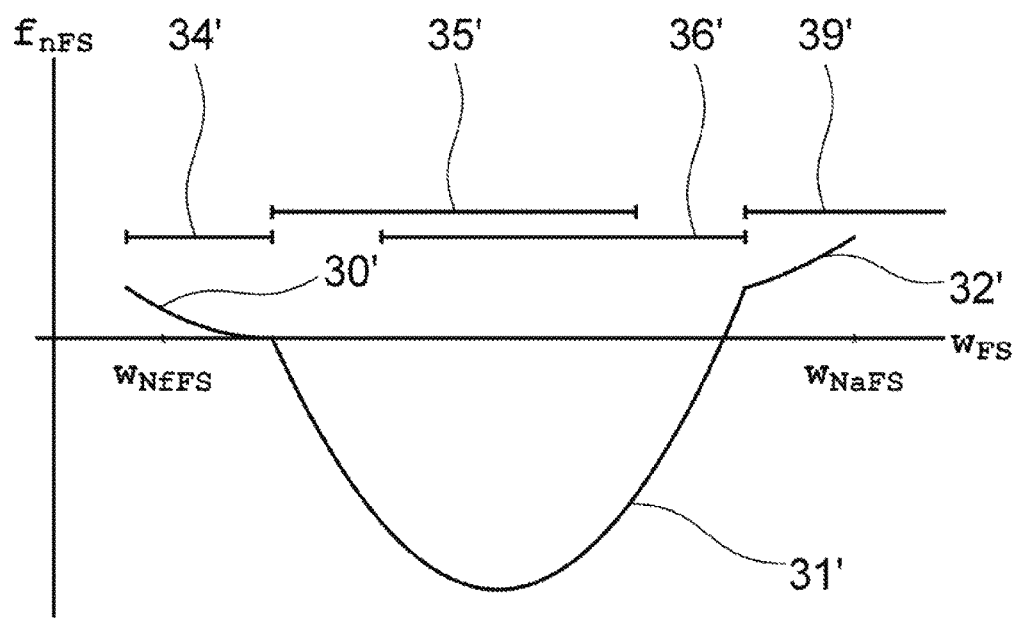

METHOD OF PRODUCING ONE OR MORE WORKPIECES

CROSS REFERENCE TO RELATED APPLICATION

This application claims priority to German Patent Application No. 10 2015 008 972.2, entitled "Method of Producing One or More Workpieces," filed Jul. 10, 2015, the entire contents of which is hereby incorporated by reference in its entirety for all purposes.

TECHNICAL FIELD

The present disclosure relates to a method of producing one or more workpieces having a desired gear geometry by means of a suitably dressed tool. After the carrying out of one or more machining steps, the tools is respectively dressed by a dresser before further machining steps are carried out at the same work piece or at further workpieces. The present disclosure in particular relates to a method of producing one or more workpieces by gear machining grinding, in particular by generating grinding.

BACKGROUND AND SUMMARY

The dressing of a tool first serves to give the tool a surface geometry required for the machining of a workpiece.

A method is known from DE102012015846A1 in which a modification of the surface geometry is produced by additional movements when dressing on the tool, said modification having a constant value in the generating pattern at least locally in a first direction on the tooth flank and being given by a function f(x) in a second direction which extends perpendicular to the first direction. A method is known from EP1995010A1 and WO 2010/060596A1 of dressing a worm in a crowning manner over its width by changing the center distance during dressing. A method is known from DE19624842A1 and DE 19706867A1 in which a worm whose profile angle changes over its width is produced by a constant change of the position of the dresser with respect to the tool during dressing. Methods are likewise known from DE 102005030846A1 and DE 102006061759A1 in which a worm is manufactured by corresponding dressing kinematics either over its total width with a constantly modified profile angle or the profile angle is modified over the worm width. A two-flank dressing for twist-free generating grinding is known from Kapp, Effizient and produktiv mit technologischer Flexibilität, JOSE LOPEZ [Kapp, Efficient and Productive with Technological Flexibility, JOSE LOPEZ].

It must furthermore be taken into account that the tools used for the machining of workpieces within the framework of a gear machining process are subject to constant wear due to their high strain during gear manufacturing machining. The tools therefore have to be dressed again at regular intervals in order to be further able to produce workpieces having the desired gear geometry. The active surface of the tool is machined in dressing using a dresser to give said active surface the desired shape again.

The dressers used for dressing are typically designed for a specific macrogeometry of the tool and in particular for a specific diameter of the tool. However, the diameter of the tool is reduced by the repeating dressing processes. The dresser hereby no longer matches the tool after a certain number of dressing procedures so that unwanted deviations are produced in the gear geometry of the tool. With larger worm diameters and small diameter differences between the new tool and the diameter toward the end of use, deviations have previously been negligible with current tolerance specifications. With small tool diameters or large modules or a high number of starts, in contrast, the deviations have to be taken into account. In accordance with the prior art, either a plurality of dressers therefore have to be used for the different diameters of the tool could not be utilized over its complete diameter range.

It is the object of the present disclosure to provide an efficient method of producing one or more workpieces having a desired gear geometry.

In a first aspect, the present disclosure comprises a method of manufacturing one or more workpieces having a desired gear geometry by means of a suitably dressed tool, in which, after the carrying out of one or more machining steps, the tool is respectively dressed by a dresser before further machining steps are carried out at the same workpiece or at further workpieces. In accordance with the present disclosure, on a later dressing procedure, the relative position between the dresser and the tool changes with respect to a prior dressing procedure in addition to the smaller center distance resulting from the smaller tool diameter by a corresponding additional adjustment of the axes of movement of the dressing machine. In accordance with the present disclosure, the dresser is thus not simply only delivered more closely to the tool to take account of the tool diameter having become smaller due to the preceding dressing procedures. An adjustment of the axes of movement of the dressing machine rather takes place in addition to this reduction of the center distance.

The additional adjustment of the axes of movement of the dressing machine optionally takes place such that modifications of the gear geometry which are produced by the tool diameter having become smaller are at least partly compensated. The present disclosure thus takes into account that the dresser actually no longer exactly matches the tool due to the smaller tool diameter and at least partly and optionally completely compensates the modifications arising hereby by a corresponding setting of the axes of movement.

Alternatively or additionally, the additional adjustment of the axes of movement of the dressing machine can effect a change of the profile crowning produced during dressing with respect to a dressing without such an additional adjustment. The inventor of the present disclosure has recognized that influence can be taken on the profile crowning produced during dressing by the adjustment of the axes of movement of the dressing machine. Since the tool diameter which becomes smaller also results in an unwanted change of the profile crowning, this can be at least partly compensated by a corresponding adjustment of the axes of movement of the gear manufacturing machine.

Further alternatively or additionally, the additional adjustment can be selected such that a deviation of the gear geometry produced on the workpiece from a desired gear geometry is reduced and/or minimized. Unwanted modifications on the workpiece machined using the tool can thus in particular be reduced by the adjustment of the axes of movement during dressing.

Further alternatively or additionally, the additional adjustment can reduce or minimize a deviation of the gear geometry produced by the dresser on the tool. The setting of the axes of movement can in particular be calculated such that a desired geometry of the tool is reached as much as possible.

The method in accordance with the present disclosure in accordance with the first aspect can in particular be used to produce the same profile shape on the tool in every dressing procedure. The same profile shape on the tool can in particular nevertheless be produced despite the diameter of the tool becoming smaller due to the different setting of the movement of axes in accordance with the present disclosure during dressing. This optionally has the result within the framework of the machining method that unwanted modifications of the gear geometry resulting on the workpiece are reduced and optionally minimized.

In an alternative variant, the method in accordance with the first aspect can, however, also be used to specifically produce different profile shapes on the tool in the consecutive dressing procedures. These different profile shapes, however, may have the result in combination with a correspondingly adapted machining method that unwanted modifications of the gear geometry produced on the workpiece are reduced and minimized.

In accordance with a second aspect, the present disclosure comprises a method of manufacturing one or more workpieces having a desired gear geometry by means of a suitably dressed tool, in which, after the carrying out of one or more machining steps, the tool is respectively dressed before further machining steps are carried out at the same workpiece or at further workpieces. In accordance with the present disclosure, the profile angle of the tool is changed with respect to an earlier dressing procedure in a later dressing procedure, wherein the workpiece or workpieces is or are gear manufacturing machined after the later dressing procedure with a different profile angle of the gearing of the tool than after an earlier dressing procedure. The profile angle is respectively selected in a first variant of the second aspect such that a deviation of the gear geometry produced on the workpiece from a desired gear geometry is reduced or minimized. In a second variant, a stretching and/or compression of a modification produced on the tool by a modified dresser can be reduced or minimized by the change of the profile angle. The first variant and the second variant are may be combined.

The inventor of the present disclosure has recognized that influence can be taken on the gear geometry produced on the tool and in particular on the profile crowning produced there by a corresponding change of the settings of the axes of movement during dressing. If, however, the dresser has a modification itself, the change in the relative position between the dresser and the tool produces an unwanted stretching and/or compression of this modification on the transfer to the tool. This compression and/or stretching can, however, be at least partly compensated by the change of the profile angle of the tool in accordance with the present disclosure.

The present disclosure makes use of the fact that the same gear geometry of a workpiece can be produced with tools having a different profile angle. The profile angle, however, has an influence on the mapping of a modification of the dresser on the tool and on the mapping of a modification of the tool on the workpiece. The compression and/or stretching can therefore be reduced and minimized by the suitable selection of the profile angle. Unwanted modifications of the gear geometry arising in the machining of the workpiece can hereby be reduced.

Such a procedure in accordance with the second aspect is in particular possible in the production of symmetrical gearings of the workpiece.

The present disclosure in accordance with the second aspect is, however, also possible on the manufacture of asymmetrical gearings of the workpiece. The calculation of the profile angle which reduces or minimizes the relative profile stretching must admittedly be carried out separately on the left and right flanks. With a cylindrical tool, no complete cancellation of the stretch and/or compression is therefore possible if required. The profile angle can, however, be selected such that deviations are produced on the left and right flanks which are as small as possible in total.

The present disclosure therefore further comprises a method in accordance with the present disclosure such as was described above for producing an asymmetrical gearing of the workpiece, wherein the profile angle of the workpiece on the right and left flanks is selected such that a deviation of the gear geometry resulting on the workpiece on the left and right flanks is reduced and/or minimized overall with respect to a desired gear geometry; and/or a stretching and/or compression of a modification on the left and right flanks produced on the tool by a modified dresser is reduced or minimized overall.

In a method in accordance with the first or second aspects of the present disclosure, a tool can first be used having a cylindrical base shape, in particular a grinding worm having a cylindrical base shape.

Alternatively, however, a tool having a conical base shape can also be used. A grinding worm having a conical base shape can in particular be used.

The conical angle is optionally selected such that the gear geometry resulting on the workpiece has deviations from a desired gear geometry which are as small as possible. The inventor of the present disclosure has recognized that a further degree of freedom is provided with the conical angle by the use of a tool having a conical base shape, which degree of freedom can be used for influencing the gear geometry and in particular for avoiding unwanted modifications or for producing desired modifications.

A tool having a conical basic shape is optionally used in accordance with the second aspect, with the conical angle being selected such that a compression and/or stretching of the tool of a modification produced by a modified dresser on the tool is reduced or minimized by the change of the profile angle of the tool.

The use of a conical tool has particular advantages in the producing of an asymmetrical gearing of the workpiece. The profile angles of the tool and the conical angle can in particular be selected such that the stretching and/or compression of the modification is reduced and/or minimized on the right and left flanks.

When a tool having a conical base shape is used, provision can optionally be made that the conical angle is changed in a later dressing procedure with respect to an earlier dressing procedure.

The present disclosure is in particular used when a tool is dressed consecutively a plurality of times by the same dresser in order to produce the same respective gear geometry of a workpiece machined by the tool after every dressing procedure within the framework of the production process.

In a first application case, a dressing can already become necessary after one or more machining steps which are carried out at a single workpiece before one or more further machining steps are carried out at the same workpiece. For example, after one or more grinding strokes which are carried out at a workpiece, a dressing may become necessary before further grinding strokes are carried out at this workpiece. Such a procedure can in particular be necessary with large gearings having a large module and/or with a small tool diameter with respect to the module.

In a further application case, the present disclosure is in contrast used in a method of producing a plurality of tools, and in particular a large number of tools, with the tool being respectively dressed after the production of one or more workpieces before further workpieces are machined. Such a procedure is in particular customary in mass production in which a large number of identical workpieces are to be produced.

If a plurality or a large number of workpieces are machined in accordance with the present disclosure, deviations of the surface geometry of the respective workpieces resulting due to the machining procedure with respect to a desired geometry which is the same for all workpieces are reduced and minimized.

In a third aspect, the present disclosure comprises a method of producing a workpiece having a desired gear geometry by means of a tool suitably dressed by a modified dresser, the method comprising specifying a desired gear geometry of the workpiece; and determining a suitable profile angle of the tool and a suitable relative position between the dresser and the tool during the dressing for providing the desired gear geometry of the workpiece at least within a permitted tolerance in the machining by the tool.

As already shown above, the inventor of the present disclosure has recognized that the profile angle has an influence on the dressing procedure, but that a desired gear geometry of a workpiece can be achieved in the same way with different profile angles of the tool. In accordance with the present disclosure, the tool can thus be configured by a suitable selection of the profile angle and a suitable relative position between the dresser and the tool during dressing with a gear geometry which produces the desired gear geometry of the workpiece when machining by the tool at least within a permitted tolerance.

A compression and/or stretching of the modification of the dresser during the transfer to the tool can in particular be taken into account in the determination of the profile angle and of the relative position between the dresser and the tool.

The profile angle and the relative position between the dresser and the tool are optionally determined such that a desired compression and/or stretching of the modification of the dresser on the tool results during dressing. The method in accordance with the present disclosure can thus be used, for example, when the profile present on the dresser is to be applied to the tool in a compressed or stretched form to achieve the desired gear geometry of the workpiece.

The profile angle is, however, optionally determined such that a compression and/or stretching of the modification of the dresser on the tool resulting from the relative position between the dresser and the tool during dressing is at least partly compensated by the profile angle.

The three aspects of a method of producing a workpiece described in more detail above can each be used on their own. The individual aspects can, however, also be combined with one another.

The aspects explained in accordance with the second and third aspects with respect to a compression and/or stretching of a modification of the dresser during the dressing of the tool can in particular be combined with the aspects explained with respect to the first aspect with respect to the provision of the desired modifications of the workpiece and/or of the tool.

In addition to the above-named method of producing one or more workpieces, the present disclosure furthermore comprises a method for the modified dressing of a tool which can be used for the gear manufacturing machining of a workpiece on a dressing machine, with a modified dresser being used for dressing the tool. In accordance with the present disclosure, the axes of movement of the dressing machine are set during the dressing of the tool and/or the macrogeometry of the tool and/or of the dresser are selected such that the modification of the dresser is applied compressed or stretched by a certain amount on the tool and/or compressed or stretched by a certain amount on the workpiece. The fact is also exploited here in accordance with the present disclosure that the stretching or compression with which a modification of the dresser can be applied to the tool can be influenced by the suitable choice of the relative position between the dresser and the tool and/or of the macrogeometry of the tool or dresser. The number of starts and/or the diameter and/or the profile angle and/or the conical angle of the tool can be set or selected correspondingly with respect to the macrogeometry of the tool. The diameter of the dresser can in particular be selected suitably with respect to the macrogeometry of the dresser.

The method in accordance with the present disclosure for the modified dressing of a tool can in particular be used with a method in accordance with the present disclosure of producing one or more workpieces such as were described above.

In all of the above-shown methods in accordance with the present disclosure, the desired modification of the tool can optionally be produced at at least two rolling angles, and further optionally at at least three rolling angles, and by the setting of the axes of movement of the dressing machine. Alternatively or additionally, the relative position between the dresser and the tool during dressing can be determined such that a desired profile crowning on the tool is produced. The inventor of the present disclosure has recognized that the profile crowning of the tool can be influenced and/or the modification at two, three or four rolling angles can be set within certain limits by the suitable setting of the relative position and/or of the axes of movement of the dressing machine during dressing.

Alternatively or additionally, an association of a specific radius of the dresser with a specific radius of the tool can be specified and can be achieved by a corresponding setting of the axes of movement of the dressing machine.

The present disclosure furthermore comprises an apparatus and/or a software program in accordance with a first aspect for determining the settings of the axes of movement of the dressing machine used for the multiple dressing of a tool using the same dresser.

The apparatus and/or the software program can be used in accordance with a first variant for carrying out a method such as was described in more detail above. The apparatus and/or the software program can in particular determine suitable settings of the axes of movement of the dressing machine to carry out a method in accordance with the present disclosure such as was shown above.

In accordance with a second variant, which may be combined with a first variant, the apparatus or the software program has an input function for inputting a first tool diameter as well as a determination function for determining the setting of the axes of movement of the dressing machine to be used for the dressing of the tool with the first tool diameter. An input function for inputting a second tool diameter for which the dresser is configured is further advantageously provided. Alternatively or additionally, an input function can be provided for inputting a desired gear geometry of the workpiece or of the tool. The determination function can in particular be configured such that it determines the settings of the axes of movement to be set within the framework of the methods shown in more detail above.

In a second, independent aspect, the present disclosure further comprises an apparatus and/or a software program for determining the setting of the axes of movement of the dressing machine or the geometry of the tool to be used for producing a workpiece having a desired gear geometry by means of a tool dressed by a modified dresser having an input function for inputting a desired gear geometry of the workpiece and/or for inputting a desired stretching and/or compression of the modification of the dresser on the tool or workpiece.

In a first variant, the apparatus or the software program in accordance with the second aspect comprises a determination function for determining a suitable profile angle of the tool and a suitable relative position between the dresser and the tool during dressing for providing the desired gear geometry of the workpiece during the machining by the tool and/or for providing the desired stretching and/or compression of the modification of the dresser on the tool or workpiece.

In a second variant, the apparatus or the software program comprises a determination function for determining the setting of the axes of movement of the dressing machine during the dressing of the tool and/or the macrogeometry of the tool and/or of the dresser. In particular one or more of the following values can be determined with respect to the macrogeometry: number of starts and/or diameter and/or profile angle and/or conical angle of the tool; diameter of the dresser.

In a third variant, the apparatus and/or the software program can comprise a determination function for determining the setting of the axes of movement of the dressing machine during the dressing of the tool and/or the macrogeometry of the tool in a method such as was shown in more detail above.

Two or all three of the variants just described are optionally combined with one another within the framework of an apparatus in accordance with the present disclosure and/or of a software program in accordance with the present disclosure.

In a possible embodiment of the present disclosure, the software program can be worked through on the apparatus in accordance with the present disclosure. The software program can be stored on a data carrier or in a memory, for example. The apparatus can in particular be a computer and/or a machine control (e.g., a machine control system comprising instructions stored in non-transitory memory of the control system and executable by a processor to perform the various functions and control actions described herein). A software program in accordance with the present disclosure can optionally run thereon.

The present disclosure furthermore comprises a dressing machine having a tool holder for holding the tool to be dressed and having a dresser holder for holding the dresser used for this purpose, wherein the dresser holder has an axis of rotation and wherein the dressing machine has further axes of movement by which further degrees of freedom can be set independently of one another when dressing the tool in line contact with the dresser.

In a first variant, the dressing machine has a control which comprises an apparatus and/or a software program such as was shown in more detail above.

In a second variant, the control can have a function for carrying out the dressing steps within the framework of one of the methods in accordance with the present disclosure such as were shown in more detail above. A function for the multiple carrying out of a dressing procedure of a tool can in particular be provided having changed settings of the axes of movement of the dressing machine, wherein the control is programmed such that it changes the relative position between the dresser and the tool by a corresponding additional change of the axes of movement of the dressing machine in a later dressing procedure with respect to an earlier dressing procedure in addition to the smaller center distance resulting from the smaller tool diameter. The control can have a function for determining and/or calculating the controlling of the axes of movement.

Both variants of a dressing machine in accordance with the present disclosure are combined with one another.

The dressing machine can be a machine which is only used for dressing tools and has no additional function for machining workpieces using such tools. The dressing machine may be, however, a combination machine which allows both a machining of workpieces and the dressing.

The present disclosure further comprises a gear manufacturing machine such as was just shown. It can in particular be a combination machine on which both a gear machining of a workpiece can be carried out by a tool and the dressing of the tool can be carried out by a dresser. Alternatively or additionally, the gear manufacturing machine in accordance with the present disclosure can also comprise an apparatus and/or a software program such as was shown above. In this respect, the manufacturing machine and the dressing machine can optionally share individual holders or axes of movement or a plurality of holders or axes of movement.

The gear manufacturing machine optionally has a workpiece holder and a tool holder provided in addition to the tool holder of the dressing machine as well as a gear manufacturing machining control for controlling the workpiece holder and the tool holder for carrying out a gear manufacturing machining. The gear manufacturing machining control is in particular programmed such that it carries out a method in accordance with the present disclosure, in particular in an automated manner. The gear manufacturing machining control and the control which controls the dressing processes are optionally configured such that a method in accordance with the present disclosure can be carried out in an automated manner.

The methods in accordance with the present disclosure are furthermore optionally carried out using an apparatus in accordance with the present disclosure and/or a software program in accordance with the present disclosure and/or a dressing machine in accordance with the present disclosure and/or a gear-manufacturing machine in accordance with the present disclosure.

The gear manufacturing machining in accordance with the present disclosure is optionally a generating machining method, in particular a generating grinding method. An axial generating method or a diagonal generating method are optionally used.

The tool which is dressed or used in accordance with the present disclosure is optionally a grinding worm. A profile roller dresser or a form roller is optionally used as the dresser in accordance with the present disclosure.

The method in accordance with the present disclosure and the apparatus or tools in accordance with the present disclosure are optionally configured such that an involute gearing is produced in accordance with the present disclosure on the workpiece.

In accordance with the present disclosure, the relative position of the dresser to the tool during dressing with line contact can be specifically set such that the contact line between the dresser and the tool on the dresser is displaced in order hereby to influence the active profile transferred to the tool along the contact line. The desired modification on the tool is hereby produced. The crowning along the contact line and thus the profile crowning can in particular be set or changed.

The present disclosure will now be explained in more detail with reference to embodiments and to drawings.

BRIEF DESCRIPTION OF THE FIGURES

The Figures only show w-z diagrams of cylindrical gear teeth by way of example. The w-z diagrams of conical gear teeth are generally not rectangular, are typically trapezoidal, since the evaluation region of the rolling distance varies over the gear tooth width;

FIG. 20A shows a profile modification $f_{nFS}$ which was applied by a plurality of strokes using a dresser having a small active region on the worm. The profile modification has a region 30 which produces a tip relief on the gearing; a region 32 which produces a root relief on the gearing; and a main profile 31. All these regions have an angle correction and a crowning. 34, 35, 36, 37, 38, 39 mark the regions which were dressed during the individual strokes;

FIG. 20B shows the same profile modification $f_{nFS}$ as FIG. 20A which was applied here by a plurality of strokes using a dresser having a plurality of active regions on the worm. The profile modification has a region 30' which produces a tip relief on the gearing; a region 32' which produces a root relief on the gearing; and a main profile 31'. All these regions have an angle correction and a crowning. 34', 35', 36', 39' mark the regions which were dressed during the individual strokes;

DETAILED DESCRIPTION

Figure 1:
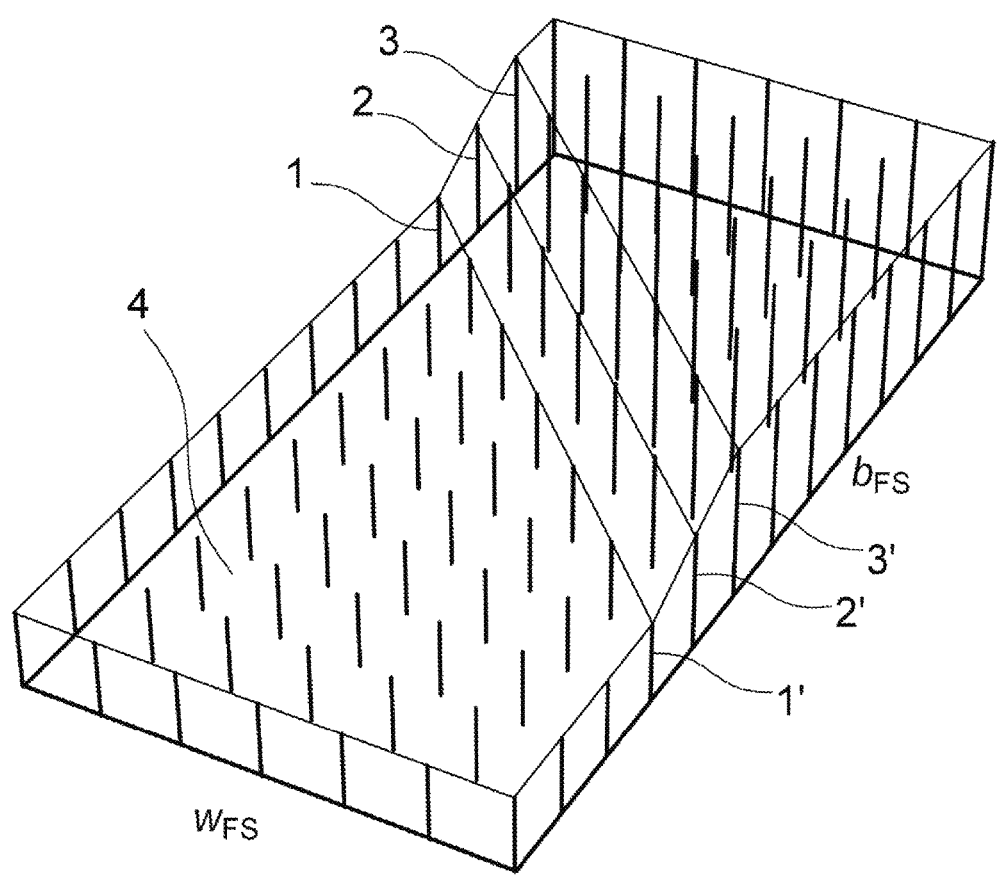
FIG. 1 schematically shows a section of the flank of a worm thread with vectors in the normal direction for a worm not ground over the whole width. The number of vectors was considerably reduced here in comparison with a simulation calculation. The plane 4 shown schematically here corresponds to the generally curved flank of the non-modified worm onto which the vectors are placed. The vectors 1 and 1' have already been swept over by the contact line and are thus completely shortened. The vectors 2 and 2' have already been shortened at least once, but have not yet been swept over by the contact line. The vectors 3 and 3' have not yet been shortened and thus still have the length corresponding to the selected allowance.

1. Description of the Dressing of the Worm

The first part of the present disclosure relates to a method for dressing tools for gear manufacturing machining and will be described in more detail in the following with reference to worms for generating grinding. The worms can be symmetrical or asymmetrical and they can be cylindrical or conical. They can all have profiles which are suitable for generating grinding of gears which can be generated; the worms can in particular have involute profiles.

Two processes are essentially known for the dressing of worms. On the one hand, dressing using a profile roller dresser which allows the dressing of the entire profile, from tip to root in one stroke, is known. This method in particular produces short dressing times when it is used on two flanks. It is, however, a disadvantage of this method that with a given dresser the profile shape can only be influenced with limitations during the dressing process. Only the profile angles can thus be influenced via the dressing kinematics in accordance with the prior art. An influencing of the profile crowning via the dressing kinematics has in particular not previously been possible.

A further method for dressing is contour dressing. In contrast to dressing using a profile roller dresser, only a small section of the profile is dressed per stroke here, which requires a plurality of strokes to dress the profile from tip to root, whereby this method becomes very uneconomical. It does, however, offer the possibility of specifying the profile shape freely within certain limits during dressing via the kinematics. If a dresser having a circular or ellipsoid profile is used, the profile can be designed very flexibly, but a very large number of strokes are necessary due to the small contact surface, and the profile has high roughness. If dressers having short, straight profile shapes are used, the number of strokes can admittedly be reduced, but profile modifications such as profile crowning can only be very roughly approximated, whereby shape deviations occur.

The following definitions are made to formulate the relationships mathematically:

Parameters for describing a dresser are provided with the index A; parameters for describing a workpiece are provided with the index S; and parameters for describing a gear are provided with the index V. In the examples in which involute worms and gears are looked at, the parameters known from DIN3960 are used: base circle radius $r_b$; base module $m_b$; base helical angle $\beta_b$. Since the relationships described here apply generally to asymmetric gears, parameters which can differ on left and right flanks are provided with the index F. Profile crowning values can be either negative or positive.

The following terms are used for transformations:

$R_x(\varphi)$: rotation by the angle $\varphi$ about the x axis. Analogously for y and z;

$T_x(v)$: translation by the path v in the x direction. Analogously for y and z; and $H(A_1, \ldots, A_N)$: general transformation describable by a homogenous matrix with a total of N coordinates $A_1$ to $A_N$.

The term "coordinates" is used here for generalized, not necessarily independent coordinates.

The axis of rotation of the worm or of the dresser always coincides with the z axis in the respective rest frames.

It is furthermore important for the formulation of the relationships to define the kinematic chain which describes the relative positions between the worm and the dresser.

The relative position between the worm and the dresser is described by the following kinematic chain $K_R$:

$$K_R = R_z(-\varphi_S) \cdot T_z(-v_{zS}) \cdot R_x(-\gamma) \cdot T_x(-d) \cdot T_y(v_{yA}) \cdot R_z(\varphi_A) \quad (1)$$

$\varphi_S$: Worm angle of rotation
$\varphi_A$: Dresser angle of rotation
$v_{yA}$: y position of the dresser
$v_{zS}$: Axial position of the worm
d: Center distance
$\gamma$: Axial cross angle.

This kinematic chain initially first only serves the mathematical description of the present disclosure described here. It does not have to match the physical axes of the machine on which the present disclosure is used. If the machine has a movement apparatus, which makes possible relative positions between the worm and the dresser in accordance with a transformation $$H(B_1, \ldots, B_{N_S}) \text{ where } N_S \geq 1 \quad (2)$$

the present disclosure can be used on this machine when there are coordinates $B_1, \ldots, B_{N_S}$ for each set of coordinates from the kinematic chain just described which set is calculated in this present disclosure, where $$H(B_1, \ldots, B_{N_S}) = K_R \quad (3)$$

The calculation of the coordinates $B_1, \ldots, B_{N_S}$ can be carried out by means of a coordinate transformation.

Typical movement apparatus which make possible all the required relative positions are, for example, described by the following kinematic chains:

$$H_{Bsp1}=R_z(-\varphi_{B1}) \cdot T_Z(-\nu_{V1}) \cdot R_x(-\varphi_{A1}) \cdot T_x(-\nu_{X1}) \cdot T_y(\nu_{Z1}) \cdot R_y(\varphi_{C5}) \cdot R_Z(\varphi_{B3}).$$ (4)

$$H_{Bsp2}=R_z(-\varphi_{B1}) \cdot T_Z(-\nu_{V1}) \cdot R_x(-\varphi_{A1}) \cdot T_x(-\nu_{X1}) \cdot T_y(\nu_{Z1}) \cdot R_z(\varphi_{B3})$$ (5)

Figure 22:
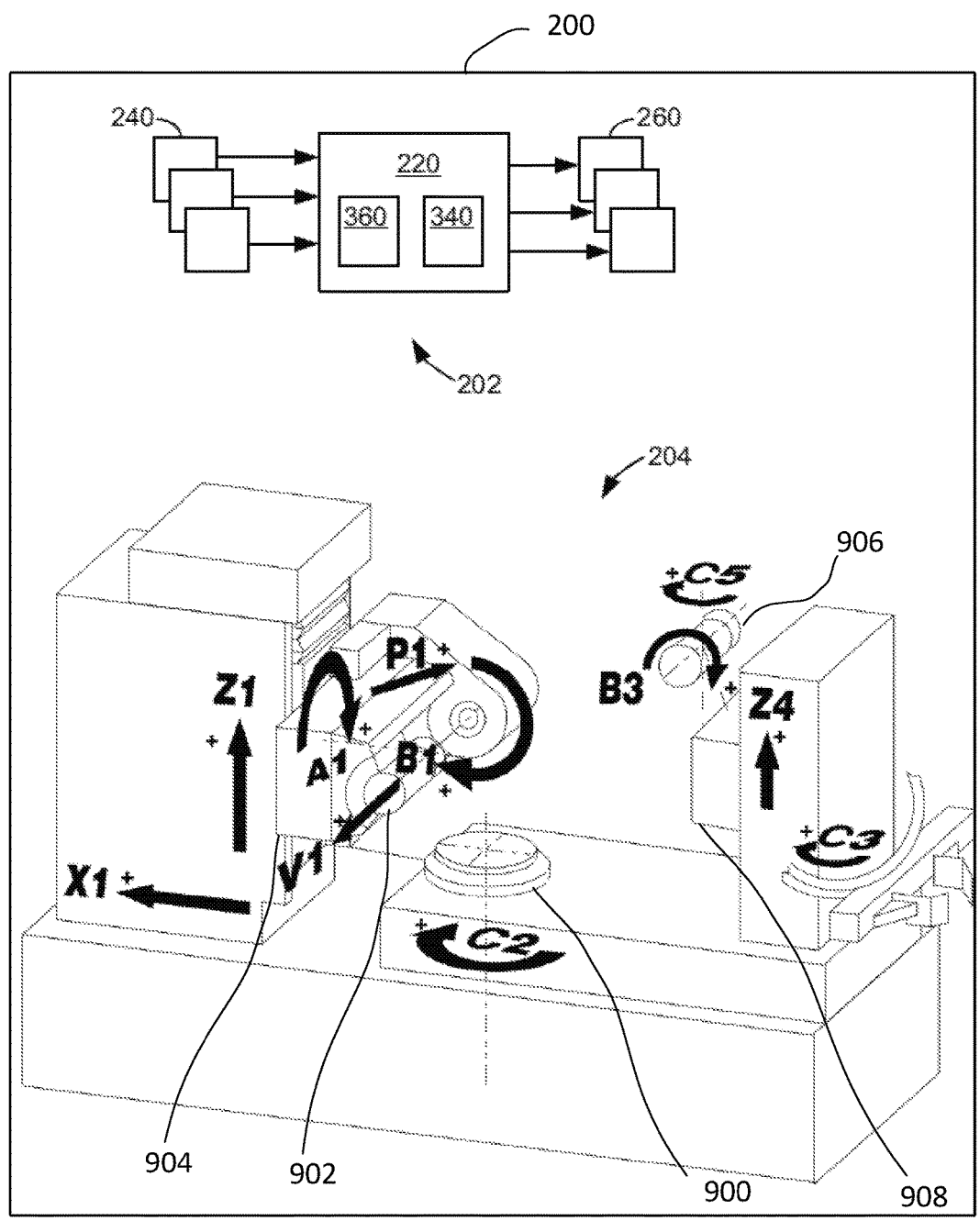
FIG. 22 shows by way of example a gear-cutting machine on which the invention can be used.

A gear cutting machine 200 which has a machine apparatus 204 such as in these two examples is shown in FIG. 22. The indices B1, V1, A1, X1, Z1, C5, B3 in formulas (4) and (5) respectively relate to the machine axes shown there.

FIG. 22 shows a perspective view of machine apparatus 204 of gear cutting machine 200 having a dressing machine which can be used for carrying out the method in accordance with the present disclosure. The gear generating machine has a machining head shown at the left having a tool holder, a workpiece holder 900 shown at the center and a dresser holder shown schematically at the right. A workpiece clamped in the workpiece location can be machined by a tool 902 clamped in the tool holder 904 for carrying out a gear manufacturing machining. To carry out a dressing process, the tool clamped in the tool holder can be machined by a dresser 906 clamped in the dresser holder 908. This has the advantage that the tool for dressing can remain in the tool holder. The axes of movement of the machining head can furthermore be used for setting the relative positions of the tool and the dresser.

As shown, gear cutting machine 200 includes a control system 202. Control system 202, which is shown schematically in FIG. 22, includes a control unit 220, sensors 240, and actuators 260. Control unit 220 includes a processor 340 and non-transitory memory 360, the non-transitory memory having instructions stored therein for controlling the gear cutting machine and the components thereof in the manner described herein. For example, the various functions, calculations, and algorithms described herein may be performed/carried out via execution, at processor 340, of instructions stored in non-transitory memory 360. Further, a computer program may be installed on the gear cutting machine, e.g. installed and thereafter stored in non-memory of the control system of the gear cutting machine, and the computer program may include instructions stored in the non-transitory memory which are executable by the processor of the control system to perform the various functions, calculations, determinations, and algorithms described herein. The sensors 240 represent various sensors and/or detection devices, e.g. sensors and/or detection devices for detecting a current state and position of the various components of the gear cutting machine. Sensors 240 further may include devices (e.g., display devices, joysticks, etc.) which receive input from an operator of the gear cutting machine and send signals to the control unit responsive to the operator input. Actuators 260 include the machining head and the dresser, as well as various components which effect the rotational and translational movement fo the machining head, dresser, and workpiece holder, for example. Control unit 220 receives signals from the various sensors 240 and employs the various actuators 260 to adjust operation of the gear cutting machine, based on the received signals and the instructions stored in the non-transitory memory 360.

The gear cutting machine has the axes of movement A1, B1, V1, X1, Z1 for moving the tool holder C2, for moving the workpiece holder and B3, C5 for moving the dresser.

In detail, B1 allows a rotation of the tool about its axis of rotation; X1 allows a translatory movement of the tool perpendicular to the axis of rotation of the tool or workpiece; Z1 allows a translatory movement of the tool in a vertical direction or in parallel with the axis of rotation of the workpiece; A1 allows a pivot movement of the tool; V1 allows a tangential movement or shift movement of the tool in the direction of its axis of rotation; C2 allows a rotary movement of the workpiece; B3 allows a rotational movement of the dressing tool about its axis of rotation; and C5 allows a pivot movement of the dressing tool to change the pressure angle α at the tool.

Other gear cutting machines and/or dressing machines can also be used for carrying out the methods in accordance with the present disclosure.

The idea of the present disclosure is to observe the 5 degrees of freedom $\varphi_S$, $\nu_{zS}$, γd and $\nu_{yA}$ from equation (28) during the dressing process to influence the profile shape of the worm. The degree of freedom $\varphi_A$ plays no role in the observation made here due to the rotational symmetry of the dresser.

In the previously known methods, only up to 4 of the existing degrees of freedom are used during the dressing. A method is thus known from EP1995010 A1 in which a worm is dressed in a crowning manner over its width b changing the center distance d (tooth trace crowning). A method is known from DE 19706867 A1 in which a worm can be manufactured with a profile angle varied over its width by a constant change of $\varphi_{C5}$, $\nu_{V1}$ and $\nu_{X1}$ with a kinematic chain similar to the example from equation (4) with $\varphi_{A1}$=0. The same is described in DE 102006061759A1 with a kinematic chain as described in equation (5) with $\varphi_{B1}$, $\nu_{V1}$, $\varphi_{A1}$, $\nu_{X1}$ and $\nu_{Z1}$. Even though 5 axes are moved or corrected here, there are only 3 degrees of freedom $\varphi_{C5}$, $\nu_{V1}$, and $\nu_{X1}$ from equation (4) which are varied. The positions of the 5 moved axes result from a coordinate transformation with given $\varphi_{C5}$, $\nu_{V1}$ and $\nu_{X1}$. Due to the similarity with the method from DE19706867 A1, only the profile angle can likewise be modified over the worm width using DE102006061759 A1.

It is already shown in DE102005030846A1, analogously to DE102006061759A1, how the profile angle of a worm can be modified constantly over its whole width using the axes $\varphi_{B1}$, $\nu_{V1}$, $\varphi_{A1}$, $\nu_{X1}$ and $\nu_{Z1}$ from equation (5). Only 3 degrees of freedom are again also varied here and the positions of the moved axes result from a coordinate transformation.

When dressing a worm, its axial position $\nu_{zS}$ over the lead is typically coupled to the angle of rotation of the worm $\varphi_S$. The contact line between the worm and the dresser thereby sweeps over the part of the worm to be dressed. If a worm is dressed without modification over its width, the remaining coordinates d, $\nu_{yA}$ and γ are set to fixed values and are not moved during dressing. These coordinates are typically set to those values which were adopted in the configuration of the dresser. If values are selected for these coordinates which do not correspond to those of the dresser configuration, it is possible to dress the worm in modified form. The achievable forms of the modifications depend on the number of degrees of freedom used. Modifications on the flanks of the worm thread, defined in the normal direction on the flank are marked by $$f_{nFS}(w_{FS},b_{FS})$$ (6)

here, where $b_{FS}$ is the position in the width line direction, and $w_{FS}$ is the rolling distance (also called the rolling path) in involute profiles and is a parameter for parameterizing the profile with non-involute profiles. However, the term rolling distance will also be used for non-involute gears in the following.

Since the axial position $v_{ZS}$ of the worm is only responsible for displacing the contact line over the worm width, this coordinate cannot be used for influencing the modification along the contact line. The following 4 degrees of freedom are thus available for producing modifications: $\varphi_S$, $\gamma$, d and $v_{yA}$. However, only the corrections of these degrees of freedom with respect to the values during the dressing of worms not modified via the kinematics will be looked at here. The corrections are designated as follows:

$$\Delta\varphi_S, \Delta\gamma, \Delta d, \Delta v_{yA} \tag{7}$$

and are combined in the parameter $\Delta K := (\Delta\varphi_S, \Delta\gamma, \Delta d, \Delta v_{yA})$.

If the influence of these 4 coordinate corrections on the produced profile modification of the worm differs, that is if a change of one of these coordinates results in respectively different profile modifications, this can be utilized to freely specify four points of the modification within certain limits. The region in which the modifications can be specified and what form this modification has over the total profile is decisive for the applicability of the method proposed here. This will be discussed in detail further below.

If generating grinding is carried out on a gear having a profile modification, that is a modification which only depends on the rolling distance $w_{FV}$ and not on $b_{FV}$, a corresponding profile modification has to be introduced into the worm for this purpose. A radius on the worm $r_S$ is associated for this purpose with each radius within the region on the gear $r_V$ to be ground. This association has in principle to be carried out again for every worm diameter. To be able to dress a worm modified in this manner with the aid of a profile roller dresser, a radius on the dresser $r_A$ has to be associated with every radius on the worm $r_S$ and a corresponding modification on the dresser has to be introduced at these associated radii. If dressing is carried out with uncorrected kinematics, the dresser can be utilized, in dependence on the dresser geometry and worm geometry, over a large range of worm diameters and the worms thus manufactured produce the correct profile modification on the ground gear. If, however, the above-mentioned dressing kinematics are used during dressing to freely specify the modification on the worm at 4 points within certain limits, this generally has the result that the correct association between the radii on the worm and the radii on the dresser is no longer ensured. If this occurs, it results in a displacement of the profile modification on the worm toward a smaller or a larger radius. This incorrect positioning of the profile modification on the worm then produces an incorrect positioning of the profile modification on the gear. If, for example, the modification introduced into the dresser serves exclusively the producing of a profile crowning, this incorrect association is of no further significance as long as it is not so pronounced and can be compensated by corrected dressing kinematics. If, however, this incorrect association is so pronounced that the outer radius of the dresser no longer reaches the smallest radius to be dressed on the worm or that the dresser dips so far into the worm that there is contact with the mating flank, the incorrect association is also harmful in these cases. If, in contrast, the profile modification includes distinctive points such as a kink at the start of a tip relief, the incorrect association would result in an incorrect positioning of this kink on the gear.

To solve this problem, the dressing kinematic can be selected such that the dresser contacts the worm at a specified radius. If, in the just listed example of the tip relief at the dresser, the radius at which the kink is positioned is selected and if the radius at the worm is selected which produces the radius at the gear, at which radius the kink should be positioned, this problem can be avoided. However, this has the result that the profile modification on the profile can only be specified at 3 points instead of at 4. The specification at only 3 points is, however, sufficient in order, for example, to apply profile crownings to an involute worm which then in turn produce profile crownings at a ground involute gear.

To be able to carry out the following calculations, it is necessary to be able to determine which profile, in particular which profile modification, is produced with a given dresser and with given axis corrections $\Delta K$ on the flanks of the worm. The case will first be looked at here in which axis corrections are fixedly set during the dressing process and only $v_{zS}$ and $\varphi_S$ are moved coupled in accordance with the lead of the worm. The modification, defined as a deviation in the normal direction with respect to the tooth flank, in dependence on the axis corrections, is designated by $f_{nFS}(w_{FS}; \Delta K)$ here. The calculation of $f_{nFS}(w_{FS}; \Delta K)$ can be carried out, for example, with the aid of a dressing simulation. Inputs into such dressing simulations are, in addition to the dresser geometry and the dressing kinematics, as a rule also the geometry of the worm prior to dressing. The worm prior to the dressing is selected in the following calculation such that it has a positive stock everywhere on the thread with respect to the worm after the dressing. In such dressing simulations, the dressing process is typically divided into a finite number of time steps and where material removed at the worm by the dresser is then determined for each point in time.

A possible algorithm which is able to deliver all the information required later will be presented in detail here. For this purpose, a worm is first looked at which is not modified as a rule. Vectors in the normal direction having a previously fixed length are placed on individual points having the coordinates ($w_{FS}$, $b_{FS}$) on the threads of this worm. The length of the vectors corresponds to the stock of the worm before the dressing, with reference to the non-modified worm. The stock is typically selected to be so large that each vector is shortened at least once during the simulation described in the following. The number of points on the threads determines the accuracy of the result. These points are optionally selected as equidistant. The relative position of the worm to the dresser is specified at each point in time, for example by the coordinates of the uncorrected kinematics $\varphi_S$, $\gamma$, d, $v_{yA}$ and their corrections $\Delta K$. The intersection of all vectors with the dresser is calculated at each of the discrete times. If a vector does not intersect the dresser, it remains unchanged. If it, however, intersects the dresser, the point of intersection is calculated and the vector is shortened so much that it ends just at the point of intersection. The distance of the point of intersection from the dresser axis, that is the radius on the dresser $r_A$ of the point of intersection, is furthermore calculated and is stored as additional information to the just shortened vector. Since the corrections of the coordinates are not changed during the dressing here, all the vectors on a given radius of the worm $r_S$ or on a given rolling distance $w_{FS}$ have approximately the same length after the simulation was carried out over the total width of the worm. This length corresponds to the modification $f_{nFS}$ of the worm dependent on the corrections $\Delta K$.

The slight differences in the lengths are due to the fact that the algorithm described here causes feed markings due to the discretization of the time. These feed markings, and thus also the differences in the lengths of the vectors on a given radius of the worm, can be reduced by a finer discretization of the time, equivalent to a shortening of the time steps. If the simulation is not carried out over the total width of the worm, but is rather aborted at a given axial shift position $v_{zS}$ of the worm, only the vectors which were already swept over by the contact path of the dresser and the worm have approximately the same length for a given radius on the worm. The remaining vectors either have the originally selected length or were already shortened at least once, but do not yet have the final length since they will be shortened again at a later time. This fact can be used to determine the contact line very exactly for the given dresser and for the given relative position of the worm with respect to the dresser, described by $\Delta K$. All the vectors on a given radius on the worm $r_{FS}$ or on the rolling distance $w_{FS}$ are observed for this purpose and it is determined at which width line position the transition is from vectors having approximately the same length to those having a length differing therefrom. The contact line can thus be described by a function $b_{BRFS}$ or $b_{BwFS}$, depending on the corrections $\Delta K$ and $v_{zS}$, where:

$$b_{FS} = b_{BRFS}(r_{FS}; v_{zS}, \Delta K) \text{ or } b_{FS} = b_{BwFS}(w_{FS}; v_{zS}, \Delta K) \quad (8)$$

For involute worms, the contact line can be described in a very good approximation by a straight line in the coordinates $(w_{FS}, b_{FS})$, where:

$$w_{FS} \sin \rho_{FS}(\Delta K) + b_{FS} \cos \rho_{FS}(\Delta K) = X_{FS}(v_{zS}, \Delta K) \quad (9)$$

with $\rho_{FS}(\Delta K)$ describing the direction and $X_{FS}(v_{zS}, \Delta K)$ describing the position of the straight line. The dependency of the direction $\rho_{FS}(\Delta K)$ on the corrections $\Delta K$ is only small so that the direction can still be assumed to be a good approximation as only given by the worm geometry and dresser geometry.

If the vectors are determined along which the contact line extends, the radii on the dresser $r_{FA}$ previously stored for them can be read out and it can thus be determined for each radius on the worm $r_{FS}$ by which radius on the dresser $r_{FA}$ it was dressed. This association depends on the corrections $\Delta K$:

$$r_{FA} = r_{FA}(r_{FS}; \Delta K) \quad (10)$$

The accuracy with which the contact line and the association of the radii can be determined in this manner depends both on the selected distance of the points and also on the length of the discrete time steps. Both values can theoretically be selected as small as desired, but in practice they are limited by the available RAM and the maximum acceptable computing time. This calculation is possible in practice with sufficient accuracy using the PCs available today with multiple gigabyte RAM.

An alternative to the just presented dressing simulation for calculating $f_{nSF}$, $b_{BRFS}$ or $b_{BwFS}$ and $r_{FA}$ is an analytical calculation. This mathematically more complex method offers the advantage that the calculation can generally be carried out faster.

The mathematical relationships underlying the present disclosure will be described more exactly in the following for some cases of application.

4 Point Method

The case of a profile modification which is constant over the whole worm width will first be looked at which is to be exactly reached at 4 rolling distances $w_{FSi}$ (4 point method). The values of the profile modification $f_{FSi}$ at the 4 rolling distances $w_{FSi}$ are functions of the coordinate corrections $\Delta K$.

$$f_{FSi} = f_{nFS}(w_{Fi}; \Delta K), i = 1, \ldots, 4 \quad (11)$$

The function $F_4$ $$F_{F4}(\Delta K) = \begin{pmatrix} f_{nFS}(w_{F1}; \Delta K) - f_{FS1} \\ f_{nFS}(w_{F2}; \Delta K) - f_{FS2} \\ f_{nFS}(w_{F3}; \Delta K) - f_{FS3} \\ f_{nFS}(w_{F4}; \Delta K) - f_{FS4} \end{pmatrix} \quad (12)$$

can be constructed from this. For certain profile modifications ($f_{FS1}$, $f_{FS2}$, $f_{FS3}$, $f_{FS4}$), the roots of $F_{FS4}$ can be calculated which correspond to the corrections $\Delta K$ which have to be set to produce the desired profile modification on the worm at the rolling angles ($w_{FS1}$, $w_{FS2}$, $w_{FS3}$, $w_{FS4}$). If the function $F_{FS4}$ does not have a root, the profile modification cannot be exactly produced.

The profile modification is only considered at 4 rolling distances in this calculation. The profile modification along the total profile, that is for all rolling distances, can be determined using $f_{nFS}(w_{FS}; \Delta K)$ from the calculated corrections $\Delta K$.

The root calculation can be carried out using the methods known from numerical mathematics, for example using the multidimensional Newton's method. The partial derivations of $F_{FS4}$ can be numerically calculated for this purpose. It is necessary for this purpose to be able to calculate the function $F_{FS4}$ and thus also the function $f_{nFS}(w_{FS}; \Delta K)$ with a high accuracy, which, as described above, is possible with the algorithm presented here. It can equally be checked with such a numerical method whether $F_{FS4}$ has a root at all. This is shown in Newton's method, for example, in the convergence which is adopted. These considerations on the numerical calculation of the roots apply equally to the further variants presented.

This makes it possible to calculate the number of all profile modifications which can be produced for a given worm and for a given dresser. However, the inverse calculation is also particularly relevant in practice; that is a calculation with which the worm geometries and dresser geometries which can produce the desired modifications can be determined.

The axis corrections described here generally cause a displacement and deformation of the contact line between the dresser and the worm which are described by equation (8). Equation (8), however, allows the position of the contact line to be specified at a time such that a point $(w_{FS0}, b_{FS0})$ specified on the worm lies on the contact line. This produces the following relation $$b_{FS0} = b_{BwFS}(w_{FS0}; v_{zS}, \Delta K) \quad (13)$$

which can be used together with the function $F_{FS4}$ from equation (12) to define the function $\hat{F}_{F4}$ $$\hat{F}_{F4}(\Delta K, v_{zS}) := \begin{pmatrix} f_{nFS}(w_{FS1}; \Delta K) - f_{FS1} \\ f_{nFS}(w_{FS2}; \Delta K) - f_{FS2} \\ f_{nFS}(w_{FS3}; \Delta K) - f_{FS3} \\ f_{nFS}(w_{FS4}; \Delta K) - f_{FS4} \\ b_{BwFS}(w_{FS0}; v_{zS}, \Delta K) - b_{FS0} \end{pmatrix} \quad (14)$$

The roots of this function also supply, in addition to the axis corrections $\Delta K$, an axial position of the worm $v_{zS}$ such that the desired modification is produced and the contact line passes through the points $(w_{FS0}, b_{FS0})$. This makes it possible directly to dress only specific regions on the worm and makes it possible to keep the overrun required during dressing as small as possible.

The just discussed example can be expanded such that the modification on the worm is not the same over the whole width. Such modifications are called topological modifications. For this purpose, the modifications $f_{FSi}$ are given a dependency on the position in the width line direction $b_{FS}$.

$$f_{FSi} = f_{FSi}(b_{FS}), i=1,\ldots,4 \quad (15)$$

The rolling angles $w_{FSi}$ at which the modifications are specified can equally be dependent on the position in the width line direction.

$$w_{FSi} = w_{FSi}(b_{FS}), i=1,\ldots,4 \quad (16)$$

Figure 2:
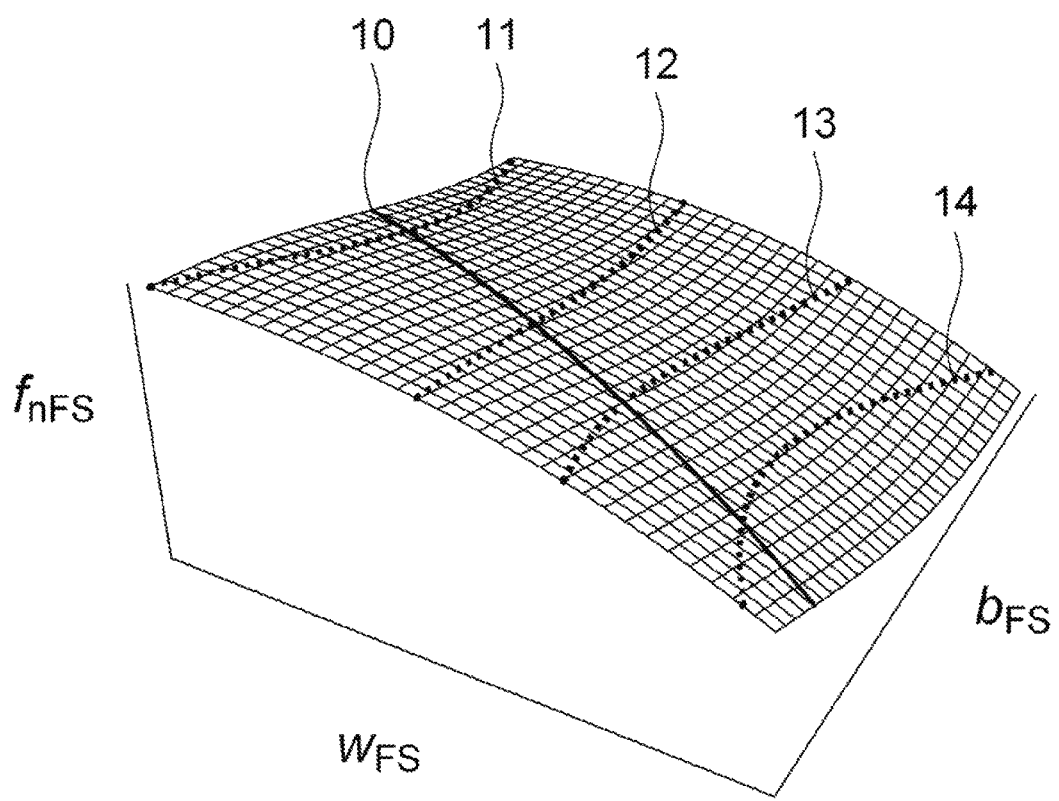
FIG. 2 shows a topological modification $f_{nFS}(w_{FS}, b_{FS})$ of a worm with the contact line 10 between the dresser and the worm and with the four freely specifiable lines $w_{FSi}(b_{FS})$ 11, 12, 13 and 14 along which the desired modification should be exactly reached during dressing.

This expansion is in particular of interest when the dressed worm should be used for the generating grinding in the diagonal generating method. It is possible in this special form of generating grinding to apply topological modifications specifically on the gear. The likewise topological modification $f_{nFS}(w_{FS}, b_{FS})$ on the worm in this case has a dependency on $w_{FS}$ and $b_{FS}$. The function $w_{FSi}(b_{FS})$ defines on which rolling distances the desired modification is to be exactly reached during dressing at which points on the worm in dependence on the position in the width line direction (see FIG. 2). If, for example, the tolerance of the modification on the worm is not the same for all values of $w_{FS}$ and $b_{FS}$, the free choice of $w_{FSi}(b_{FS})$ can be used to achieve the modification exactly at the regions with tighter tolerances. The function $F_{FSi}(b_{FS})$ is given by:

$$f_i(b_{FS}) = f_{nFS}(w_{FSi}(b_{FS}), b_{FS}) = 1,\ldots,4 \quad (17)$$

Analogous to equation (14), a function can thus be defined whose roots deliver, for a given $b_{FS0}$, the corrections $\Delta K$ to be set and the axial position $v_{zS}$ to be set. It must, however, be noted that the contact line must intersect the 4 lines $w_{FSi}(b_{FS})$ in this calculation, from which the positions result at which the desired modification $f_{nFS}(w_{FS}, b_{FS})$ is to be evaluated. These additional conditions have the result that the function to be looked at here has 9 dimensions instead of the previous 5.

3 Point Method

As initially mentioned, the 4 point method has the disadvantage that it does not allow any control of the positioning of the modification introduced into the dresser on the worm. To solve this problem, only 3 modifications $f_{FSi}$ are looked at at 3 rolling angles $w_{FSi}$ which are initially constant again in the following method (3 point method). It is assumed for this purpose as an additional condition that the radius $r_{FA}$ on the dresser should produce the radius $r_{FS}$ on the worm. Analogous to $F_{F4}$, the function $F_{F3}$ with $$F_{F3}(\Delta K) := \begin{pmatrix} f_{nFS}(w_{FS1}; \Delta K) - f_{FS1} \\ f_{nFS}(w_{FS2}; \Delta K) - f_{FS2} \\ f_{nFS}(w_{FS3}; \Delta K) - f_{FS3} \\ r_{FA}(r_{FS}; \Delta K) - f_{FA} \end{pmatrix} \quad (18)$$

can be constructed from this. For specific tuples ($f_{FS1}$, $f_{FS2}$, $f_{FS3}$, $r_{FS}$, $r_{FA}$), the roots of $F_{F3}$ can be calculated which correspond to the corrections $\Delta K$ which have to be set to produce the desired modifications ($f_{FS1}$, $f_{FS2}$, $f_{FS3}$) and to map the desired radius on the dresser to the desired radius on the worm. This method can likewise be expanded by the option of specifying a point ($w_{FS0}, b_{FS0}$) which should lie on the current contact line. The function $F_{F3}$ has to be expanded to the function $\hat{F}_{F3}$ analogous to equation (14) for this purpose. It is also important in the 3 point method for the evaluation of the applicability of the method to be able to determine which modifications can be reached with a given worm geometry and dresser geometry or also the inverse, that is to calculate worm and dresser geometries which allow the desired modifications. For this purpose an involute worm is looked at by way of example in which $f_{FS1}=0$ and $f_{FS3}=0$ and $w_{FS2}=(w_{FS1}+w_{FS3})/2$. $f_{FS2}/\cos\beta_{bFV}$ is here designated by $c_{\alpha FS}$ since this choice of the modifications $F_{FSi}$ and of the rolling angles $w_{FSi}$ results in a profile crowning between the rolling angles $w_{FS1}$ and $w_{FS3}$ having the value $f_{FS2}/\cos\beta_{bFV}$. This special case was chosen here since the profile crowning substantially determines whether the desired modification can be achieved with a given worm geometry and dresser geometry. Modifications with freely selected values for $f_{FS1}$, $f_{FS2}$ and $f_{FS3}$ are received by a superposition of one of the modifications looked at here with $f_{FS1}=0$ and $f_{FS3}=0$, a tooth thickness change of the worm thread and a profile angle correction. The tooth thickness and the profile angle can, however, be corrected during dressing substantially independently of the worm geometry and dresser geometry; it is only necessary to ensure that the dresser, when dressing one flank, does not intersect the other flank of the same gap. However, in practice, it is not the profile crowning on the worm which is relevant, but rather the profile crowning produced during the generating grinding on the workpiece. This profile crowning, designated by $c_{\alpha FV}$ here, is calculated by $$c_{\alpha FV} = -c_{\alpha FS} \cdot \frac{\cos\beta_{bFS}}{\cos\beta_{bFV}} \quad (19)$$

In this respect, the evaluation regions for the profile crownings are selected such that the start of the evaluation region on the worm produces the end of the evaluation region on the gear and the end of the evaluation region on the worm produces the start of the evaluation region on the gear. It is known from the prior art that worms having the most varied geometries can be used with a given gear to be ground. With the involute gears and worms, the essential criterion for deciding whether a worm can be used is whether the two involute gears (worm and gear) can mesh with one another. This is equivalent to:

$$m_{bFV} \cdot \cos\beta_{bFV} = m_{bFS} \cdot \cos\beta_{bFS} \quad (20)$$

Typical developments of the axis corrections $\Delta K$ are discussed in the following for an exemplary gear, in dependence on the profile crowning $c_{\alpha FV}$ to be achieved on the gear. In addition to the axis corrections, the axial position $v_{zS}$ is also looked at. In this respect, dressers are looked at which are designed such that they dress worms without profile crowning and these worms then also do not produce any profile crownings on the gear.

Figure 6:
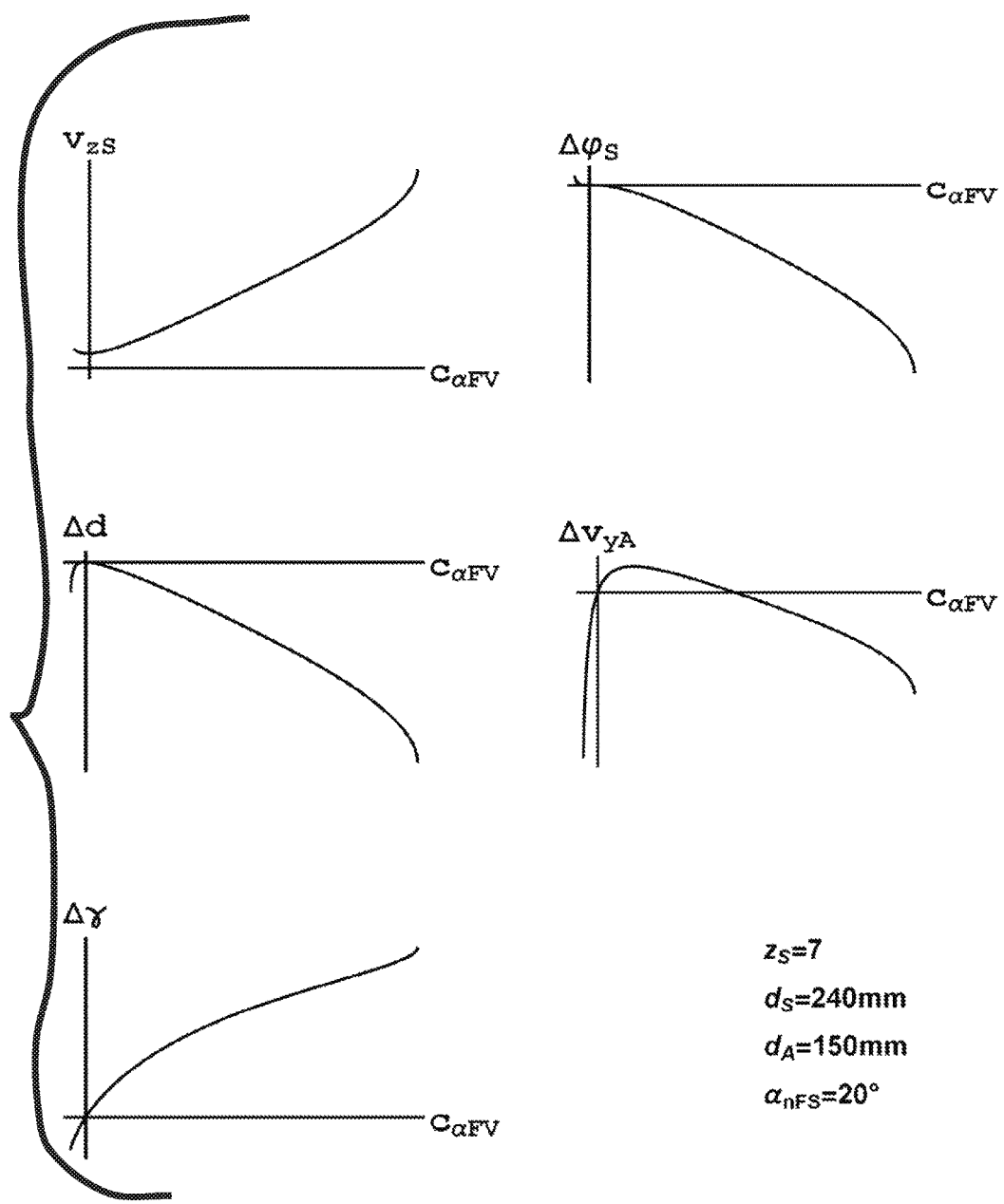
FIG. 6 shows for the example of an involute worm and of an involute gearing ground therewith which axial corrections $\Delta K$ and which axial position of the worm $v_{zS}$ are to be set in dependence on the profile crowning $c_{\alpha FV}$ to be produced on the gearing. The diagrams show almost the whole region of the profile crownings which can be generated on this gearing using the selected worm and the selected dresser.
Figure 7:
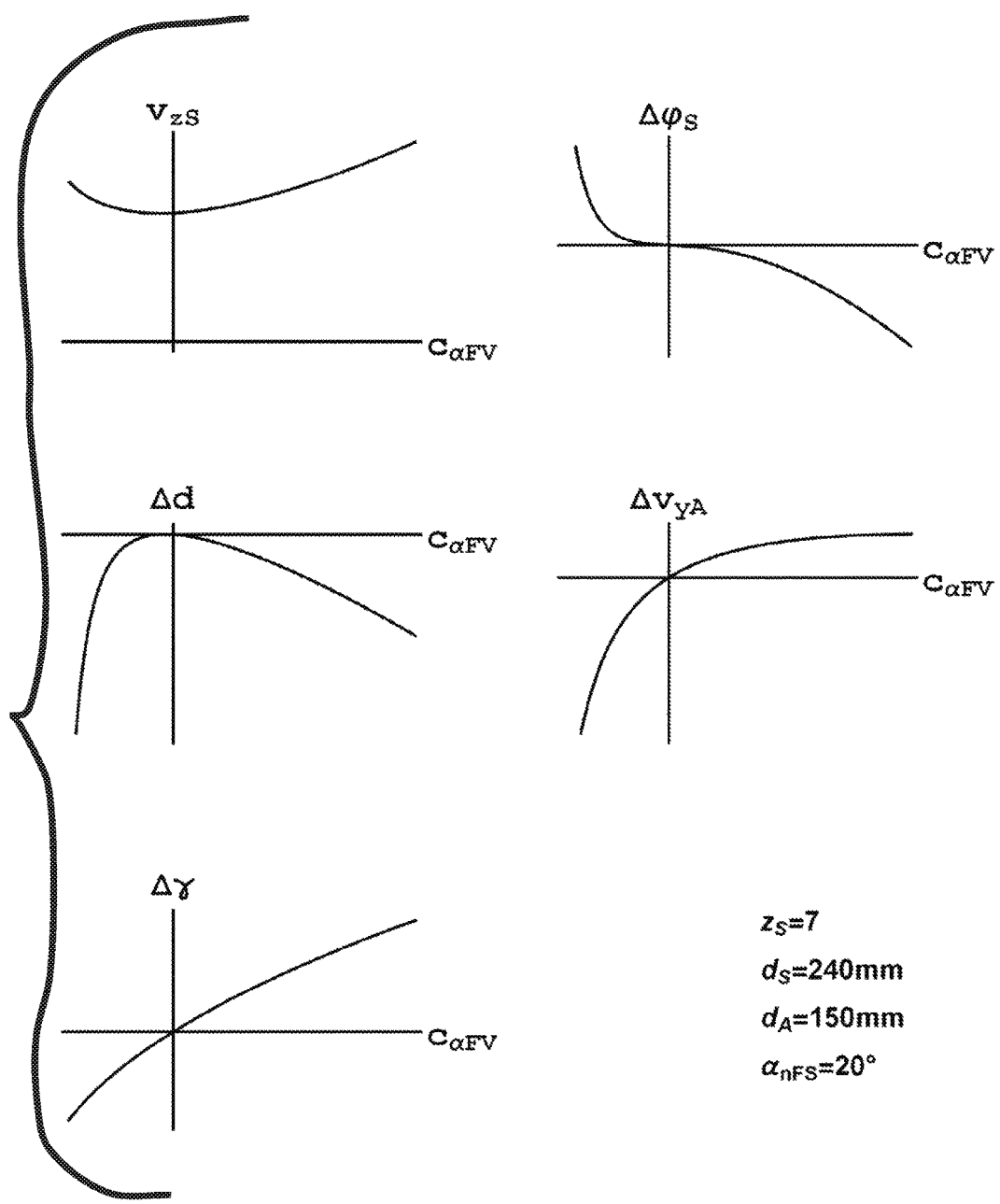
FIG. 7 shows the same diagrams as FIG. 6, but reduced to a smaller region of the profile crowning $c_{\alpha FV}$ to better illustrate the progressions for small profile crownings.

The developments of the axial corrections have complex forms over the total region of the profile crowning which can be achieved on the gear and said forms cannot be described by simple functions (see FIG. 6). It is in particular not possible reliably to draw conclusions on the total progression from the progressions with profile crownings which are small in amount. It is thus advisable in every case to carry out the calculation for the desired profile crowning. Steep increases (e.g., increases having a slope greater than a threshold) can be found at the axial corrections $\Delta K$ and the axial position of the worm $v_{zS}$ at the right hand margin of the progressions shown. This steep increase can in particular be found at $\Delta d$, $\Delta\varphi_S$ and $\Delta v_{yA}$ at the left hand margin. These margins mark the maximum and minimal profile crowning which can be produced. Outside the left hand and right hand margins, the function $\hat{F}_{F3}$ no longer has any roots.

Figure 8:
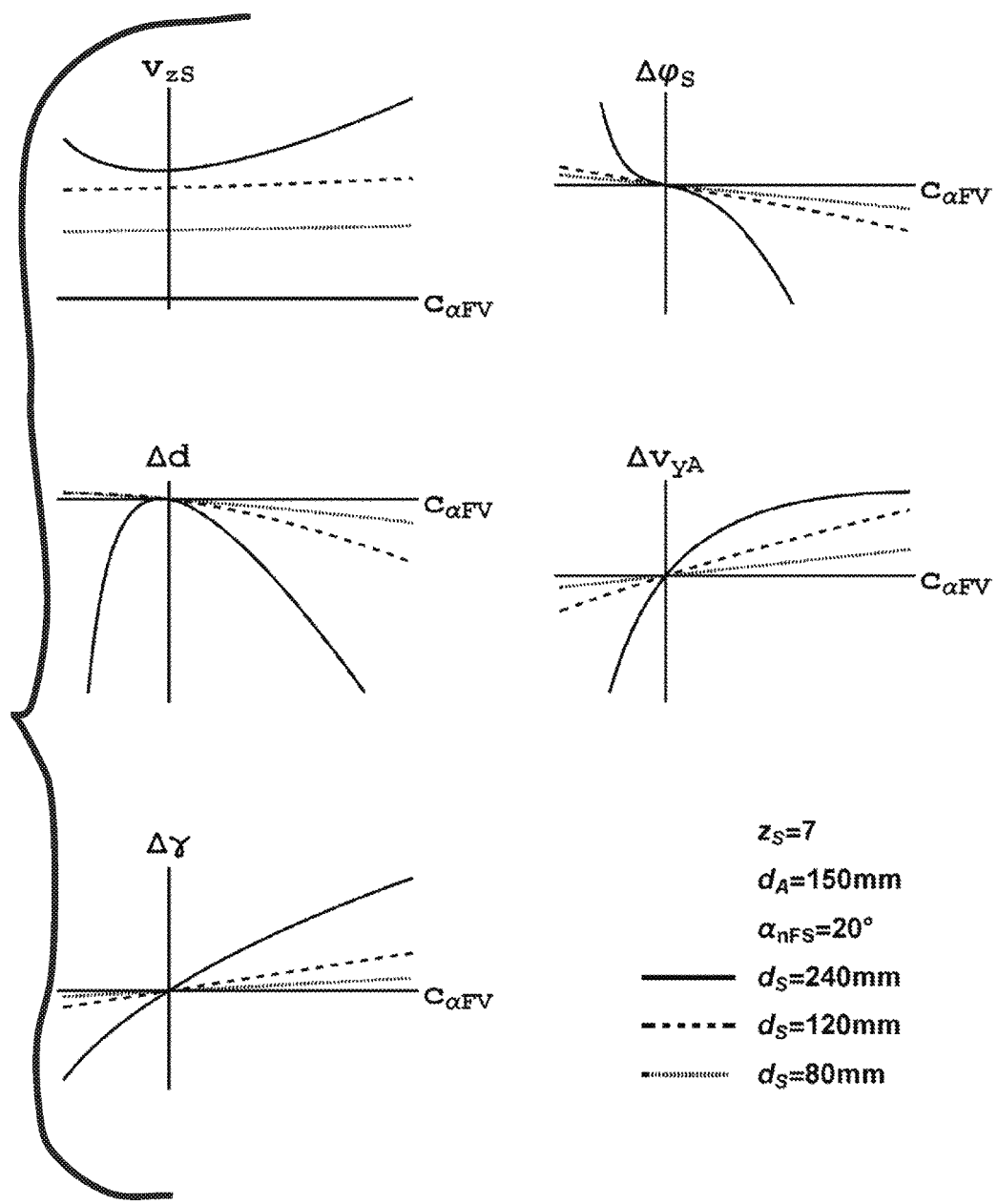
FIG. 8 shows diagrams as in FIG. 7 with the same region of the profile crowning $c_{\alpha FV}$, but for different worm diameters $d_S$.
Figure 9:
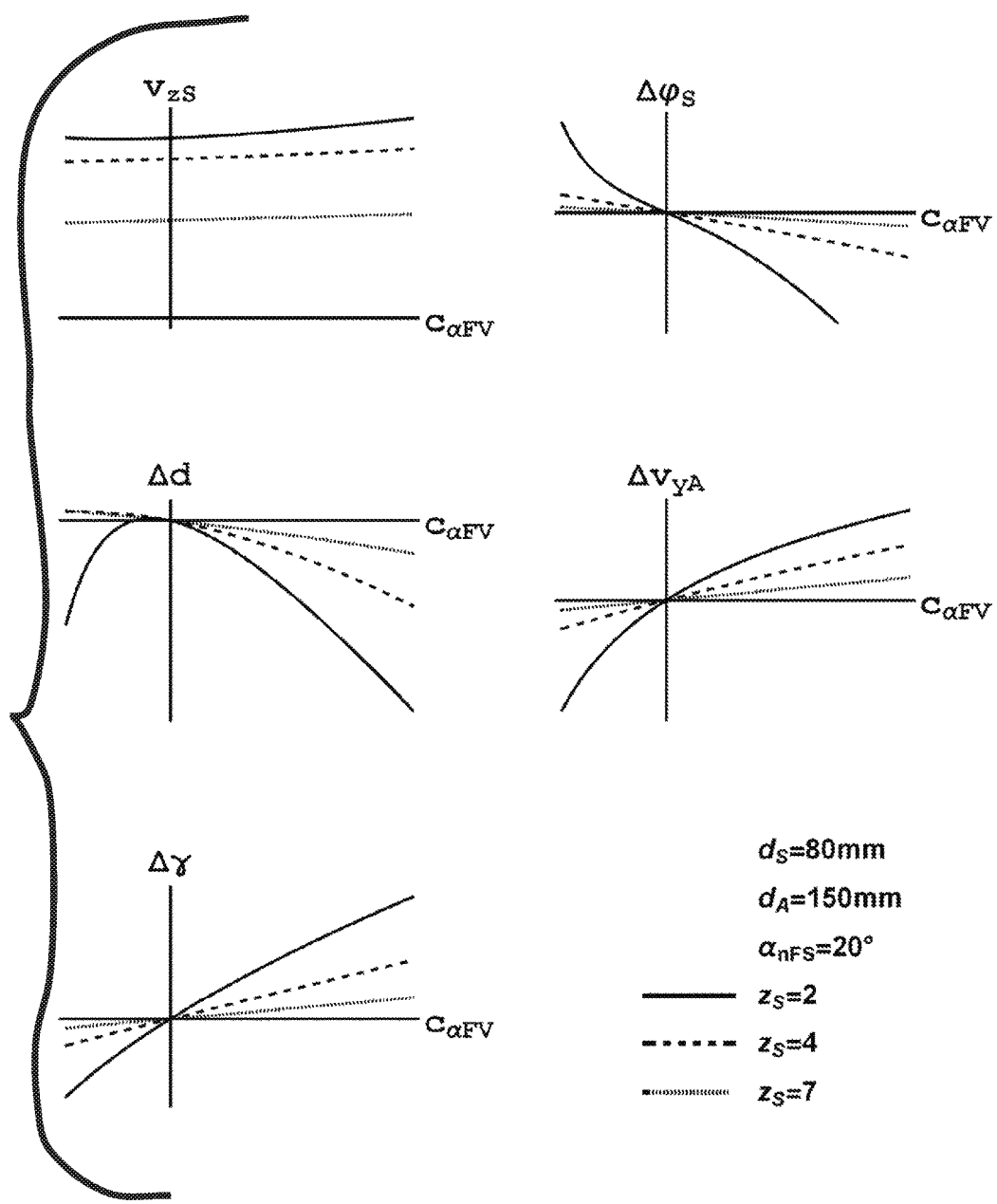
FIG. 9 shows diagrams as in FIG. 7 with the same region of the profile crowning $c_{\alpha FV}$, but for a different worm diameter $d_S$ and for different numbers of threads $z_S$.
Figure 10:
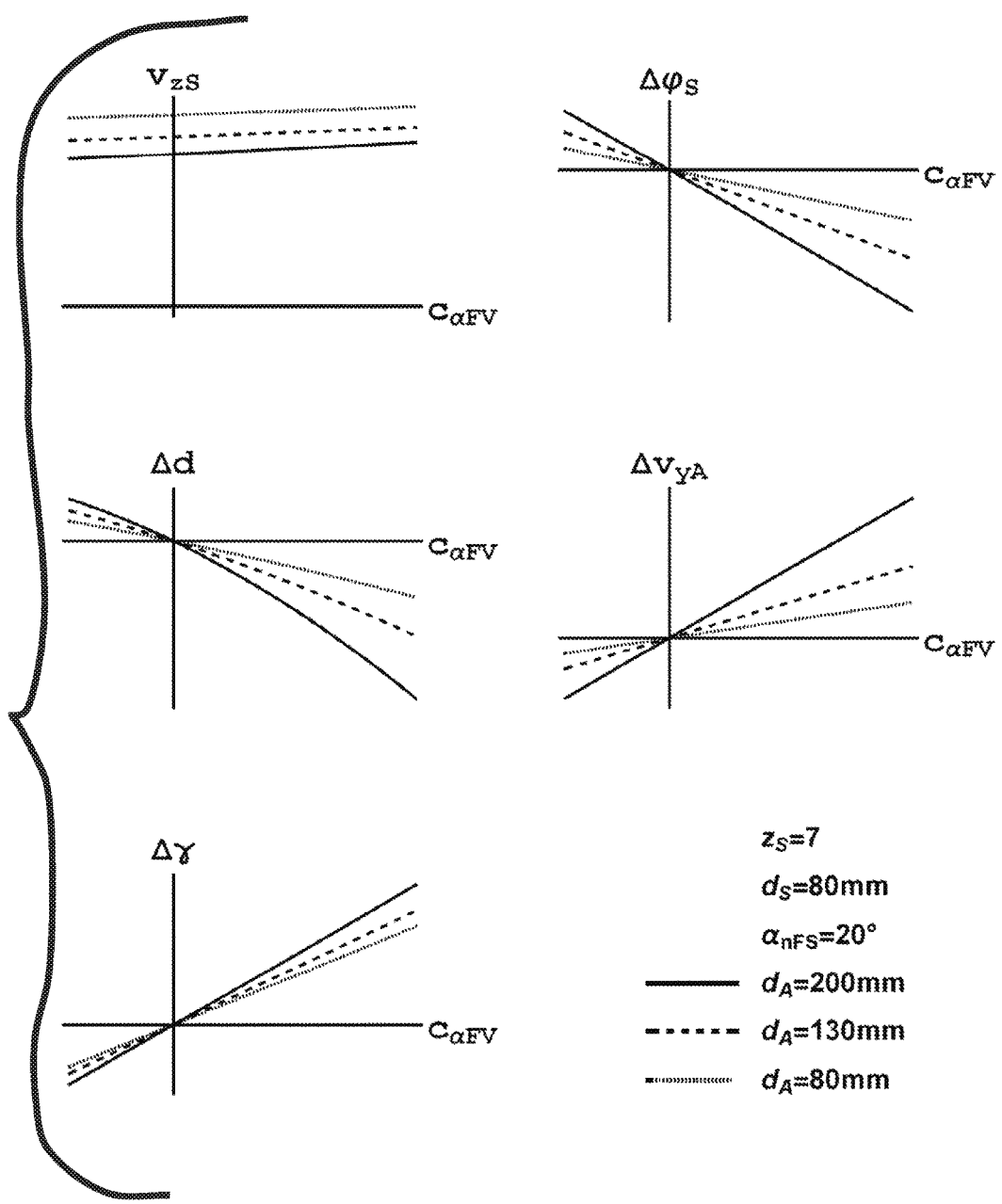
FIG. 10 shows diagrams as in FIG. 7 with the same region of the profile crowning $c_{\alpha FV}$, but for a different worm diameter $d_S$ and for different diameters of the dresser $d_4$.
Figure 11:
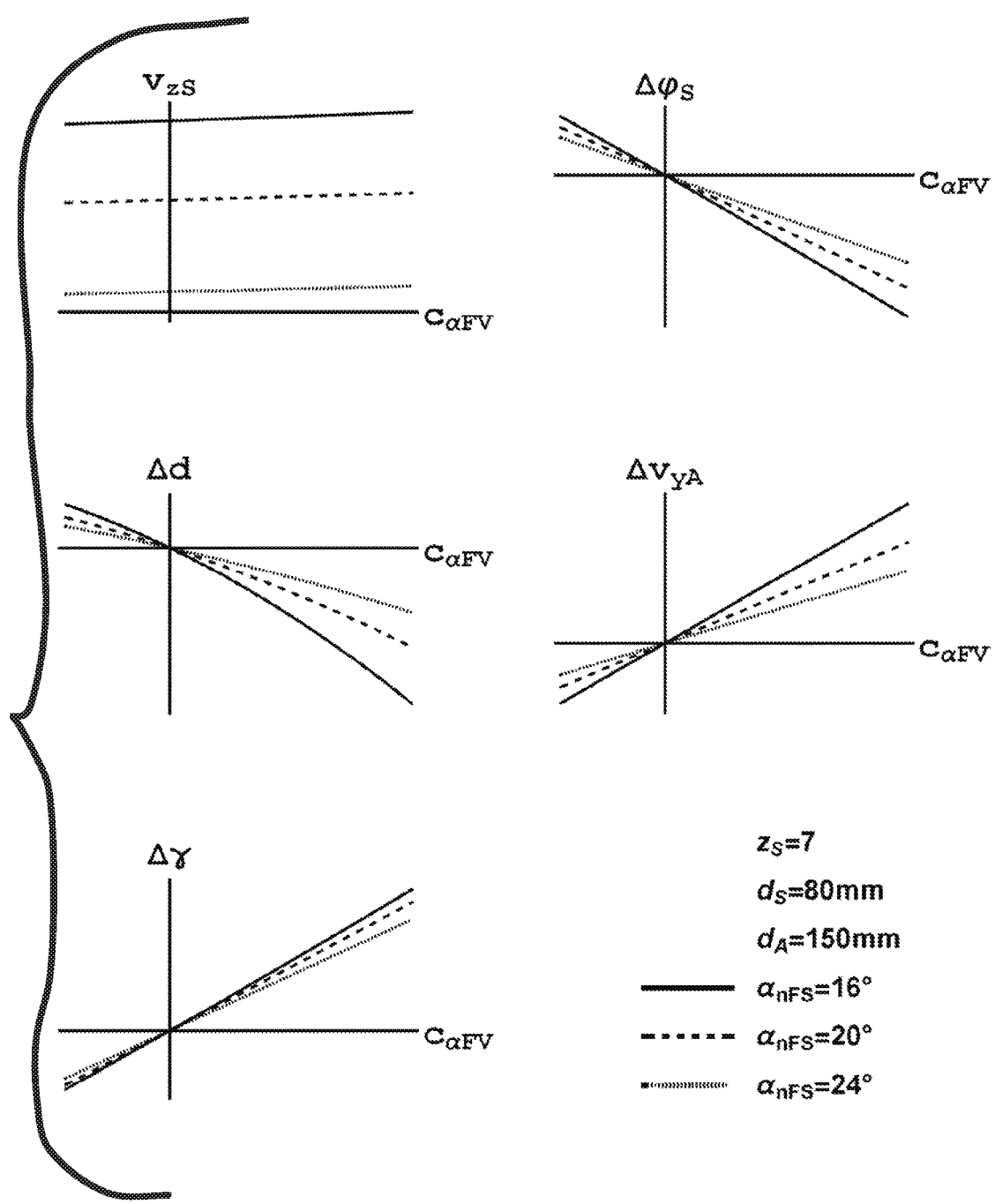
FIG. 11 shows diagrams as in FIG. 7 with the same region of the profile crowning $C_{\alpha FV}$, but for a different worm diameter $d_S$ and for different profile angles of the worm $\alpha_{nFS}$.

The progressions are highly influenced by the geometrical parameters of the worm used and of the dresser. FIG. 8 thus shows that as the diameter of the worm $d_S$ increases, the corrections $\Delta K$ and the axial position $v_{zS}$ become larger and $\Delta \varphi_S$, $\Delta d$ and $\Delta \gamma$ in particular become considerably larger. FIG. 9 shows that as the number of starts of the worm $z_S$ decreases, the corrections $\Delta K$ and the axial position $v_{zS}$ become larger and $\Delta \varphi_S$, $\Delta d$ and $\Delta \gamma$ in particular become considerably larger. FIG. 10 shows that as the diameter of the dresser $d_A$ increases, the corrections $\Delta K$ become larger. FIG. 11 shows that as the normal profile angle of the worm $\alpha_{nFS}$ becomes smaller, the corrections $\Delta K$ and the axial position $v_{zS}$ become larger. These high dependencies reveal that the choice of the suitable worm and dresser geometries described here is of great importance for the successful application of the present disclosure described here since it is generally of advantage to keep the travel of the machine axes as small as possible.

It is customary in accordance with the state of the art to configure dressers such that they produce a profile crowning on the worm and such that these worms then in turn produce a profile crowning on the gear. If such dressers are used, the profile crownings produced by the dresser are added to those produced using the method presented here.

Figure 12A:
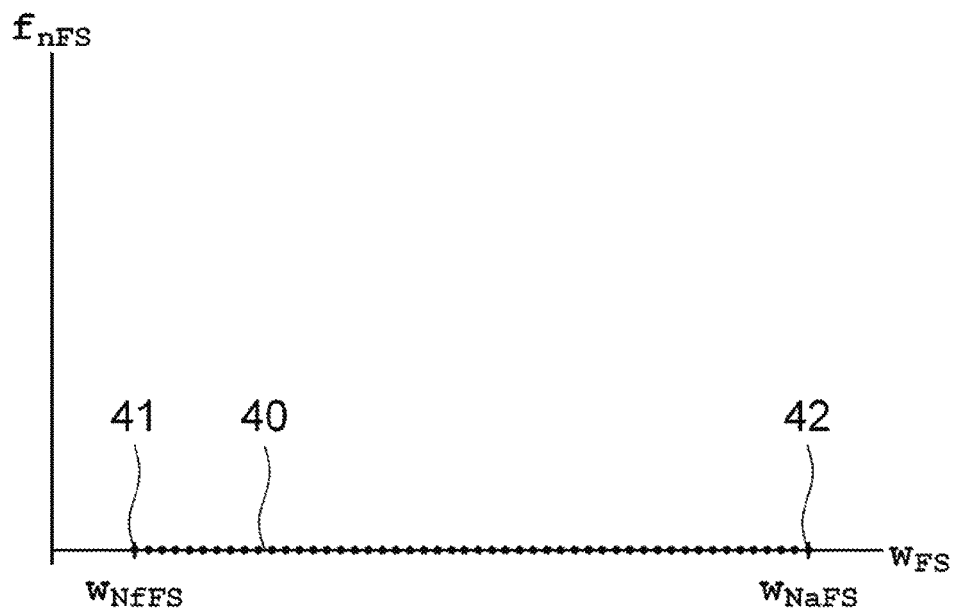
FIG. 12A shows the profile modification 40 on a non-modified worm which was dressed using a dresser with uncorrected kinematics which was designed for a straight profile without any profile correction. The points show the actually produced profile modification $f_{nFS}$ which is 0 over the total profile. Each of these points corresponds to a radius on the dresser. The Figure thus shows which radius on the dresser dresses which rolling distance on the worm. The dresser was designed such that when dressing with uncorrected kinematics, the point 42 lies at the tip-shape circle $w_{NaFS}$ and the point 41 at the root-shape-circle $w_{NfFS}$.
Figure 12B:
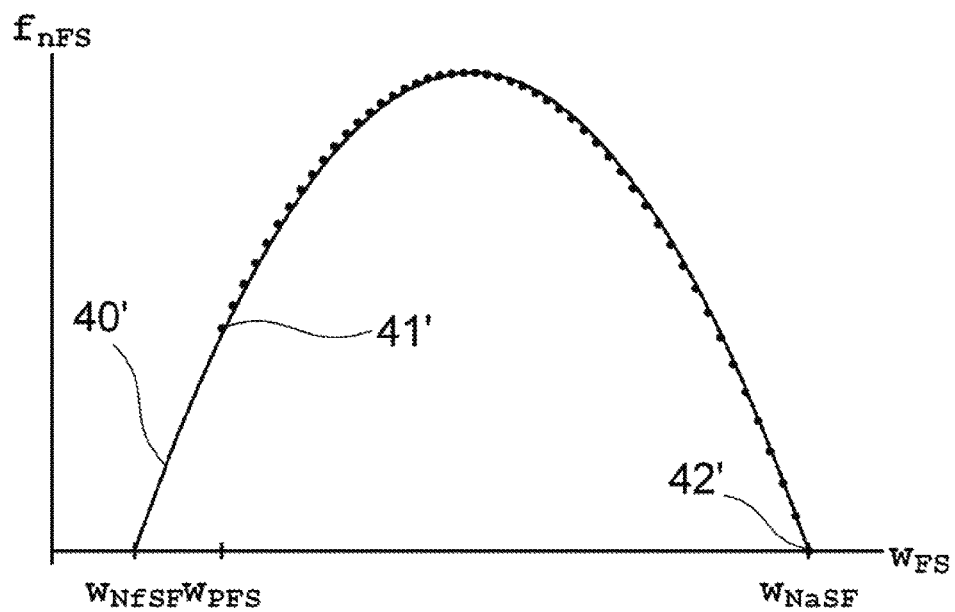
FIG. 12B shows a profile crowning (desired modification) 40' on a worm which was dressed using the dresser of FIG. 12A, but with dressing kinematics in accordance with the 3-point method. The points also show the actually produced profile modification $f_{nFS}$ here. The Figure shows that when the 3-point method is used and the point 42' is fixed at the tip-shape circle, the radius on the dresser matching point 41' no longer dresses the root-shape circle, but rather $w_{PS}$. The Figure furthermore shows the small deviation of the points from the desired modification.
Figure 13A:
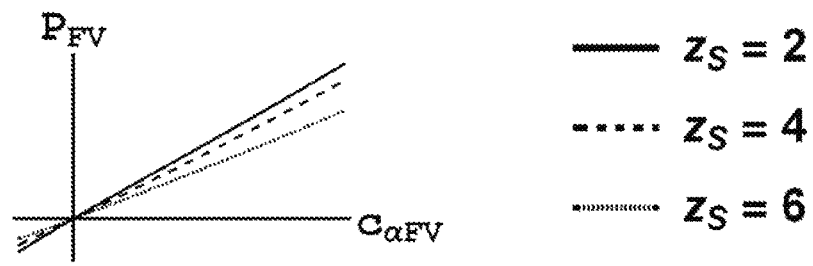
FIG. 13A shows the dependence of the relative profile stretching $P_{FV}$, of the crowning on the gearing $c_{\alpha FV}$ produced using the 3-point method for different numbers of threads of the worm $z_S$.
Figure 13B:
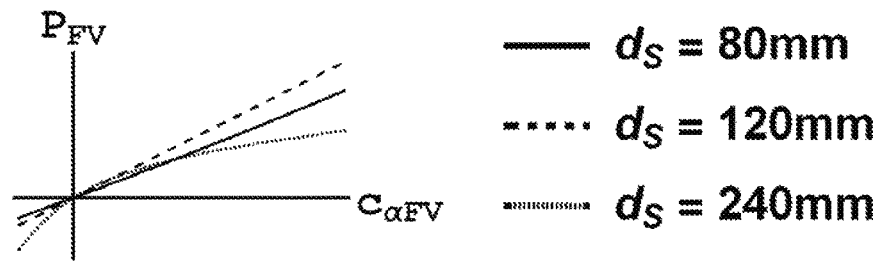
FIG. 13B shows the dependence of the relative profile stretching $P_{FV}$, of the crowning on the gearing $c_{\alpha FV}$ produced using the 3-point method for different diameters of the worm $d_S$.
Figure 13C:
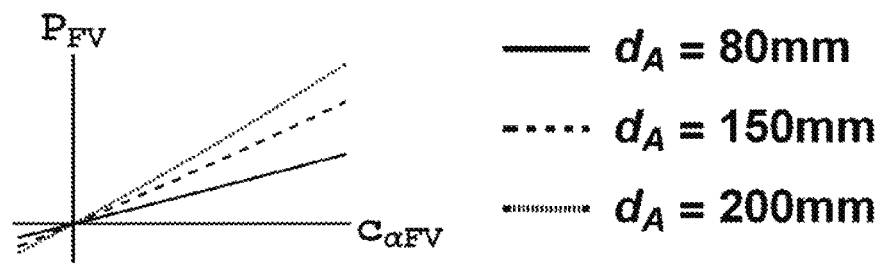
FIG. 13C shows the dependence of the relative profile stretching $P_{FV}$ of the crowning on the gearing $c_{\alpha FV}$ produced using the 3-point method for different diameters of the dresser $d_4$.
Figure 13D:
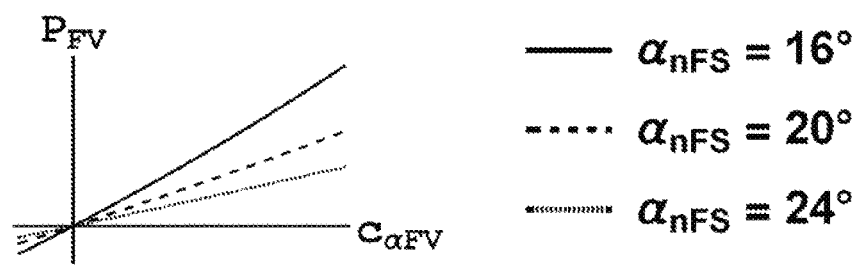
FIG. 13D shows the dependence of the relative profile stretching $P_{FV}$ of the crowning on the gearing $c_{\alpha FV}$ produced using the 3-point method for different profile angles of the worm $\alpha_{nFS}$.

Only 3 points on the profile were looked at here for calculating the axis corrections. The total profile can be determined over the whole profile region with $f_{nFS}(w_{FS}; \Delta K)$. It is has been found for the example just looked at that the shape of the modification corresponds very well to that of a parabola (see FIG. 12B) which is the typical shape of a profile crowning. Circular profile crownings can also be produced with very high accuracy in this manner since the difference between parabolic and circular profile crownings is extremely small.

It has been found when using the 3 point method that the association of radii on the dresser to radii on the worm can no longer be ensured over the whole profile. If one point is maintained, the association for all other points is displaced (see FIG. 12B). The term of relative profile stretching $$P_{FS} := \frac{w_{PFS} - w_{NfFS}}{w_{NfFS} - w_{NaFS}} \quad (21)$$

is introduced to understand this effect quantitatively. Here, $w_{NfFS}$ corresponds to the radius on the worm which produces the tip circle $w_{NaFV}$ on the generating grinding of the gear and $w_{NaFS}$ corresponds to the radius on the worm which produces the root circle $w_{NfFV}$. The same relative profile stretching $P_{FV}$ is produced on the gear ground using such a worm. Since, however, each point at the utilizable root circle on the gear is typically produced by a point at the utilizable tip circle of the worm and vice versa during generating grinding, in the example looked at here, the correct profile modification is produced on the gear at the root shape diameter, but an incorrect profile modification is associated at the utilizable tip diameter. The profile crowning on the gear is calculated according to equation (19). FIG. 13 shows for the example of the 3 point method how the relative profile stretching arising when generating grinding on the gear depends on the profile crowning $c_{\alpha FV}$ produced on the gear. The four Figures furthermore show the influence of the number of starts of the worm $z_S$, of the diameter of the worm $d_S$, of the diameter of the dresser $d_A$, and of the profile angle of the worm $\alpha_{nFS}$ on the dependency of the relative profile stretching $P_{FS}$ on the profile crowning on the gear $c_{\alpha FV}$.

The effect of the relative profile stretching influences the active region available on the dresser.

Figure 14A:
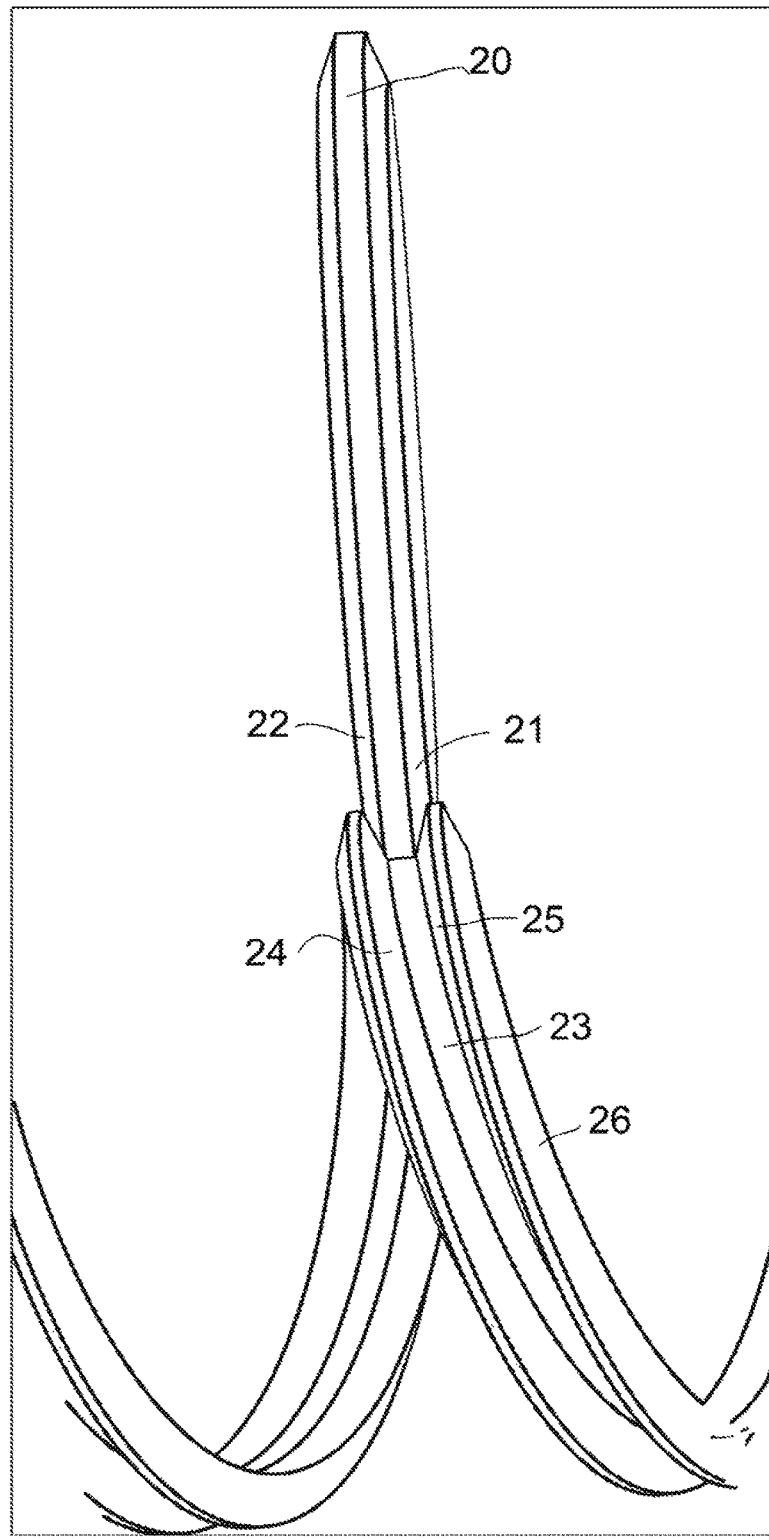
FIG. 14A shows two adjacent worm threads of a multi-thread worm and a dresser having a relative position such as corresponds to the single-flank dressing according to the state of the art. The left flank 24 of the first worm thread is dressed using the left flank 22 of the dresser. The outer jacket surface 20 of the dresser dresses a large portion of the root 23 between the two threads. The right flank 25 of the second worm thread and the right flank 21 of the dresser contact one another and do not pass through one another.
Figure 14B:
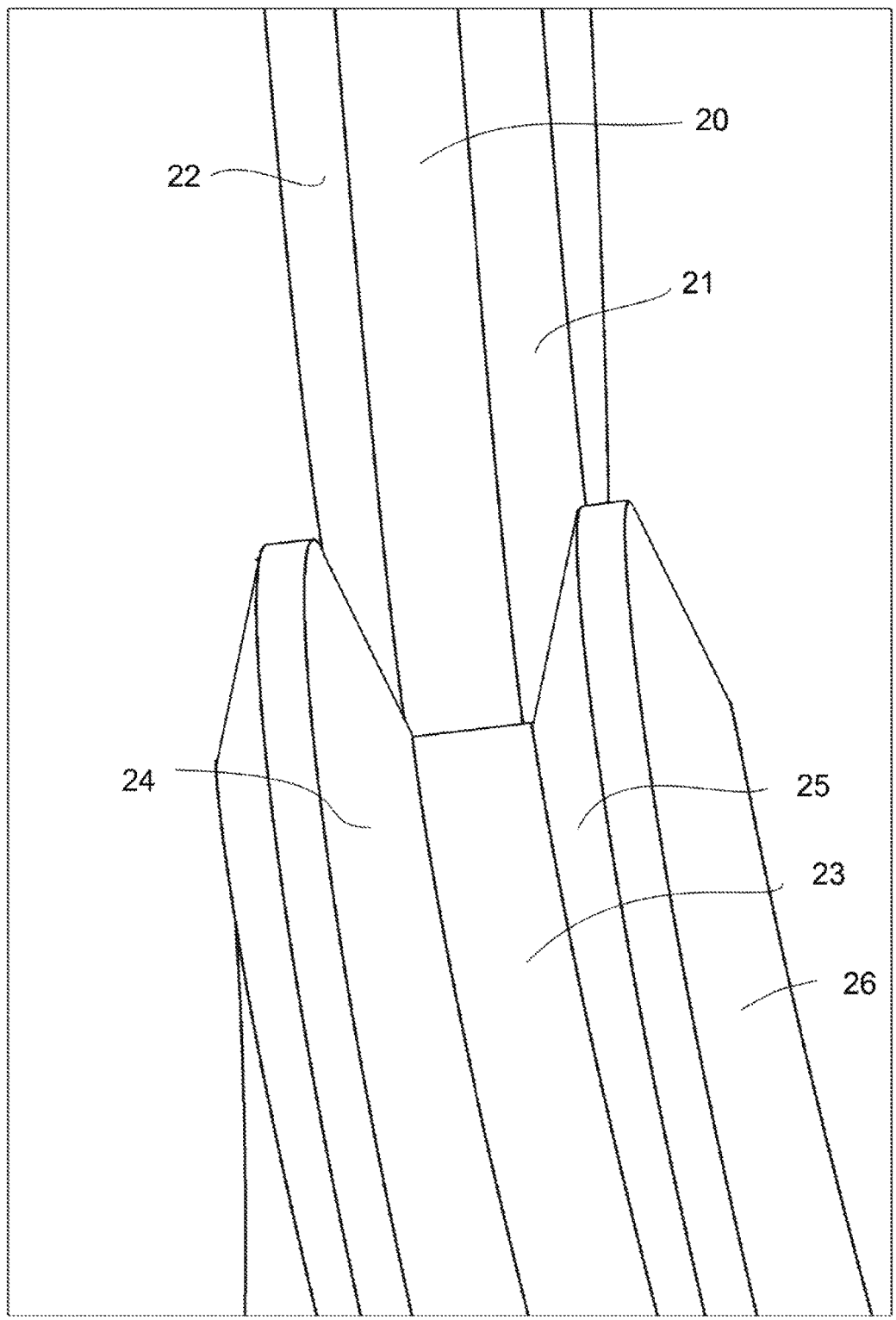
FIG. 14B shows an enlarged detail of FIG. 14A.
Figure 15:
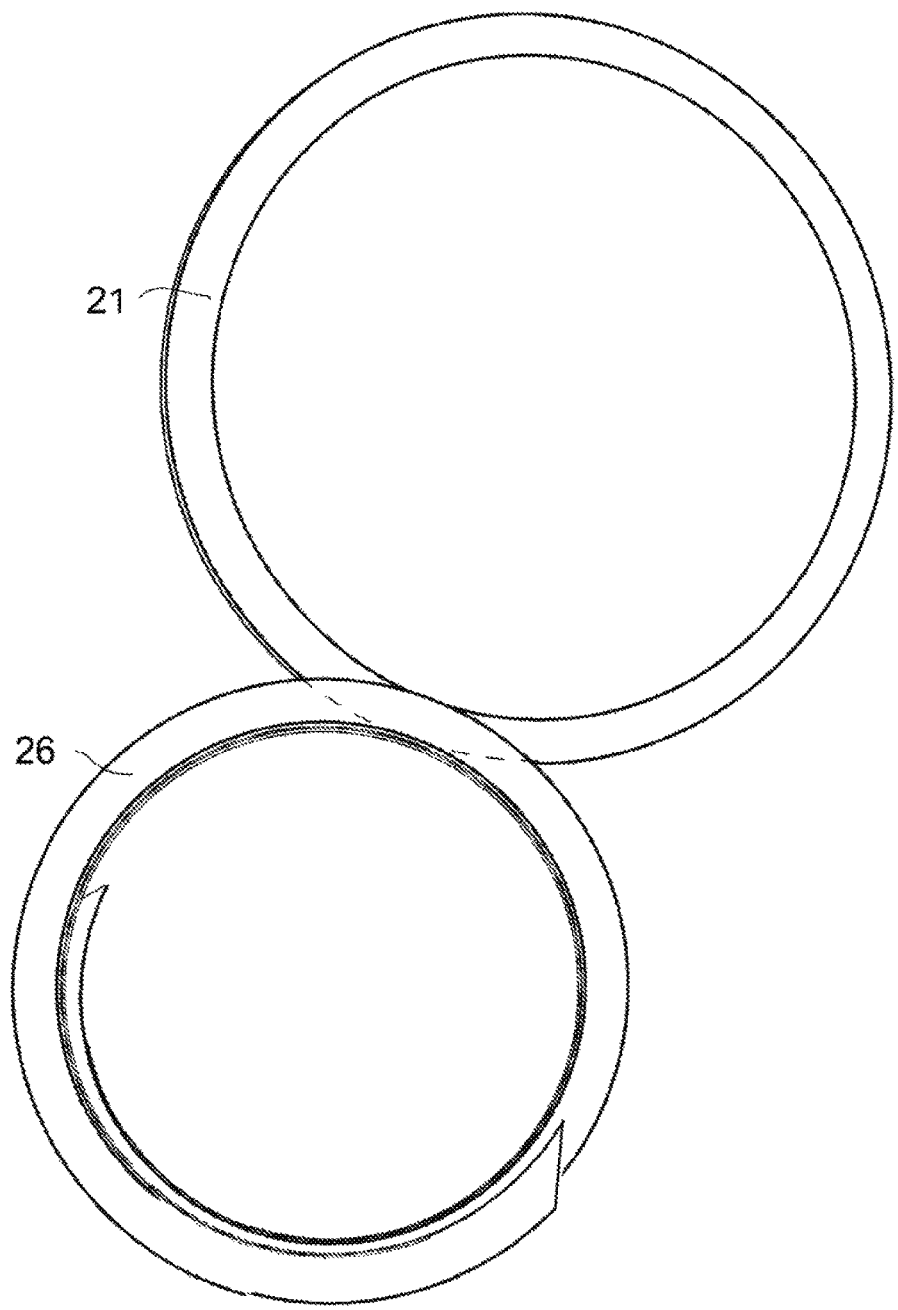
FIG. 15 shows the same situation as FIG. 14A, but from a different angle of view.
Figure 16A:
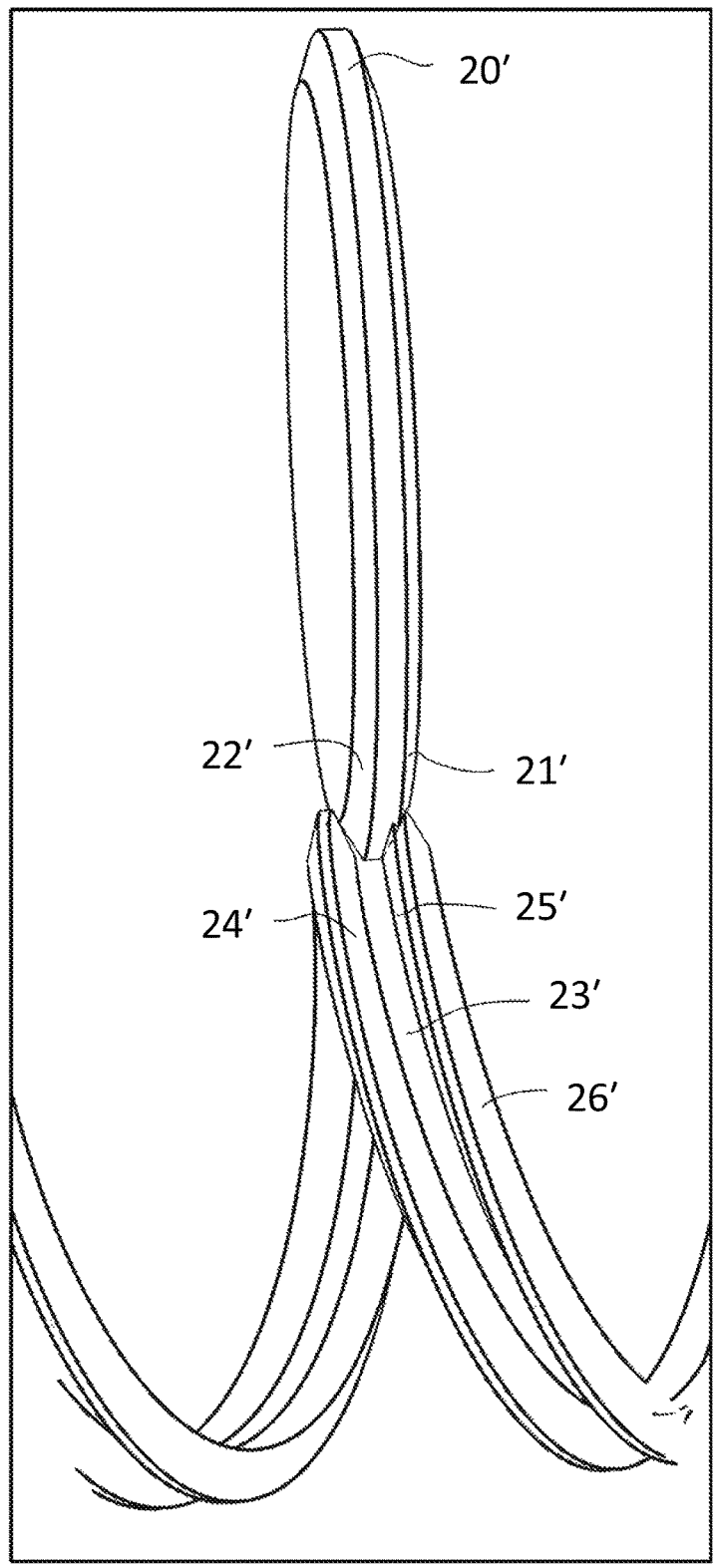
FIG. 16A shows the same two adjacent worm threads and the same dresser of FIG. 14A. The relative position corresponds to that of the 3-point method for producing a profile crowning on the worm. The left flank 24' of the first worm thread is dressed using the left flank 22' of the dresser. The outer jacket surface 20' of the dresser passes through the root 23' between the two threads. The right flank 21' of the dresser passes through the right flank.
Figure 16B:
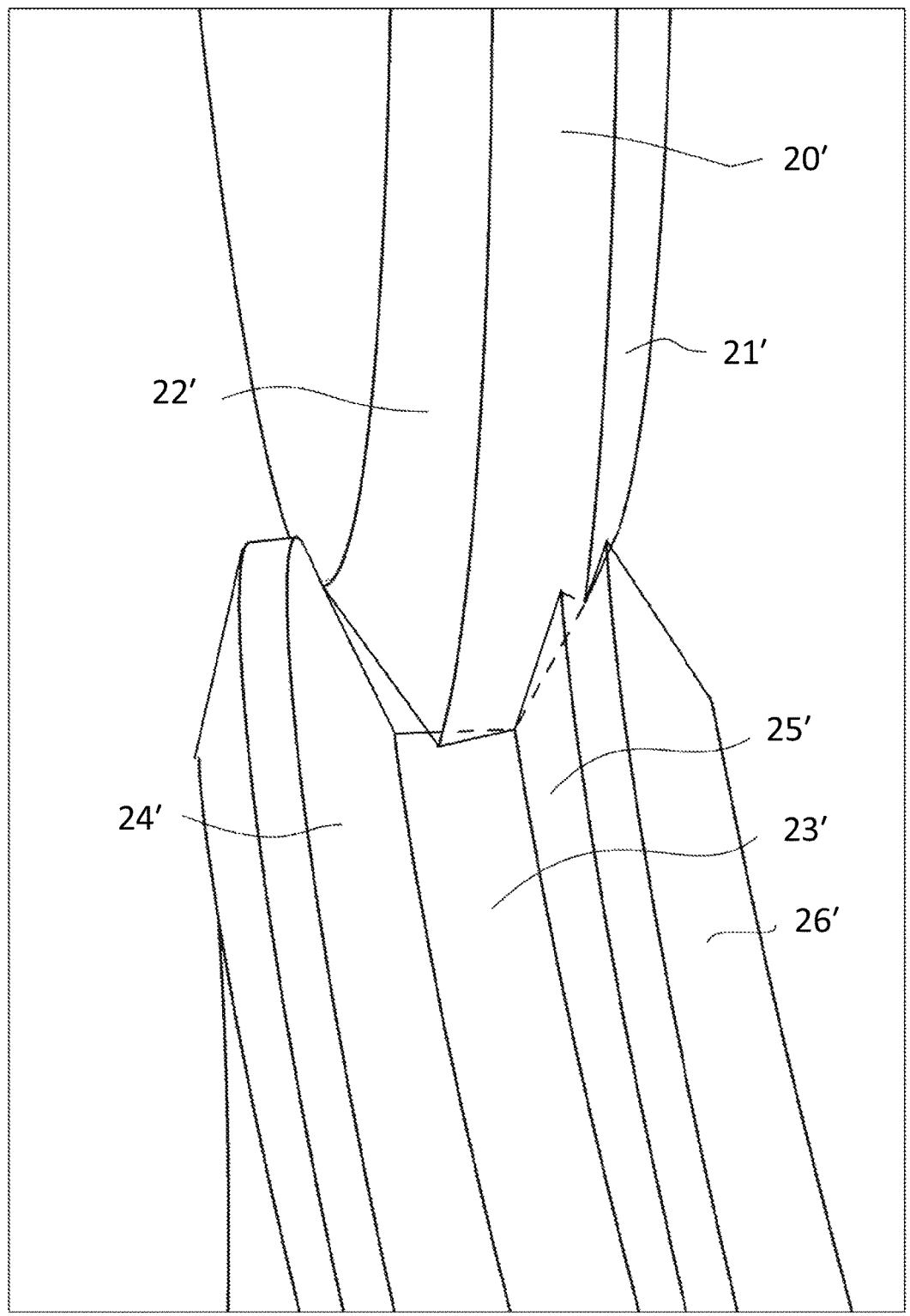
FIG. 16B shows an enlarged detail of FIG. 16A.
Figure 17:
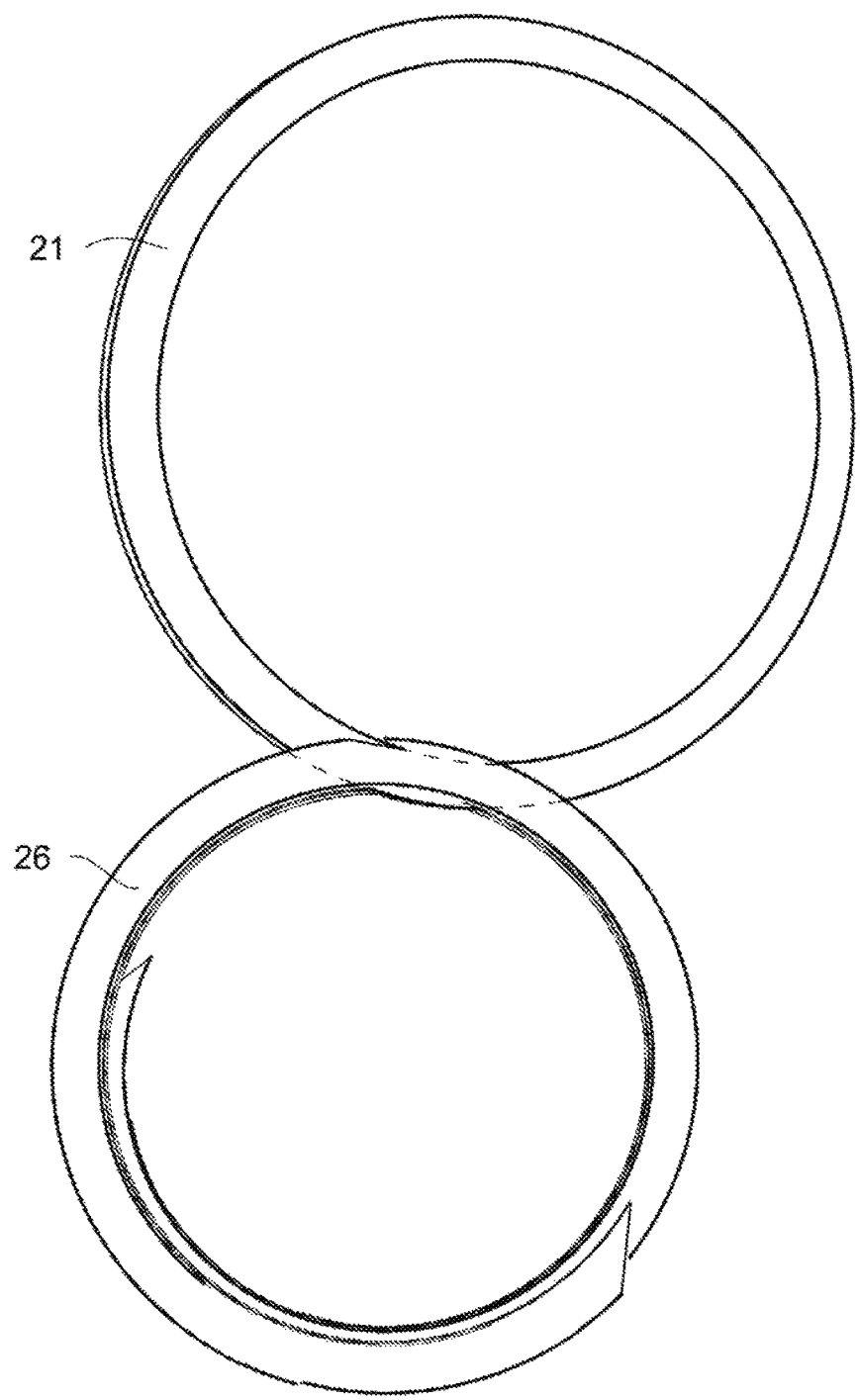
FIG. 17 shows the same situation as FIG. 16A, but from a different angle of view; the penetration of the outer jacket surface 20' into the worm beneath the root 23' can be recognized from this angle of view.
Figure 18A:
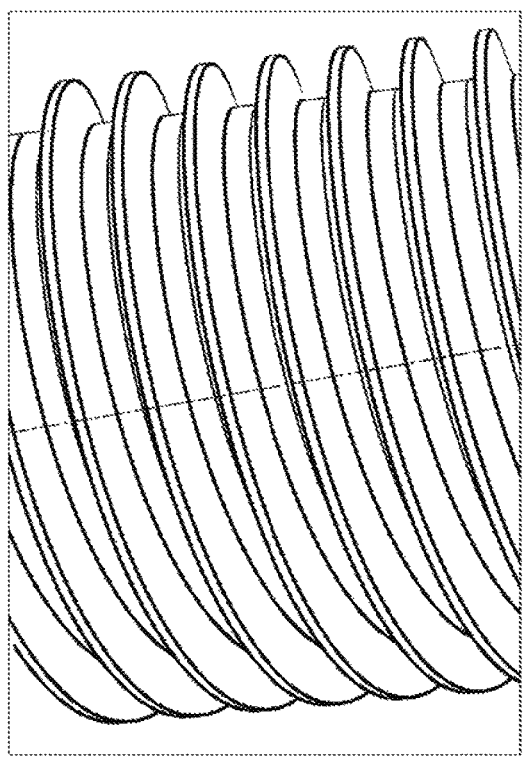
FIG. 18A shows by way of example a two-thread worm such as is used in accordance with the state of the art.
Figure 18B:
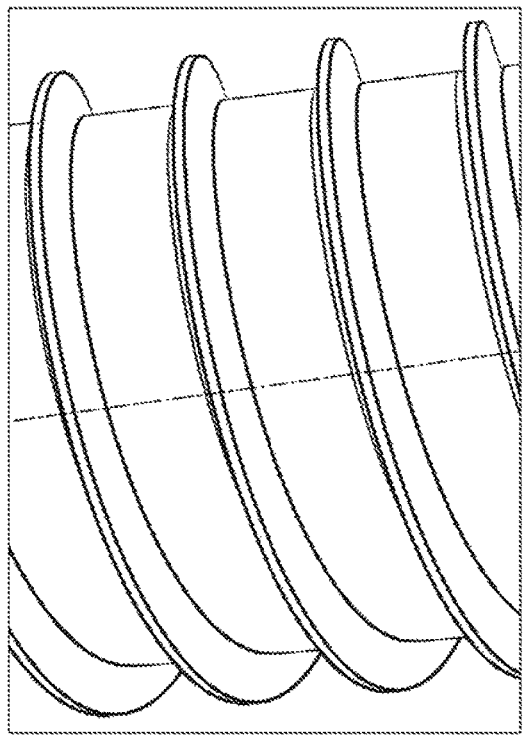
FIG. 18B shows a worm which was designed as an analogue to that of FIG. 18A, but in which a thread has been omitted.

A limitation of the maximum profile crowning which can be produced using a given dresser using the 3 point method results directly from the relative position to be set between the worm and the dresser for this purpose. FIGS. 14A, 14B and 15 show in 3D views from different perspectives and distances the relative position for uncorrected dressing kinematics for the example of an involute worm. No contact and no penetration take place here between the right flank 21 of the dresser and the right flank 25 of the worm thread. A single-flank dressing is thus possible without problem. The base 23 of the worm thread is furthermore dressed as desired by the outer jacket surface 20 of the dresser. However, the situation is different when dressing using the 3 point method. FIGS. 16A, 16B and 17 show, for the same worm and the same dresser, in 3D views from different perspectives and distances, the relative position for dressing kinematics in accordance with the 3 point method. It shows that the right flank 21' of the dresser and the outer jacket surface 20' penetrate the right flank 25' of the one worm thread. If such a penetration is present, the method cannot be used since an unwanted stock removal on the right flank 25' results. To avoid this, the dresser can be designed as narrower. The outer jacket surface 20' thereby also becomes narrower and the right flank 21' moves closer to the left flank 22'. The reduction in width can theoretically be carried out so much until the outer jacket surface 20' has a width 0. In practice, however, a minimum width cannot be fallen below for production reasons. Whether such an unwanted penetration takes place can be determined by calculating $f_{nFS}(w_{FS};\Delta K)$ for the right flank 25' using the corrections $\Delta K$ calculated for the left flank 24' in accordance with the 3 point method. If the profile modification on the right flank 25' thus calculated lies at at least one rolling distance $w_{FS}$ below the current stock, unwanted penetration generally occurs. Such a penetration is in particular to be avoided when the calculated profile modification is below the desired modification. A further problematic effect results from the change of the axis distance $\Delta d$ by the 3 point method. This frequently negative change has the result, as can be seen in FIG. 17, of an intrusion of the outer jacket surface 20' into the worm below the base 23'. Such an intrusion is, however, not critical to a certain extent since the base generally has no contact with the gear during the generating grinding process. Too deep an intrusion can, however, result in an undercutting of the worm thread. This undercutting can result in a material removal at points on the worm at which the worm thread is to be positioned at a later dressing cycle, that is when the worm is dressed for a smaller diameter $d_{Sk}$. If, however, this material is no longer present, this worm thread is no longer fully formed and cannot be utilized. To check whether there is such an unwanted stock removal, $f_{nFS}(w_{FS};\Delta K)$ can be calculated for smaller diameters of the worm $d_{Sk}$ using the corrections $\Delta K$ for the current worm diameter for one or both flanks. If the profile modification calculated in this manner on at least one flank is below the desired modification at at least one rolling distance $w_{FS}$, an unwanted stock removal occurs.

In the same manner as with the 4 point method, the 3 point method can also be expanded such that the modification is not equal over the worm width. The procedure is analogous here and the equations (15), (16) and (17) then apply to 3 points.

Figure 3:
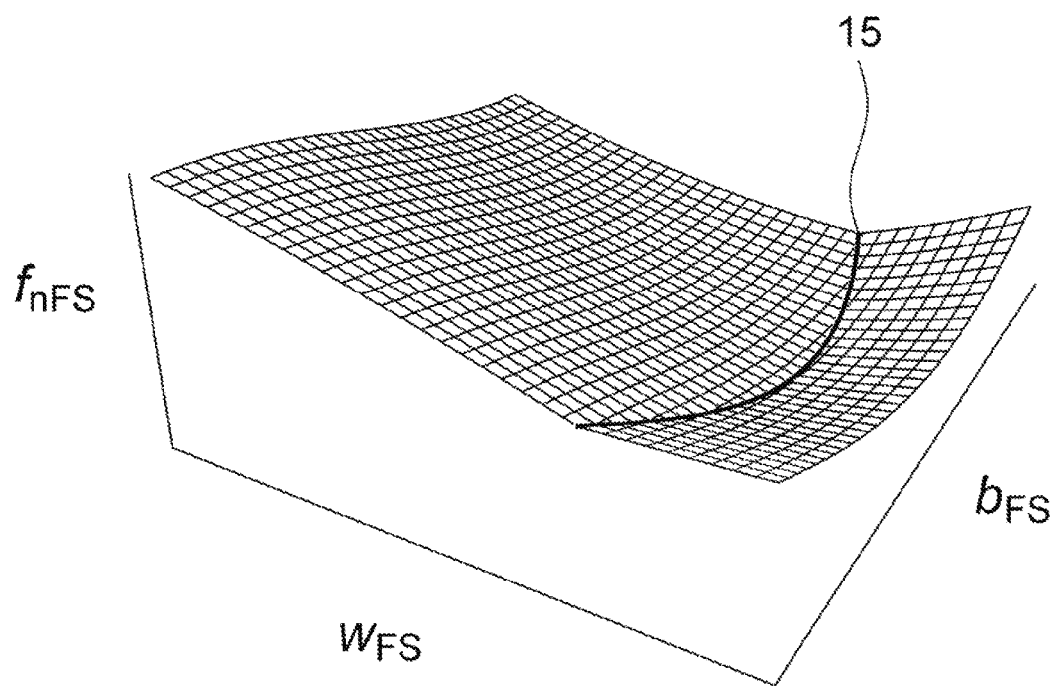
FIG. 3 shows a topological modification $f_{nFS}(w_{FS}, b_{FS})$ of a worm which was dressed using a dresser which was designed for dressing worms which generate a linear root relief at the gearing during generating grinding. Such dressers have a kink at a specific radius, said kink marking the transition from the main profile to the root relief. This radius on the dresser was associated in the Figure over the worm width with different radii on the worm so that this kink 15 extends in an arc on the worm.
Figure 4:
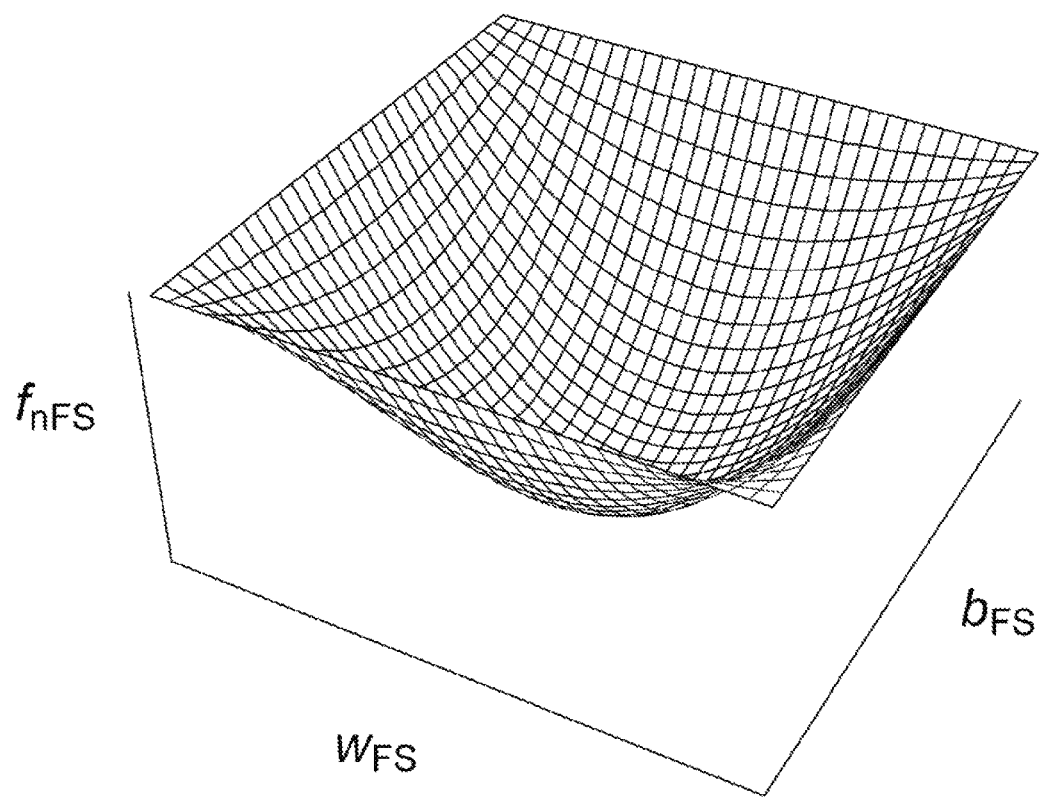
FIG. 4 shows for the example of an involute worm a topological modification by way of example which can be approximated very exactly during dressing using the invention. The modification is defined as the product of a width crowning and a profile crowning.
Figure 5:
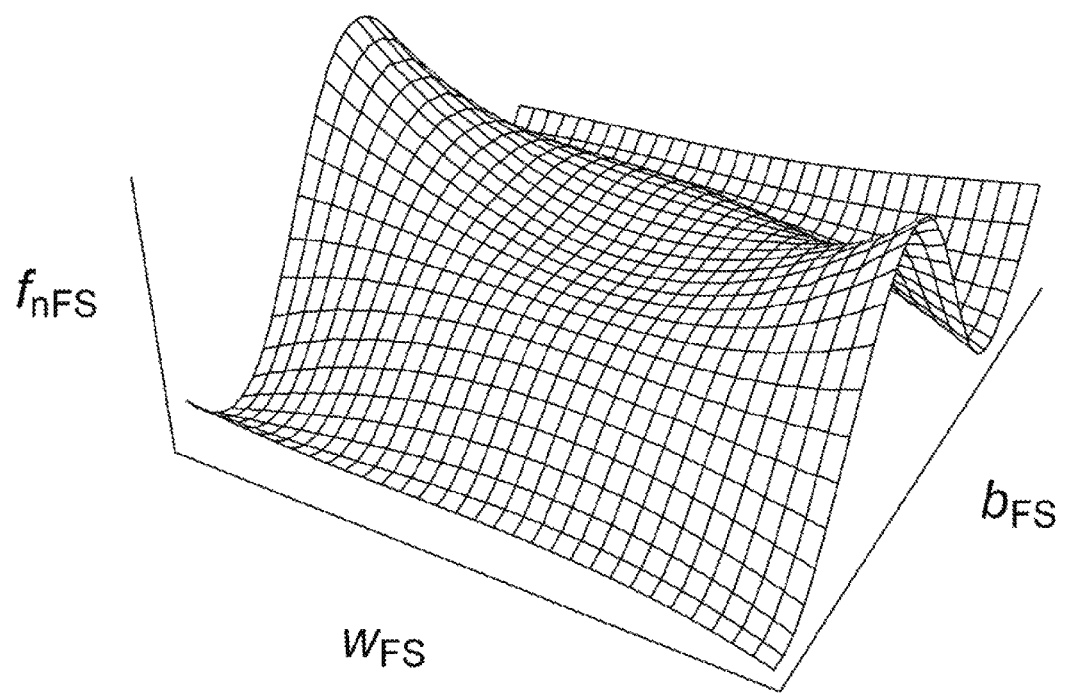
FIG. 5 shows for the example of an involute worm a topological modification by way of example which can be dressed using the invention. The modification is defined as a sine wave having an amplitude dependent on $w_{FS}$ and $b_{FS}$, wherein the amplitude increases toward the margins.

In addition, the association of the radii on the dresser to the radii on the worm can also be designed variably over the width of the worm. For this purpose, the fourth component from $F_{F3}$ in equation (18) is to be replaced by $$r_{FA}(r_{FS}(b_{FS});\Delta K) - r_{FA}(b_{FS}) \quad (22)$$

where $r_{FA}(b_{FS})$ and $r_{FS}(b_{FS})$ describe the association of radii on the dresser with radii on the worm, in dependence on the worm width position. FIG. 3 shows the modification of a worm which was dressed with a variable association of the radii.

Including the association of the radii as an additional condition to the modifications at 3 different rolling distances is, however, only a variant of the present disclosure. In principle, any desired additional conditions can be looked at of which some will be discussed by way of example in the following.

Figure 21:
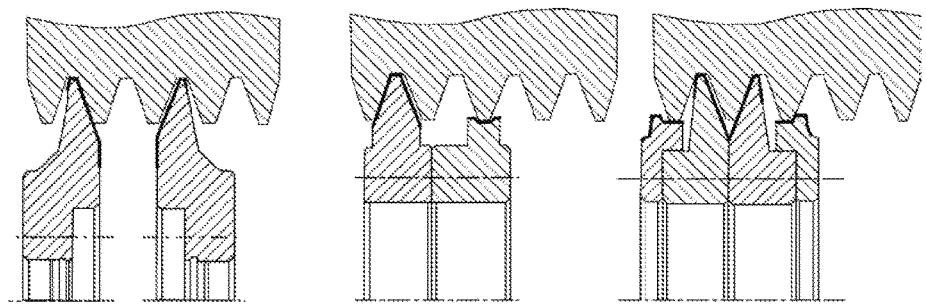
FIG. 21 shows by way of example 3 possible dresser variants which can be used on the use of the method described here. The Figure shows the dressers during a single-flank dressing. A two-flank dressing is equally possible with them when using the method described here. The dressers can optionally be designed as combination dressers which can also dress the tip of the worm in addition to the flank.

A dresser, for example for involute worms, cannot only be used to dress the flanks of a worm, but also to simultaneously dress the tip of the worm. The dressing time can thereby be shortened, on the one hand, because the additional dressing at a scratch plate is omitted, but it is also possible to give the worm tip a specific shape in order also to machine the root of the gear during generating grinding. Such a dressing of the tip can be carried out at the same worm thread and at approximately the same width position; however, it can also be carried out at a different thread or at the same thread at a different width position (see FIG. 21). As a rule a dresser configured for a simultaneous dressing of the tip and of the flank is configured such that it dresses the tip of the worm at the correct level for specific dressing kinematics. If, however, the dressing kinematics are corrected, this can produce an incorrect positioning of the tip dresser with respect to the worm tip and the worm tip is dressed at an incorrect level or is given an incorrect shape. To solve this problem, it can be required as an additional function that the tip dresser dresses the worm tip at a specified level. This variant thus allows the profile to be modified and simultaneously the tip to be dressed at the correct level. It is also possible to vary the height of the worm tip over the worm width; the additional condition must be formulated in dependence on $b_{FS}$ for this purpose. If, however, not only the height of the worm tip is to be monitored, but if two points should also be specified, this is equally possible. For this purpose, two additional conditions can be formulated, with then only two rolling distances on the flank being able to be specified. Alternatively, a variation of the 4 point method can be used, wherein two rolling distances are selected on the flank and two on the tip.

A further alternative is produced when 5 degrees of freedom cannot be used, for example because they are not available on the machine or if dressing should be topologically, if 5 degrees of freedom are not available as active degrees of freedom and can thus not be varied during the machining. The lack of a degree of freedom can be formulated as a necessary condition and thus provides the desired additional condition. It is also possible that up to two degrees of freedom are lacking.

Depending on the number of the additional conditions, the number of the rolling angles at which the modifications are to be reached has to be reduced so that the sum of the number of rolling angles and of additional conditions always produces 4. However, those variants are of particular interest in which the number of rolling angles is at least 2.

Now that the mathematical relationships have been described in detail, the applications resulting therefrom will be looked at in the following.

As initially described, no method is known with which the profile shape during the dressing of a worm for the generating grinding of gears can be influenced by the dressing process, with the exception of profile angle modifications with involute worms. A more flexible specification of such profile modifications can, however, bring about great advantages in practice. The possibility is thus opened up, for example, of using a dresser which was configured especially for worms for a certain gear having certain profile modifications also for dressing worms for a different gear and/or for different profile modifications. Such an application is in particular of great interest in small-batch production and contract production since costs can be reduced and procurement times can be omitted due to the reusability of expensive dressers. A further application is the correction of manufacturing defects in dressers. Even if the latter can now be produced very precisely, deviations from the desired geometry still occur. If such defects are found in the dressers during generating grinding, the dressers have to be sent by the gear cutter to the manufacturer for relapping according to the prior art, whereby expensive waiting times arise. Such deviations can be corrected via the dressing kinematics using the methods presented here without a return to the dresser being necessary. It also becomes possible by such a correction possibility to reduce the production tolerances of profile modifications, in particular also in mass production. Such a correction can, for example, be carried out by a manual input into the control of a gear cutting machine or by measuring the ground profile modification in the machine and can be carried out automatically from this measurement result. In the case of an involute gear, the correction of a profile crowning is in particular of great interest.

If the method described here for generating variable profile modifications over the worms is used, it opens up new possibilities in topological generating grinding by means of diagonal generating methods. In diagonal generating methods, the grinding worm is not only displaced axially with respect to the gear, but also axially with respect to its own axis of rotation during the generation grinding process. Different regions of the grinding worm thereby come into contact which typically have different modifications, whereby modifications differing over the width can be applied to the ground gear. The required topological modification on the worm results from the topological modification to be produced on the gear and from an association of points on the gear with points on the worm during the generating grinding process. The larger the spectrum of possible topological modifications on the worm, the greater the spectrum of possible topological modifications on the gear. It was previously only possible to vary the tooth thickness and the profile angle over the worm width during dressing. It is now in particular possible for involute worms with the method described here additionally also to design the profile crowning as variable over the worm width. The profile modification which can be generated on an involute worm using the 3 point method can, as can be seen from FIG. 12B, be described in a very good approximation by a parabola, that is a second degree polynomial in $w_{FS}$. Equation (9), which describes the contact line along which the profile modification can be influenced also applies in a very good approximation. If these two very good approximations are combined, the variable topological modification $f_{nFStop3}$ on the worm which can be generated using the 3 point method can be described by $$f_{nFStop3}(w_{FS};b_{FS}) = C_{0FS}(X_{FS}) + C_{1FS}(X_{FS}) \cdot w_{FS} + C_{2FS}(X_{FS}) \cdot w_{FS}^2 \quad (23)$$

where $C_{0FS}(X_{FS})$, $C_{1FS}(X_{FS})$ and $C_{2FS}(X_{FS})$ are constant functions and $X_{FS}=w_{FS} \sin \rho_{FS}+b_{FS} \cos \rho_{FS}$. In addition to this modification, a profile modification laid in the dresser can also be additively superposed. This modification $f_{nFSA}$ can be placed on the profile in dependence on the position of the contact line $X_{FS}$ and can be simplified by $$f_{nFSA}(w_{FS}, b_{FS})=A(w_{FS}-\Delta w_{0FS}(X_{FS})) \qquad (24)$$

where $A(w_{FS})$ describes the profile modification on the worm which the dresser would produce with uncorrected kinematics and $\Delta w_{0FS}(X_{FS})$ describes the displacement of this profile modification by a changed association of the radii on the dresser with radii on the worm, in dependence on the position of the contact line. An exact calculation additionally requires the consideration of the relative positive stretching for all rolling distances, in dependence on the corrections $\Delta K$, to take account of the actual association of radii on the dresser with radii on the worm. This applies analogously to the 4 point method, with this method being able to describe the profile modification in a very good approximation by a third degree polynomial.

Two-Flank Dressing

The method described in this present disclosure can be transferred to two-flank dressing. For this purpose, for example, the 3 rolling angles or 4 rolling angles from the 3 point method or 4 point method can be distributed as desired over the two flanks. The association of the radii on the dresser with radii on the worm with the 3 point method can be implemented on one of the two flanks. The modifications which can be produced in two-flank dressing are limited with respect to those which can be produced with one flank due to the reduced number of points considered per flank; however, the two-flank dressing allows shorter dressing times. In the case of an involute worm, the stock and the profile angle on both flanks can be specified within certain limits in this manner, for example, using the 4 point variant. The 3 point variant only allows the specification of 3 of these 4 values; the fourth results automatically, but can be influenced via the geometry of the worm. Two-flank dressing can be used for producing both simple profile modifications and topological modifications on the worm.

The use of this present disclosure therefore does not always have to take place over the total worm width. Only parts of the worm can thus also be dressed using the method underlying the present disclosure. It is also possible to apply a plurality of identically or differently modified regions on the worm. Such regions can be used for roughing and/or for finishing. It is frequently the case that two adjacent modified regions cannot be positioned directly next to one another. This distance between modified regions which thereby arises can optionally be used as a roughing region. A worm divided into a plurality of partly modified regions can thus be used almost completely.

Curve Fitting

It the required topological modification during generating grinding of a topological modification by means of diagonal generating grinding is determined via the association of points on the gear with points on the worm, this will not always have a shape in accordance with equation (23) combined with a variably positioned modification from the dresser. It is, however, possible in certain cases to sufficiently approximate the modification required on the worm by a modification which can be produced using the method described here. Such an approximation can be carried out, for example, by means of curve fitting. With such curve fitting, unlike the 3 point method, not only 3 points on the profile enter into the calculation of the axis corrections $\Delta K$, but at least 4 points enter into the calculation, so that an overdetermined equation system is obtained. This equation system is then solved by means of optimization of a distance function. In such a distance function, the differently considered points can optionally be weighted differently or different distance functions can be used. Such a different selection of the distance function or of the weighting can be of advantage when the tolerances of the considered points are not all the same. For example, points with tighter tolerances can thus be given more weight. A typical variant of the curve fitting which weights all points equally is the method of least squares which uses the 2-norm as the distance function. The condition for the association of radii on the dresser with radii on the worm can be maintained with curve fitting so that an optimization problem with a secondary condition is obtained. It is, however, also possible to include this condition in the distance function since such an association is generally likewise tolerated. It is likewise possible to include a plurality of such associations for different radii on the worm and on the dresser into the distance function if not only one such association is to be observed. This is in particular of interest when dressing is on two flanks. Such curve fitting is possible analogously as an extension of the other methods described here, in particular of the 4 point method or of the variant with any desired one or two additional conditions. The additional conditions can generally also be a component of the distance function or can act as secondary conditions which are to be strictly observed.

The use of curve fitting is not only possible for the general case of the topological modification, but equally for the special case of as simple profile modification.

Conical Worms

Figure 36A:
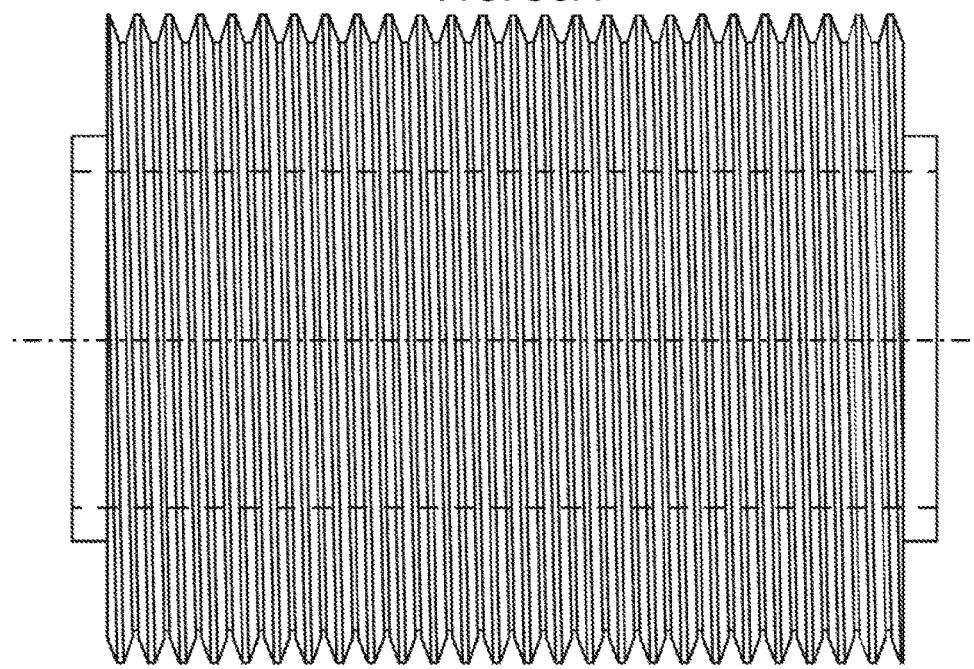
FIG. 36A shows a cylindrical worm by way of example.
Figure 36B:
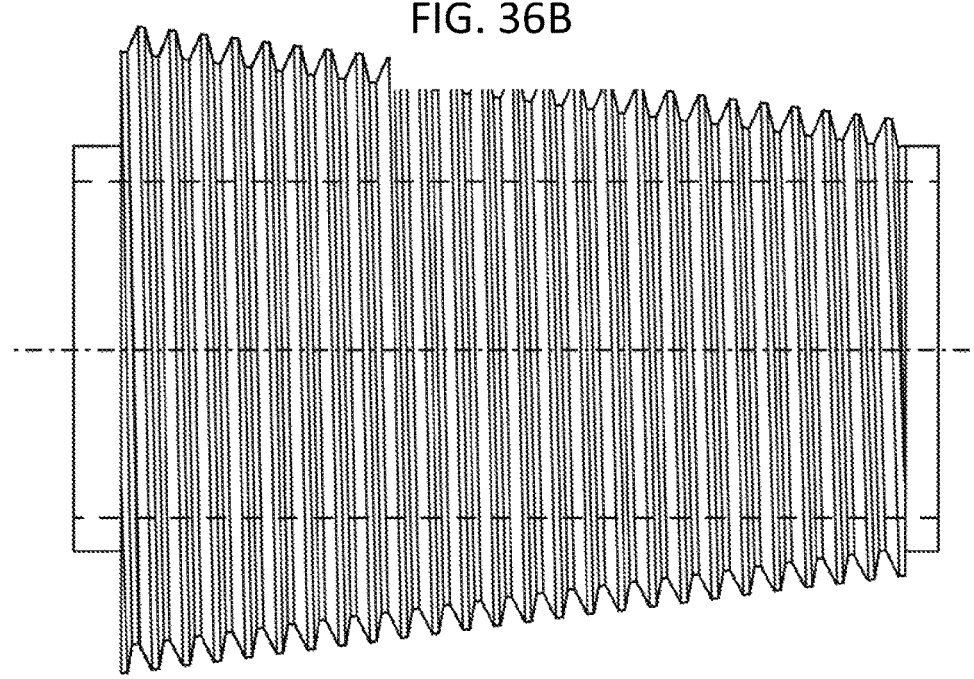
FIG. 36B shows a conical worm by way of example.

The method described here is not only restricted to cylindrical worms, but can also be directly transferred to conical worms. Conical worms here mean worms having different leads on the left and right flanks. Such a conical worm is shown in FIG. 36B. In the case of involute worms, they are called beveloids. When dressing conical worms, an association of radii on the dresser with radii on the worm which is variable over the worm width is of particular importance since, due to the taper, the worm is dressed over a different diameter range at every width line position. The points on the worm which grind the start of a tip relief of the gear are thus, for example, located at a different radius at every width position.

Worms Having Small Diameters and/or Large Numbers of Starts

As was initially mentioned, in most cases dressers configured for specific worm diameters can be used for a large range of worm diameters and produce the desired profile modification on the worm during dressing which then produces the correct profile modification on the gear. However, this no longer works when the ratio of worm diameter to module of the gear to be ground becomes too small and/or when the number of starts is too large. Worms having small diameters can be used, for example, when generating grinding with a larger worm is no longer possible due to an interference contour. A further application is the grinding of large-module gears. Since the worm diameters which can be used are upwardly limited, the ratio of worm diameter to the module reduces as the module increases. It is also possible to use worms having greater numbers of starts due to the capability of modern gear manufacturing machines to implement high table speeds.

Figure 19A:
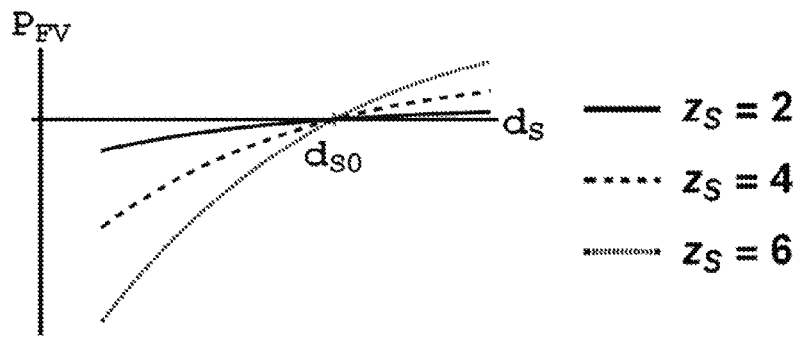
FIG. 19A shows, for the example of involute worms with small diameters which were machined using the 3-point method with a dresser which was designed for the diameter of the worm $d_{S0}$ and for the profile angle of the worm $\alpha_{nFS0}$ for different numbers of threads $z_S$, the course of the relative profile stretch on the gearing $P_{FV}$, in dependence on the current worm diameter $d_S$.
Figure 19B:
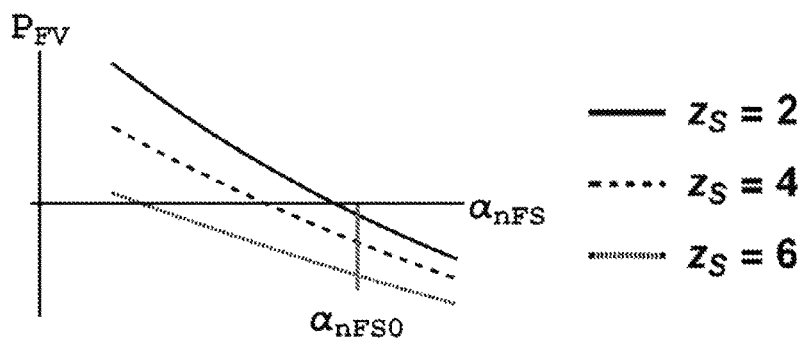
FIG. 19B shows, for the example of involute worms with small diameters which were machined using the 3-point method with a dresser which was designed for the diameter of the worm $d_{S0}$ and for the profile angle of the worm $\alpha_{nFS0}$ for different numbers of threads $z_S$, the progression of the relative profile stretching on the gearing $P_{FV}$ in dependence on the profile angle of the worm $\alpha_{nFS}$ for a worm diameter which is below $d_{S0}$.
Figure 19C:
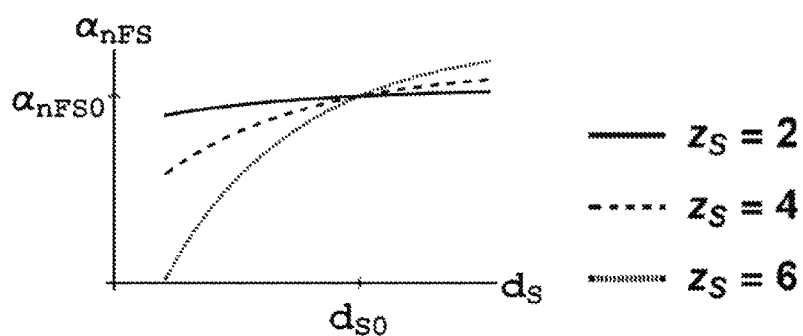
FIG. 19C shows, for the example of involute worms with small diameters which were machined using the 3-point method with a dresser which was designed for the diameter of the worm $d_{S0}$ and for the profile angle of the worm $\alpha_{nFS0}$ for different numbers of threads $z_S$, the extent of the profile angle of the worm $\alpha_{nFS}$ for which the relative profile stretching is 0.

If such worms are used, a dresser configured for the worm in a new state generates an unwanted profile defect for smaller radii, an unwanted profile crowning in the case of involute worms, if dressing takes place in accordance with a method of the prior art. If this profile defect or this profile crowning is below a worm diameter outside the tolerance, the worm cannot be further dressed using the given dresser, whereby the maximum useful layer thickness is restricted. This problem has previously only been able to be solved by using different dressers for different diameter ranges. It is, however, possible with the method described here to keep the profile shape constant over a large diameter range with only one dresser. For this purpose, the dresser is considered a dresser which does not match the worm and the dressing kinematics are determined such that the desired profile shape is produced on the worm. With involute worms, the 3 point method may be used here so that a radius on the dresser can be associated with a radius on the worm. However, this method produces a generally unwanted relative profile stretching over the gear (see FIG. 19Aa). Such a relative profile stretching is not critical if the profile modification introduced in the dresser has to be exactly associated at a maximum of one diameter on the gear. This is the case, for example, when only one relief is to be introduced on the profile. However, if the profile modification has at least two such diameters, for example a tip relief and a root relief, these two points would become closer and closer together due to the relative profile stretching as the worm diameter becomes smaller. If the distance of these two points is outside the tolerance for a worm diameter, the worm cannot be dressed or used further. A solution to this problem is provided by the possibility of grinding a gear using worms of different profile angles $\alpha_{nFS}$. If a dresser is configured for a worm having a diameter $d_{S0}$ and a profile angle $\alpha_{nFS0}$, it can be used for dressing a worm having a smaller diameter and a different profile angle using the 3 point method such that the profile crowning on the gear corresponds to the desired specification. FIG. 19B shows how the relative profile stretching arising for a fixed worm diameter differs from the selected profile angle. A zero passage of these progressions is present for all 3 shown numbers of starts, that is, the profile angle can be selected such that the relative profile stretching is 0. FIG. 19B shows the profile angle determined in this manner for different worm radii. The combination of the 3 point method with the selection of suitable profile angles thus allows the profile shape on the gear to be kept almost constant over a very large region of the worm diameter with small worm diameters and/or large numbers of starts.

The profile error or the profile crowning can be corrected analogously with asymmetrical gears. If the relative profile stretching should likewise be corrected with involute worms, a correction via the profile angle of the worm is only possible with restrictions during grinding using cylindrical worms. The calculation of the profile angle which allows the relative profile stretching to disappear has to be carried out separately on the left and right flanks and generally produces a worm which is no longer suitable for generating grinding the gear since equation (20) is no longer satisfied for both sides. A cylindrical worm can, however, be used whose profile angles on the right and left flanks are selected such that the gearing can be ground and the relative profile stretching on the left and right flanks is minimized. The use of a conical (beveloid) worm is alternatively possible. The conical angle of this worm can then be selected such that the gearing can be ground using the worm and the relative profile stretching on both flanks is 0.

Multi-Stroke Dressing

To be able to dress as economically as possible, it is of advantage to use dressers which have contact from the worm tip to the worm root during dressing. Even though the present disclosure makes it possible to influence the profile shape using such dressers, there are profile modifications which are not possible with a universally usable dresser. High flexibility is, however, required in contract production and in small-batch production. If dressers having smaller active regions are therefore used, only parts of the profile can be dressed by them per stroke and the method described here can be used in each of these regions; the modification at the 3 or 4 rolling distances can in particular be specified. This allows a very flexible design of the profile modification, but requires considerably fewer strokes in comparison with contour dressing with point contact known from the prior art. The 3 point methods can optionally be used here to associate the active region of the dresser in each stroke to the regions to be dressed in the current stroke. FIG. 20A shows by way of example a profile modification $f_{nFS}$ which is composed of the 3 regions 30, 31, 32. The profile angle deviation and the profile crowning can be specified separately in each of these regions. The regions 30 and 32 are each dressed in one stroke, and the main profile 31 is dressed in 4 strokes. The size of the active region on the dresser is selected here such that the region 34 starts below the utilizable root diameter $w_{NfFS}$ of the worm. Such a falling below of the utilizable root diameter is not critical within certain limits since this region of the worm generally has contact with the gearing during generating grinding. A correspondingly large choice of dresser, however, brings about the advantage that fewer strokes are required for the main profile in comparison with an active region with which the utilizable root diameter would not be fallen below. To reduce the number of strokes even further without losing flexibility in so doing, there is the possibility of using a dresser having a plurality of active regions which are optionally of different sizes. Different regions on the worm can then be dressed by different active regions on the dresser. If a large active region of the dresser is selected for the main profile with the example just considered, the number of strokes for this can be reduced from 4 to 2 (see FIG. 20B). Such a dresser and a method which describes such an association are already known from DE19624842C2. It is, however, only possible with the method described there to specify the profile angle in the individual regions via the dressing kinematics; a specification of more complex modifications which are to be achieved at 3 or 4 points is, however, not possible. In particular no specification of the profile crowning is possible in the individual regions. The achievable profile crownings only result from the modification placed into the dresser.

Dressing in a plurality of strokes cannot only be used for generating simple profile modifications, but can also be transmitted directly to the dressing of topologically corrected worms, analogous to a dressing in one stroke. It is possible to displace the regions which are dressed during one stroke over the width of the worm. The positions of the transitions between the regions 30 and 31 or 31 and 32 in FIG. 20A can thus, for example, be freely specified over the worm width. A worm modified in this manner can then be used, for example, to implement a start of the tip and root reliefs variable over the gear width by means of diagonal generating grinding on the gear.

A dresser used in a plurality of strokes can also already include modifications which are then specifically positioned on the worm. A dresser can thus, for example, have a region which is used for generating the tip relief, a part of the main profile and the kink between the two and it can have a second region which is used for generating the root relief, a part of the main profile and the kink between the two. If the upper part of the profile is then dressed in one stroke using the first region and the lower part of the profile is dressed using the second region, the progressions of the start of the tip relief or root relief can be specified independently of one another over the width of the worm and a tangential transition can be implemented at the transition between the upper part and the lower part of the profile. A worm dressed in this manner can be used in diagonal generating grinding to freely specify the start of the tip relief or root relief on the gear in dependence on the width position.

It is in principle also possible with multi-stroke dressing that more than one dresser is used and thus individual strokes can be carried out using different dressers. They can have different modifications and/or geometries and thus allow an even more flexible dressing.

Consideration of Maximum Achievable Profile Modification, in Particular Profile Crowning and Selection of Suitable Dressers and Worms As already mentioned further above, the modifications which can be produced purely over the dressing kinematics are limited by different conditions. They are:

the purely mathematical limitation which can be determined via the existence of roots of the functions constructed in the mathematical part;

the collision of the dresser with the counter-flank;

the undercutting of the worm threads; and the relative profile progression.

All these limiting flanks above all depend on the number of starts of the worm $z_S$;

the diameter of the worm $d_S$;

the diameter of the dresser $d_A$;

and, with involute profiles, on the profile angle of the worm $\alpha_{nFS}$.

The collision with the counter-flank and the undercutting additionally depend on the width of the outer jacket surface of the dresser and on the thickness of the worm thread. The amounts of the maximum possible modifications resulting for a gear to be ground from these geometrical values can extend over several orders of magnitude. For an involute gear, the maximum possible profile crowning which can be produced using the present disclosure can thus lie, depending on the geometrical values, below 0.01 µm or also above 100 µm. This example shows how important an understanding of these relationships and the selection of suitable geometries is for the applicability of this method. Typical worms and dressers used today frequently only allow small or even only very small profile crownings.

A calculation unit/software is also part of this present disclosure which, for a given modified gear, checks with respect to a given set of geometrical values the manufacturing capability using the method in accordance with the present disclosure, optionally while considering the modification introduced into the dresser. If, for example, a profile crowning of 20 µm is to be produced with an involute gearing, but only a dresser having a modification for producing 15 µm is available, a check must be made whether a profile crowning of 5 µm can be produced for the given geometry using the 3 point method, for example. Such a calculation unit/software can additionally also include a function to calculate all the modifications which can be produced with the present disclosure for a set of geometrical sizes, including dresser modifications, with respect to a gearing. For example, in the case of an involute profile, the maximum and minimal profile crowning which can be generated can be determined. If the dresser includes a modification which is to be mapped as a profile modification on the gear and if this modification is to have a modification produced in accordance with the present disclosure superposed on it, a check must optionally additionally be made whether the modification is still correctly mapped, within the framework of the tolerance, on the gearing by the arising relative profile stretching.

Conversely, a calculation unit/software can also include a functionality to calculate proposed values for the remaining geometrical values with respect to a modified gearing and to an incomplete set of geometrical values, including a dresser modification. If, for example, the dresser with modification is given as well as the number of starts of the worm, the diameter of the worm and/or the profile angle of the worm can be determined such that the required modification can be produced using the method in accordance with the present disclosure. If such a calculation unit/software has a database with available dressers and/or with worm diameters, the software can determine all the combinations suitable for producing a specific modification. Such a database can also include, in addition to or instead of the worm diameters, data on already pre-profiled available worms. Such data would, for example, include the number of starts and/or the diameter and/or taper and/or profile angle and/or lead. Such a functionality is in particular of great interest for contract gear cutters since worms and dressers can be used for different gears in this manner.

Such calculations cannot not only be carried out for simple profile modifications, but also for topological modifications on the worm. The calculation is carried out for discrete width positions for this purpose, for example. Such a calculation delivers possible function values for the functions $C_{0FS}(X_{FS})$, $C_{1FS}(X_{FS})$ and $C_{2FS}(X_{FS})$ from equation (23), for example, and thus describes the quantity of the topological modifications which can be generated, in particular the minimal and maximum profile crowning which can be produced along the contact line. If these minimally and maximally required profile crownings are known for a topological modification, suitable geometrical values can in turn be determined. Such a functionality is not only of great importance for contract production and small-batch production, in particular for such topological modifications, but also in the process design for mass production facilities. The most critical width position is taken into account in the inversion of the calculation for determining suitable geometrical values and dressers.

Use of Worms Having Omitted or Inactive Starts

The consideration of the maximum producible profile modification, in particular profile crowning, in single-flank dressing shows that they tend to become larger when the number of starts of the worm becomes larger;

the diameter of the worm becomes smaller;

the diameter of the dresser becomes smaller;

the width of the outer jacket surface of the dresser becomes smaller;

the thickness of the worm thread becomes smaller; and the profile angle with involute worms becomes larger, with the limitations predominantly being the collision with the counter-flank and the undercutting. These limitations of the geometrical values can have a negative effect on the process. Increasing numbers of starts and falling worm diameters thus have the result, for example, of higher table speeds with a constant cutting speed. Even though modern gear-cutting machines allow ever higher table speeds, the required table speeds can nevertheless easily exceed the technically possible table speeds. In addition, better roughness values can be achieved in part using worms with larger diameters due to the longer contact line on the worm during generating grinding and due to abrasive particles being increasingly brought into engagement. Smaller diameters of the dresser can be disadvantageous to the extent that they have a smaller active surface and the service life is thus reduced. A possibility of avoiding these limitations which occur in specific cases comprises omitting individual starts in the worm in order in this way to create more room in the gap and to avoid collisions and undercutting. If, for example, grinding should take place with a two-start worm, one of the two starts can be at least partly removed during dressing, whereby it becomes inactive in the grinding process. The root radius can optionally be reduced in size with respect to the original worm. How the grinding process is to be carried out with this worm depends on the number of teeth of the gearing. If it has an odd number of teeth, the process can be carried out using the original number of grinding strokes, but with half feed so that the technological parameters remain substantially unchanged. If the number of teeth is even, all the strokes are carried out double with the original feed, with the gearing being rotated by one pitch before the repetition of each stroke. This principle can be directly expanded to higher numbers of starts, with it being advantageous to select the numbers of starts such that the machining can be carried out in one stroke to avoid periodically occurring pitch jumps. It is also possible to remove more than only the two adjacent threads of a remaining tooth and/or not always to select the number of removed threads between remaining threads as the same.

Consideration of Differences in the Axes

When checking the manufacturing capability of a given profile modification for a set of geometrical values or in the determination of a set of geometrical values from a given profile modification, it can be advantageous also to look at the axial corrections $\Delta K$ required for the dressing in addition to the previously discussed limitations. FIGS. 8, 9, 10 and 11 show the influence, which is very high in part, of four of the geometrical values on the axial corrections. Corrections which are too high can, however, have a disadvantageous effect. If axes are moved too far, collisions can occur, for example, between the worm and/or the dresser and machine parts. A further problem is to be found in the deviations in the positioning of the dresser relative to the worm due to the large travel paths. Depending on the selected geometrical values, the amounts of the axial corrections are orders of magnitude above the amounts of the profile modifications to be produced and, in these cases, considerably above axial corrections which are typically required in methods in accordance with the state of the art. The influence of such deviations on the produced modification can be calculated using the function $f_{nFS}(w_{FS}; \Delta K)$, where $\Delta K$ is provided with a deviation. If the deviations of the axes, which are primarily mechanically induced, in dependence on the axial corrections are known, the influence on the profile modification to be produced and the error in the profile modification can be calculated. The geometrical values can then be determined such that the error in the profile modification is below a given tolerance. This observation can be transferred directly to the production of topological modifications, wherein the calculation may be carried out for different positions of the contact line here.

The just observed deviations result both from the deviations of the physical axes and from other mechanical deviations such as a tilt of the stand. If the machine has a movement apparatus so that the calculation of the coordinates $B_1, \ldots, B_{N_s}$ in accordance with equation (3) does not produce an unambiguous solution, there are a plurality of sets of coordinates $B_1, \ldots, B_{N_s}$ which result in the same relative position between the worm and the dresser. An example for a machine which has such a movement apparatus is shown in FIG. 22. Its movement apparatus can be described by equation (4). A non-ambiguous solution for the coordinates $B_1, \ldots, B_{N_s}$ as a rule means that different axial positions produce the same relative position. These different solutions generally produce different deviations in the positioning of the dresser relative to the worm and thus in different deviations in the axial corrections $\Delta K$. The solution may be selected in the application of the present disclosure which produces the smallest error in the profile caused by the deviations. Optionally, possible collisions between the worm and/or dresser and/or machine parts with other machine parts can additionally be considered in the selection of a suitable solution. This observation can be transferred directly to the production of topological modifications, with kinematic aspects additionally being able to taken into account in the selection of the solution here. Technologically unfavorable direction reversals of one or more axes can thus be avoided by a suitable choice of the solution in specific cases. If the direction reversals and/or the setting of axial values having large deviations over the width of the worm to be dressed cannot be avoided, the positions of the contact line at which particularly unsafe axial values are moved to can, however, influence the positions of the contact line in specific cases. If the tolerances of a topological modification are not the same everywhere, the unfavorable axial values having large deviations can thus optionally be set when the contact line sweeps over regions of high tolerance.

Calculation of Deviations of the Axes from Errors in the Modification

If the deviations of the axes are not known, they can be calculated from the error in the profile caused by them. The underlying calculation of the present disclosure is used for this purpose to calculate the axial corrections $\Delta K$ from the actually produced profile modification. They are compared with the axial corrections set in the machine during dressing and the deviation of the axial values results from the difference. If a topological modification is dressed, this calculation can be carried out for different positions of the contact line. The deviations for different axial values are obtained in this manner. If the deviations are known, the axial values can be corrected accordingly on further dressing processes and the profile errors can thus be minimized.

The knowledge of actually produced profile modifications on the worm required for this are generally not directly known and are also not directly measurable. However, they are mapped in the ground gearing which can be measured and the profile modification on the worm can be calculated from its profile modification. This works analogously in diagonal generating grinding with a topologically modified worm, with here the knowledge of the association of points on the gearing with points on the worm being necessary. Such an association is, however, generally known in this case since it is already required for determining the topological modification of the worm.

Specific Use of the Profile Stretching

The effect of the profile stretching can also be specifically used. If, for example, a worm should be dressed using a modified dresser, but if the modification introduced into the dresser would produce a stretched or compressed profile modification on the worm, the method in accordance with the present disclosure can thus be used to set the relative profile stretching such that the profile modification produced on the worm is correctly stretched. If a relative profile stretching is produced, a profile crowning simultaneously arises with involute profiles, for example. How large this is with a given relative profile stretching above all depends on the geometrical values of the worm and of the dresser (see FIG. 13). This profile crowning can be so small in specific cases that only a stretching substantially results, but no superposition with a profile crowning. The worm geometry can be selected accordingly to achieve this. It is, however, also possible to select the worm geometry such that not only the profile stretching, but also the profile modification produced by the dressing kinematics, in particular the profile crowning in the case of involute gears, is achieved in accordance with a specification. This can also be transferred to the dressing of topologically modified worms, whereby it becomes possible to vary the profile stretching specifically over the worm width, with a suitable worm geometry and dresser geometry, and simultaneously to produce only a negligibly small profile crowning. It is also possible to vary the profile stretching and the profile crowning specifically over the worm width, with both being coupled to one another. This coupling can be set as required using an exactly matched worm geometry and dresser geometry (in particular number of starts, profile angle, both diameters). The coupling which is linear in a first approach is shown in FIG. 13. The profile stretching and, for example, the profile modification are effective for each width position along the current contact line. A conical worm can in particular be used with asymmetrical gears and/or when the coupling is to be different for left and right flanks and a variation of the conical angle can additionally be used for a separate setting of the coupling on the left and right flanks. As the worm diameter becomes smaller, this coupling changes, however, which can in turn be corrected by a correspondingly coordinated matching of the profile angle.

2. Description of Diagonal Generating Grinding

The second part of the present disclosure describes a method of producing a specific class of topological surface modifications on tooth flanks of both cylindrical and conical (beveloid) involute gear teeth. The gear teeth can be both symmetrical and asymmetrical, i.e. the profile angles of the left and right flanks can, but do not have to, be different. The method can inter alia be used in the following production processes:

gear hobbing;
skiving hobbing;
shaving;
generating grinding; and
honing.

If the method is used in generating grinding, both dressable and non-dressable tools can be used. The dressing can take place using a profile roller dresser on one or two flanks, but equally in contour dressing on one or two flanks.

The machining process takes place using a tool which is modified over the tool length and which is displaced in the axial direction during the process (diagonal generating method).

Parameters which differ or which may differ for left and right flanks are provided with the index F. F can be l (left) or r (right). Equations in which the index F occurs always apply to left and right flanks. The involute gear teeth looked at here are divided into the following four types in dependence on the base radii ($r_{br}$, $r_{bl}$) and on the base helix angles ($\beta_{br}$, $\beta_{bl}$).

1. Cylindrically symmetrical: $r_b := r_{br} = r_{bl}$ and $\beta_b := \beta_{br} = \beta_{bl}$
2. Cylindrically asymmetrical: $r_{br} \neq r_{bl}$ and $$\frac{\tan\beta_{br}}{r_{br}} = \frac{\tan\beta_{bl}}{r_{bl}}$$

3. Conically symmetrical: $\beta_{br} \neq \beta_{bl}$ and $r_{br} \cos\beta_{br} = r_{bl} \cos\beta_{bl}$
4. Conically asymmetrical: $\beta_{br} \neq \beta_{bl}$ and $r_{br} \cos\beta_{br} \neq r_{bl} \cos\beta_{bl}$ and $$\frac{\tan\beta_{br}}{r_{br}} \neq \frac{\tan\beta_{bl}}{r_{bl}}$$

The class of the topological surface modifications which can be produced using the method first described here will be defined in the following. First, the customary description of topological surface modifications will be looked at for this purpose. They are described via a function $f_{Ft}(w_F, z_F)$, where $w_F$ is the rolling distance and $z_F$ is the position in the width line direction. A topological surface modification belongs to the class of surface modifications looked at here when there is a function $F_{FtC}$, $F_{FtL}$ and $F_{FtQ}$, where $$f_{Ft}(w_F, z_F) = F_{FtC}(X_F) + F_{FtL}(X_F) \cdot w_F + F_{FtQ}(X_F) \cdot w_F^2 \quad (25)$$

where $$X_F = w_F \sin\rho_F + z_F \cos\rho_F, \quad (26)$$

and $f_{Ft}(w_F, z_F)$ describes the surface modification exactly or at least approximately. Each $X_F$ thus unambiguously defines a straight line on the flank in the coordinates $w_F$ and $z_F$.

In illustrative terms, the definition of the surface modification means that it has the shape of a parabola (second degree polynomial) or can be approximated by it along every straight line given by a $X_F$. The shape of the parabola and thus the coefficients of the polynomial can differ for every such straight line. The coefficients are given, in dependence on $X_F$, by the functions $F_{FtC}$, $F_{FtL}$ and $F_{FtQ}$. Those cases are also included in which individual coefficients or all the coefficients are equal to zero for certain $X_F$, in particular also the cases in which the parabola for specific $X_F$ degenerates to a linear or constant function. The specific case is also included in which $F_{FtQ}=0$ for all $X_F$. In this case, the surface modification along the straight line defined by $X_F$ is given by a linear function, with the function also being able to degenerate to a constant function here for certain $X_F$.

For the special case of $\rho_F=0$, the surface modification is a pure tooth trace modification, i.e. the surface modification is constant over the total profile in any given transverse section. For the special case of $$\rho_F = \pm\frac{\pi}{2},$$

the surface modification is a pure profile line modification.

No method has yet become known with which the surface modification looked at here can be produced without deviations or with a sufficient modification, with the exception of some special cases, using one of the production methods looked at here. Surface modifications are meant by surface modifications which can be produced free of deviations here which can theoretically be produced without any deviation from the desired approximation, apart from feed markings and possibly generating cuts.

The underlying idea of the present disclosure will be looked at in more detail in the following. This will be described for the example of generating grinding; however, it can equally be used for all the production methods looked at here due to their similarity. A worm which likewise has involute gear teeth, as a rule with a large helix angle, is used for the generating grinding of involute teeth. There is a theoretical point contact between the worm and the end geometry of the gear teeth to be produced during the machining process. The surfaces of the tooth flanks $E_F$, both of the workpiece and of the tool, are typically parameterized over the rolling distance ($w_F$) and the position in the width line direction ($z_F$).

$$E_F(w_F, z_F) = \begin{pmatrix} r_{bF} \cdot \sin\left(\left(s_F \cdot \left(\frac{w_F}{r_{bF}} + \eta_{bF}\right) - \frac{z_F \cdot \tan(\beta_{bF})}{r_{bF}}\right) - \\ s_F \cdot w_F \cdot \cos\left(s_F \cdot \left(\frac{w_F}{r_{bF}} + \eta_{bF}\right) - \frac{z_F \cdot \tan(\beta_{bF})}{r_{bF}}\right)\right) \\ r_{bF} \cdot \cos\left(\left(s_F \cdot \left(\frac{w_F}{r_{bF}} + \eta_{bF}\right) - \frac{z_F \cdot \tan(\beta_{bF})}{r_{bF}}\right) + \\ s_F \cdot w_F \cdot \sin\left(s_F \cdot \left(\frac{w_F}{r_{bF}} + \eta_{bF}\right) - \frac{z_F \cdot \tan(\beta_{bF})}{r_{bF}}\right)\right) \\ z_F \end{pmatrix} \quad (27)$$

where $s_F$ serves to write equations for left and right flanks in a compact form and is defined by:

$$s_F := \begin{cases} +1, & \text{for left flanks} \\ -1, & \text{for right flanks} \end{cases}$$

This parameterization allows simple relationships to be calculated for the progression of the contact point on the tool and on the workpiece. This extent is continuously displaced both on the workpiece and on the tool by the axial feed of the workpiece and the shift movement of the tool. The knowledge of these extents makes it possible to associate a point on the workpiece unambiguously with a point on the tool, and vice versa. The ratio between the axial feed of the workpiece and the shift movement of the tool, called the diagonal ratio in the following, and the surface modification on the tool can be matched by this association such that the desired modification is produced on the workpiece.

The following definitions are made to formulate the relationships mathematically:

The following terms are used for transformations:

$R_x(\varphi)$: rotation by the angle $\varphi$ about the x axis. Analogous for y and Z.

$T_x(v)$: translation by the path v in the x direction. Analogous for y and z.

$H(A_1, \ldots, A_N)$: general transformation describable by a homogenous matrix with a total of N coordinates $A_1$ to $A_N$.

The term "coordinates" is used here for generalized, not necessarily independent coordinates.

The axis of rotation of a gearing in its system of rest always coincides with the z axis. The gear tooth center is at z=0.

It is furthermore important for the formulation of the relationships to define the kinematic chains which describe the relative positions between the workpiece and the tool. This depends on whether the tool or the workpiece is cylindrical or conical. All four possible combinations will be looked at here. In the following, values which relate to the tool are provided with the index 1 and those which relate to the workpiece are provided with the index 2.

Kinematic Chain for a Cylindrical Tool and a Cylindrical Workpiece

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_z(\varphi_2) \quad (28)$$

$\varphi_1$: Tool angle of rotation.
$\varphi_2$: Workpiece angle of rotation.
$z_{V1}$: Axial feed of the tool (also called the shift position).
$z_{V2}$: Axial feed of the workpiece.
d: Center distance (tool/workpiece).
$\gamma$: Axial cross angle (tool/workpiece).

Kinematic Chain for a Conical Tool and a Cylindrical Workpiece

The relative position between the tool and the workpiece is described by the following kinematic chain $K_R$:

$$K_R = R_z(-\varphi_1) \cdot T_y(r_{w1}) \cdot R_x(\vartheta_1) \cdot T_z(-z_{V1}) \cdot T_y(d) \cdot R_y(\gamma) \cdot T_z(z_{V2}) \cdot R_z(\varphi_2) \quad (29)$$

$\varphi_1$: Tool angle of rotation.
$\varphi_2$: Workpiece angle of rotation.
$z_{V1}$: Feed of the tool (also called the shift position).
$z_{V2}$: Axial feed of the workpiece.
d: Dimension for the center distance (tool/workpiece).
$\gamma$: Axial cross angle (tool/workpiece).
$\vartheta_1$: Tool conical angle.
$r_{w1}$: Pitch circle radius of the tool.

Kinematic Chain for a Cylindrical Tool and a Conical Workpiece

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_x(-\vartheta_2) \cdot T_y(-r_{w2}) \cdot R_z(\varphi_2) \quad (30)$$

$\varphi_1$: Tool angle of rotation.
$\varphi_2$: Workpiece angle of rotation.
$z_{V1}$: Axial feed of the tool (also called the shift position).
$z_{V2}$: Feed of the workpiece.
d: Dimension for the center distance (tool/workpiece).
$\gamma$: Axial cross angle (tool/workpiece).
$\vartheta_2$: Workpiece conical angle.
$r_{w2}$: Pitch circle radius of the workpiece.

Kinematic Chain for a Conical Tool and a Conical Workpiece

The relative position between the tool and the workpiece is described by the following kinematic chain $K_R$:

$$K_R = R_z(-\varphi_1) \cdot T_y(r_{w1}) \cdot R_x(\vartheta_1) \cdot T_z(-z_{V1}) \cdot T_y(d) \cdot R_y(\gamma) \cdot T_z(z_{V2}) \cdot R_x(\vartheta_2) \cdot T_y(-r_{w2}) \cdot R_z(\varphi_2) \quad (31)$$

$\varphi_1$: Tool angle of rotation.
$\varphi_2$: Workpiece angle of rotation.
$z_{V1}$: Feed of the tool (also called the shift position).
$z_{V2}$: Feed of the workpiece.
d: Dimension for the center distance (tool/workpiece).
$\gamma$: Axial cross angle (tool/workpiece).
$\vartheta_1$: Tool conical angle.
$\vartheta_2$: Workpiece conical angle.
$r_{w1}$: Pitch circle radius of the tool.
$r_{w2}$: Pitch circle radius of the workpiece.

These kinematic chains initially first only serve the mathematical description of the present disclosure described here. They do not have to match the physical axes of the machine on which the present disclosure is used. If the machine has a movement apparatus, which makes possible relative positions between the tool and the workpiece in accordance with a transformation $$H(A_1, \ldots, A_{N_s}) \text{ where } N_S \geq 1 \quad (32)$$

the present disclosure can be used on this machine when there are coordinates $A_1, \ldots, A_{N_s}$ for each set of coordinates from the kinematic chains just described which set is calculated in this present disclosure, where $$H(A_1, \ldots A_{N_s}) = K_R \quad (33)$$

The calculation of the coordinates $A_1, \ldots, A_{N_s}$ can be carried out by means of a coordinate transformation.

Typical movement apparatus which make possible all the required relative positions are, for example, described by the following kinematic chains:

$$H_{Bsp1} = R_z(\phi_{B1}) \cdot T_z(-v_{V1}) \cdot R_x(90°-\phi_{A1}) \cdot T_z(-v_{Z1}) \cdot T_x(-v_{X1}) \cdot R_z(\phi_{C2}) \quad (34)$$

$$H_{Bsp2} = R_z(\phi_{B1}) \cdot R_x(90°-\phi_{A1}) \cdot T_z(-v_{Y1}) \cdot T_z(-v_{Z1}) \cdot T_x(-v_{X1}) \cdot R_z(\phi_{C2}) \quad (35)$$

FIG. 22 schematically shows a gear manufacturing machine having a movement apparatus described by $H_{Bsp1}$.

The $z_{V2}$ coordinate is moved during the machining process and the feed of the workpiece is thus implemented. With cylindrical wheels, this is the axial feed; with conical wheels, this feed is not axial, but is tilted by the conical angle $\vartheta_2$ with respect to the axis of the gear teeth.

If work is carried out in the diagonal generating method, the $z_{V1}$ coordinates are additionally moved, which implements the feed of the tool. With cylindrical tools, this is the axial feed; with conical wheels, this feed is not axial, but is tilted by the conical angle $\vartheta_1$ with respect to the axis of the tool.

In the further course, however, the term feed is also used for $z_{V1}$ and $z_{V2}$ respectively for cylindrical tools or workpieces.

If grinding is performed with a constant diagonal ratio, $z_{V1}$ is a function of $z_{V2}$ and the following relationship applies:

$$z_{V1}(z_{V2}) = K_{Z_{V1}} \cdot z_{V2} + z_{V01} \quad (36)$$

$K_{Z_{V1}}$ is here the diagonal ratio and $z_{V01}$ is a fixed offset which makes it possible to position the modifications described here on different points on the tool or to select the region on the worm which should be used. If $K_{Z_{V1}} \neq 0$, we speak of a diagonal generating method.

How the speed of the workpiece and/or of the tool and/or the feed of the tool and/or of the workpiece behave in time and/or relative to one another during the machining does not play any role in this method since only the coupling between $z_{V1}$ and $z_{V2}$ is looked at. The speeds and feeds can be changed during the machining as long as the required couplings are observed.

The four possible combinations of cylindrical and/or conical tools and workpieces will be looked at separately. The starting point in each case is the mathematical description of the progression of the contact point on the tool and on the workpiece in generating grinding as the relationship between the rolling distance (w) and the position in the width line direction (z) in dependence on the feed positions $z_{V1}$ and $z_{V2}$.

In preparation for this, the modifications on the worms required for this purpose and their production by means of dressing will first be discussed.

The tools, cylindrical and conical worms, symmetrical or asymmetrical, which will be looked at here likewise at least approximately have a modification in accordance with equation (25). This type of modification is in particular very advantageous with dressable grinding worms since it can be produced on the worm when dressing with a dressing wheel. A method of dressing a worm having such a surface modification is described in the first part of this application.

When dressing with a dressing wheel, there is a line contact between the dressing wheel and the flanks of the worm. If this contact line is described as a relationship between $w_{F1}$ and $z_{F1}$ for both flanks, a straight line is obtained in a very good approximation, given by:

$$w_{F1} \sin \rho_{F1} + z_{F1} \cos \rho_{F1} = X_{F1} \quad (37)$$

In equation (37), $\rho_{F1}$ defines the direction of this straight line. It can be slightly influenced by the number of starts, the diameter of the worm, the diameter of the dressing wheel, the profile angle of the worm and the relative position of the worm to the dresser.

A modification $f_{nF1}$ at a point on the worm, defined in the normal direction on the worm thread surface, results in a modification $f_{nF2} = -f_{nF1}$ on the workpiece, defined in the normal direction on the tooth flank surface, at the corresponding point on the workpiece. Modifications on gears are typically defined in the transverse section ($f_{Ft}$), not in the normal direction ($f_{Fn}$). However, it is easy to convert between these two definitions of the modifications.

$$f_{Fn} = f_{Ft} \cdot \cos \beta_{bF} \quad (38)$$

Cylindrical Tool and Cylindrical Workpiece

It is shown in the following for the case of a cylindrical tool and of a cylindrical workpiece how, with the aid of a worm which has a modification in accordance with equation (25), a modification in accordance with the same equation, but with an angle $\rho_{F2}$ freely specifiable within certain limits, can be produced in diagonal generating grinding. For this purpose, the progression of the contact point (contact path) between the workpiece and the worm will first be described in dependence on the axial feeds $z_{V1}$ and $z_{V2}$. This progression depends on the base circle radii and on the base helix angles of the workpiece and of the worm and on the center distance d and on the axial cross angle $\gamma$. The relative position of the workpiece to the worm is described by equation (28) in this observation. This progression can be described mathematically as a relationship (R6) between the position in the width line direction ($z_F$) and the rolling distance ($w_F$) for the worm (index 1) and for the workpiece (index 2), as follows:

$$z_{F1} = C_{Fw1} \cdot w_{F1} - z_{V1} + C_{Fc1} \quad (39)$$

$$z_{F2} = C_{Fw2} \cdot w_{F2} - z_{V2} + C_{Fc2} \quad (40)$$

The coefficients $C_{Fw1}$, $C_{Fc1}$, $C_{Fw2}$ and $C_{Fc2}$ introduced here have the following dependencies:

$$C_{Fw1} = C_{Fw1}(\beta_{bF1}) \quad (41)$$

$$C_{Fc1} = C_{Fc1}(\beta_{bF1}, \beta_{bF2}, r_{bF1}, d, \gamma) \quad (42)$$

$$C_{Fw2} = C_{Fw2}(\beta_{bF2}) \quad (43)$$

$$C_{Fc2} = C_{Fc2}(\beta_{bF1}, \beta_{bF2}, r_{bF2}, d, \gamma) \quad (44)$$

This relationship shows that there is a linear relationship between $z_F$, $w_F$ and $z_V$ both for the worm and for the workpiece.

If all the points on the workpiece having a fixed rolling distance $w_{F2}$ are looked at in the production process, all these points on the worm only contact points having a rolling distance $w_{F1}$ resulting from this. The relationship (R7) between the rolling distances of contacting points on the worm and on the workpiece is given by:

$$\hat{C}_{Fw1} \cdot w_{F1} + \hat{C}_{Fw2} \cdot w_{F2} + \hat{C}_{Fc} = 0 \quad (45)$$

The coefficients $\hat{C}_{Fw1}$, $\hat{C}_{Fw2}$ and $\hat{C}_{FC}$ introduced here have the following dependencies:

$$\hat{C}_{Fw1} = \hat{C}_{Fw1}(\beta_{bF1}) \quad (46)$$

$$\hat{C}_{Fw2} = \hat{C}_{Fw2}(\beta_{bF2}) \quad (47)$$

$$\hat{C}_{Fc} = \hat{C}_{Fc}(\beta_{bF1}, r_{bF1}, \beta_{bF2}, r_{bF2}, d, \gamma) \quad (48)$$

The relationships just presented follow directly from an analytical calculation of the contact points of two involute gear tooth arrangements which are oriented with respect to one another in accordance with the kinematic chain from equation (28).

It is now the basic idea of the present disclosure to utilize the above relationships, together with the constant diagonal ratio from equation (36), to associate a point on the worm with every point on the workpiece. The fact is utilized that the worm can have a modification in accordance with equation (25) which can be any desired within certain limits and a modification is to be produced on the workpiece in accordance with the same equation with a given function $F_{F1}$ and a given angle $\rho_{F1}$. It is the aim to map the points on the worm which lie on a straight line given by $X_{F1}$ and $\rho_{F1}$ onto a straight line on the workpiece given by $X_{F2}$ and $\rho_{F2}$. For this purpose, the equations (39) and (40) are resolved for $z_{V1}$, and $z_{V2}$ and are used in equation (36); subsequently equation (7) is used for the worm and the workpiece to eliminate $z_{Fi}$ and $z_{F2}$ and is replaced with equation (45) $w_{F1}$. This results in a relationship of the form:

$$\hat{C}_{Fc} + \hat{C}_{Fw2} \cdot w_{F2} = 0, \tag{49}$$

which has to apply to all $w_{F2}$. $\hat{C}_{Fw2}$ inter alia has a dependency on $K_{Z_{V1}}$. $\hat{C}_{Fc}$, in contrast, additionally has a dependency on $X_{F1}$ and $X_{F2}$. With the aid of a coefficient comparison, it is thus possible to calculate $K_{Z_{V1}}$ from this relationship both for the left and for the right flank and $X_{F2}$ as a function of $X_{F1}$, likewise for the left and right flanks. $K_{Z_{V1}}$, as defined in equation (36), determines the diagonal ratio with which the machining process has to be carried out so that the mapping of the points on the worm onto the points on the workpiece takes place along the direction defined by $\rho_{F2}$.

For $\rho_{l2} = \rho_{r2}$, this calculation produces the same diagonal ratios $K_{Z_{V1}}$ for the left and right flanks with symmetrical gear teeth. A two-flank, deviation-free generating grinding is thus possible.

If, however, $\rho_{l2} \neq \rho_{r2}$ and/or the gear teeth are asymmetrical, the calculation generally results in different diagonal ratios $K_{Z_{V1}}$ for the left and right flanks. A two-flank, deviation-free generating grinding is thus generally no longer possible in the case with a cylindrical tool.

A single-flank, deviation free generating grinding is, however, possible, wherein different diagonal ratios $K_{Z_{V1}}$ have to be set for the machining of the left and right flanks. If there is a diagonal ratio $K_{Z_{V1}}$, so that the produced modification on the left and right flanks is still within the respective tolerance when generating grinding with it, a two-flank generating grinding is also still possible, but no longer a deviation-free one. The diagonal ratio to be selected for this as a rule lies between the diagonal ratios determined for the left and right flanks. The direction $\rho_{F2}$ of the modification produced on the workpiece deviates from the desired specified value on at least one of the two flanks. If, however, this desired specified value is within tolerance, it is possible in specific cases to select the diagonal ratio such that both directions $\rho_{F2}$ lie within the tolerance.

A method with which modifications with different directions $\rho_{F1}$ on the left and right flanks and/or asymmetrical gear teeth can be generation ground on two flanks and deviation-free will be presented in the following. The cylindrical tool is replaced with a conical one for this purpose.

Conical Tool and Cylindrical Workpiece

Generating grinding is to date only known with cylindrical worms. It is, however, also possible to use conical worms as the tool. The kinematics of this process can be described by a continuous generating gear train having a conical and a cylindrical wheel. These kinematics are described by the kinematic chain given in equation (29). As in the continuous generating gear train comprising two cylindrical wheels, there is also a theoretical point contact between both wheels. This allows the same approach to be used as for cylindrical tools, i.e. a worm having a modification in accordance with equation (25) is used in the diagonal generating method in order likewise to produce a modification in accordance with equation (25) on the workpiece. The progression of the contact point between the workpiece and the worm can be described mathematically as follows.

$$z_{F1} = C_{Fw1} \cdot w_{F1} + C_{Fz_{V1}1} \cdot z_{V1} + C_{Fc1} \tag{50}$$

$$z_{F2} = C_{Fw2} \cdot w_{F2} + C_{Fz_{V1}2} \cdot z_{V1} - z_{V2} + C_{Fc2} \tag{51}$$

The coefficients $C_{Fw1}$, $C_{Fc1}$, $C_{Fw2}$, $C_{Fz_{V1}1}$, $C_{Fz_{V1}2}$ and $C_{FC2}$ introduced here have the following dependencies:

$$C_{Fw1} = C_{Fw1}(\beta_{bF1}) \tag{52}$$

$$C_{Fc1} = C_{Fc1}(\beta_{bF1}, \beta_{bF2}, r_{bF1}, d, \gamma, \vartheta_1) \tag{53}$$

$$C_{Fw2} = C_{Fw2}(\beta_{bF2}) \tag{54}$$

$$C_{Fc2} = C_{Fc2}(\beta_{bF1}, \beta_{bF2}, r_{bF2}, d, \gamma, \vartheta_1) \tag{55}$$

$$C_{Fz_{V1}1} = C_{Fz_{V1}1}(\beta_{bF1}, \beta_{bF2}, r_{bF1}, d, \gamma, \vartheta_1) \tag{56}$$

$$C_{Fz_{V1}2} = C_{Fz_{V1}2}(\beta_{bF1}, \beta_{bF2}, r_{bF2}, d, \gamma, \vartheta_1) \tag{57}$$

Equation (45) is replaced with:

$$\hat{C}_{Fw1} \cdot w_{F1} + \hat{C}_{Fw2} \cdot w_{F2} + \hat{C}_{Fz_{V1}} \cdot z_{V1} + \hat{C}_{FC} = 0 \tag{58}$$

The coefficients $\hat{C}_{Fw1}$, $\hat{C}_{Fw2}$, $\hat{C}_{Fz_{V1}}$ and $\hat{C}_{Fc}$ introduced here have the following dependencies:

$$\hat{C}_{Fw1} = \hat{C}_{Fw1}(\beta_{bF1}) \tag{59}$$

$$\hat{C}_{Fw2} = \hat{C}_{Fw2}(\beta_{bF2}) \tag{60}$$

$$\hat{C}_{Fz_{V1}} = \hat{C}_{Fz_{V1}}(\beta_{bF1}, r_{bF1}, \beta_{bF2}, r_{bF2}, \gamma, \vartheta_1) \tag{61}$$

$$\hat{C}_{FC} = \hat{C}_{Fc}(\beta_{bF1}, r_{bF1}, \beta_{bF2}, r_{bF2}, d, \gamma, \vartheta_1) \tag{62}$$

With knowledge of these relationships, a mapping of points on the worm to points on the workpiece can be calculated in an analogous manner to the case of cylindrical tools and workpieces. If a modification on the worm in accordance with equation (25) is again assumed here, this results in a relationship analogous to equation (49), but with other coefficients $\hat{C}_{FW2}$ and $\hat{C}_{FC}$. These coefficients now additionally depend on $\vartheta_1$. A coefficient comparison also here again allows the calculation of $K_{Z_{V1}}$ and the calculation of $X_{F2}$ as a function of $X_{F1}$, respectively for the left and right flanks, but now $K_{Z_{V1}}$ additionally has a dependency on $\vartheta_1$. It must be noted here that a change of $\vartheta_1$ generally requires a change of the base circle radii and of the base helix angles of the worm so that the worm and the workpiece can continue to mesh with one another and can thus form a continuous generating gear train. This means the worm has to be able to be generated using a rack tilted by $\vartheta_1$ and the worm and the workpiece have to mesh with one another. If $\vartheta_1$ and thus also the base circle radii and the base helix angles are changed, this change has a different influence on $K_{Z_{V1}}$ on the left and right flanks. This different influencing allows a $\vartheta_1$ to be determined so that $K_{Z_{V1}}$ are the same for the left and right flanks. In addition to the conical angle $\vartheta_1$, the profile angles of the rack generating the worm and the axial cross angle $\gamma$ also influence the value $K_{Z_{V1}}$ with conical worms. These values can thus be varied in addition to the conical angle to obtain the same $K_{Z_{V_1}}$ for the left and right flanks. This change of the profile angles likewise results in a change of the base circle radii and of the base helix angles of the worm. These variation possibilities allow a two-flank, deviation-free generating grinding, also for gear teeth and desired modifications, in which a two-flank, deviation-free generating grinding with a cylindrical worm would not be possible. It is also possible with conical worms to grind on one flank and/or to select a worm and a diagonal ratio which do not produce the modification free of deviation; that is, in which $\rho_{F2}$ deviates from the desired specifiable value on at least one flank. Such a choice of the worm and of the diagonal ratio can be necessary, for example, when both are not freely selectable due to other specified values.

Cylindrical Tool and Conical Workpiece

The method described here can be transferred directly onto the generating grinding of conical workpieces in the diagonal generating method. The case of a cylindrical worm is first looked at here which has a modification in accordance with equation (25). The worm and the workpiece again form a continuous generating gear train whose kinematics are given by equation (30). There is again also a theoretical point contact between the worm and the workpiece. The progression of the contact point between the workpiece and the worm can be described mathematically as follows:

$$z_{F1} = C_{Fw1} \cdot w_{F1} - z_{V1} + C_{Fz_{V2}} \cdot z_{V2} + C_{Fc1} \tag{63}$$

$$z_{F2} = CF_{Fw2} \cdot w_{F2} + C_{Fz_{V2}2} \cdot z_{V2} + C_{Fc2} \tag{64}$$

The coefficients $C_{Fw1}$, $C_{Fc1}$, $C_{Fw2}$, $C_{Fz_{V2}2}$, $C_{Fz_{V2}1}$ and $C_{Fc2}$ introduced here have the following dependencies:

$$C_{Fw1} = C_{Fw1}(\beta_{bF1}) \tag{65}$$

$$C_{Fc1} = C_{Fc1}(\beta_{bF1}, \beta_{bF2}, r_{bF1}, d, \gamma, \vartheta_2) \tag{66}$$

$$C_{Fw2} = C_{Fw2}(\beta_{bF2}) \tag{67}$$

$$C_{Fc2} = C_{Fc2}(\beta_{bF1}, \beta_{bF2}, r_{bF2}, d, \gamma, \vartheta_2) \tag{68}$$

$$C_{Fz_{V2}2} = C_{Fz_{V2}2}(\beta_{bF1}, \beta_{bF2}, r_{bF2}, d, \gamma, \vartheta_2) \tag{69}$$

$$C_{Fz_{V2}1} = C_{Fz_{V2}1}(\beta_{bF1}, \beta_{bF2}, r_{bF1}, d, \gamma, \vartheta_2) \tag{70}$$

Equation (45) is replaced with:

$$\hat{C}_{Fw1} \cdot w_{F1} + \hat{C}_{Fw2} \cdot w_{F2} + \hat{C}_{Fz_{V2}} \cdot z_{V2} + \hat{C}_{Fc} = 0 \tag{71}$$

The coefficients $\hat{C}_{Fw1}$, $\hat{C}_{Fw2}$, $\hat{C}_{Fz_{V2}}$ and $\hat{C}_{FC}$ introduced here have the following dependencies:

$$\hat{C}_{Fw1} = \hat{C}_{Fw1}(\beta_{Fw1}) \tag{72}$$

$$\hat{C}_{Fw2} = \hat{C}_{Fw2}(\beta_{bF2}) \tag{73}$$

$$\hat{C}_{Fz_{V2}} = \hat{C}_{Fz_{V2}}(\beta_{bF1}, r_{bF1}, \beta_{bF2}, r_{bF2}, \gamma, \vartheta_2) \tag{74}$$

$$\hat{C}_{Fc} = \hat{C}_{Fc}(\beta_{bF1}, r_{bF1}, \beta_{bF2}, r_{bF2}, d, \gamma, \vartheta_2) \tag{75}$$

The known mathematical approach also again here results in a relationship analogous to equation (49), but with other coefficients $\hat{C}_{Fw2}$ and $\hat{C}_{FC}$. These coefficients now additionally depend on $\vartheta_2$. A coefficient comparison also here again allows the calculation of $K_{Z_{V_1}}$ and the calculation of $X_{F2}$ as a function of $X_{F1}$, respectively for the left and right flanks, but now $K_{Z_{V_1}}$ additionally has a dependency on $\vartheta_2$. On a specification of the same direction of the modification given by $\rho_{F2}$ on the left and right flanks, the calculation of $K_{Z_{V_1}}$ generally produces different values for the left and right flanks. This is also generally the case with symmetrical workpieces. In other words, this means that on a two-flank grinding, the direction $\rho_{F2}$ of the modification is generally different on the left and right flanks. If there is a diagonal ratio $K_{Z_{V_1}}$, so that $\rho_{F2}$ can be reached on both sides or is within the tolerance, a two-flank grinding with a cylindrical tool is possible. Otherwise only a single-flank grinding is possible with a cylindrical tool. As with cylindrical workpieces, a deviation-free, two-flank grinding can be made possible by using a conical tool with an independent specification of the angles $\rho_{F2}$ on the left and right flanks.

Conical Tool and Conical Workpiece

The calculation for a conical tool and a conical workpiece takes place analogously to the previously discussed combinations. The worm and the workpiece again form a continuous generating gear train whose kinematics are given by equation (31). There is again also a theoretical point contact between the worm and the workpiece. The progression of the contact point between the workpiece and the worm can be described mathematically as follows:

$$z_{F1} = C_{Fw1} \cdot w_{F1} + C_{Fz_{V1}1} \cdot z_{V1} + C_{Fz_{V2}1} \cdot z_{V2} + C_{Fc1} \tag{76}$$

$$z_{F2} = C_{Fw2} \cdot w_{F2} + C_{Fz_{V1}2} \cdot z_{V1} + C_{Fz_{V2}2} \cdot z_{V2} + C_{Fc2} \tag{77}$$

The coefficients $C_{Fw1}$, $C_{Fc1}$, $C_{Fw2}$, $C_{Fz_{V2}2}$, $C_{Fz_{V2}1}$, $C_{Fz_{V1}2}$, $C_{Fz_{V1}1}$ and $C_{Fc2}$ introduced here have the following dependencies:

$$C_{Fw1} = C_{Fw1}(\beta_{bF1}) \tag{78}$$

$$C_{Fc1} = C_{Fc1}(\beta_{bF1}, \beta_{bF2}, r_{bF1}, d, \gamma, \vartheta_1, \vartheta_2) \tag{79}$$

$$C_{Fw2} = C_{Fw2}(\beta_{bF2}) \tag{80}$$

$$C_{Fc2} = C_{Fc2}(\beta_{bF1}, \beta_{bF2}, r_{bF2}, d, \gamma, \vartheta_1, \vartheta_2) \tag{81}$$

$$C_{Fz_{V2}2} = C_{Fz_{V2}2}(\beta_{bF1}, \beta_{bF2}, r_{bF2}, d, \gamma, \vartheta_1, \vartheta_2) \tag{82}$$

$$C_{Fz_{V2}1} = C_{Fz_{V2}1}(\beta_{bF1}, \beta_{bF2}, r_{bF1}, d, \gamma, \vartheta_1, \vartheta_2) \tag{83}$$

$$C_{Fz_{V1}2} \beta C_{Fz_{V1}2}(\beta_{bF1}, \beta_{bF2}, r_{bF2}, d, \gamma, \vartheta_1, \vartheta_2) \tag{84}$$

$$C_{Fz_{V1}1} = C_{Fz_{V1}1}(\beta_{bF1}, \beta_{bF2}, r_{bF1}, d, \gamma, \vartheta_1, \vartheta_2) \tag{85}$$

Equation (45) is replaced with:

$$\hat{C}_{Fw1} \cdot w_{F1} + \hat{C}_{Fw2} \cdot w_{F2} + \hat{C}_{Fz_{V1}} \cdot z_{V1} + \hat{C}_{Fz_{V2}} \cdot z_{V2} + C_{Fc} = 0 \tag{86}$$

The coefficients $\hat{C}_{Fw1}$, $\hat{C}_{Fw2}$, $\hat{C}_{Fz_{V1}}$, $C_{Fz_{V2}}$ and $C_{FC}$ introduced here have the following dependencies:

$$\hat{C}_{Fw1} = \hat{C}_{Fw1}(\beta_{bF1}) \tag{87}$$

$$\hat{C}_{Fw2} = \hat{C}_{Fw2}(\beta_{bF2}) \tag{88}$$

$$\hat{C}_{Fz_{V1}} = \hat{C}_{Fz_{V1}}(\beta_{bF1}, r_{bF1}, \beta_{bF2}, r_{bF2}, \gamma, \vartheta_1, \vartheta_2) \tag{89}$$

$$\hat{C}_{Fz_{V2}} = \hat{C}_{Fz_{V2}}(\beta_{bF1}, r_{bF1}, \beta_{bF2}, r_{bF2}, \gamma, \vartheta_1, \vartheta_2) \tag{90}$$

$$\hat{C}_{Fc} = \hat{C}_{Fc}(\beta_{bF1}, r_{bF1}, \beta_{bF2}, r_{bF2}, d, \gamma, \vartheta_1, \vartheta_2) \tag{91}$$

The known mathematical approach also again here results in a relationship analogous to equation (49), but with other coefficients $\hat{C}_{Fw2}$ and $\hat{C}_{FC}$. These coefficients now additionally depend on $\vartheta_1$ and $\vartheta_2$. A coefficient comparison also here again allows the calculation of $K_{Z_{V_1}}$ and the calculation of $X_{F2}$ as a function of $X_{F1}$, respectively for the left and right flanks, but now $K_{Z_{V_1}}$ additionally has a dependency on $\vartheta_1$ and $\vartheta_2$. Analogous to the grinding of a cylindrical workpiece with a conical worm, a change of $\vartheta_1$, the profile angle of the rack of the worm and the axial cross angle, and thus also the base circle radii and the base helix angle, influence the diagonal ratio $K_{Z_{V_1}}$ differently on the left and right flanks. This makes it possible, for given directions $\rho_{F2}$ of the desired modification, to determine a value of $\vartheta_1$, the profile angle of the rack of the worm and an axial cross angle so that $K_{z_{V1}}$ is the same for the left and right flanks and thus a two-flank, deviation-free grinding becomes possible.

In all combinations described here, the modification $F_{t1}$ ($X_{F1}$) required on the worm is given by:

$$F_{Ft1}(X_{F1}) = -\frac{\cos\beta_{bF2}}{\cos\beta_{bF1}} \cdot F_{Ft2}(X_{F2}(X_{F1})) \qquad (92)$$

where $F_{Ft2}(X_{F2})$ describes the modification on the workpiece in accordance with equation (25).

Calculation Approach for Calculating the Contact Paths on the Tool and on the Workpiece In the following, a calculation approach will be shown with which the above-used contact paths can be calculated in dependence on the feeds. This calculation of the contact between the workpiece and the tool is carried out with the aid of two theoretical racks (also called basic racks), one each for the workpiece and the tool, each having trapezoidal, generally asymmetrical profiles which can generate the gear teeth. Since both the tool and the workpiece are involute gear teeth, this observation is symmetrical with respect to a swapping over of the tool and workpiece.

Figure 35:
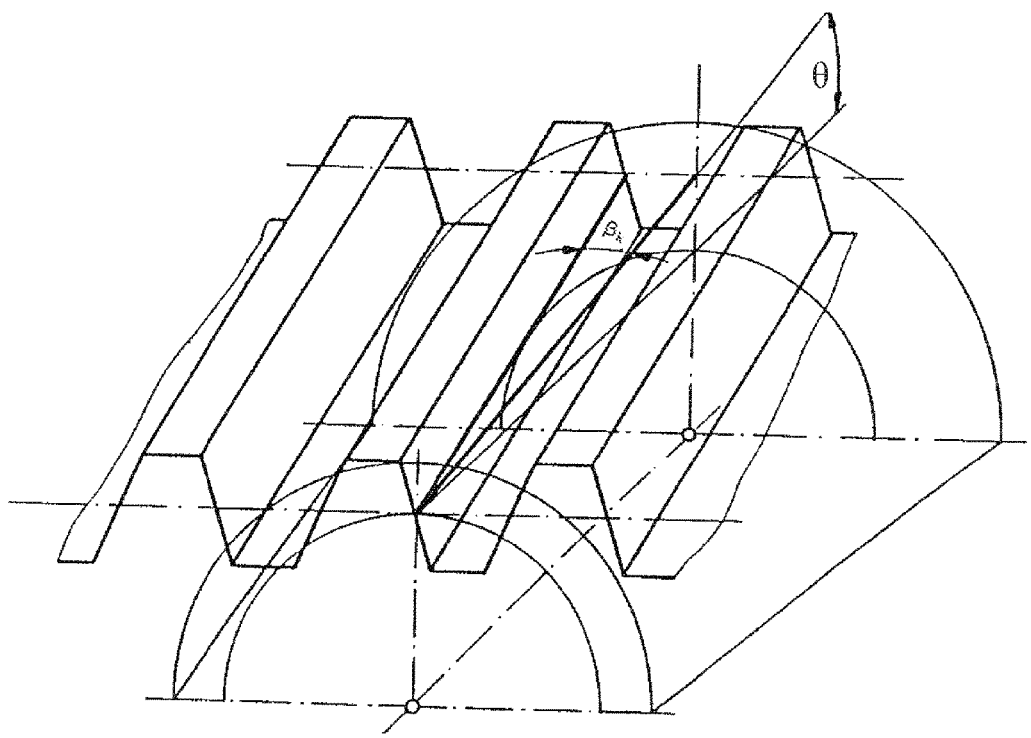
FIG. 35 shows a representation of conical gear teeth having a rack generating them. The rack is pivoted by the helix angle $\beta_k = \beta_w$ and is tilted by the conical angle $\theta = \vartheta$. (From Zierau, S: Die geometrische Auslegung konischer Zahnräder and Paarungen mit parallelen Achsen [The Geometrical Design of Conical Gears and Pairs Having Parallel Axes], Report No. 32, Institute For Construction Science, Braunschweig Technical University)
Figure 37:
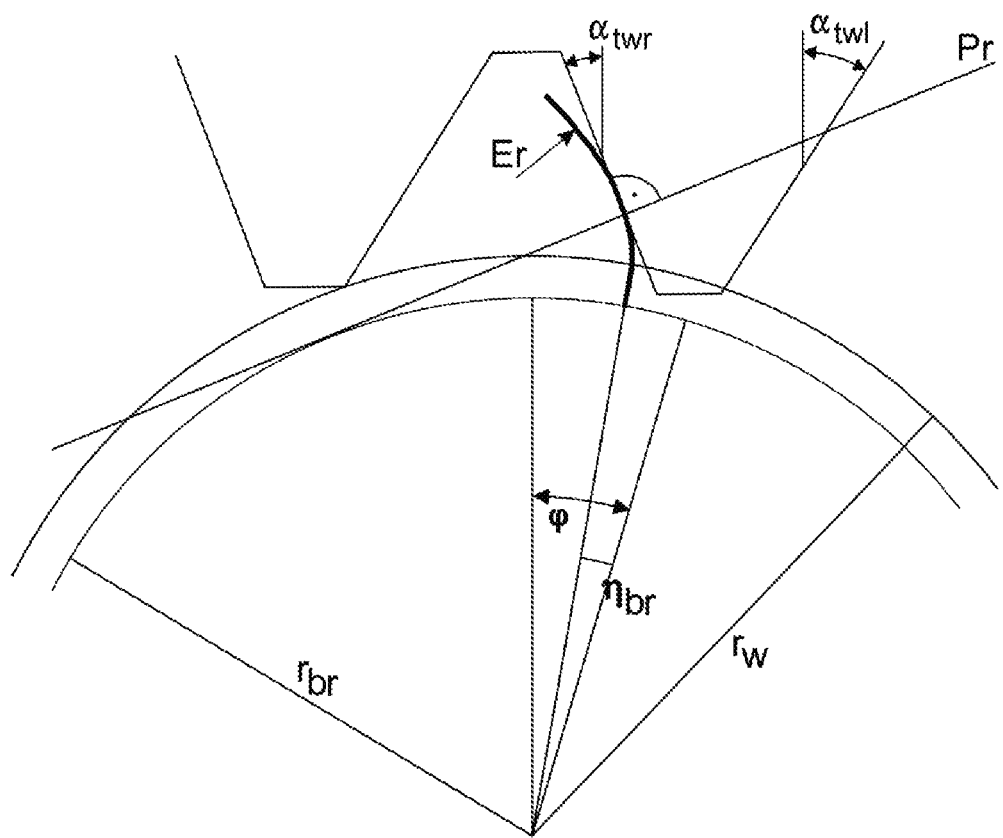
FIG. 37 shows the engagement of a right flank with a generating asymmetrical rack in the transverse section. The profile angle in the transverse section $\alpha_{twr}$ defines the inclination of the engagement planes $P_r$. The gear teeth are rotated by the angle of rotation $\varphi$.

FIG. 37 shows by way of example the contact of a right involute flank with a generating rack with a profile angle $\alpha_{twr}$ in the transverse section. The gear teeth are rotated by the angle of rotation $\varphi$; the contact between the flank and the rack takes place in the engagement plane $P_r$ which is inclined by $\alpha_{twr}$. The contact point between the flank and the rack results for all angles of rotation $\varphi$ as the point of intersection between the flank and the engagement plane. While the gear teeth rotate, the rack is horizontally displaced so that it rolls off the pitch circle with a radius $r_w$ without slippage. The flank and the rack thereby remain in contact. To describe the gear teeth in their whole width, the relative position of the rack to the gear teeth has to be observed in 3D. It is pivoted by the helix angle $\beta_w$ for cylindrical gear teeth. For the case of conical gear teeth, the position of the rack to the gear teeth is described exhaustively in (Zierau) ([The Geometrical Design of Conical Gears and Pairs Having Parallel Axes], Report No. 32, Institute For Construction Science, Braunschweig Technical University). In addition to the pivoting by the helix angle $\beta_w$, a tilt takes place by the conical angle $\vartheta$ (see FIG. 35). In both cases, the rack has the profile angle $\alpha_{nwF}$ in the normal section. Which combinations of angles $\alpha_{twF}$, $\alpha_{nwF}$, and $\beta_w$ as well as of the normal module $m_n$ and the transverse module $m_t$ are possible to produce given gear teeth results for cylindrical gear teeth from the set of formulas of DIN 3960 and for conical gear teeth additionally from the set of formulas from [Zierau]. The formulas required for this can be transferred directly to asymmetrical gear teeth by introducing different profile angles at the left and right sides.

If the geometry and the relative position of the rack to the gear teeth are known, the transverse sections can be determined for any desired width positions and within them the contact point between the rack and the flank. All these contact points in the individual transverse sections form a straight line (straight contact line) in the engagement plane for an angle of rotation $\varphi$. If these contact points are described via w and z from the parameterization in equation ((27), a linear relationship (R1) between w, z and $\varphi$ is obtained. If the rack is held fast in space, it is possible for cylindrical gear teeth to displace them in the axial direction. This axial feed $z_V$ is typically set for the workpiece to machine it over the total toothed width and is set for the tool to set the diagonal ratio. So that the gear teeth continue to contact the rack, at two flanks as a rule, the gear teeth have to be rotated about their axis in addition to the displacement. The amount of the rotation results from the lead of the gear teeth and from the amount of the displacement, the rotational sense from the hand of thread. With conical gear teeth, the feed $z_V$ does not take place in the axial direction, but rather tilted by the conical angle $\vartheta$ with respect to it. The lead required for the calculation of the correction of the angle of rotation is calculated using the same formula as for cylindrical gear teeth from $\beta_w$ and $m_t$. The transverse sections are to be observed in dependence on the axial feed or the feed with the correspondingly corrected angles of rotation for calculating the contact points in the individual transverse sections. A linear relationship (R2) between w, z, $z_V$ and $\varphi$ results from (R1) for the description of the contact points.

Figure 34:
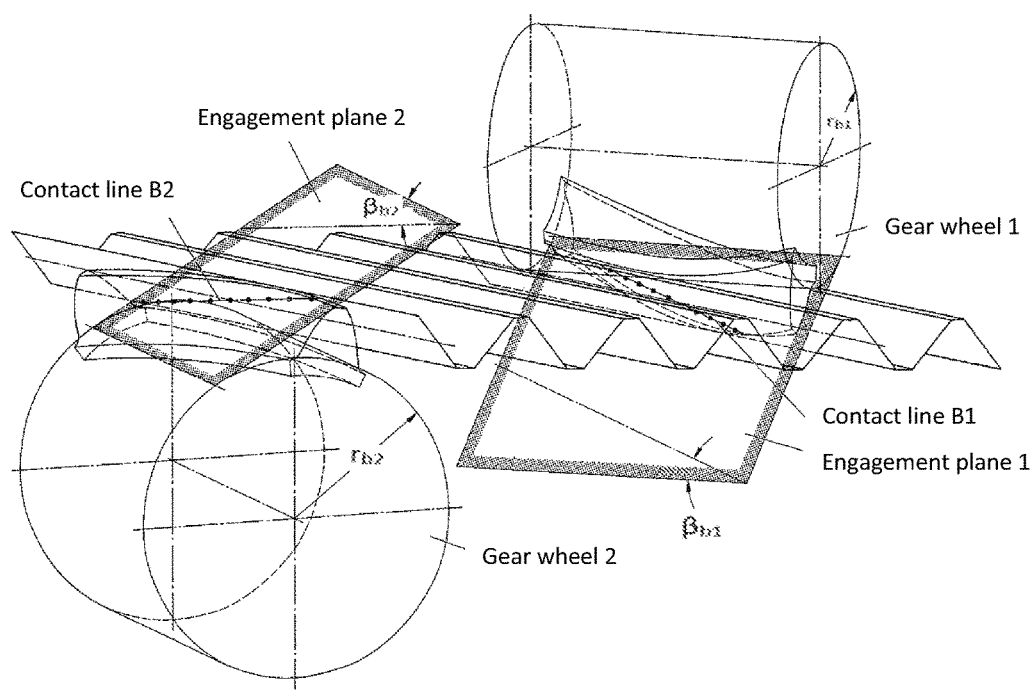
FIG. 34 shows a representation of two gear tooth arrangements in a continuous generating gear train including the common rack and the engagement planes of both gear tooth arrangements. For a better illustration, the relative position of the two gear tooth arrangements does not correspond to that in the continuous generating gear train. This Figure also shows the relative position of cylindrical gear teeth to the generating rack. (From Niemann, G; Winter, H: Maschinenelemente Band 3 2. Auflage, [Machine Elements Vol. 3, 2nd Edition] Springer Verlag, Berlin, 1983)

If two sets of gear teeth are paired in a continuous generating gear train, their two racks have to be congruent at all times, as shown in FIG. 34. This implies that the profile angles $\alpha_{nwF}$ have to be equal for both sets of gear teeth. (R3) furthermore results from this: $\gamma+\beta_{w1}+\beta_{w2}=0$. This condition allows the profile angles to be determined in the normal section or in the transverse section of the two racks from a given axial cross angle for two given sets of gear teeth which can mesh with one another. A change of the base circle radii and of the base helix angles of the worm is thus equivalent to a change of the profile angle and/or of the conical angle and/or of the axial cross angle.

So that the racks are congruent at all times, a linear constraint (R4) results between the two angles of rotation and the two feeds.

If the two angles of rotation and the two feeds are known, the contact point of the two sets of gear teeth can be determined directly by calculating the point of intersection of the two straight contact lines. The parameters $z_{F1}$ and $w_{F1}$ or $z_{F2}$ and $w_{F2}$, which describe the contact point on gear teeth 1 or gear teeth 2, depend linearly on $\varphi_1$, $\varphi_2$, $z_{V1}$ and $z_{V2}$ (R5). If the angles of rotation are eliminated in these relationships, the sought contact paths (R6) follow.

A linear relationship (R7) results between $w_{F1}$, $w_{F2}$, $z_{V1}$ and $z_{V2}$ from (R4) and (R2) for both sets of gear teeth by eliminating $\varphi_1$ and $\varphi_2$ and describes, in dependence on the feed, which rolling distance on gear set 1 contacts which rolling distance on gear set 2.

The following has to apply so that the tool and the workpiece mesh with one another:

$$m_{bF1} \cdot \cos\beta_{bF1} = m_{bF2} \cdot \cos\beta_{bF2} \qquad (93)$$

Alternatively to the just described approach, it is also possible to carry out the contact paths (R6) and the relationship between the pitch angles (R7) with the aid of a simulation calculation. It is possible with such simulations to calculate the exact geometry of the workpiece from a given tool, in particular from a worm and from a given kinematics, in particular from a given relative position between the tool and the workpiece. Such simulations can be extended such that it is also possible to determine with them which point on the tool produces which point on the workpiece, in dependence on the feed of the tool and of the workpiece. An algorithm suitable for this will be described in the following.

For this purpose, a workpiece is first looked at which is not modified as a rule. Vectors in the normal direction having a previously fixed length are placed on individual points having the coordinates ($w_{F2}$, $z_{F2}$) on the teeth of this workpiece. The length of the vectors corresponds to the stock of the workpiece prior to grinding, with respect to the non-modified workpiece. The stock is typically selected to be so large that each vector is shortened at least once during the simulation described in the following. The number of points on the teeth determines the accuracy of the result. These points are optionally selected as equidistant. The relative position of the workpiece to the worm is specified at every time, for example by the kinematic chain $K_r$. The section of all vectors is calculated with the worm at each of the discrete times. If a vector does not intersect the worm, it remains unchanged. If it, however, intersects the worm, the point of intersection is calculated and the vector is shortened so much that it ends just at the point of intersection. The spacing of the point of intersection from the worm axis, that is the radius on the worm $r_{F1}$ of the point of intersection, is furthermore calculated and is stored as additional information to the just shortened vector. Since the corrections of the coordinates are not changed during the grinding here, all the vectors on a given radius of the workpiece $r_{F2}$ or on a given rolling distance $w_{F2}$ have approximately the same length after the simulation was carried out over the total width of the worm.

Figure 38:
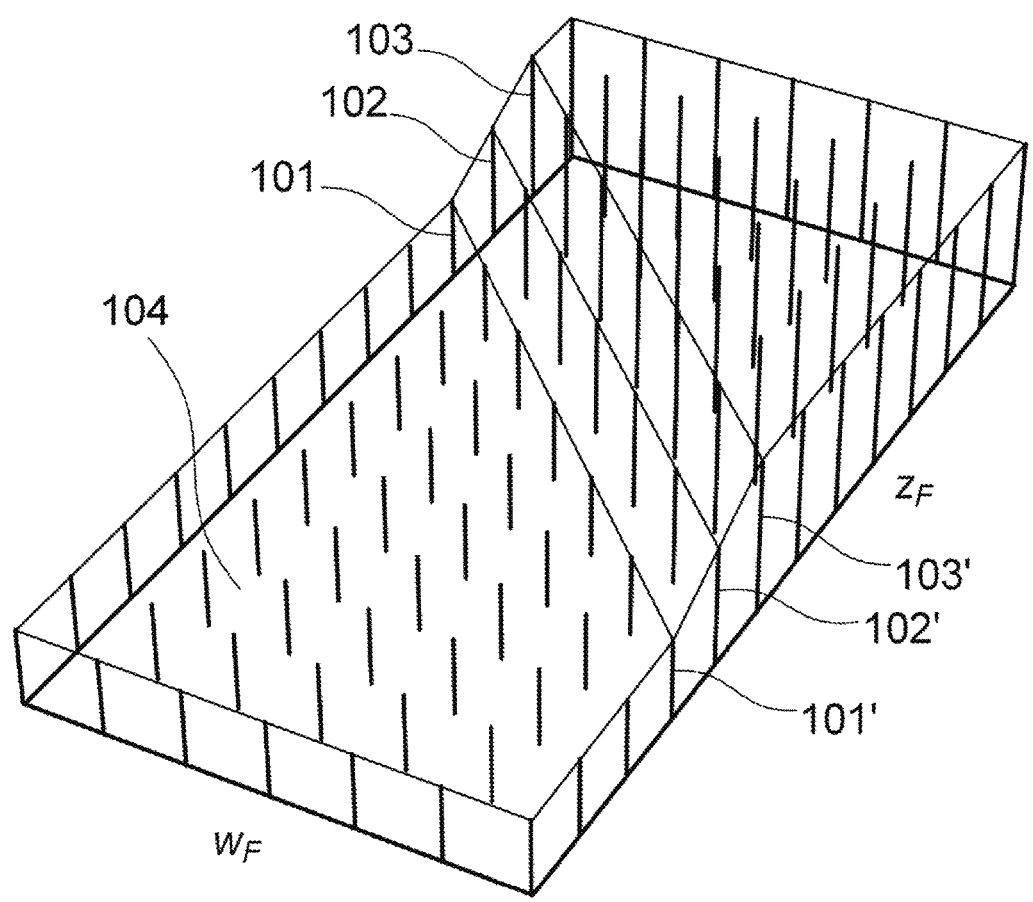
FIG. 38 schematically shows a section of the flank of a workpiece tooth with vectors in the normal direction for a workpiece not ground over the whole width. The number of vectors was considerably reduced here in comparison with a simulation calculation. The plane 104 shown schematically here corresponds to the generally curved flank of the non-modified workpiece onto which the vectors are placed. The vectors 101 and 101' were already swept over by the contact path and are thus completely shortened. The vectors 102 and 102' have already been shortened at least once, but have not yet been swept over by the contact path. The vectors 103 and 103' have not yet been shortened and thus still have the length corresponding to the selected allowance.

The slight differences in the lengths are due to the fact that the algorithm described here causes markings, similar to the generating cuts during hobbing, due to the discretization of the time. These markings, and thus also the differences in the lengths of the vectors on a given radius of the workpiece, can be reduced by a finer discretization of the time, equivalent to a shortening of the time steps. If the simulation is not carried out over the total width of the workpiece, but is rather aborted at a given axial shift position $z_{V2}$ of the workpiece, only the vectors which were already swept over by the contact path have approximately the same length for a given radius on the worm. The remaining vectors either have the originally selected length or were already shortened at least once, but do not yet have the final length since they will be shortened again at a later time (see FIG. 38). This fact can be utilized to determine the contact path for the current feeds of the workpiece and of the worm with great accuracy. All the vectors on a given radius on the workpiece $r_{F2}$ or on the rolling distance $w_F$ are observed for this purpose and it is determined at which width line position the transition is from vectors having approximately the same length to those having a length differing therefrom. Since the continuous generating gear train is symmetrical with respect to the swapping over of the workpiece and the worm, the contact path on the worm can be determined in the same manner. If the workpiece and the worm are both cylindrical, the coefficients from equation (39) or (40) can be determined, for example by means of curve fitting from the points on the contact path calculated in this manner. If the vectors are determined along which the contact path extends, the radii on the worm $r_{F1}$ previously stored for them can be read out and it can thus be determined for each radius on the workpiece $r_{F2}$ by which radius on the worm $r_{F1}$ it was ground. These radii can be converted into rolling distances. The coefficients from equation (45) can be determined, for example by means of curve fitting, from these value pairs for cylindrical workpieces and cylindrical worms.

If the worm is conical and the workpiece is cylindrical, the contact path for at least two different feeds $z_{V1}$ has to be determined in order additionally to determine the coefficients before $z_{V1}$ in the equations (50), (51) and (58). In an analogous manner, at least two different feeds $z_{V2}$ have to be looked at when the workpiece is conical and the worm is cylindrical. If the workpiece and the worm are conical, the contact paths for at least two feeds $z_{V1}$ and at least two feeds $z_{V2}$ have to be looked at to determine all the coefficients from the equations (76), (77) and (86).

Selection of the Macrogeometry of the Worm and of the Dresser

The diagonal ratio calculated here also inter alia depends on the macrogeometry of the worm, in particular on the number of starts, the base helix angle, the base circle radii, the outer diameter (at a defined z position in the case of a conical tool) and, optionally, on the conical angle. These values can therefore be utilized to influence the diagonal ratio to be set with given directions $\rho_F$. This thus also makes it possible to extend or shorten the working region, which can be of advantage for the tool division. An influencing of the diagonal ratio can also be sensible for technological reasons.

In the selection of the macrogeometry of the worm, the aspects from the first part of this application are to be taken into account in the case of a use of dressable tools. The macrogeometry is thus to be selected such that the required surface modification on the worm can be produced via the dressing process. It must in particular be ensured here that the required crowning can be reached along each straight contact line on the worm by the dresser which contacts the active region of the worm. If two-flank dressing is used, it must be taken into account whether the required topological modifications on the worm can be produced on the left and right flanks, for example using the method from the first part of this application. The case is particularly relevant in which only constant and linear portions of the modification ($F_{FtC}$, and $F_{FtL}$) are required along the contact line between the dresser and the worm. Such modifications can be produced within certain limits using the 4 point method. The extent to which the linear portions $F_{FtL}$ can be freely selected on the left and right flanks depends greatly on the macrogeometry of the worm, in particular on the diameter, the number of starts, the conical angle and the profile angle and additionally on the diameter of the dresser. The 4 point method allows a determination to be made whether the desired topological modification can be produced for specific macrogeometries and thus allows suitable macrogeometries to be determined.

Non-Constant Diagonal Ratio

The method previously described here requires that the machining process has to be carried out with a constant, specified diagonal ratio. The diagonal ratio and the width of the workpiece, including the overrun, determine the feed of the workpiece required for the machining. Together with the extension of the contact path on the tool, the feed determines the length of the part of the tool involved in the machining, also called the working region. The length of the working region, on the one hand, determines the minimum length of the tool or, with short working regions and long tools, the number of modified regions which can be placed on the worm. It can be advantageous in both cases to extend or to shorten the length of the working region. A possibility of changing the length of the working region depends on changing the geometry of the tool, in particular the base circle radii and the base helix angles. The influence of this variant on the length of the working region is generally very small, however. A further possibility of changing the length of the working region comprises changing the diagonal ratio during the machining. If this is done while the progression of the contact point sweeps over a modified region, this results in deviations of the modification. If the deviation is then still within the tolerance, a change of the diagonal ratio can sensibly be used.

If the modification is designed such that the progression of the contact point sweeps over regions which are not modified, the parts of the worm engaged at this point in time are also not modified. This allows the diagonal ratio to be freely selected while this region is swept over. In order, for example, to minimize the length of the working region, the diagonal ratio can be set to 0. A reduction of the diagonal ratio, however, results in a greater load on the tool, which makes a technological observation necessary. If the stock removal is particularly large while the non-modified region is being produced, it may also be sensible to increase the diagonal ratio in these regions.

Typical examples for modifications which comprise a non-modified region are end reliefs or also triangular end reliefs.

Figure 23:
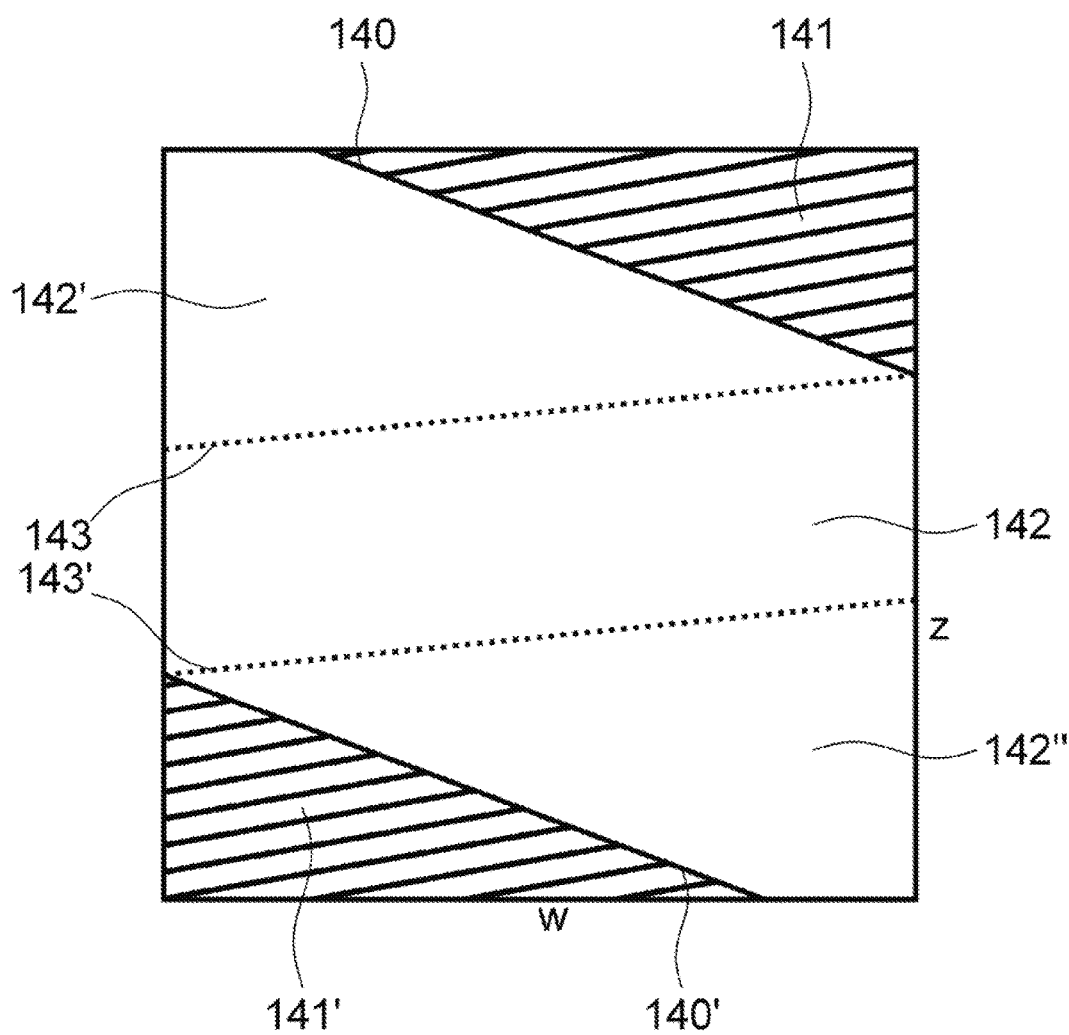
FIG. 23 shows a w-z diagram of a modification comprising regions 141 and 141' modified in accordance with equation (25) and non-modified regions 142, 142' and 142". The straight lines 140 and 140' extend in the direction given by $\rho_{F2}$. The straight lines 143 and 143' correspond to the progression of the contact point.

FIG. 23 shows for the example of two generated end reliefs a division into modified (141 and 141') and non-modified (142, 142', 142") regions. While the progression of the contact point (143 or 143') sweeps over the region 142, only non-modified regions of the worm come into engagement. The diagonal ratio can be freely selected in this region. If a region above 143 or beneath 143' is swept over, the contact point extends at least partly over a modified region. The calculated diagonal ratio has to be observed here to produce a modification free of deviations. It is, however, also possible not to observe the diagonal ratio and to accept deviations. If grinding is carried out on two flanks, both flanks have to be taken into account in this observation. If a deviation-free modification is to be produced, the diagonal ratio can only be freely selected while the contact path sweeps over a non-modified region on both flanks.

Modifications are also possible which are composed of non-modified regions and of regions with modifications extending in different directions. If the modification is designed such that the progression of the contact point between the modified regions sweeps over regions which are not modified, the diagonal ratio can again be selected as desired in these regions. If modified regions are swept over, the diagonal ratio has to be set in accordance with the direction of the just swept over modification. The non-modified regions can be utilized to adapt the diagonal ratio from one modified region to the next.

Figure 24:
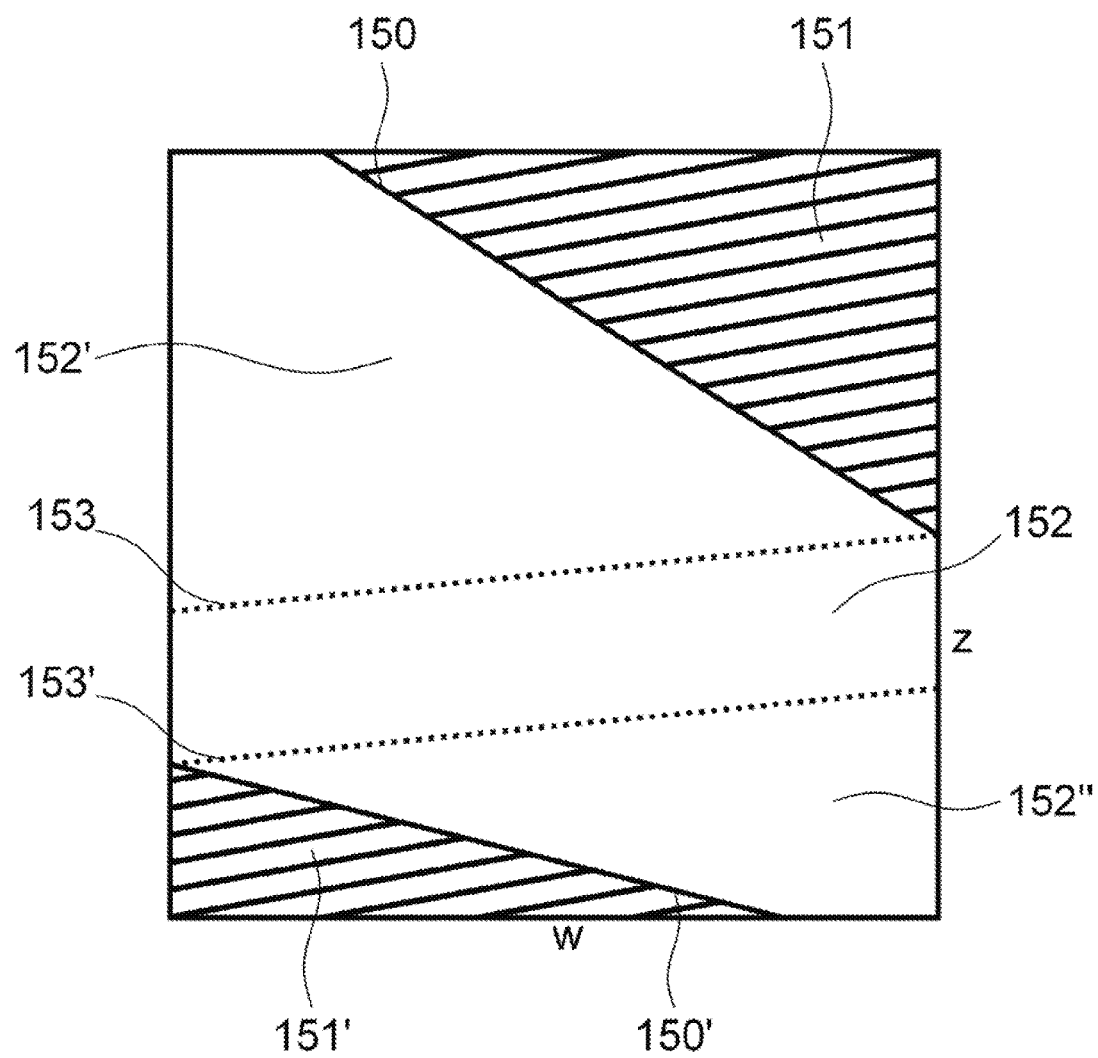
FIG. 24 shows a w-z diagram of a modification comprising regions 151 and 151' modified in accordance with equation (25) and non-modified regions 152, 152' and 152". The regions 151 and 151' have modifications with different directions $\rho_{F2}$. The straight lines 150 and 150' extend in the direction given by the respective $\rho_{F2}$. The straight lines 153 and 153' correspond to the progression of the contact point.

FIG. 24 shows for the example of two generated end reliefs which extend in different directions a division into modified (151 and 151') and non-modified (152, 152', 152") regions. The directions $\rho_{F2}$ (150 and 150') of the modifications in accordance with equation (25) are different in the modified regions. Different diagonal ratios thus have to be set for the machining of the two regions. While the progression of the contact point (153 and 153') sweeps over the region 152, the diagonal ratio can be freely selected. To be able to produce the modification free of deviations the straight lines 153 and 153' have to lie at the same height or 153 above 153'. If, however, 153' is above 153, the contact point extends both over the region 151 and over the region 151' for which different diagonal ratios are to be set. This produces a deviation on at least one of the two regions. If grinding takes place on two flanks, an observation of both flanks is also necessary here. If grinding should be free of deviations, care must be taken that the regions ground simultaneously on both sides require the same diagonal ratio. If this is not the case, the modification is produced with deviations.

It is, however, also possible to change the diagonal ratio specifically while the contact path on the workpiece sweeps over modified regions. To describe this mathematically, equation (36) is replaced by a variant, generally non-linear.

$$z_{V1}(z_{V2}) = F_{Z_{V1}}(z_{V2}) \tag{94}$$

In this respect, $F_{Z_{V1}}$ is any desired continuous function which describes a relationship between $z_{V1}$ and $z_{V2}$. The diagonal ratio is given by the derivation from $F_{Z_{V1}}(z_{V2})$ to $z_{V2}$ and is thus generally not constant. If $F_{Z_{V1}}$ is not linear, straight lines on the worm in the w-z diagram are no longer mapped onto straight lines on the workpiece in the w-z diagram. The curve which describes the progression of the points in the w-z diagram on the workpiece which are mapped onto a straight line on the worm defined by $X_{F1}$ can be described by a function $z_{F2}(w_{F2}, X_{F1})$. For the most general case of a conical workpiece and a conical worm, a relationship (R20) is obtained between $F_{Z_{V1}}(z_{V2})$, $z_{F2}(w_{F2}, X_{F1})$, $w_{F2}$ and $X_{F1}$ in that the equation system from equation (76) and (77) is resolved for $z_{V1}$ and $z_{V2}$, and in that the two feeds are inserted into equation (94) and in that subsequently $z_{F1}$ and $w_{F1}$ are replaced with the aid of equations (37) and (86). $F_{Z_{V1}}$ describes the progression of the points on the workpiece flank which are mapped onto the straight line on the worm defined by $X_{F1}$. Conversely, the function $F_{Z_{V1}}(z_{V2})$ can also be determined from a progression $z_{F2}(w_{F2}, X_{F1})$ given for a $X_{F1}$. Furthermore, a function $F_{X_{F1}}(w_{F2}, z_{F2})$ can be determined from the relationship (R20) with which function, for given $z_{F2}$ and $w_{F2}, X_{F1}$, and thus the straight line on the worm onto which straight line the point on the gear teeth is mapped. An analogous procedure can be followed for the cases in which the workpiece and/or the worm are cylindrical.

Figure 25A:
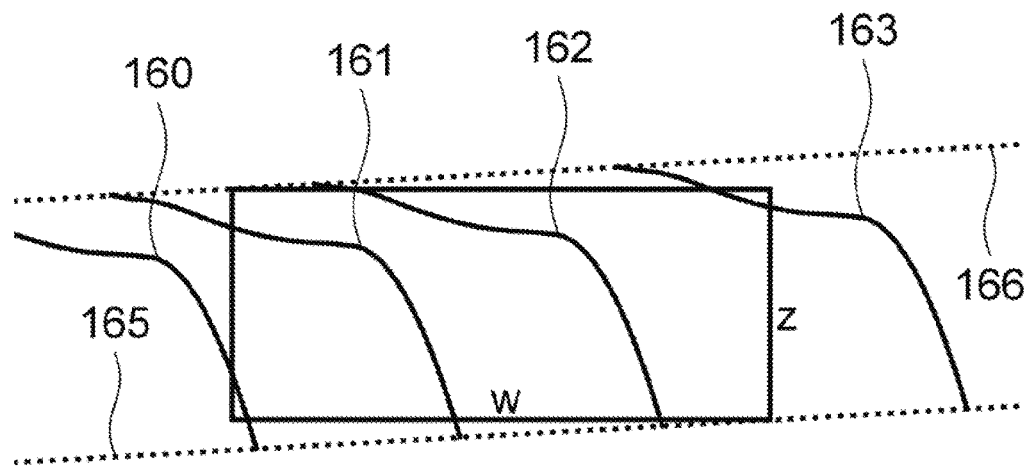
FIG. 25A shows, for the example of a, right flank of a cylindrical workpiece slanted to the right, four curves 160-163 which each describe the progression of the points in the w-z diagram on the workpiece which are mapped onto a straight line on the worm. The four curves correspond to four different values $X_{F1}$ and thus to four different straight lines on the worm. The curves are displaced with respect to one another along the parallel straight lines 165 and 166.
Figure 25B:
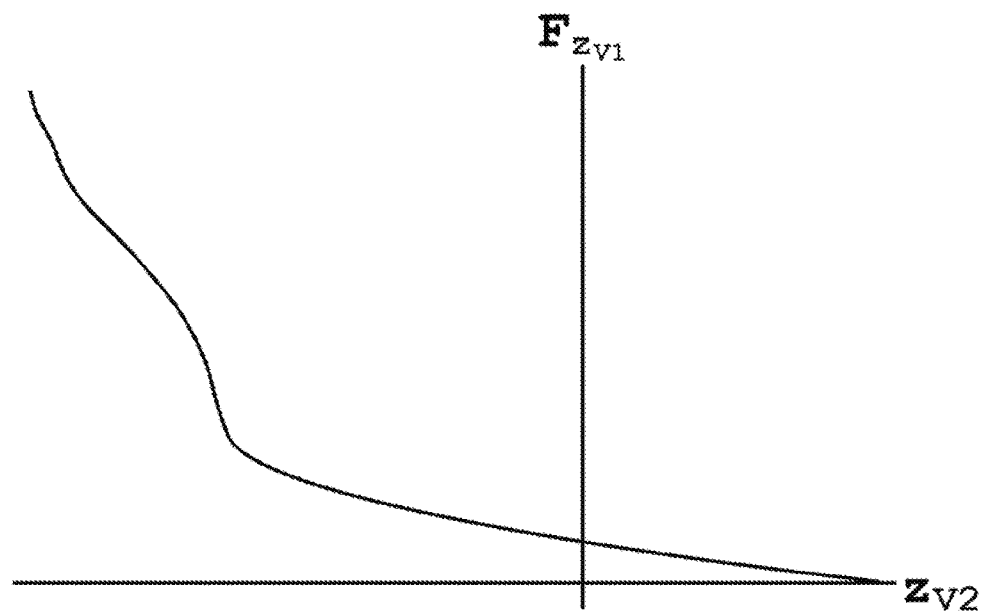
FIG. 25B shows, matching FIG. 25A, the function $F_{Z_{V1}}(z_{V2})$ which describes the dependence of $z_{V1}$ on $z_{V2}$.

If only the part of the progression is looked at for a $X_{F1}$ which lies on the flank, i.e. within the w-z diagram, this generally does not define the function $F_{Z_{V1}}(z_{V2})$ for all the values of $z_{V2}$ since, for other feed positions of the workpiece, parts of the then current progression sweep over the flank which were still outside the diagram for $X_{F1}$. FIG. 25A shows this by way of example for a cylindrical workpiece. This can be utilized to compose $F_{Z_{V1}}(z_{V2})$ section-wise from the extents for different $X_{F1}$ or to expand the definition range. It is alternatively also possible to determine $F_{Z_{V1}}(z_{V2})$ from an extent for an $X_{F1}$ which was continued beyond the limits of the w-z diagram. FIG. 25A shows how such a progression can be selected. In this example, the function $F_{Z_{V1}}(z_{V2})$ can then be determined from one of the four progressions 160-163.

In particular, when $F_{Z_{V1}}(z_{V2})$ is to be determined from the continuation of an $X_{F1}$, it is of particular significance to know how the progression changes from one $X_{F1}$ to another $X_{F1}$. This is calculated for the general case by the following steps:

Calculation of $F_{Z_{V1}}(z_{V2})$ from the progression for an $X_{F1}$; and

Calculation of the progression for another $X_{F1}$ from the previously determined $F_{Z_{V1}}(z_{V2})$.

If the gear teeth are cylindrical, it results from this calculation that a progression $X_{F1}$ results from the progression for another $X_{F1}$ by displacement along a marked direction. This direction is shown by the two parallel straight lines 165 and 166 in FIG. 25A. If the worm is cylindrical, the direction of this straight line is independent of the geometry of the worm and thus only depends on the geometry of the workpiece. Conical worms can be used to influence the direction of this straight line and thus to design the produced modifications with even more variability. This direction can be influenced via the geometry of the conical worm ($r_{bF1}$ or $\beta_{bF1}$) and the axial cross angle and the center distance, in particular of the conical angle.

If the gear teeth are conical, the change of the progression from one $X_{F1}$ to another can be influenced, both for conical and cylindrical worms, via the geometry of the worm ($r_{bF1}$ or $\beta_{bF1}$, $\vartheta 1$) and the axial cross angle. The relationship can, however, no longer be clearly described easily and has to be determined by the above-described steps.

If generating grinding takes place on one flank, $F_{Z_{V1}}(z_{V2})$ and thus the progression can be specified separately for each flank.

If generating grinding takes place on both flanks, one $F_{Z_{V1}}(z_{V2})$ influences the progressions on both flanks. If the progression is specified on one flank 1, the progression resulting from this on the other flank 2 can be determined by the steps:

Calculation of $F_{Z_{V1}}(z_{V2})$ from the progression of flank 1; and

Calculation of the progression of flank 2 from $F_{Z_{V1}}(z_{V2})$.

If the progression on a flank 1 is specified, the progression on flank 2 resulting from this is influenced by the geometry of the worm ($r_{bF1}$ or $\beta_{bF1}$, $\vartheta_1$) and the axial cross angle and the center distance. This influence can be utilized to coordinate $F_{Z_{V1}}(z_{V2})$, the geometry of the worm and the axial cross angle and the center distance such that the progressions on both flanks correspond to the desired progressions as well as possible.

If the worm has a modification in accordance with equation (25), the value of the modification on the workpiece along a progression $z_{F2}(w_{F2}, X_{F1})$ equals:

$$-\frac{\cos\beta_{bF1}}{\cos\beta_{bF2}} \cdot (F_{Ft1C}(X_{F1}) + F_{Ft1L}(X_{F1}) \cdot w_{F1} + F_{Ft1Q}(X_{F1}) \cdot w_{F1}^2) \quad (95)$$

An at least approximate parameterization of the modification $f_{Ft2}(w_{F2},z_{F2})$ on the workpiece over $w_{F2}$ and $z_{F2}$ is then obtained by the relationship $$X_{F1}=F_{X_{F1}}(w_{F2},z_{F2}) \quad (96)$$

and relationship (R7) from which $w_{F1}$ can be expressed by $w_{F2}$ with the aid of the progression of the contact point between the workpiece and the worm.

If the modification on the gear is known, the functional values of the functions $F_{Ft1c}$, $F_{Ft1L}$ and $F_{Ft1Q}$ can be determined for all progressions. For this purpose, in a simple variant, the functional values are determined while taking account of the modification at three rolling angles along the progression; in an expanded variant, this can be done by means of curve fitting.

Figure 26:
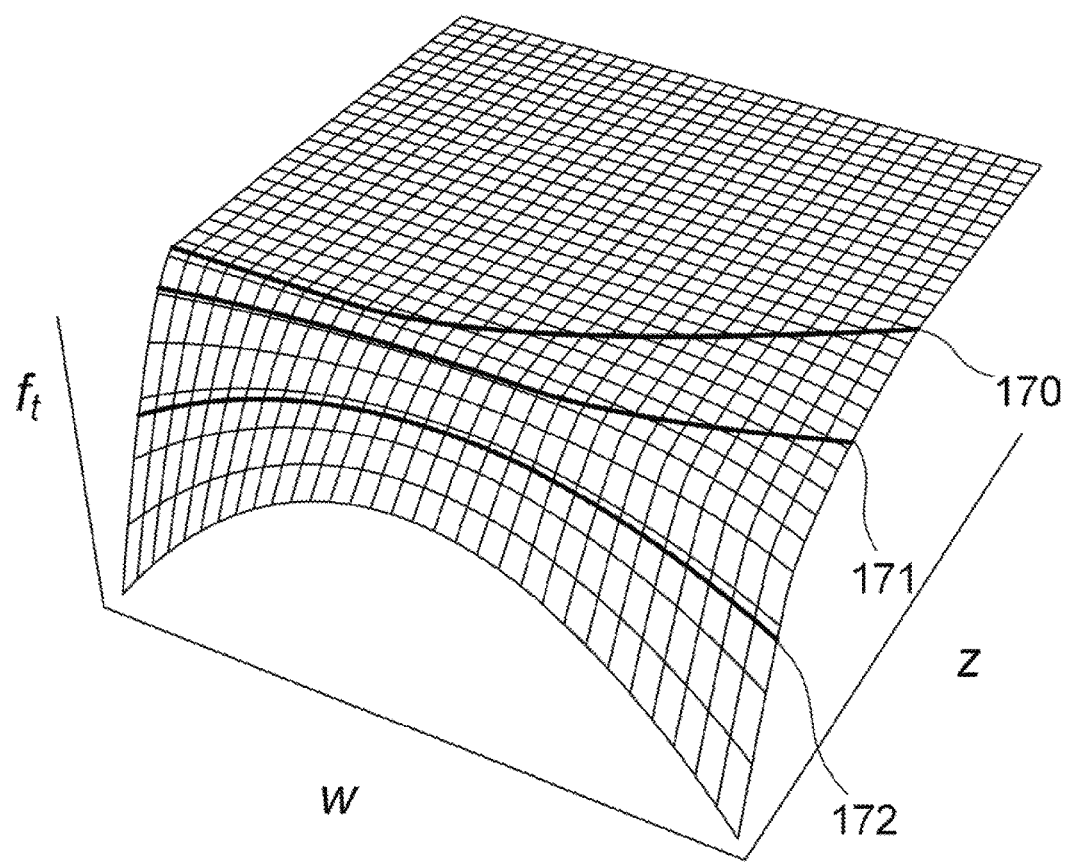
FIG. 26 shows a w-z diagram of a right flank of a cylindrical workpiece slanted to the left onto which a modification has been applied by means of variable diagonal ratios. Line 170 marks the progression of the points which are mapped onto the straight line defined by $X_{F1}=0$ on the worm. Line 171 marks the progression of the points which are mapped onto the straight line defined by $X_{F1}=0.5$ mm on the worm. Line 172 marks the progression of the points which are mapped onto the straight line defined by $X_{F1}=1.0$ mm on the worm. The modifications along the respective progressions are shown in FIG. 27C.
Figure 27A:
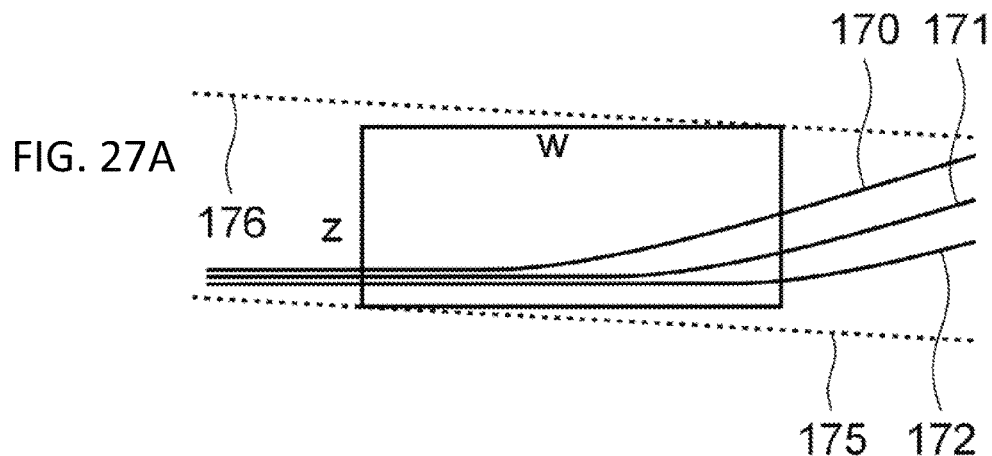
FIG. 27A shows, in a scheme as in FIG. 25, the progressions 170-172 of the points on the workpiece which, in the example from FIG. 26, are mapped onto the straight line defined by $X_{F1}=0$, $X_{F1}=0.5$ mm, and $X_{F1}=1.0$ mm on the worm. The straight lines 175 and 176 define the direction along which the progressions for different $X_{F1}$ are displaced with respect to one another.
Figure 27B:
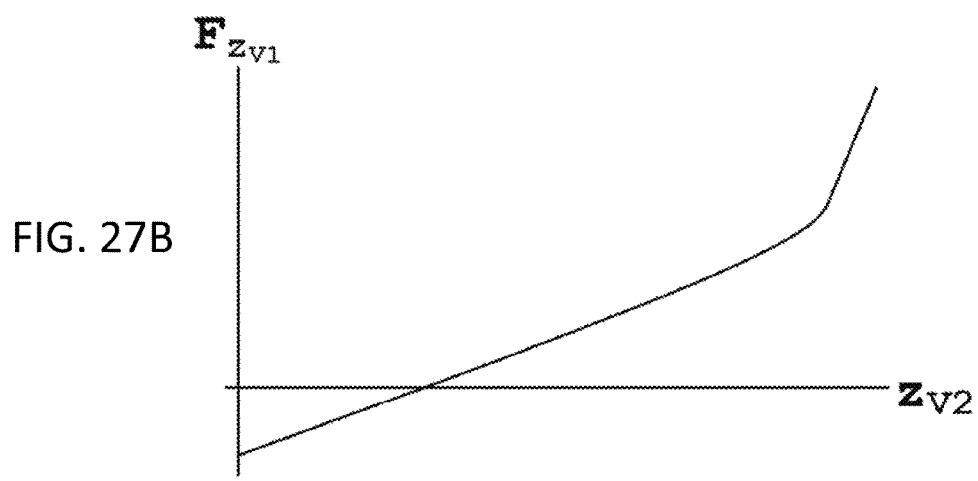
FIG. 27B shows the function $F_{Z_{V1}}(z_{V2})$ which is used in the example in FIG. 26 and which describes the dependence of $z_{V1}$ on $z_{V2}$.
Figure 27C:
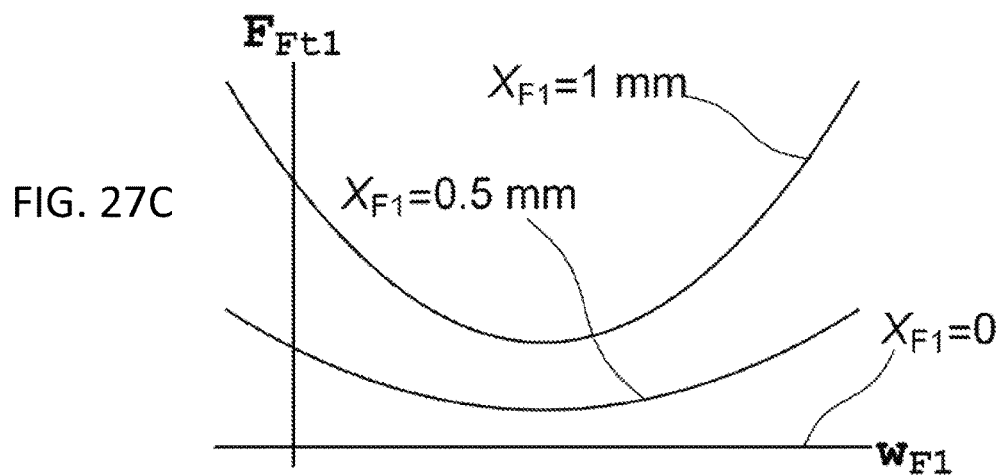
FIG. 27C shows the modifications along the 3 progressions from the example in FIG. 26.
Figure 28:
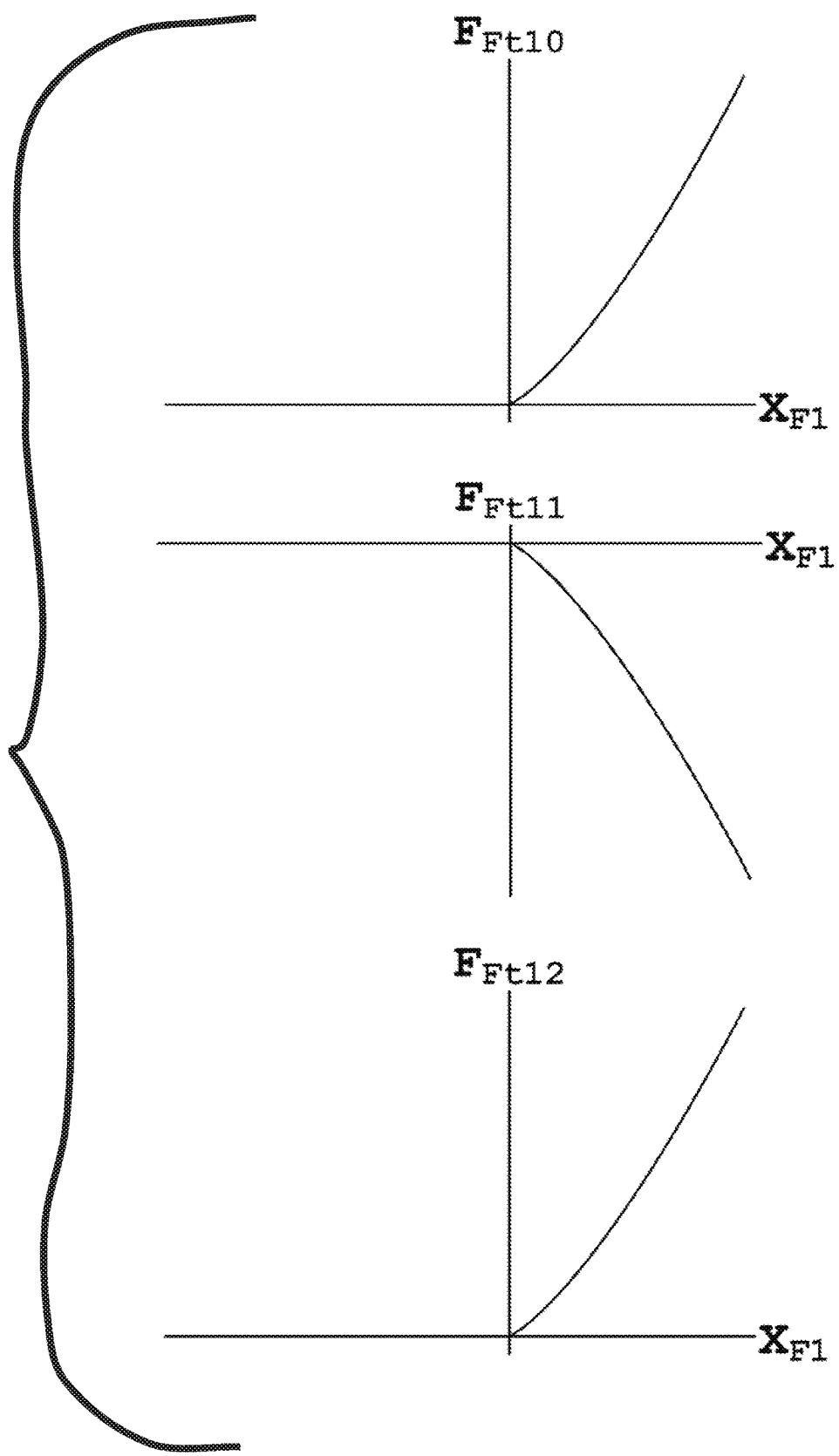
FIG. 28 shows the functions $F_{Ft10}(X_{F1})$, $F_{Ft11}(X_{F1})$ and $F_{Ft12}(X_{F1})$ used in the example in FIG. 26 which define the modification on the worm in accordance with equation (25)

A specific example is shown in FIG. 26 and will be discussed in the following. The modification is selected so that it approximates the combination of a triangular end relief and an end relief in the tooth trace direction, wherein the end relief is more pronounced at the tip and root of the gear than at the center of the profile the closer one approaches the end face. The transition between the start of the two reliefs is selected as tangential by way of example here, whereby the progression 170 is given by a curve which can be differentiated. The value of the modification along 170 is selected as equal to 0 here. The modification along 170 and 171 can be read off with the aid of equation (95) from FIG. 27C in dependence on the rolling angle of the gear. Since the distances between 170 and 172 are smaller in the region of the end relief in the tooth trace direction than the spacing between 170 and 172 in the region of the triangular end relief, the pitch of the modification in the region of the end relief is larger in the tooth trace direction than in the region of the triangular end relief. The ratio of these two pitches is decisively influenced by the direction of the displacement of the progressions (175 and 176). This direction can be adapted by the use of conical worms and by selection of a suitable geometry of the worm. The ratio between the pitches can thus also be set as desired.

Superposition with Other Modifications

Modifications which are known from the prior art can be additively superposed without interference on the modifications which can be produced using the method described here. They are pure profile modifications, on the one hand. Such modifications $f_{PFt}$, which can be separately specified for the left and right flanks, only depend on the rolling distance and not on the z position for cylindrical gearings. They can be mathematically described by the following equation:

$$f_{PFt}=f_{PFt}(w_F) \quad (97)$$

Pure profile modifications can be implemented by a tool modified in the profile line direction. Such modifications in the profile line direction can be additively superposed without interference with the modifications from equation (25). This modification is placed in the dresser as a rule on generating grinding using dressable worms. The dressing process can then be carried out unchanged and the profile modifications form as desired on the worm and later, during grinding, on the workpiece. For conical workpieces, profile modifications depend on the z-position z. In a wz-diagram, points having the same value of modification will lie on a straight line having a slope $m_F$. This slope can be calculated from the mapping of points on the worm to points on the workpiece described herein, both for the case that a cylindrical worm is used and for the case that a conical worm is used. For conical gearings $f_{PFt}$ can be written as $$f_{PFt}=f_{PFt}(w_F+m_F z_F) \quad (98)$$

A further method known from the prior art DE10208531 of producing modifications on gear teeth comprises correcting the kinematics during the grinding process. Such modifications can be implemented, for example, by changing the axial spacing and/or by correcting the angle of rotation and/or by correcting the feeds. Such corrections always have an effect along the contact path and have the same value along it. The direction of the contact path given by $\rho_{KF}$ can, however, not be influenced in this method since it only depends on the base helical angle of the workpiece. This modification $f_{KFt}$ can be mathematically described as follows:

$$f_{KFt}(w_F,z_F)=F_{KFt}(w_F \sin \rho_{KF}+z_F \cos \rho_{KF}) \quad (99)$$

In this respect, the functions $F_{KFt}$ can be any desired continuous functions. The required corrections of the grinding kinematics can be calculated from the functions $F_{KFt}$ for the left and right flanks. Naturally twisted crownings or also distorted end reliefs can, for example, be manufactured using this method.

Since no correction of the grinding kinematics is necessary, apart from diagonal shifting, in the present disclosure underlying this application, a correction of the grinding kinematics and thus a modification in accordance with equation (99) can be additively superposed without interference.

In summary, the modifications $f_{GFt}$ which can be produced can be described as follows:

$$f_{GFt}(w_F,z_F)=F_{FtC}(X_F)+F_{FtL}(X_F)\cdot w_F+F_{FtQ}(X_F)\cdot w_F^2+\\ f_{PFt}(w_F+m_F z_F)+F_{KFt}(w_F \sin \rho_{KF}+z_F \cos \rho_{KF}) \quad (100)$$

where $X_F = w_F \sin \rho_F \, z_F \cos \rho_F$ and where $F_{FtC}$, $F_{FtL}$, $F_{FtQ}$, $f_{PFt}$ and $F_{KFt}$ are continuous functions freely specifiable for both flanks and the angles $\rho_F$ define directions freely definable for both flanks. The special cases are also in particular possible in which at least one of the functions $F_{FtC}$, $F_{FtL}$, $f_{PFt}$ and $F_{KFt}$ is constant, is in particular 0. In the special case of cylindrical workpieces, $m_F = 0$.

If a modification $f_F$ is given, it can generally be resolved approximately, in individual cases also exactly, into the three terms from equation (100), for example, with the aid of curve fitting. For this purpose, the functions $F_{FtC}$, $F_{FtL}$, $F_{FtQ}$, $f_{PFT}$ and $F_{KFt}$ and the directions $\rho_F$ are determined such that the deviations between $f_{GFT}$ and $f_F$ are optimum, in particular minimal. This deviation can, for example, be calculated at discrete points $(w_{Fi}, z_{Fi})$ or continuously over the whole w-z diagram. The continuous calculation of the deviation can, for example, be carried out with the help of an integral of a distance function over all values of w and z. It is also possible to calculate the deviations weighted in dependence on the position of the points in a w-z diagram. This is in particular of advantage when the tolerance to be observed is not the same everywhere. To take these specifications into account, it is also possible as an extension not to select the distance function used for the curve fitting as the same for all values of $w_F$ and $z_F$. A typical variant of the curve fitting is the method of least squares which uses the 2-norm as the distance function.

The desired modification can be given, for example, by a continuous function $f_F$, by a scatter plot $(w_{Fj}, z_{Fj}, f_{Fj})$ or by a combination of the two. The functions $F_{FtC}$, $F_{FtL}$, $F_{FtQ}$, $f_{PFt}$ and $F_{KFt}$ can be calculated as continuous functions with the aid of curve fitting. It is alternatively also possible to calculate functional values only at discrete points $(w_{Fk}, z_{Fk})$. Continuous functions can be calculated from these discrete points by interpolation.

Technological aspects can optionally also additionally be taken into account in the curve fitting. For example, it may be of advantage to restrict the diagonal ratios and thus the directions $\rho_F$ for technological reasons. The distance function used in the curve fitting and to be minimized can generally also depend on technological parameters in addition to the deviation between $f_{GFT}$ and $f_F$:

If the method is used with a non-constant diagonal ratio, equation (100) has to be modified such that $F_{FtC}$, $F_{FtL}$, $F_{FtQ}$ has to be replaced with a modification in accordance with equation (95). If a given modification should be approximated by such a composed modification or if it should be exactly resolved by curve fitting, the functions $F_{Ft1C}$, $F_{Ft1L}$, $F_{Ft1Q}$, $f_{PFt}$ and $F_{KFt}$ $F_{Zv1}$ and the macrogeometry of the worm, in particular the conical angle and the profile angle, can be determined such that the spacing from the desired modification becomes minimal. If the option of grinding with a conical worm is considered, the geometry of the worm, in particular the conical angle and the profile angle of the generating rack, as well as the axial cross angle, can also additionally be optimized in the curve fitting. This is in particular helpful when grinding should take place on two flanks. In this case, the function $F_{Zv1}$ is the same for the left and right flanks. The functions $F_{Ft1C}$, $F_{Ft1L}$, $f_{PFt}$ and $F_{KFt}$ $F_{Ft1Q}$ are generally different for the left and right flanks, both with grinding on one flank and with grinding on two flanks.

Splitting Up of the Tool

The machining of the gear teeth frequently takes place in rough machining steps and finishing or fine machining steps. These different machining steps can be carried out both with the same regions on the tool and with different regions or with different tools. The rough machining steps can be carried out in total or in part using the method described here. It is, however, also possible to carry out other methods for the rough machining steps, in particular axial grinding with a diagonal ratio of zero or with a very small technologically induced diagonal ratio. Such a rough machining allows the rough machining region or regions on the worm to be utilized better, but does not produce the desired modification on the gear teeth. If the method described here is already used during rough machining, the stock at the start of the finish or fine machining is distributed more evenly and the fine machining region is loaded more evenly. It is also possible to use the method described here in rough machining, but to select the modification to be smaller in amount in comparison with finishing or fine machining in order not to overload the worm at the regions of the rough machining region which have to remove a lot of material. If a plurality of rough machining steps are carried out, the amount of the modification can be increased from step to step. It is also possible only to approximate the modification produced on the gear teeth during rough machining, in particular to approximate the direction given by $\rho_p$, in order thereby to extend or shorten the working region in order thus to divide the worm in an optimized manner from technological aspects. Rough finishing or fine machining regions can be positioned as desired over the worm width both with cylindrical worms and with conical worms.

Transferability to Other Production Methods

The method underlying the present disclosure has previously been described for the example of generating grinding using dressable tools and dressing by means of a profile roller dresser. However, non-dressable tools can equally be used as long as they have a modification in accordance with equation (25). Depending on the manufacturing method with which these non-dressable tools are produced, it is possible to select the direction of constant modification given by $\rho_F$ freely or at least freely within certain limits, so that in turn the diagonal ratio during generating grinding and thus also the working region can be influenced. This free selection of $\rho_F$ is also possible with a contour dressing of the tool.

The method can also be used in other production methods which use a toothed tool and the kinematics of a continuous generating gear train and allow a feed of the tool. These further production methods are, for example, hobbing, skiving hobbing, shaving and honing. The tools likewise have to have a modification in accordance with equation (25). A free selection of $\rho_p$ on the tool is also possible here depending on the production method of the tool.

Application Examples

Some simple application examples will be described in the following for which in part the advantage of the present disclosure described here with respect to the prior art will be illustrated and which at the same time are intended to illustrate the method a little.

A particular subclass of modifications which can be produced using the method described here and which is already of great relevance today is represented by modifications which are given by a second degree polynomial in w and z. Such modifications $f_{p^2}$ can generally be described by $$f_{p^2}(w_F, z_F) = A_{w0z0} + A_{w1z0} \cdot w_F + A_{w0z1} \cdot z_F + A_{w1z1} \cdot w_F \cdot z_F + A_{w2z0} \cdot w_F^2 + A_{w0z2} \cdot z_F^2 \quad (101)$$

where the coefficients A are real numbers freely selectable within certain limits. If $f_{p^2}$ is resolved in accordance with equation (100) in $F_{FtC}$, $F_{FtL}$ and $F_{KFt}$ and if the approach $$F_{FtC}(X_F) = K_{F02} \cdot X_F^2 + K_{F01} \cdot X_F + K_{F00} F_{FtL}(X_F) = K_{F11} \cdot X_F + K_{F10} F_{KFt}(X_{KF}) = K_{KF2} \cdot X_{KF}^2 + K_{KF1} \cdot X_{KF} \quad (102)$$

with $X_{KF}=w_F \sin \rho_{KF}+z_F \cos \rho_{KF}$ is selected, a coefficient comparison produces 6 equations from which the coefficients K can be determined which were introduced in the approach.

The equation system can always be solved, independently of $\rho_F$, and thus also independently of the selected diagonal ratio. It can thus be selected freely within certain limits on the production of a modification $f_{\rho^2}$.

Since 7 coefficients were introduced overall, the equation system is underdetermined and the solution is not unambiguous. This freedom can be used, for example, to select the coefficients such that the worm can be dressed as well as possible; for example $K_{F10}$ can thus be freely specified for the left and right flanks respectively. This is in particular of interest when the dressing is to take place on two flanks. In illustrative terms, $K_{F10}$ substantially describes how far the dresser has to be pivoted about the C5 axis at a position $X_{F1}$ if a movement apparatus as in FIG. 22 is used for the dressing. $K_{l10}$ and $K_{r10}$ can now be selected such that the same pivot angle of the C5 axis is to be set for two positions $X_{l1}$ and $X_{r1}$ on the left and right flanks of the worm which are dressed at the same time. Whether the pivot angle of the C5 axis is the same over the whole region of the worm to be dressed depends on the coefficients $K_{F11}$ and on the macrogeometries of the tool and the workpiece, in particular on whether they are symmetrical or asymmetrical and cylindrical or conical. It is, however, also possible within certain limits to dress a worm on two flanks if different C5 angles are necessary. All the degrees of freedom during dressing can be used for this purpose such as are described in the first part of this application. For this purpose, for example, two of the 4 points respectively to be reached are selected on the left and right flanks. A method is thus available to produce a very large range of the modifications defined by equation ((101) and to use single-flank or two-flank dressing.

Such two-flank dressing can still be optimized in that the diagonal ratio is determined such that the required topological modification can be produced as simply as possible on the worm. This means for the example of second degree polynomials observed here that the diagonal ratio is adapted such that the C5 angles required for dressing the left and right flanks respectively vary to the same degree or at least to a similar degree over the width of the worm. For this purpose, the diagonal ratio is to be selected such that $K_{l11}$ and $K_{r11}$ adopt corresponding values. The flexibility of the free selection of the diagonal ratio is admittedly thereby lost, but a still larger spectrum of modifications on the workpiece can be produced using two-flank dressing.

The most relevant modifications today, which can be described by equation ((101) are crownings and additive superpositions of a plurality of crownings. A crowning $f_B$ can generally be described as $$f_B(w_F, z_F) = K_{B2} \cdot (w_F \sin \rho_{BF} + z_F \cos \rho_{BF})^2 + K_{B1} \cdot (w_F \sin \rho_{BF} + z_F \cos \rho_{BF}) + K_{B0} \quad (103)$$

For $\rho_{BF}=0$ it is a tooth trace crowning; for $$\rho_{BF} = \pm \frac{\pi}{2}$$

a profile crowning. In the other cases, it is a question of directed crownings. Since these produce a twisting, they are frequently called crownings having direct twisting. Crownings are often also defined as circular crownings, but they can also be approximated in a very good approximation by the quadratic crownings described here.

Methods, apart from contour dressing, to influence profile crownings via the dressing and/or grinding kinematics have not previously been known. Methods to produce tooth trace crownings free of twist or directly twisted are admittedly known from the initially quoted documents. However, all these methods cause unwanted profile crownings which do not arise using the method presented here. The method presented here goes even further and allows a direct production of a profile crowning, which was previously only possible over the geometry of the dresser. High procurement costs for new dressers when only the profile crowning has to be changed are thereby not incurred. This is in particular of special relevance in contract production and small batch production. It is furthermore also possible to use dressers with incorrectly produced profile crowning and to correct the latter. Ground gears can thus be measured and the produced profile crowning can be determined and corrected accordingly. In addition to the method presented in the first part of this application, a further method is thus available which allows the profile crowing during generating grinding to be influenced. Both of these methods have advantages and disadvantages with respect to the other which will be briefly listed here. The method presented in the first part allows the profile crowning of the worm to be influenced equally over its whole length. The grinding can thereby take place in an axial grinding method using such a worm as long as not topological modifications are required. This axial grinding method generally produces a higher number of workpieces which can be ground per dressing cycle. It is, however, a requirement for the application that the macrogeometry of the worm allows a sufficiently large influencing of the profile crowning, which tends to require the use of small, multi-thread worms. The method presented in the second part here, allows the use of worms having effectively any desired macrogeometry; however, it requires the use of diagonal generating grinding. If the workpiece is anyway ground in diagonal generating grinding in order, for example, to produce topological modifications or because a diagonal generating grinding is technologically required due to the width of the gearing, this method does not bring about any disadvantages.

The diagonal ratio and thus the shift range and the size of the region utilized on the worm can be selected freely within certain limits to produce a crowning or an additive superposition of a plurality of crownings. The number of the regions on a worm can thus, for example, be optimized or can be optimally matched to the worm length while taking account of technological aspects.

Figure 29:
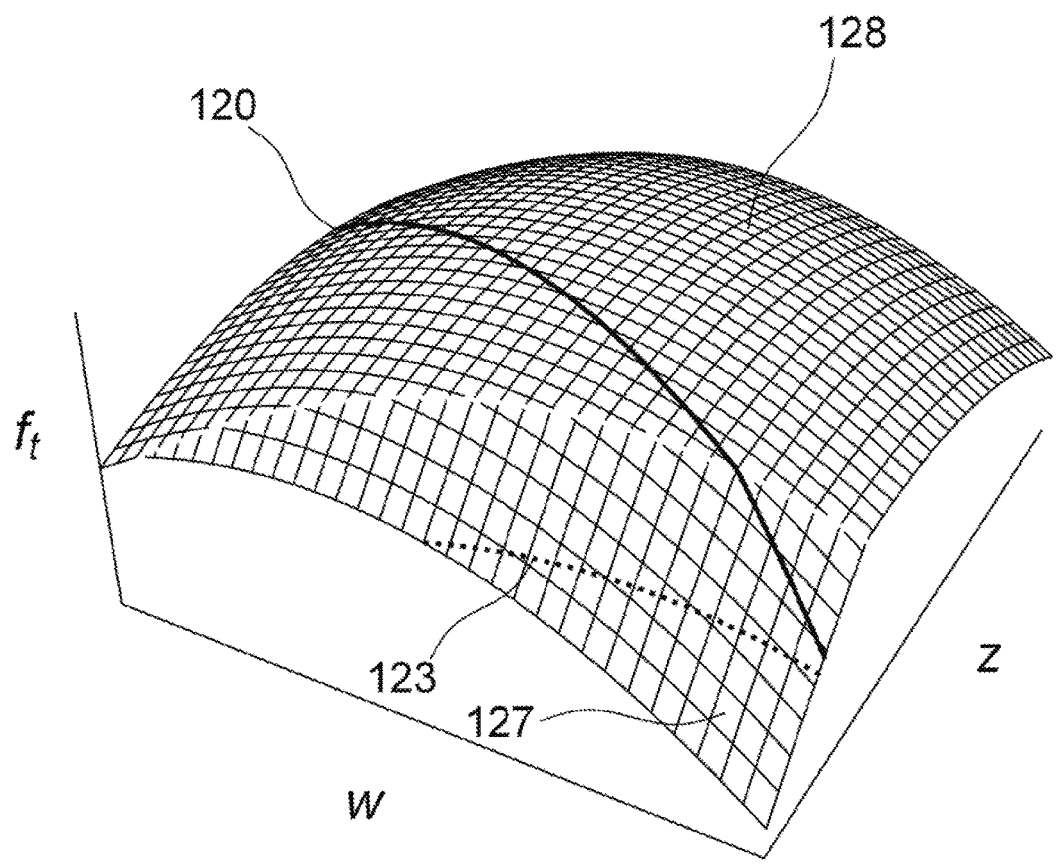
FIG. 29 shows in a w-z diagram the additive superposition of a profile crowning and of a tooth trace crowning as well as of a linear triangular end relief without a transition region such as can be produced using the method described here. Line 120 marks a contact path. Line 123 marks a straight line on the workpiece which is mapped onto a straight line on the worm. Only the two crownings are superimposed in the region 128; in the region 127 additionally the triangular end relief.
Figure 30:
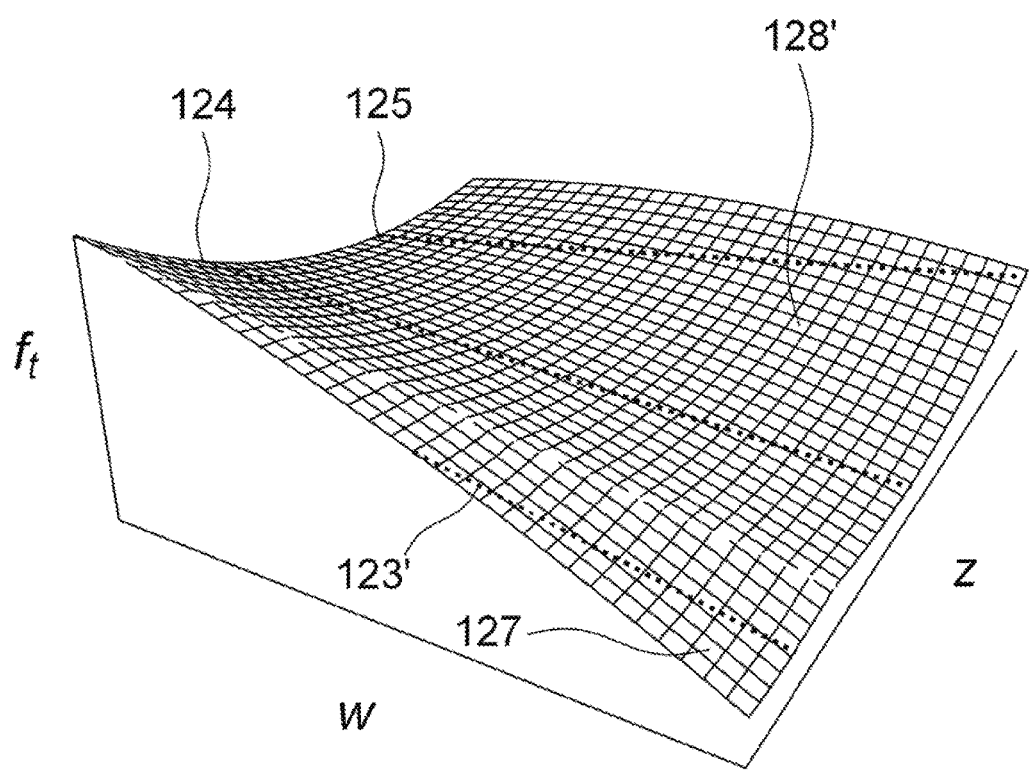
FIG. 30 shows in a w-z diagram the portion of the modification of FIG. 29 which is transferred to the workpiece via the modification on the worm by the diagonal grinding. Region 128' marks the region which contributes to the production of the crownings; 127 shows the region which additionally contributes to the production of the triangular end relief; 123', 124 and 125 mark straight lines in w and z which are mapped on straight lines in w and z on the worm. The modifications along the respective straight lines are linear in w.
Figure 31:
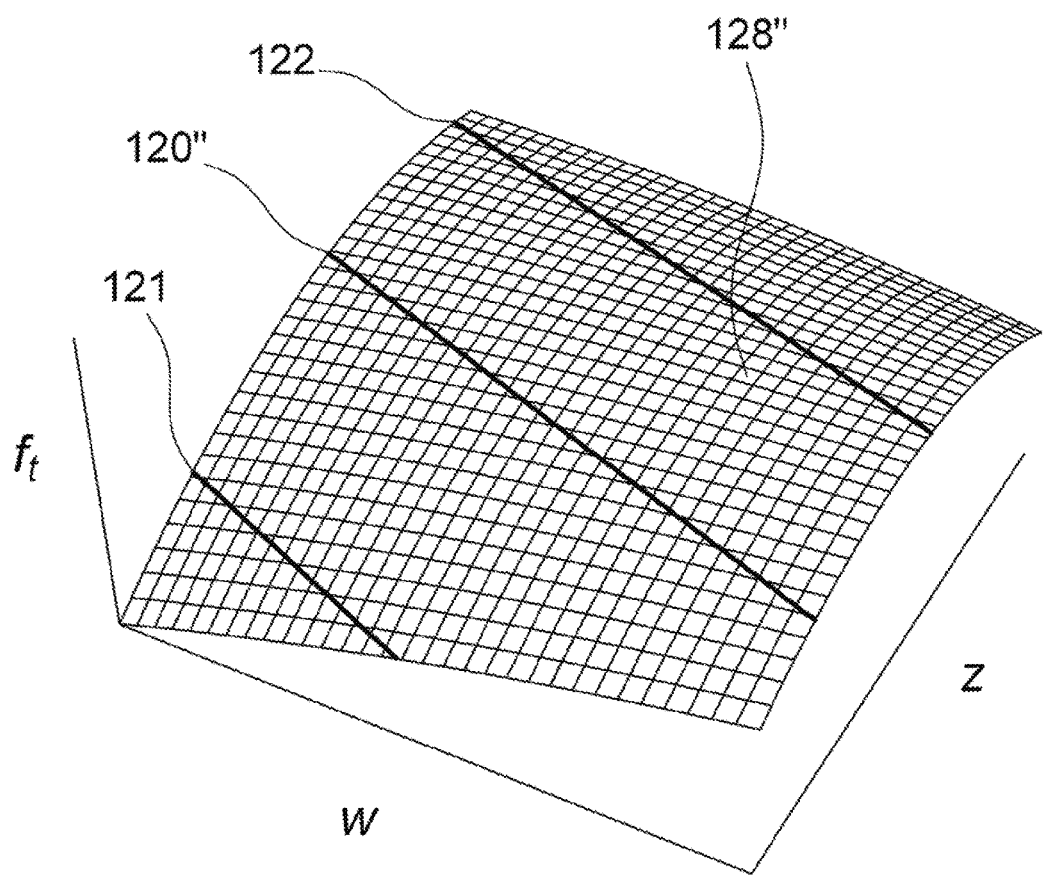
FIG. 31 shows in a w-z diagram the portion ($F_{KFt}$) of the modification of FIG. 29 which is produced via the grinding kinematics. The region 128", which is the only region, only contributes to the production of the crownings. The lines 120", 121 and 122 mark the contact path for different feed positions. The modification is constant in each case along these lines.

A further effect which results from the free selection of the diagonal ratio is the possibility of superposition with modifications which require a fixedly specified diagonal ratio. Such an example is shown in FIG. 29. It is an additive superposition of a triangular end relief, of a profile crowning and of a twist-free tooth trace crowning, wherein the profile crowning is produced using the method described here and not via a correspondingly configured dresser. To produce the triangular end relief, the diagonal ratio has to be selected such that the relief drops in the correct direction. This direction is defined by the line 123 which is a straight line in w and z. The portion of the modification which emanates purely from the triangular end relief is constant along this line. This applies equally to all lines in parallel with line 123 which lie in the region 127, wherein the portion of the modification from the triangular end relief has a different value along each of these lines. To be able to grind the total modification using the method described here, it can be resolved into a portion ($F_{KFt}$) which comes from grinding kinematics and which is shown in FIG. 31 and a portion ($F_{FtC}+F_{FtL}$) which comes from the modification of the worm via diagonal shifting and which is shown in FIG. 30, as described in equation (102).

The way of producing a modification in accordance with equation ((101) shown by way of example here can also be transferred to higher degree polynomials in w and z. For this purpose, higher orders in $X_F$ and $X_{KF}$ can be added in the approach from equation (102) and the function $F_{FtQ}$ can furthermore also be included analogously. Third degree polynomials can be produced in this way, for example. They are likewise of particular interest since circular crownings can be very easily approximated with them which comprise two tangentially adjoining arcs of a circle having different radii. A method is thus available for the first time with which it is possible to produce such crownings in a specially directed manner or with a specific twist or free of twist with a diagonal ratio which is freely selectable within certain limits using the production method looked at here.

Figure 32:
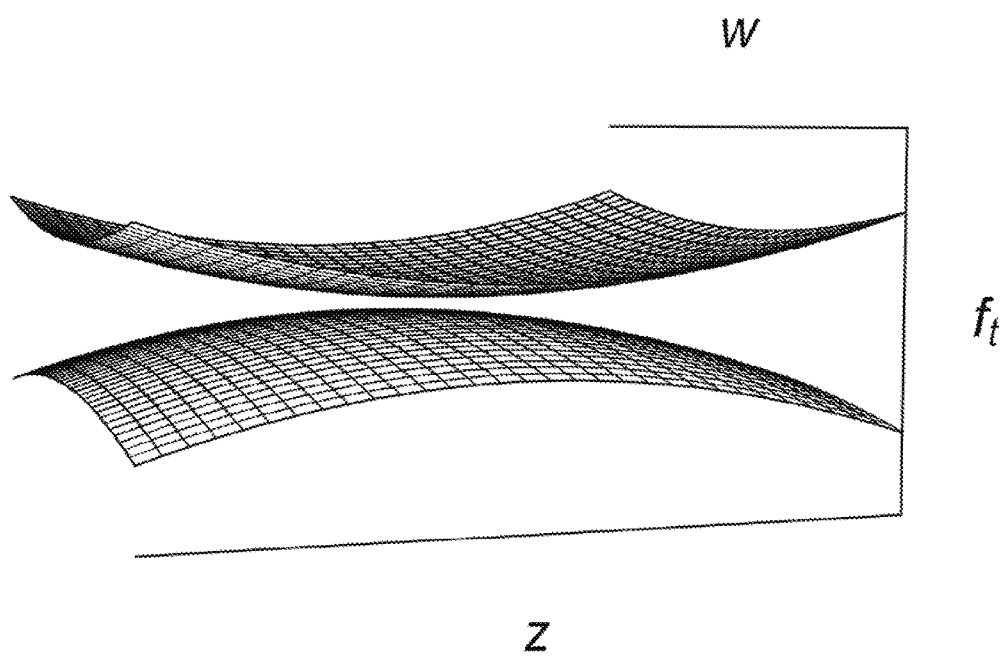
FIG. 32 shows in a w-z diagram the upper and lower enveloping surface of the waviness of FIG. 33.

An further example is waviness having a varied amplitude over the tooth flank. A method is known from DE102012015846 with which waviness having a defined direction ($\rho_{F2}$), phase length ($\delta$), wavelength ($\lambda$) and amplitude can be produced in generating grinding. In this respect, the amplitude of the waviness is constant along the first direction $G_{C2}$, but can be varied along the second direction, perpendicular to the first direction. It is now possible using the method presented here to vary the amplitude over the whole flank. FIG. 32 shows an upper surface and a lower surface which jacket the waviness. The upper surface defines the amplitude function of the waviness in dependence on w and z. An amplitude function was selected here by way of example which has a smaller value in the center of the flank in comparison with at the margin of the flank and is given as the sum of two second degree polynomials in w and Z. Amplitude functions are equally possible which produce smaller amplitudes at the margin of the flank. The waviness of non-constant amplitude results by multiplying the amplitude function by the waviness $$\left(\sin\left(\frac{X_{F2}}{\lambda}+\delta\right)\right).$$

Figure 33:
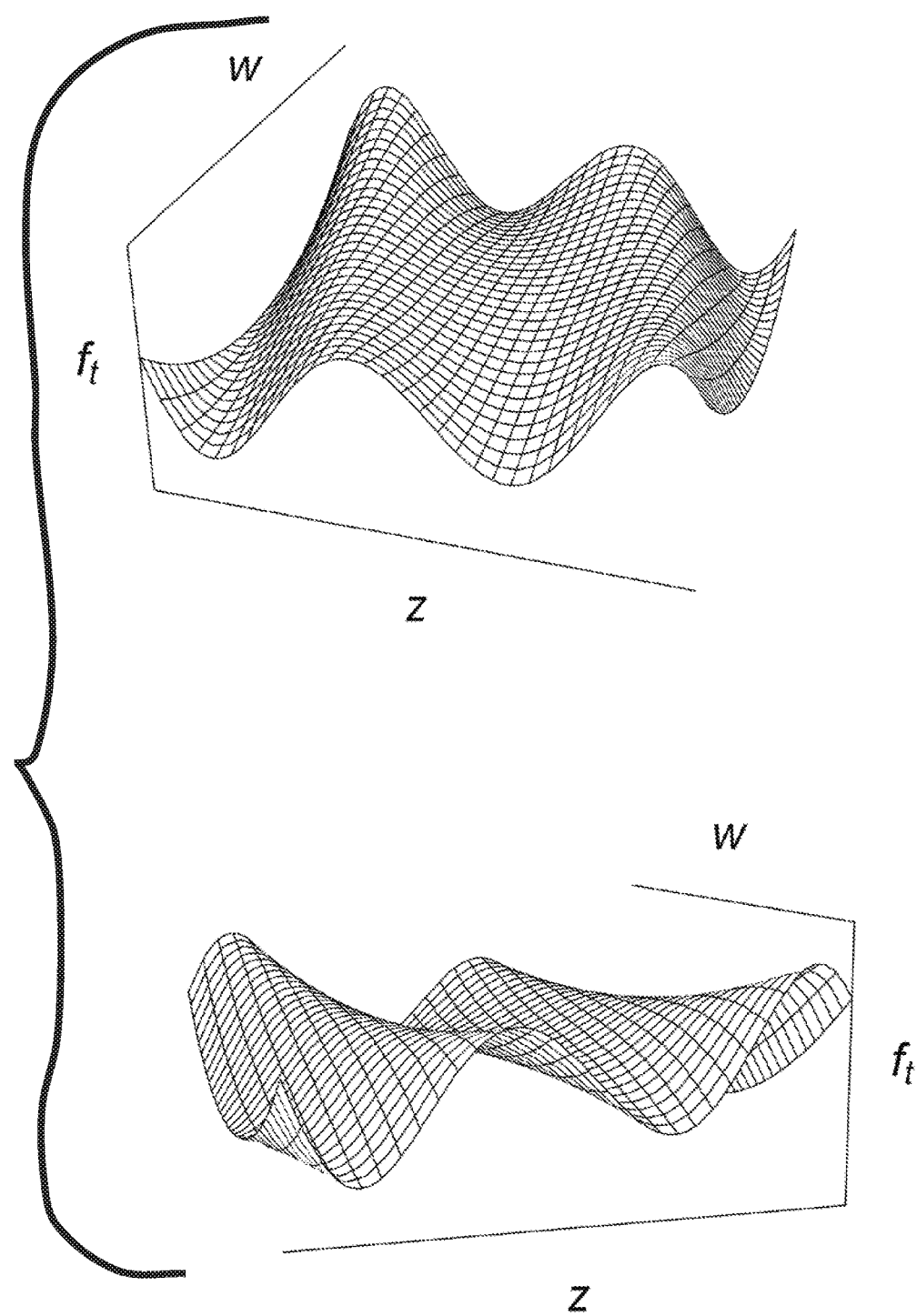
FIG. 33 shows in two w-z diagrams from different directions of view a waviness whose amplitude increases toward the margin of the flank.

The modification resulting from this thereby has a shape in accordance with equation (25) and is shown in FIG. 33. Such waviness can, as also described in DE102012015846, be used for optimizing the excitation behavior of transmissions, but due to the different amplitude over the tooth flank, additionally allow an optimization for different load levels.

If the flanks of the worm threads are dressed in a plurality of strokes, it is thus possible to dress different regions of the flanks in each stroke, e.g. an upper part of the profile in the first stroke and a lower part in the second stroke; and thereby to apply different modifications in the different regions. It thus becomes possible, for example, only to apply waviness to a workpiece in an upper region of the profile or to transition between the region modified by waviness and the region not modified by waviness diagonally over the flank v.

List of Points Worthy of Protection

Important aspects of the present disclosure will be presented in the following which are the subject matter of the present application both per se and in combination with one another and in combination with the aspects presented in the previous description. In this respect, in particular those aspects which are shown with respect to the dressing of the tools can be used for providing the modifications on the tool which is used in the aspects for the diagonal generating method.

A. Dressing

A.I. Specification of Rolling Angle

1. A method of dressing a tool, which can be used for the gear tooth machining of a workpiece, on a dresser, wherein the dressing takes place with line contact between the dresser and the tool, wherein a specific modification of the surface geometry of the tool is produced by the suitable choice of the position of the dresser to the tool when dressing, characterized in that the specific modification of the surface geometry of the tool is specifiable at at least three rolling angles, and/or wherein a crowning of the specific modification of the surface geometry of the tool is specifiable; and/or in that the specific modification of the surface geometry of the tool is specifiable at at least two rolling angles and, in addition, an association of a specific radius of the dresser with a specific radius of the tool takes place, and/or wherein a pitch of the specific modification of the surface geometry of the tool is specifiable and, in addition, an association of a specific radius of the dresser with a specific radius of the tool takes place; and/or in that an association of two specific radii of the dresser with two specific radii of the tool takes place; and/or in that the angle of rotation of the tool and the tool width position are varied during dressing to guide the dresser along the tool and at least two further degrees of freedom of the relative position between the dresser and the tool are set independently of one another for influencing the gear tooth geometry produced by the dressing and/or for the association of a specific radius of the dresser with a specific radius of the tool.

2. A method in accordance with aspect 1, wherein the desired modification of the tool is specified at four rolling angles; and/or wherein, in addition to the specification of the desired modification of the tool at three rolling angles, an association of a specific radius of the dresser with a specific radius of the tool takes place; and/or wherein, in addition to the association of two specific radii of the dresser with two specific radii of the tool, a specification of the specific modification of the surface geometry of the tool at at least two rolling angles and/or a specification of a pitch of the specific modification of the surface geometry of the tool takes/take place.

3. A method in accordance with aspect 1 or aspect 2, wherein the specification of the specific modification of the surface geometry of the tool takes place by specification of a desired modification of the surface geometry of a workpiece to be machined using the tool, with the modification of the surface geometry of the tool required for this purpose optionally being determined from the desired modification of the surface geometry of the workpiece to be machined using the tool.

4. A method in accordance with one of the aspects 1 to 3, wherein the specific modification of the surface geometry of the tool or the desired modification of the surface geometry of the workpiece is a simple profile modification.

5. A method for the modified dressing of a tool which can be used for the gear manufacturing machining of a workpiece on a dressing machine, having the steps:

specifying a desired profile modification of the tool;

setting the axes of movement of the dressing machine for influencing the relative position between the dresser and the tool during the dressing in dependence on the desired profile modification, characterized in that a modified dresser is used and the produced profile modification of the tool results from the profile modification of the dresser and from the set axes of movement of the dressing machine.

6. A method in accordance with aspect 5, wherein curve fitting is used to determine a relative position between the dresser and the tool during dressing by which the desired profile modification can be at least approximately produced; and/or wherein the portion of the profile modification of the tool produced by the setting of the axes of movement of the dressing machine is specified or determined at at least one rolling angle, and optionally at two or three rolling angles; and/or wherein a desired position of the profile modification of the dresser on the tool is specified or determined; and/or wherein a desired stretching or compression of the profile modification of the dresser on the tool is specified or determined; and/or wherein a suitable profile angle of the tool is selected.

7. A method in accordance with one of the aspects 1 to 3, wherein the specific modification of the surface geometry of the tool or the desired modification of the surface geometry of the workpiece is specifiable at at least one rolling angle and optionally at two or three rolling angles as a function of the tool width position; and/or wherein the setting of the axes of movement of the dressing machine takes place in dependence on the tool width position to produce the specific modification; and/or wherein the association of a specific radius of the dresser with a specific radius of the tool is specifiable as a function of the tool width position; and/or wherein the setting of the axes of movement of the dressing machine takes place in dependence on the tool width position to produce the desired modification; wherein at least one of the rolling angles, and further optionally two or three rolling angles, at which the modification is specifiable is selected differently in the tool width direction and is further optionally specifiable as a function of the tool width position.

8. A method in accordance with one of the preceding aspects, wherein the dressing takes place on one flank and the at least three rolling angles are arranged on one flank; and/or wherein the dressing takes place on two flanks and the at least three rolling angles are distributed over the two flanks; and/or wherein the dressing takes place on two flanks and a tool having a conical base shape is used, with the conical angle optionally being used for setting the modification.

9. A method in accordance with one of the preceding aspects, wherein a modification produced by a modification of the dresser is superposed with a specific modification of the surface geometry of the tool produced by the setting of the position of the dresser to the tool during dressing, wherein the position of the modification on the tooth flank produced by a modification of the dresser is optionally specifiable, is in particular specifiable as a function of the position in the tool width direction, and/or by an association of a specific radius of the dresser with a specific radius of the tool; and/or wherein a desired stretching or compression of the modification of the dresser on the tool is optionally specifiable which is optionally specifiable as a function of the position in the tool width direction, in particular by an association of two specific radii of the dresser with two specific radii of the tool; and/or wherein a suitable profile angle of the tool is selected; and/or wherein the modified dresser optionally has an unchanging modification over its complete active profile, for example an unchanging crowning; or wherein the modified dresser optionally has a modification in at least one first part region of its profile which differs from the profile shape in at least one second part region, with the modification in the first part region advantageously having a different profile angle and/or a different crowning, with the modification in particular being able to have an edge; and/or wherein the dresser is optionally in contact with the tool surface simultaneously in the first and second part regions during dressing; and/or wherein a combination dresser is used for a simultaneous dressing of the addendum and of the tooth flank, with the height of the addendum optionally being specified and being produced by setting the axes of movement of the dressing machine during dressing, with the height of the addendum optionally being specifiable as a function of the tool width position.

10. A method in accordance with one of the preceding aspects, wherein a setting is selected from a plurality of settings of the axes of movement of the dressing machine which produce the same relative position between the dresser and the tool, which setting better satisfies specified conditions, with that setting optionally being selected which provides the desired relative position with a higher accuracy and/or with smaller positional errors. and/or with that setting being selected which requires smaller travel movements of the machine axes, and/or with that setting being selected which avoids collisions of the dresser, of the tool and/or of machine parts with one another; and/or wherein the gear tooth geometry produced by the tool or the gear tooth geometry produced on the tool by the dressing is measured and the deviations of the axes of movement of the dressing machine from their desired setting occurring during dressing are determined from deviations from a desired geometry.

11. A method in accordance with one of the preceding aspects, wherein at least three degrees of freedom, and optionally four or five degrees of freedom are used during the relative positioning between the dresser and the tool for producing the desired modification, with the degrees of freedom optionally being settable independently of one another for producing the desired modification, and/or with it optionally being a case of at least three, four or all of the following five degrees of freedom: angle of rotation of the tool; axial position of the tool; y position of the dresser; center distance and/or axial cross angle, with the axial position of the tool, i.e. the tool width position, optionally being used to displace the contact line of the dresser, and with two, three or four of the remaining four degrees of freedom being set independently of one another to produce the specified modification along the contact line.

12. A method in accordance with one of the preceding aspects, wherein errors in the surface geometry of a dresser are at least partly corrected by specifying corresponding correction values on the setting of the axes of movement of the dressing machine; and/or wherein a dresser which was configured for a tool having a first macrogeometry and/or a first desired surface geometry is used for dressing a tool having a second macrogeometry and/or having a second desired surface geometry, with the errors resulting by the configuration for the tool having the first macrogeometry and/or the first desired surface geometry being at least partly compensated by a corresponding setting of the axes of movement of the dressing machine when dressing the tool having a second macrogeometry and/or a second desired surface geometry; and/or wherein the setting of the axes of movement of the dressing machine during dressing and/or the macrogeometry of the dresser and/or the modification of the dresser and/or the macrogeometry of the tool is/are determined by means of curve fitting, with the modifications in the generating pattern achievable by the change of the setting of the axes of movement of the dressing machine optionally varying in a direction having an angle $\rho_{FS}$ to the tool width direction at two, three or four rolling angles and being interpolated along their direction and optionally being assumed as a linear, quadratic and/or cubic function, and being compared with a desired modification, with a distance function optionally being used for quantifying the deviation, with the distance function optionally having a weighting dependent on the position in the generating pattern.

13. A method in accordance with one of the preceding aspects, wherein a tool is used in which at least one start is inactive and/or omitted, and/or in which the dresser at least partly engages into the contour of the oppositely disposed flank during the dressing of a first flank; and/or wherein at least one tooth flank is dressed such that it does not come into contact with the workpiece during the machining of the workpiece and is therefore inactive, with at least one start optionally being dressed such that it does not come into contact with the workpiece during the machining of the workpiece and is therefore inactive; wherein at least one inactive and/or omitted start is optionally provided between two active starts; and/or wherein maximally every second tooth optionally comes into engagement with the tool during the machining of the workpiece in generating coupling after one another; and/or wherein at least one first portion of the teeth of the workpiece are optionally machined in dependence on the number of teeth of the workpiece and/or on the number of starts in at least one first pass, whereupon the workpiece is rotated relative to the tool in order to machine at least one second portion of the teeth in at least one second pass.

14. A method in accordance with one of the preceding aspects, wherein the dressing takes place in two or more strokes with line contact in each case; wherein the axes of movement of the dressing machine during dressing are optionally set differently in the respective stroke in addition to the change required for the different positioning between the dresser and the tool in the two or more strokes to influence the pitch and/or crowing of the modification in at least one of the strokes; and/or wherein the specific modification is optionally set in at least one of the strokes such that the surface geometry produced by the at least one stroke adjoins the surface geometry produced by at least one second stroke at a desired angle and in particular tangentially; and/or wherein a desired modification of the tool is optionally specified at at least two rolling angles and optionally at three rolling angles for at least one stroke and optionally for each stroke; and/or wherein an association of a specific radius of the dresser with a specific radius of the tool takes place for at least one stroke and optionally for each stroke.

15. A method in accordance with aspect 14, wherein different regions of the dresser are used for the individual strokes and/or different dressers are used for the individual strokes; and/or wherein one of the strokes is used for producing a modification of the dedendum or of the addendum, for example for producing a relief of the addendum or of the dedendum; and/or wherein the position or the positions at which the modifications produced in the respective strokes adjoin one another is or are varied in dependence on the tool width position.

16. A method of producing a workpiece having a modified gear geometry by a generating method, in particular a diagonal generating method, by means of a modified tool, wherein a specific modification of the surface geometry of the tool is produced by a method in accordance with one of the preceding aspects; and wherein the specific modification of the tool by the generating method, in particular the diagonal generating method, produces a corresponding modification on the surface of the workpiece.

17. An apparatus and/or a software program for calculating the relative position between the dresser and the tool required for producing a desired modification of a tool during dressing in line contact with a specified dresser or of the settings of the axes of movement of a dressing machine required for its provision, in particular for carrying out a method in accordance with one of the preceding aspects, comprising an input function by which the specific modification of the surface geometry of the tool is specifiable; and a calculation function which determines from the specific modification the relative position between the dresser and the tool required for the production of said specific modification during dressing with line contact between the dresser and the tool or which determines the settings of the axes of movement required for providing said specific modification; wherein the input function and the calculation function are configured such that they can be used for carrying out one of the preceding methods; and/or wherein the input function and the calculation function are configured such that the specific modification of the surface geometry of the tool is specifiable at at least three rolling angles and can be produced there by the calculated relative position or setting of the axes of movement of the dressing machine; and/or such that a crowning of the gear is specifiable and can be produced by the calculated relative position or setting of the axes of movement of the dressing machine; and/or wherein the input function and the calculation function are configured such that the specific modification of the surface geometry of the tool is specifiable at at least two rolling angles and can be produced there by the calculated relative position or setting of the axes of movement of the dressing machine and, in addition, an association of a specific radius of the dresser with a specific radius of the tool can be specified or calculated and takes place by the calculated relative position or setting of the axes of movement of the dressing machine; and/or wherein the input function and the calculation function are configured such that a pitch of the gearing is specifiable and can be produced by the calculated relative position or setting of the axes of movement of the dressing machine and, in addition, an association of a specific radius of the dresser with a specific radius of the tool can be specified or calculated and takes place by the calculated relative position or setting of the axes of movement of the dressing machine; and/or wherein the input function and the calculation function are configured such that an association of two specific radii of the dresser with two specific radii of the tool takes place; and/or wherein the input function and the calculation function are configured such that data with respect to a modified dresser can be input and the determination unit determines the setting of the axes of movement of the dressing machine such that a desired profile modification of the tool is produced at least approximately from the profile modification of the dresser and from the set axes of movement of the dressing machine.

18. A dressing machine or a gear manufacturing machine comprising a dressing machine, wherein the dressing machine has a tool holder for holding the tool to be dressed and a dresser holder for holding the dresser used for this purpose, with the dresser holder having an axis of rotation, and with the dressing machine having further axes of movement by which further degrees of freedom can be set independently of one another during the dressing of the tool in line contact with the dresser, having a control, characterized in that the control controls the axes of movement such that the angle of rotation of the tool and the tool width position are varied during the dressing to guide the dresser along the tool, wherein at least two further degrees of freedom of the relative position between the dresser and the tool can be set and/or controlled and/or specified independently of one another for influencing the gear tooth geometry produced by the dressing; and/or in that the control has an input function by which the specific modification of the surface geometry of the tool is specifiable, wherein the control has a calculation function which determines from the specific modification the settings of the axes of movement required for the production of said specific modification during dressing with line contact between the dresser and the tool; and wherein the control has a control function which carries out the corresponding setting of the axes of movement during the dressing with line contact between the dresser and the tool; wherein the input function, the calculation function and the control function are configured such that they can be used for carrying out one of the preceding methods; and/or wherein the input function, the calculation function and the control function are configured such that the specific modification of the surface geometry of the tool is specifiable at at least three rolling angles and is produced there by setting the axes of movement of the dressing machine; and/or in that a crowning of the gear is specifiable and is produced by the setting of the axes of movement of the dressing machine; and/or wherein the input function, the calculation function and the control function are configured such that the specific modification of the surface geometry of the tool is specifiable at at least two rolling angles and is produced there by the setting of the axes of movement of the dressing machine and, in addition, an association of a specific radius of the dresser with a specific radius of the tool is specifiable or is calculated and takes place by the setting of the axes of movement of the dressing machine; and/or wherein the input function, the calculation function and the control function are configured such that a pitch of the gearing is specifiable and is produced by the setting of the axes of movement of the dressing machine and, in addition, an association of a specific radius of the dresser with a specific radius of the tool is specifiable or is calculated and takes place by the setting of the axes of movement of the dressing machine; and/or wherein the input function, the calculation function and the control function are configured such that an association of two specific radii of the dresser with two specific radii of the tool takes place; and/or wherein the input function, the calculation function and the control function are configured such that data with respect to a modified dresser can be input and the determination unit determines the setting of the axes of movement of the dressing machine such that a desired profile modification of the tool is produced at least approximately from the profile modification of the dresser and from the set axes of movement of the dressing machine.

A.II. Selection of Dresser and Tool

1. A method of producing a workpiece having a desired gear geometry by means of a suitably dressed tool, comprising the steps:

specifying a desired gear geometry of the workpiece;

selecting a combination from a dresser and a tool such that the desired gear geometry of the workpiece can be produced by the selected at least within a permitted tolerance;

dressing the tool with the dresser in line contact for producing a suitable gear geometry of the tool; and machining the workpiece with the dressed tool for producing the desired gear geometry of the workpiece at least within a permitted tolerance.

2. A method in accordance with aspect 1, wherein the selection takes place from a plurality of dressers and/or from a plurality of tools in dependence on the desired gear geometry of the workpiece; and/or wherein the dressers and/or tools are optionally an at least partly specified or already existing range; and/or wherein the dressers are designed for different tools and/or have different modifications and/or different diameters; and/or wherein the tools differ with respect to their macrogeometry, in particular with respect to the number of starts and/or diameter and/or profile angle; and/or wherein specifications are present with respect to the dressers and/or tools which can be used and are complemented such that the desired gear geometry of the workpiece can be produced by the selected combination at least within a permitted tolerance; and/or wherein the tool is selected with respect to its macrogeometry, in particular with respect to number of starts and/or diameter and/or profile angle.

3. A method of determining the manufacturing capability of a workpiece having a desired gear geometry by means of a specified combination of a dresser and a tool, comprising the steps:

specifying a desired gear geometry of the workpiece;

determining whether the tool can be dressed in line contact using the specified combination of dresser and tool and the workpiece can be machined with the dressed tool such that the desired gear geometry can be produced at least within a permitted tolerance;

outputting information on the manufacturing capability of the workpiece on the basis of the determination, wherein data with respect to a plurality of gear geometries and further optionally all of the gear geometries of the workpiece which can be produced from the specified combination of a dresser and a tool are calculated, in particular minimal and/or maximal values with respect to achievable modifications, and further optionally the desired gear geometry of the workpiece is compared with the data.

4. A method for determining a plurality of dressers and/or a plurality of tools for manufacturing workpieces with desired gear geometries, comprising the steps:

specifying a plurality of desired gear geometries of workpieces and/or of a desired range of gear geometries of workpieces;

determining a plurality of dressers and/or a plurality of tools in dependence on the plurality of desired gear geometries of workpieces and/or the desired range of gear geometries on workpieces in the manner such that as many of the desired gear geometries of workpieces as possible and/or a range of the desired range of gear geometries of workpieces which is as large as possible can be produced at least within a permitted tolerance by a combination of a dresser and a tool from the plurality of dressers and/or from the plurality of tools.

5. A method in accordance with one of the aspects 1 to 3, wherein the desired gear geometry of the workpiece is a modified gear geometry; and/or wherein the tool is dressed in a modified manner; or a method in accordance with aspect 3 or aspect 4, wherein the plurality of desired gear geometries of workpieces and/or the desired range of gear geometries of workpieces comprises at least one modified gear geometry and optionally a plurality of modified gear geometries.

6. A method in accordance with one of the preceding aspects, wherein the profile of the dresser and/or modifications of the tool which can be produced by the dresser by a suitable setting of the axes of movement of the dressing machine during the dressing are taken into account in the selection and/or determination of the dresser or dressers and/or of the tool or tools and/or in the check of the manufacturing capability.

7. A method in accordance with aspect 6, wherein a change of the profile angle and/or of the crowning of the tool which can be produced during dressing by a suitable setting of the axes of movement of the dressing machine is taken into account; and/or wherein it is taken into account that the modification of the tool is specifiable at at least two rolling angles and optionally at three rolling angles and can be produced by a suitable setting of the axes of movement of the dressing machine during dressing; and/or wherein it is taken into account that an association of a specific radius of the dresser with a specific radius of the tool can take place; and/or wherein the desired gear geometry of the workpiece is a simple profile modification; and/or wherein the gear geometry produced on the tool is a simple profile modification; and/or wherein the plurality of desired gear geometries of workpieces and/or of the desired ranges of gear geometries of workpieces are only gear geometries which have not modifications or which have simple profile modifications; and/or wherein only those gear geometries which have and/or produce no modifications and/or have and/or produce simple profile modifications are taken into account in the selection of the dressers and/or tools; and/or wherein errors in the modification produced on the tool during dressing by deviations in the axes of movement of the dressing machine are take into account in the determination and/or selection of the dresser or dressers and/or tools, in particular in a manner such that those dressers and/or tools are determined or selected by which the errors can be reduced.

8. A method in accordance with aspect 6 or aspect 7, wherein specific modifications of the surface geometry of the tool which can be generated by the change in the position of the dresser with respect to the tool during dressing in dependence on the tool width position are taken into account; wherein it is optionally taken into account that the specific modifications of the surface geometry of the tool at a rolling angle are specifiable as a function $C_{OFS}$ of the position in the tool width direction; and/or wherein it is optionally taken into account that at least the pitch and/or crowning of the surface geometry of the tool in a first direction of the tool which has an angle $\rho_{FS}$ to the tool width direction is specifiable as a function of the position in the tool width direction; and/or wherein it is optionally taken into account that the specific modification of the surface geometry of the tool is specifiable at at least two rolling angles and optionally three rolling angles as function of the tool width position; and/or wherein it is optionally taken into account that an association of a specific radius of the dresser with a specific radius of the tool is possible, with it further optionally being taken into account that the association is specifiable as a function of the tool width position; and/or wherein the desired gear geometry of the workpiece is the modification depending on the workpiece width position; and/or wherein the gear geometry produced on the tool is a modification dependent on the tool width position; and/or wherein the plurality of desired gear geometries of workpieces and/or the desired range of gear geometries of workpieces comprises at least one gear geometry and optionally a plurality of gear geometries which depends or depend on the workpiece width position; and/or wherein those gear geometries which can be produced on the tool and which depend on the tool width position are also taken into account in the selection of the dressers and/or tools.

9. A method in accordance with one of the preceding aspects, wherein the limitations resulting by the macrogeometry of the tool and/or of the dresser with respect to the modifications which can be produced during dressing by a specific profile of the dresser and/or by a suitable setting of the axes of movement of the dressing machine are taken into account in the selection and/or determination of the dresser or dressers and/or of the tool or tools, wherein in particular the number of starts and/or the diameter and/or the profile angle of the tool and/or the diameter of the dresser are taken into account, and/or possible collisions of the dresser during single-flank dressing with the counter-flank, and/or an undercutting of the tool teeth, and/or a relative profile stretching and/or profile compression.

10. A method in accordance with one of the preceding aspects, wherein modifications which can be produced by a change of the kinematics of the gear manufacturing machine in the machining of a workpiece using the tool dressed by the dresser are taken into account in the selection and/or determination of the dresser or dressers and/or of the tool or tools; and/or wherein it is taken into account that, with respect to the dressers, also only individual regions can be brought into contact with the workpiece; and/or the dressers can have different regions which come into use at different strokes; and/or in that a plurality of dressers from the plurality of dressers can also dress different regions of the tool in consecutive strokes.

11. An apparatus and/or a software program for selecting a combination of a dresser and a tool suitable for producing a desired gear geometry of a workpiece and/or for determining the manufacturing capability of a workpiece having a desired gear geometry by means of a specified combination of a dresser and a tool; having a database function which comprises respective data on the gear geometries achievable by the combination for a plurality of combinations of dressers and/or tools; and/or having a calculation function which calculates respective data on the gear geometries achievable by the combination for at least one combination and optionally for a plurality of combinations of dressers and/or tools; wherein the data optionally comprise information on the modifications minimally and/or maximally achievable by a combination and/or on the range of modifications achievable by a combination; wherein an input function is furthermore optionally present via which a desired gear geometry of a workpiece can be input and/or a determination function is present which determines at least one combination of a dresser and a tool by which the desired gear geometry of the workpiece can be produced at least within a permitted tolerance and/or which checks whether a workpiece having a desired gear geometry can be produced by means of a specified combination of a dresser and a tool, wherein the determination function optionally makes use of the database function and/or of the calculation function; and/or wherein an input function is further optionally present via which data on a combination of dresser and tool and/or on a plurality of dressers and/or tools can be input; and/or wherein an input function is further optionally present via which specifications on a combination of dresser and tool and/or a plurality of dressers and/or tools can be input, wherein the determination function determines a suitable combination of dresser and tool on the basis of the specifications; and/or wherein the data of the database function and/or of the calculation function further optionally take modifications of the tool into account which can be produced by the dresser by a suitable setting of the axes of movement of the dressing machine during dressing; and/or wherein a determination function is further optionally present which determines the settings of the axes of movement of the dressing machine during dressing required with respect to a specific combination of dresser and tool, which settings result in the production of a gear geometry of the tool by which the desired gear geometry of a workpiece can be produced at least within a permitted tolerance; and/or an output function is present which outputs the required settings of the axes of movement of the dressing machine during dressing; and/or wherein the database function and/or calculation function are further optionally configured such that a method in accordance with one of the preceding aspects can be carried out; and/or are configured such that the elements are included in the data which are taken into account within the framework of one of the methods in accordance with one of the preceding aspects with respect to the selection of the combination.

12. An apparatus and/or a software program for determining a plurality of dressers and/or a plurality of tools for producing workpieces having desired gear geometries, having a database function which comprises respective data on the gear geometries achievable by the combination for a plurality of combinations of dressers and/or tools; and/or having a calculation function which calculates respective data on the gear geometries achievable by the combination for a plurality of combinations of dressers and/or tools; wherein the data optionally comprise information on the modifications minimally and/or maximally achievable by a combination and/or on the range of modifications achievable by a combination; wherein an input function is further optionally present via which a plurality of desired gear geometries of workpieces and/or a desired range of gear geometries of workpieces can be input; and/or a determination function is present which determines a plurality of dressers and/or a plurality of tools such that as many of the desired gear geometries of workpieces as possible and/or a range of the desired range of gear geometries of workpieces which is as large as possible can be produced at least within a permitted tolerance by a combination of a dresser and a tool from the plurality of dressers and/or from the plurality of tools; and/or wherein an input function is further optionally present via which already present dressers and/or tools can be input, with the determination function complementing the present dressers and/or tools; and/or wherein an input function is further optionally present via which a maximum permitted number of dressers and/or tools for the determination function can be specified; and/or wherein the database function and/or calculation function are further optionally configured such that a method in accordance with one of the preceding aspects can be carried out; and/or are configured such that the elements are included in the data which are taken into account within the framework of one of the methods in accordance with one of the preceding aspects with respect to the selection of the combination.

13. And apparatus and/or a software program in accordance with aspect 11 or aspect 12, wherein the apparatus has a display or the software program controls a display such that the at least one suitable combination of a dresser and a took determined by the determination function is displayed; wherein when a plurality of suitable combinations of a dresser and tool were determined, one of the combinations can optionally be selected; and/or wherein the plurality of dressers and/or tools are displayed, with a selection of the dressers and/or tools optionally being possible, with selected dresser and/or tools being able to be supplied to an order function.

14. A dressing machine having a tool holder for holding the tool to be dressed and having a dresser holder for holding the dresser used for this purpose, wherein the dresser holder has an axis of rotation; and wherein the dressing machine has further axes of movement by which further degrees of freedom in the dressing of the tool in line contact with the dresser can be set independently of one another; and having a control which comprises an apparatus and/or a software program in accordance with one of the aspects 11 to 13; wherein the control optionally has an input function by which a desired modification of a workpiece is specifiable; and/or wherein the control optionally determines a combination of dresser and tool by which the desired gear geometry of the workpiece can be produced at least within a permitted tolerance; wherein the dressing machine optionally has a display on which the combination of dresser and tool is displayed; and/or wherein the control further optionally has a calculation function which determines from the desired modification of the workpiece the settings of the axes of movement in the dressing with line contact between the dresser and tool which are necessary for producing said modification of the workpiece; and wherein the control optionally has a control function which carries out the corresponding setting of the axes of movement during the dressing with line contact between the dresser and the tool; wherein the input function, the calculation function and the control function are configured such that they can be used for carrying out one of the preceding methods.

15. A gear manufacturing machine having a dressing machine in accordance with aspect 14 and/or having an apparatus and/or having a software program in accordance with one of the aspects 11 to 13, wherein the gear cutting machine optionally has a workpiece holder and a tool holder provided optionally in addition to the tool holder of the dressing machine, and a gear manufacturing machining control for controlling the workpiece holder and the tool holder for carrying out a gear manufacturing machining, in particular for carrying out a method in accordance with one of the preceding aspects.

A.III. Specific Compression and Stretching

1. A method of manufacturing one or more workpieces having a desired gear geometry by means of a suitably dressed tool, wherein, after the carrying out of one or more machining steps, the tool is respectively dressed by a dresser before further machining steps are carried out at the same workpiece or at further workpieces, characterized in that, on a later dressing procedure, the relative position between the dresser and the tool is changed with respect to a prior dressing procedure in addition to the smaller center distance resulting by the smaller tool diameter by a corresponding additional adjustment of the axes of movement of the dressing machine.

2. A method in accordance with aspect 1, wherein the additional adjustment of the axes of movement of the dressing machine partly compensates modifications of the gear geometry which result by the smaller tool diameter; and/or wherein the additional adjustment of the axes of movement of the dressing machine with respect to a dressing without such an additional adjustment effect a change of the profile crowning resulting during dressing; and/or wherein the additional adjustment is selected such that a deviation of the gear geometry resulting on the workpiece from a desired gear geometry is reduced and/or minimized; and/or wherein the additional adjustment reduces or minimizes a deviation of the gear geometry produced on the tool by the dresser from a desired geometry.

3. A method of manufacturing one or more workpieces having a desired gear geometry by means of a suitably dressed tool, wherein, after the carrying out of one or more machining steps, the tool is respectively dressed before further machining steps are carried out at the same workpiece or at further workpieces, characterized in that, in a later dressing procedure, the profile angle of the tool is changed with respect to an earlier dressing procedure so that the workpiece or workpieces is or are gear manufacturing machined with a different profile angle of the gearing of the tool after the later dressing procedure than after an earlier dressing procedure, wherein the profile angle is respectively selected such that a deviation of the gear geometry resulting on the workpiece is reduced or minimized with respect to a desired gear geometry; and/or wherein a stretching and/or compression of a modification produced on the tool by a modified dresser is reduced or minimized by the change of the profile angle.

4. A method in accordance with aspect 3, wherein an asymmetrical gear is produced; and wherein the profile angle of the tool on the right and left flanks is selected such that a deviation of the gear geometry resulting on the workpiece on the left and right flanks is reduced and/or minimized overall with respect to a desired gear geometry; and/or a stretching and/or compression of a modification on the left and right flanks produced on the tool by a modified dresser is reduced or minimized overall.

5. A method in accordance with one of the preceding aspects, wherein a tool is used having a conical base shape, wherein the conical angle is optionally selected such that the gear geometry resulting on the workpiece has deviations from a desired gear geometry which are as small as possible; and/or wherein a stretching and/or compression of a modification produced on the tool by a modified dresser is reduced or minimized by the change of the profile angle of the tool, in particular in the production of an asymmetrical gear; and/or wherein the conical angle is changed with respect to an earlier dressing procedure in a later dressing procedure.

6. A method in accordance with one of the preceding aspects for producing a plurality of workpieces, wherein the tool is respectively dressed after the production of one or more workpieces before further workpieces are machined.

7. A method of manufacturing a workpiece having a desired gear geometry by means of a tool suitably dressed by a modified dresser, comprising the steps:
specifying a desired gear geometry of the workpiece; and
determining a suitable profile angle of the tool and a suitable relative position between the dresser and the tool during the dressing of the tool for providing the desired gear geometry of the workpiece at least within a permitted tolerance in the machining by the tool.

8. A method in accordance with aspect 7, wherein the profile angle and the relative position between the dresser and the tool are determined during dressing such that a desired compression and/or stretching of the modification of the dresser results on the tool during dressing, with the profile angle in particular being determined such that a compression and/or stretching of the modification of the dresser on the tool resulting by the relative position between the dresser and the tool is compensated by the profile angle.

9. A method for the modified dressing of a tool which can be used for the gear manufacturing machining of a workpiece on a dressing machine, wherein a modified dresser is used for dressing the tool, characterized in that, the axes of movement of the dressing machine are set during the dressing of the tool and/or the macrogeometry of the tool and/or of the dresser, in particular the number of starts and/or the diameter and/or the profile angle and/or the conical angle of the tool and/or the diameter of the dresser is/are selected such that the modification of the dresser is applied to the tool compressed or stretched by a specified amount and/or is applied to the workpiece compressed or stretched.

10. A method in accordance with one of the preceding aspects, wherein a desired modification of the tool is specified at at least two rolling angles and optionally at three rolling angles and is produced by the setting of the axes of movement of the dressing machine; and/or wherein the relative position between the dresser and the tool is determined during dressing such that a desired profile crowning is produced on the tool; and/or wherein an association of a specific radius of the dresser with a specific radius of the tool is specified and is achieved by a corresponding setting of the axes of movement of the dressing machine.

11. An apparatus and/or a software program for determining the settings of the axes of movement of a dressing machine used for the multiple dressing of a tool using the same dresser in a method in accordance with one of the preceding aspects, wherein an input function is advantageously provided for inputting a first tool diameter; and a determination function is provided for determining the settings of the axes of movement of the dressing machine to be used for dressing the tool with the first tool diameter; wherein further advantageously an input function is provided for inputting a second tool diameter with respect to which the dresser is configured; or an input function is provided for inputting a desired gear geometry of the workpiece or of the tool.

12. An apparatus and/or a software program for determining the setting of the axes of movement of the dressing machine or the geometry of the tool to be used for producing a workpiece having a desired gear geometry by means of a tool dressed by a modified dresser, comprising an input function for inputting a desired gear geometry of the workpiece and/or for inputting a desired stretching and/or compression of the modification of the dresser on the tool or workpiece; and comprising a determination function for determining a suitable profile angle of the tool and a suitable relative position between the dresser and the tool during dressing for providing the desired gear geometry of the workpiece during machining by the tool; and/or for providing the desired stretching and/or compression of the modification of the dresser on the tool or workpiece; and/or for determining the setting of the axes of movement of the dressing machine when dressing the tool; and/or for determining the macrogeometry of the tool and/or of the dresser, in particular the number of starts and/or the diameter and/or the profile angle and/or the conical angle of the tool and/or the diameter of the dresser; and/or for determining the setting of the axes of movement of the dressing machine when dressing the tool and/or the macrogeometry of the tool in a method in accordance with one of the preceding aspects.

13. A dressing machine having a tool holder for holding the tool to be dressed and having a dresser holder for holding the dresser used for this purpose, wherein the dresser holder has an axis of rotation; and wherein the dressing machine has further axes of movement by which further degrees of freedom can be set independently of one another when dressing the tool in line contact with the dresser; and comprising a control which comprises an apparatus and/or a software program in accordance with one of the aspects 11 or 12; and/or a function for carrying out the dressing steps in a method in accordance with one of the preceding aspects, in particular a function for the multiple carrying out of a dressing procedure of a tool with changed settings of the axes of movement of the dressing machine, wherein the control is optionally programmed such that, in a later dressing procedure, it changes the relative position between the dresser and the tool with respect to an earlier dressing procedure in addition to the smaller center distance resulting by the smaller tool diameter by a corresponding additional adjustment of the axes of movement of the dressing machine.

14. A gear manufacturing machine having a dressing machine in accordance with aspect 13 and/or having an apparatus and/or having a software program in accordance with one of the aspects 11 to 12, wherein the gear manufacturing machine optionally has a workpiece holder and a tool holder provided optionally in addition to the tool holder of the dressing machine, and a gear manufacturing machining control for controlling the workpiece holder and the tool holder for carrying out a gear manufacturing machining, in particular for carrying out a method in accordance with one of the preceding aspects.

A.IV. Topological Modification

1. A method of dressing a tool, which can be used for the gear tooth machining of a workpiece, on a dresser, wherein the dressing takes place with line contact between the dresser and the tool, wherein a specific modification of the surface geometry of the tool is produced in that the position of the dresser with respect to the tool is varied in dependence on the tool width position during dressing, characterized in that the specific modification of the surface geometry of the tool produced by the change of the position of the dresser with respect to the tool when dressing in dependence on the tool width position is specifiable at a rolling angle as a function $C_{0FS}$ of the position in the tool width direction and at least the pitch of the surface geometry of the tool is specifiable as a function of the position in the tool width direction in a first direction of the tool which has an angle $\rho_{FS}$ to the tool width direction; and/or in that the specific modification of the surface geometry of the tool produced by the change of the position of the dresser with respect to the tool when dressing in dependence on the tool width position is specifiable as a function of the tool width position at at least two rolling angles; and/or in that the specific modification of the surface geometry of the tool produced by the change of the position of the dresser with respect to the tool when dressing in dependence on the tool width position is specifiable as a function of the tool width position at at least one rolling angle and additionally an association of a specific radius of the dresser with a specific radius of the tool takes place, with the association optionally being specifiable as a function of the tool width position; and/or in that at least the pitch of the specific modification of the surface geometry of the tool produced by the change of the position of the dresser with respect to the tool when dressing in dependence on the tool width position is specifiable as a function of the position in the tool width position in a first direction of the tool which has an angle $\rho_{FS}$ to the tool width direction and additionally an association of a specific radius of the dresser with a specific radius of the tool takes place, with the association optionally being specifiable as a function of the tool width position; and/or in that at least the crowning of the specific modification of the surface geometry of the tool produced by the change of the position of the dresser with respect to the tool when dressing in dependence on the tool with position is specifiable as a function of the position in the tool width direction in a first direction of the tool which has an angle $\rho_{FS}$ to the tool width direction; and/or in that a modification of the tool is specifiable or is produced which can be described at least approximately in the generating pattern at least locally in a first direction of the tool by a linear and/or quadratic function, with the coefficients of these linear and/or quadratic function being formed in a second direction of the tool which is perpendicular to the first direction by coefficient functions $F_{FtC,1}$ for the constant portion and $F_{FtL,1}$ for the linear portion and/or $F_{FtQ,1}$ for the quadratic portion, with $F_{FtC,1}$ not depending linearly on the position in the second direction and $F_{FtL,1}$ not being constant; and/or in that a modification of the tool is specifiable or is produced whose pitch and/or crowning varies in dependence on the angle of rotation of the tool and/or on the tool width position, with additionally the tooth thickness varying non-linearly in dependence on the angle of rotation of the tool and/or on the tool width position; and/or in that at least two degrees of freedom of the relative position of the dresser with respect to the tool are specifiable and/or are controlled when dressing in line contact independently of one another as a function of the tool width position.

2. A method in accordance with aspect 1, wherein the specific modification of the surface geometry of the tool produced by the change of the position of the dresser with respect to the tool when dressing in dependence on the tool with position can be described at least approximately in the generating pattern in the first direction as a linear, quadratic or cubic function whose coefficients in the tool width direction are given by functions $C_{0FS}$, $C_{1FS}$, $C_{2FS}$ and/or $C_{3FS}$ and/or by coefficient functions $F_{FtC,1}$ for the constant portion, $F_{FtL,1}$ for the linear portion and/or $F_{FtQ,1}$ for the quadratic portion.

3. A method in accordance with one of the preceding aspects, wherein the specific modification of the surface geometry of the tool produced by the change of the position of the dresser with respect to the tool when dressing in dependence on the tool width position is specifiable as a function of the tool width position; and/or wherein an association of a specific radius of the dresser with respect to a specific radius of the tool takes place, with the association optionally being specifiable at at least three or four rolling angles as a function of the tool width position; and/or wherein an association of two specific radii of the dresser with two specific radii of the tool takes place, with the association optionally being specifiable as a function of the position in the tool width direction; and/or wherein at least one of the rolling angles, and further optionally two or three rolling angles, at which the modification is/are specifiable is or are selected differently in the tool width direction and is or are further optionally specifiable as a function of the tool width position.

4. A method in accordance with one of the preceding aspects, wherein the dressing takes place on one flank and the at least two or three rolling angles are arranged on one flank; wherein the dressing takes place on two flanks and the at least two or three rolling angles are distributed over the two flanks; and/or wherein the dressing takes place on two flanks and a tool having a conical base shape is used, with the conical angle optionally being used for setting the modification.

5. A method for the modified dressing of a tool which can be used for the gear manufacturing machining of a workpiece on a dressing machine, wherein a modified dresser is used for dressing the tool, in particular a method in accordance with one of the preceding claims, characterized in that the position in which the modification of the dresser is applied to the tool during dressing is specifiable in dependence on the tool width position or is changed by controlling the axes of movement of the dressing machine during dressing.

6. A method for the modified dressing of a tool which can be used for the gear manufacturing machining of a workpiece on a dressing machine, wherein the dressing takes place in at least one first stroke and one second stroke in line contact in each case, in particular in accordance with one of the preceding aspects, characterized in that the position at which the modification produced in a first stroke adjoins the modification produced with a second stroke is changed in dependence on the tool width position.

7. A method in accordance with aspect 6, wherein the axes of movement of the dressing machine during dressing are optionally set differently in at least one first and second stroke in addition to the change required for the different positioning between the dresser and the tool in the two strokes in order to influence the pitch and/or crowning of the modification in at least one of the strokes, with the pitch and/or crowning optionally being specifiable as a function of the tool width position; and/or wherein the specific modification is optionally set in at least one of the strokes such that the surface geometry produced by the first stroke adjoins the surface geometry produced by the second stroke at a desired angle and in particular tangentially; and/or wherein a desired modification of the tool is optionally specified for at least one stroke and optionally for each stroke at at least two rolling angles and optionally at three rolling angles, with the modification optionally being specifiable as a function of the tool width position; and/or wherein an association of a specific radius of the dresser with a specific radius of the tool takes place for at least one stroke and optionally for each stroke, with the association optionally taking place as a function of the tool width position; and/or wherein different regions of the dresser are used for the first and second strokes; or wherein different dressers are used for the first and second strokes; and/or wherein one of the strokes is used for producing a modification of the dedendum or of the addendum, for example for producing a relief of the addendum or of the dedendum.

8. A method in accordance with one of the preceding aspects, wherein a modification produced by a modification of the dresser is superposed with a specific modification of the surface geometry of the tool produced by the change of the position of the dresser to the tool during dressing, wherein the position of the modification produced by a modification of the dresser is optionally specifiable, is in particular specifiable as a function of the position in the tool width direction, and/or by an association of a specific radius of the dresser with respect to a specific radius of the tool; and/or wherein a desired stretching or compression of the modification of the dresser on the tool is optionally specifiable which is optionally specifiable as a function of the position in the tool width direction, in particular by an association of two specific radii of the dresser with two specific radii of the tool; and/or wherein the modified dresser optionally has an unchanging modification over its complete active profile, for example an unchanging crowning; or wherein the modified dresser optionally has a modification in a first part region of its profile which differs from the profile shape in a second part region, with the modification in the first part region advantageously having a different profile angle and/or a different crowning, with the modification in particular being able to have an edge; and/or wherein the dresser is optionally in contact with the tool surface simultaneously in the first and second regions; and/or wherein a combination dresser is used for a simultaneous dressing of the addendum and of the tooth flank, with the height of the addendum optionally being specified and being produced by setting the axes of movement of the dressing machine during dressing, with the height of the addendum optionally being specifiable as a function of the tool width position.

9. A method in accordance with one of the preceding aspects, wherein a setting is selected from a plurality of settings of the axes of movement of the dressing machine which produce the same relative position between the dresser and the tool, which setting better satisfies specified conditions, with that setting optionally being selected which provides the desired relative position with a higher accuracy and/or with smaller positional errors. and/or with that setting being selected which requires smaller travel movements of the machine axes, and/or with that setting being selected which avoids collisions of the dresser, of the tool and/or of machine parts with one another; and/or wherein the gear geometry produced by the tool or the gear geometry produced on the tool by the dressing is measured and the deviations of the axes of movement of the dressing machine present during dressing from their desired settings are determined from deviations from a desired geometry.

10. A method in accordance with one of the preceding aspects, wherein at least three degrees of freedom, and optionally four or five degrees of freedom are used during the relative positioning between the dresser and the tool for producing the desired modification, with the degrees of freedom optionally being adjustable independently of one another for producing the desired modification, and/or with them optionally being at least three, four or all of the following five degrees of freedom: angle of rotation of the tool; axial position of the tool; y position of the dresser; center distance and/or axial cross angle, with the axial position of the tool, i.e. the tool width position, optionally being used to displace the contact line of the dresser, and with two, three or four of the remaining four degrees of freedom being used independently of one another as a function of the axial position of the tool, i.e. if the tool width position, to influence the modification along the contact line.

11. A method in accordance with one of the preceding aspects, wherein errors in the surface geometry of a dresser are at least partly corrected by specifying corresponding correction values on the setting of the axes of movement of the dressing machine; and/or wherein a dresser which was configured for a tool having a first macrogeometry and/or a first desired surface geometry is used for dressing a tool having a second macrogeometry and/or having a second desired surface geometry, with the errors resulting by the configuration for the tool having the first macrogeometry and/or the first desired surface geometry being at least partly compensated by a corresponding setting of the axes of movement of the dressing machine when dressing the tool having a second macrogeometry and/or a second desired surface geometry; and/or wherein the setting of the axes of movement of the dressing machine during dressing and/or the macrogeometry or the modification of the dresser and/or the macrogeometry of the tool is/are determined by means of curve fitting, with the modifications in the generating pattern achievable by the change of the setting of the axes of movement of the dressing machine optionally varying in a direction having an angle $\rho_{FS}$ to the tool width direction at two, three or four rolling angles and optionally being interpolated therebetween and in particular being assumed as a linear, quadratic and/or cubic function, and being compared with a desired modification, with a distance function optionally being used for quantifying the deviation, with the distance function optionally having a weighting dependent on the position in the generating pattern.

12. A method in accordance with one of the preceding aspects, wherein a tool is used in which at least one thread is inactive and/or omitted, and/or in which the dresser at least partly engages into the contour of the oppositely disposed flank during the dressing of a first flank; and/or wherein at least one tooth flank is dressed such that it does not come into contact with the workpiece during the machining of the workpiece and is therefore inactive, with at least one thread optionally being dressed such that it does not come into contact with the workpiece during the machining of the workpiece and is therefore inactive; with at least one inactive and/or omitted thread being provided between two active threads; and/or wherein maximally every second tooth comes into engagement with the tool during the machining of the workpiece in a generating coupling, after one another; and/or wherein at least one first portion of the teeth of the workpiece are optionally machined in dependence on the number of teeth of the workpiece and/or on the number of starts in at least one first passage, whereupon the workpiece is rotated relative to the tool in order to machine at least one second portion of the teeth in at least one second passage.

13. A method of producing a workpiece having a modified gear geometry by a generating method, in particular a diagonal generating method, by means of a modified tool, wherein a specific modification of the surface geometry of the tool is produced by a method in accordance with one of the preceding aspects; and wherein the specific modification of the tool by the generating method, in particular the diagonal generating method, produces a corresponding modification on the surface of the workpiece.

14. An apparatus and/or a software program for calculating the relative position between the dresser and the tool required for producing a desired modification of a tool during dressing in line contact with a specified dresser or the settings of the axes of movement of a dressing machine required for its provision, in particular for carrying out a method in accordance with one of the preceding aspects, comprising an input function by which the desired modification of the tool is specifiable; and a calculation function which determines from the desired modification the relative position between the dresser and the tool required for the production of said specific modification during dressing with line contact between the dresser and the tool or which determines the settings of the axes of movement required for providing said specific modification as a function of the tool width position; wherein the input function and the calculation function are configured such that they can be used for carrying out one of the preceding methods; and/or wherein the input function and the calculation function are configured such that the specific modification of the surface geometry of the tool is specifiable at a rolling angle as a function $C_{OFS}$ of the position in the tool width direction and such that at least the pitch and/or crowning of the surface geometry of the tool is specifiable in a first direction of the tool which has an angle $\rho_{FS}$ to the tool width direction as a function of the position in the tool width direction, with the modification being able to be produced by the calculated progression of the relative position and/or setting the axes of movement of the dressing machine; and/or wherein the input function and the calculation function are configured such that the specific modification of the surface geometry of the tool is specifiable as a function of the tool width position at at least two rolling angles, with the modification being able to be produced by the calculated progression of the relative position or the setting of the axes of movement of the dressing machine; and/or wherein the input function and the calculation function are configured such that the specific modification of the surface geometry of the tool is specifiable as a function of the tool width position at at least one rolling angle and in addition an association of a specific radius of the dresser with a specific radius of the tool takes place, with the modification being able to be produced by the calculated progression of the relative position or of the setting of the axes of movement of the dressing machine, with the association optionally being specifiable as a function of the tool width position; and/or wherein the input function and the calculation function are configured such that a specific modification of the surface geometry of the tool is specifiable or is produced which can be described at least approximately in the generating pattern at least locally in a first direction of the tool by a linear and/or quadratic function, with the coefficients of this linear and/or quadratic function being formed in a second direction of the tool which is perpendicular to the first direction by coefficient functions $F_{FtC,1}$ for the constant portion and $F_{FtL,1}$ for the linear portion and/or $F_{FtQ,1}$ for the quadratic portion, with $F_{FtC,1}$ depending in a non-linear manner on the position in the second direction and with $F_{FtL,1}$ being non-constant; and/or wherein the input function and the calculation function are configured such that a specific modification of the surface geometry of the tool is specifiable or is produced whose pitch and/or crowning varies in dependence on the angle of rotation of the tool and/or on the tool width position, with additionally the tooth thickness varying non-linearly in dependence on the angle of rotation of the tool and/or on the tool width position.

15. An apparatus and/or a software program for calculating these relative position between the dresser and the tool required for producing a desired modification of a tool during dressing in line contact with a specified dresser or the settings of the axes of movement of a dressing machine required for its provision, in particular for carrying out a method in accordance with one of the preceding aspects, in particular an apparatus in accordance with aspect 14, comprising an input function by which a specified modification of the dresser can be input and a desired position of the modification of the dresser on the tool are specifiable, with the specification of the desired position of the modification of the dresser on the tool optionally taking place by associating a specific radius of the dresser with a specific radius of the tool; and a calculation function which determines from the specified modification of the dresser and from the desired position of the modification of the dresser on the tool, the relative position between the dresser and the tool required for the production of said specified modification during dressing with line contact between the dresser and the tool or the settings of the axes of movement required for providing said specified modification; wherein the input function and the calculation function are optionally configured such that they can be used for carrying out one of the preceding methods; and/or wherein the input function and the calculation function are optionally configured such that the position of the modification on the tool is specifiable via the input function in dependence on the tool width position and the calculation function determines the required relative position between the dresser and the tool or the settings of the axes of movement required for providing said relative position as a function of the tool width position.

16. An apparatus and/or a software program for calculating the relative position between the dresser and the tool required for producing a desired modification of a tool during multi-hub dressing in line contact with a dresser or he settings of the axes of movement of a dressing machine required for its provision, in particular for carrying out a method in accordance with one of the preceding aspects, in particular an apparatus in accordance with aspect 14 or aspect 15, having a multi-hub calculation function which determines the settings of the axes of movement required for multi-hub dressing with line contact between the dresser and the tool; having an input function by which the position at which the modification produced in a first stroke adjoins the modification produced using a second stroke is specifiable as a function of the tool width position; and/or having an input function and a determination function, wherein a desired modification of the tool is specifiable by the input function and the determination function determines the strokes required for producing said desired modification, with the determination function varying or determining the position at which the modification produced in a first stroke adjoins the modification produced using a second stroke as a function of the tool width position; wherein the multi-hub calculation function determines from the position at which the modification produced in a first stroke adjoins the modification produced using a second stroke, the settings of the axes of movement required for producing said modification during dressing with line contact between the dresser and the tool; wherein the input function, the calculation function and the control function are optionally configured such that they can be used for carrying out one of the preceding methods.

17. A dressing machine having a tool holder for holding the tool to be dressed and a dresser holder for holding the dresser used for this purpose, wherein the dresser holder has an axis of rotation, and wherein the dressing machine has an axis of movement by which the tool width position can be set, characterized in that the dressing machine has further axes of movement by which at least a further two degrees of freedom, and optionally three or four degrees of freedom, of the relative position between the tool and the dresser can be set independently of one another, and wherein the dressing machine has a control by which the setting of the further two degrees of freedom, and optionally three or four degrees of freedom, can be specified and/or controlled in line contact with the dresser independently of one another as a function of the tool width position; and/or in that the dressing machine has a control having an input function by which the desired modification of the tool is specifiable as a function of the tool width position; wherein the control has a calculation function which determines from the desired modification the settings of the axes of movement required for the production of said specific modification during dressing with line contact between the dresser and the tool as a function of the tool width position; and wherein the control has a control function which carries out the corresponding setting of the axes of movement during the dressing with line contact between the dresser and the tool as a function of the tool width position; wherein the input function, the calculation function and the control function are configured such that they can be used for carrying out one of the preceding methods; and/or wherein the input function, the calculation function and the control function are configured such that the specific modification of the surface geometry of the tool is specifiable at a rolling angle as a function $C_{oFS}$ of the position in the tool width direction and such that at least the pitch and/or crowning of the surface geometry of the tool is specifiable in a first direction of the tool which has an angle $\rho_{FS}$ to the tool width direction as a function of the position in the tool width direction, with the modification being able to be produced by the setting of the axes of movement of the dressing machine carried out by the control function; and/or wherein the input function, the calculation function and the control function are configured such that the specific modification of the surface geometry of the tool is specifiable as a function of the tool width position at at least two rolling angles, with the modification being able to be produced by the setting of the axes of movement of the dressing machine carried out by the control function; and/or wherein the input function, the calculation function and the control function are configured such that the specific modification of the surface geometry of the tool is specifiable as a function of the tool width position at at least one rolling angle and in addition an association of a specific radius of the dresser with a specific radius of the tool takes place, with the modification being able to be produced by the setting of the axes of movement of the dressing machine carried out by the control function, with the association optionally being specifiable as a function of the tool width position; and/or wherein the input function and the calculation function are configured such that a specific modification of the surface geometry of the tool is specifiable or is produced which can be described at least approximately in the generating pattern at least locally in a first direction of the tool by a linear and/or quadratic function, with the coefficients of this linear and/or quadratic function being formed in a second direction of the tool which is perpendicular to the first direction by coefficient functions $F_{FtC,1}$ for the constant portion and $F_{FtL,1}$ for the linear portion and/or $F_{FtQ,1}$ for the quadratic portion, with $F_{FtC,1}$ depending in a non-linear manner on the position in the second direction and with $F_{FtL,1}$ being non-constant; and/or wherein the input function and the calculation function are configured such that a specific modification of the surface geometry of the tool is specifiable or is produced whose pitch and/or crowning varies in dependence on the angle of rotation of the tool and/or on the tool width position, with additionally the tooth thickness varying non-linearly in dependence on the angle of rotation of the tool and/or on the tool width position.

18. A dressing machine having a tool holder for holding the tool to be dressed and having a dresser holder for holding the dresser used for this purpose, wherein the dresser holder has an axis of rotation; and wherein the dressing machine has further axes of movement by which further degrees of freedom in the dressing of the tool in line contact with the dresser can be set, having a control, in particular a dressing machine in accordance with aspect 17; wherein the control has an input function by which a specified modification of the dresser can be input and a desired position of the modification of the dresser on the tool are specifiable, with the specification of the desired position of the modification of the dresser on the tool optionally taking place by associating a specific radius of the dresser with a specific radius of the tool; and wherein the control has a calculation function which determines from the specified modification of the dresser and from the desired position of the modification of the dresser on the tool, the settings of the axes of movement required for the production of said modification during dressing with line contact between the dresser and the tool; and wherein the control has a control function which carries out the corresponding setting of the axes of movement during the dressing with line contact between the dresser and the tool; wherein the input function, the calculation function and the control function are optionally configured such that they can be used for carrying out one of the preceding methods; and/or wherein the input function, the calculation function and the control function are optionally configured such that the position of the modification on the tool is specifiable via the input function in dependence on the tool width position and the calculation and control function carries out the settings of the axes of movement as a function of the tool width position.

19. A dressing machine having a tool holder for holding the tool to be dressed and having a dresser holder for holding the dresser used for this purpose, wherein the dresser holder has an axis of rotation; and wherein the dressing machine has further axes of movement by which further degrees of freedom in the dressing of the tool in line contact with the dresser can be set, having a control, in particular a dressing machine in accordance with aspect 17 and/or aspect 18; wherein the control has a multi-stroke dressing function which carries out a dressing procedure with at least one first stroke and one second stroke in which the dresser is respectively in line contact with the tool; wherein the control furthermore has an input function by which the position at which the modification produced in a first stroke adjoins the modification produced with a second stroke is specifiable as a function of the tool width position; and/or by which a desired modification of the tool is specifiable, with the control having a determination function for determining the strokes required for their production which determines the position at which the modification produced in a first stroke adjoins the modification produced using a second stroke as a function of the tool width position; wherein the control has a calculation function which determines from the position at which the modification produced in a first stroke adjoins the modification produced using a second stroke, the settings of the axes of movement required for producing said modification during dressing with line contact between the dresser and the tool; and wherein the control has a control function which carries out the corresponding setting of the axes of movement during the dressing with line contact between the dresser and the tool; wherein the input function, the calculation function and the control function are configured such that they can be used for carrying out one of the preceding methods.

20. A gear manufacturing machine having a dressing machine in accordance with aspect 17, aspect 18 and/or aspect 19 and/or having an apparatus and/or having a software program in accordance with aspect 14, aspect 15 and/or aspect 16, wherein the gear cutting machine optionally has a workpiece holder and a tool holder provided optionally in addition to the tool holder of the dressing machine, and a gear manufacturing machining control for controlling the workpiece holder and the tool holder for carrying out a gear manufacturing machining, in particular for carrying out a method in accordance with aspect 13.

B. Diagonal Generating Method
B.I. Setting the Diagonal Ratio

1. A method of producing a toothed workpiece having a modified surface geometry by a diagonal generating method by means of a modified tool, wherein a tool is used whose surface geometry comprises a modification which can be described at least approximately at least locally in the generating pattern in a first direction of the tool by a linear and/or quadratic function; wherein the coefficients of this linear and/or quadratic function are formed in a second direction of the tool which extends perpendicular to the first direction by coefficient functions $F_{FtC,1}$, $F_{FtL,1}$ and/or $F_{FtQ,1}$ and/or a modification whose pitch and/or crowning varies in dependence on the angle of rotation of the tool and/or on the tool width position; and wherein the specific modification of the tool by the diagonal generating method produces a corresponding modification on the surface of the workpiece, wherein a desired modification of the surface geometry of the workpiece is specified, and a modification of the surface geometry of the tool suitable for producing this desired modification is determined in combination with a diagonal ratio of the diagonal generating method suitable for producing the desired modification.

2. A method in accordance with aspect 2, wherein the diagonal ratio is set such that in diagonal generating methods the first direction of the tool is mapped onto a direction of the workpiece suitable for producing the desired modification of the workpiece, with the diagonal ratio optionally being determined by curve fitting and/or analytically.

3. A method in accordance with one of the aspects 1 or 2, wherein the desired modification of the surface geometry of the workpiece is specifiable as a modification or comprises a modification which can at least approximately be described in the generating pattern at least locally in a first direction of the workpiece by a linear and/or quadratic function, with the coefficients of this linear and/or quadratic function being formed in a second direction of the tool which extends perpendicular to the first direction by coefficient functions $F_{FtC,2}$, $F_{FtL,2}$ and/or $F_{FtQ,2}$ and/or being specifiable as a modification or comprising a modification whose pitch and/or crowning varies in dependence on the workpiece width position.

4. A method in accordance with one of the aspects 1 to 3, wherein the coefficient functions $F_{FtC,1}$, $F_{FtL,1}$ and/or $F_{FtQ,1}$ of the modification of the surface geometry of the tool are freely selectable at least within specific conditions to produce the desired modification of the surface geometry of the workpiece; and/or wherein the coefficient functions $F_{FtC,2}$, $F_{FtL,2}$ and/or $F_{FtQ,2}$ and/or the first direction of the modifications of the surface geometry of the workpiece are freely specifiable and/or selectable at least within certain conditions; and/or wherein the pitch and/or crowning of the modification of the surface of the tool is freely selectable at least within certain conditions as a function of the tool width position and/or the pitch and/or crowning of the modification of the surface of the workpiece is freely selectable at least within certain conditions as a function of the workpiece width position; and/or wherein the diagonal ratio is determined in dependence on the first direction of the modification on the workpiece.

5. A method in accordance with aspect 1, wherein the modification of the surface geometry of the tool is determined from the desired modification of the surface geometry of the workpiece by means of the inversion of an association function which describes the mapping of the surface of the tool onto the surface of the workpiece in diagonal generating grinding, wherein the association function depends on the diagonal ratio, wherein the determination optionally takes place using a function which analytically describes the mapping of the surface of the tool onto the surface of the workpiece in diagonal-feed generating grinding, and/or wherein the desired modification of the surface geometry of the workpiece is specified as a continuous function and/or on a scatter plot, wherein the continuous function is optionally specified on a surface on the tooth flank and/or the scatter plot optionally spans a surface on the tooth flank; and/or wherein the modification of the surface geometry of the tool is determined as a continuous function and/or on a scatter plot, wherein the continuous function is optionally determined on a surface on the tooth flank and/or the scatter plot optionally spans a surface on the tooth flank; and/or wherein the modification of the surface geometry of the workpiece is specifiable and/or selectable at at least two or three rolling angles as a function of the tool width position and interpolation takes place for the rolling angle regions disposed therebetween; and/or wherein the modification of the surface geometry of the tool is variable within the framework of the determination and/or specification at at least two or three rolling angles as a function of the tool width position and interpolation takes place for the rolling angle regions disposed therebetween.

6. A method in accordance with one of the preceding aspects, wherein the modification of the surface geometry of the tool is produced by the modification of a relative position between the tool and the dresser during dressing, with the dresser optionally being in line contact with the tool during dressing and/or the first direction of the modification of the surface geometry of the tool corresponding to the line of action of the dresser during dressing the tool and/or being specified by it; wherein the tool is optionally dressed in modified form by means of a profile roller dresser or form roller dresser; wherein further optionally the profile roller dresser or form roller dresser is in contact with the tooth of the tool during the dressing from the root region to the tip region so that the modification takes place over the total tooth depth in one stroke; or alternatively the profile roller dresser or form roller dresser is in contact with the tooth of the tool only in part regions between the root and the tip during dressing so that the specific modification takes place over the total tooth depth in a plurality of strokes and at a respective different relative positioning of the dresser.

7. A method in accordance with one of the preceding aspects, wherein the modification of the surface geometry of the tool is produced in that the position of the dresser with respect to the tool is varied during dressing in dependence on the angle of rotation of the tool and/or on the tool width position, with the production of the specific modification on the tool taking place in that at least three degrees of freedom and optionally four or five degrees of freedom are used to produce the desired modification on the relative positioning between the dresser and the tool, with the degrees of freedom optionally being settable independently of one another for producing the desired modification; and/or with them optionally being at least three, four or all of the following five degrees of freedom: angle of rotation of the tool; axial position of the tool; y position of the dresser; center distance and/or axial cross angle, with the axial position of the tool, i.e. the tool width position, optionally being used to displace the contact line of the dresser, and with two, three or four of the remaining four degrees of freedom being set independently of one another to produce the specified modification along the contact line.

8. A method in accordance with one of the preceding aspects, wherein a desired modification of the surface geometry of the workpiece is specified, wherein suitable functions $F_{FtC,1}$, $F_{FtL,1}$ and/or $F_{FtQ,1}$ of the surface geometry of the tool are determined in dependence on the desired modification of the surface geometry of the workpiece and a suitable diagonal ratio id determined; and/or wherein a suitable variation of the position of the dresser to the tool on dressing in dependence on the angle of rotation of the tool and/or on the tool width position is determined in dependence on the desired modification of the surface geometry of the workpiece and/or on the tool width position and a suitable diagonal ratio is determined.

10. A method in accordance with one of the preceding aspects, wherein a desired orientation of the modification of the surface geometry of the workpiece is specified and the diagonal ratio is set such that the desired orientation of the modification is produced on diagonal generating machining; and/or wherein the diagonal ratio is constant at least over each stroke.

11. A method in accordance with one of the preceding aspects, wherein the diagonal ratio is changed as part of the machining of a workpiece.

12. A method in accordance with one of the preceding aspects, wherein the tool has a conical base shape, with the conical angle of the tool optionally being larger than 1', optionally larger than 30', further optionally larger than 1°, and/or with the conical angle of the tool being less than 50°, optionally less than 20°, further optionally less than 10°.

13. A gear cutting machine for machining a workpiece using a tool in a diagonal generating method; and/or for dressing a tool using a dresser in line contact for carrying out the method in accordance with one of the aspects 1 to 12, wherein the gear cutting machine advantageously has a control for carrying out the method in accordance with one of the aspects 1 to 12; and/or wherein the gear cutting machine advantageously has an input function via which a desired modification of the surface geometry of the workpiece is specifiable and has a control function which determines the modification of the surface geometry of the tool suitable or providing the modification of the surface geometry of the workpiece and which determines a suitable diagonal ratio; wherein the control function optionally produces the modification of the surface geometry of the tool during the dressing and/or carries out the diagonal generating method for machining the tool with the diagonal ratio.

14. A gear cutting machine in accordance with aspect 13, wherein the gear cutting machine has a dressing function for the modified dressing of the tool, said dressing function varying the position of the dresser with respect to the tool during dressing in dependence on the angle of rotation of the tool and/or varying the tool width position, with the dressing function optionally varying at least the depth of action and the pressure angle of the dresser in dependence on the angle of rotation of the tool and/or on the tool width position, and/or with the dressing function utilizing at least three degrees of freedom and optionally four or five degrees of freedom for producing the desired modification during the relative positioning between the dresser and the tool, with the degrees of freedom optionally being set independently of one another for producing the desired modification.

15. A gear cutting machine in accordance with aspect 13 or aspect 14, wherein the input function allows the specification of the desired modification of the surface geometry of the workpiece as a constant function and/or on a scatter plot, with the constant function optionally being specifiable on a surface over the tooth flank and/or the scatter plot optionally spanning a surface on the tooth flank; and/or wherein the input function allows the specification of the desired modification of the surface geometry of the workpiece at at least two or three rolling angles as a function of the workpiece width position and carries out interpolation for the rolling angle regions disposed therebetween.

16. A gear cutting machine in accordance with one of the aspects 13 to 15, wherein the gear cutting machine determines the modification of the surface geometry of the tool as a constant function and/or on a scatter plot; and/or wherein the gear cutting machine allows the specification of the modification of the surface geometry of the tool as a constant function and/or on a scatter plot, with the constant function optionally being determined and/or being specifiable on a surface on the tooth flank and/or the scatter plot optionally spanning a surface on the tooth flank; and/or wherein the modification of the surface geometry of the tool is variable within the framework of the determination and/or specification at at least two or three rolling angles as a function of the tool width position and the control carries out interpolation for the rolling angle regions disposed therebetween.

17. A gear cutting machine in accordance with one of the aspects 13 to 16, wherein the gear cutting machine allows the specification of a desired modification of the surface geometry of the workpiece as a function which can be described at least approximately in the generating pattern at least locally in a first direction of the workpiece by a linear and/or quadratic function, with the coefficients of this linear and/or quadratic function being formed in a second direction of the workpiece which extends perpendicular to the first direction by coefficient functions $F_{FtC,2}$, $F_{FtL,2}$ and/or $F_{FtQ,2}$, with the coefficient functions $F_{FtI,2}$ and/or $F_{FtII,2}$ and/or the first direction of the modification of the surface geometry of the workpiece being freely variable and/or selectable at least within certain conditions; and/or wherein the gear cutting machine allows the specification of a desired modification of the surface geometry of the workpiece as a function which has a pitch and/or a crowning in a first direction which varies in the workpiece width direction; wherein the modification of the surface geometry of the workpiece is optionally specifiable as a function of the tool width position at at least two or three rolling angles and the control carries out interpolation for the rolling angle regions disposed therebetween.

18. A gear cutting machine in accordance with one of the aspects 13 to 17, wherein the gear cutting machine allows the specification and/or determination of a modification of the surface geometry of the tool as a function which can be described at least approximately in the generating pattern at least locally in a first direction of the workpiece by a linear and/or quadratic function, with the coefficients of this linear and/or quadratic function being formed in a second direction of the tool which extends perpendicular to the first direction by coefficient functions $F_{FtC,1}$, $F_{FtL,1}$ and/or $F_{FtQ,1}$, with the coefficient functions $F_{FtC,1}$, $F_{FtL,1}$ and/or $F_{FtQ,1}$ of the modification of the surface geometry of the tool optionally being freely variable and/or selectable at least within certain conditions; and/or wherein the gear cutting machine allows the specification or determination of a modification of the surface geometry of the workpiece as a function which has a pitch and/or a crowning in a first direction which varies in the workpiece width direction; wherein the modification of the surface geometry of the tool is optionally specifiable and/or variable within the framework of the determination and/or specification at at least two or three rolling angles as a function of the workpiece width position and the control carries out interpolation for the rolling angle regions disposed therebetween.

19. A computer program, in particular for installation on a gear cutting machine and/or having an output function for data for use on a gear cutting machine, having an input function for inputting data on a desired modification of the surface geometry of the workpiece and having a function for determining the modification of the tool and of the diagonal ratio, wherein the functions implement a method in accordance with one of the preceding aspects.

B.II. Combination with Other Modifications

1. A method of producing a toothed workpiece having a modified surface geometry by a diagonal generating method by means of a modified tool, wherein a tool is used whose surface geometry comprises a modification which can be described at least approximately at least locally in the generating pattern in a first direction of the tool by a linear and/or quadratic function; wherein the coefficients of this linear and/or quadratic function are formed in a second direction of the tool which extends perpendicular to the first direction by coefficient functions $F_{FtC,1}$, $F_{FtL,1}$ and/or $F_{FtQ,1}$ and/or a modification whose pitch and/or crowning varies in dependence on the angle of rotation of the tool and/or on the tool width position; and wherein the specific modification of the tool by the diagonal generating method produces a corresponding modification on the surface of the workpiece, wherein the modification of the workpiece produced by the specific modification of the tool is superposed by a profile modification and/or a modification caused by a change of the machine kinematics during the machining process of the workpiece.

2. A method in accordance with aspect 1, wherein the shape and/or portions and/or parameters of the respective modifications are determined by a curve fitting and/or analytically.

3. A method of producing a toothed workpiece having a modified surface geometry by a diagonal generating method by means of a modified tool, wherein a tool is used whose surface geometry comprises a modification which can be described at least approximately at least locally in the generating pattern in a first direction of the tool by a linear and/or quadratic function; wherein the coefficients of this linear and/or quadratic function are formed in a second direction of the tool which extends perpendicular to the first direction by coefficient functions $F_{FtL,1}$ and/or $F_{FtQ,1}$ and/or a modification whose pitch and/or crowning varies in dependence on the angle of rotation of the tool and/or on the tool width position; and wherein the specific modification of the tool by the diagonal generating method produces a corresponding modification on the surface of the workpiece, wherein the shape of the modification of the surface geometry of the tool and at least one parameter, and optionally a plurality of parameters, of the machining procedure of the workpiece and/or of the macrogeometry of the tool are determined such that the desired modification can be produced at least approximately, with the determination in particular taking place by curve fitting and/or analytically.

4. A method in accordance with aspect 3, wherein the diagonal ratio and/or the axial cross angle during the diagonal generating method and/or the conical and/or the profile angle of the tool is/are determined, with a constant diagonal ratio being determined which is optionally constant over the tool width or with the diagonal ratio optionally being determined as a non-constant function of the feed position.

5. A method of producing a toothed workpiece having a modified surface geometry by a diagonal generating method by means of a modified tool, wherein at least two different modifications which can be produced by a modification of the dressing process of the tool and/or of the dresser used for dressing the tool and/or of the machining process of the workpiece are superposed for the production of the modification of the workpiece; wherein the desired modification of the workpiece is specifiable in the generating patterns as a second degree polynomial in the rolling angle $w_F$ and in the workpiece width position $z_F$, with at least one coefficient, and optionally a plurality and further optionally all coefficients of the polynomial being freely selected within certain conditions; and/or wherein the desired modification of the workpiece is specifiable as a superposition of a plurality of crownings with directions freely selectable within certain conditions; and/or wherein a desired profile crowning and a desired tooth trace crowning being specifiable; and/or wherein the desired modification of the workpiece is specifiable as a waviness having an amplitude which has a non-constant value transversely to the direction of propagation of the waviness, with an amplitude function optionally being specifiable which has at least a linear and/or quadratic shape transversely to the direction of propagation of the waviness and in particular along the wave peaks, with one or more of the coefficients of the amplitude function optionally being freely selectable at least within specific conditions; and/or wherein the amplitude is specifiable such that it varies in every direction of the flank.

6. A method in accordance with one of the preceding aspects, wherein at least two of the following modifications are superposed:

a first modification of the surface geometry of the workpiece which is produced by a specific modification of the surface geometry of the tool which is in turn produced in that the position of the dresser with respect to the tool during the dressing is varied in dependence on the angle of rotation of the tool and/or on the tool width position; and/or which is produced in that a tool is used whose surface geometry comprises a modification which can be described at least approximately in the generating pattern at least locally in a first direction of the tool by a linear and/or quadratic function, with the coefficients of this linear and/or quadratic function being formed in a second direction of the tool which extends perpendicular to the first direction by coefficient functions $F_{FtC,1}$, $F_{FtL,1}$ and/or $F_{FtQ,1}$, and/or a modification whose pitch and/or crowning varies in dependence on the angle of rotation of the tool and/or on the tool width position;

a second modification of the surface geometry of the workpiece which is produced by a profile modification of the dresser; and/or a third modification of the surface geometry of the workpiece which is produced by a change of the machine kinematics during the machining process of the workpiece, wherein the shape and/or the portions and/or the parameters of the respective modifications are determined by curve fitting and/or analytically.

7. A method in accordance with one of the preceding aspects, wherein a desired modification of the surface geometry of the workpiece is resolved at least approximately in at least two of the following modifications:

a first modification which can be described at least approximately in the generating pattern at least locally in a first direction of the workpiece by a linear and/or quadratic function, with the coefficients of this linear and/or quadratic function being formed in a second direction of the workpiece which extends perpendicular to the first direction by coefficient functions $F_{FtC,2}$, $F_{FtL,2}$ and/or $F_{FtQ,2}$ and/or a modification whose pitch and/or crowning varies in dependence on the workpiece width position;

a second modification which is given by a pure profile modification; and/or a third modification which has a constant value in the generating pattern at least locally in a third direction of the workpiece and is given by a function $F_{KFt}$ in a fourth direction of the workpiece which extends perpendicular to the third direction.

8. A method in accordance with one of the preceding aspects, wherein a desired modification of the surface geometry of the workpiece is specified and those parameters of the machining process and/or of the macrogeometry of the tool and/or that direct modification of the surface geometry of the tool and/or combination of modifications are determined by means of curve fitting and/or analytically which approximate the desired modification as optimally as possible and/or produces it exactly, wherein the desired modification is optionally specified as a continuous function and/or a scatter plot, wherein the constant function over a surface of the tooth flank is specifiable and/or the scatter plot optionally spans a surface on the tooth flank and/or wherein the shape of the modification and/or of the modifications is optionally determined at a plurality of points and/or as continuous functions.

9. A method in accordance with one of the preceding aspects, wherein a distance function is used within the framework of the curve fitting which quantifies the difference between the total modification given by the sum of the respective modifications and the desired modification, wherein the distance function optionally carries out a mean value formation over a plurality of points or the total generating pattern, and/or wherein a distance function A $(w_F, z_F)$ is used within the framework of the curve fitting which depends on the rolling distance $w_F$ and on the tooth width position $z_F$ and/or wherein a weighted distance function is used within the framework of the curve fitting, wherein deviations in specific regions of the workpiece are optionally weighted more than deviations in other regions, and/or wherein that specific modification of the surface geometry of the workpiece is determined in the course of curve fitting which can be at least approximately described by a linear and/or quadratic function in the generating pattern at least locally in a first direction of the workpiece in a first direction of the workpiece, with the coefficients of this linear and/or quadratic function being formed in a second direction of the tool which extends perpendicular to the first direction by coefficient functions $F_{FtC,2}$, $F_{FtL,2}$ and/or $F_{FtQ,2}$ and/or that modification of the workpiece is determined whose pitch and/or crowning measured in a first direction vary/varies in dependence on the workpiece width position which, together with at least one further modification, ideally approximates and/or exactly produces the desired modification, wherein a determination is made from the desired modification of the surface geometry of the workpiece of the modification of the surface geometry of the tool required for this purpose and/or of the machine kinematics required for this purpose during dressing; and/or wherein at least one, and optionally more parameters of the machining process and/or of the macrogeometry of the tool and/or the shape and/or the portion and/or the parameters of at least one, and optionally two or three of the possible modifications is/are varied within the framework of the curve fitting in order to determine those parameters and/or that modification and/or combination of modifications which approximate/approximates the desired modification as optimally as possible and/or produce/produces it exactly, wherein the shape of the coefficient functions $F_{Ft, 1/2}$, $F_{FtL, 1/2}$ and/or $F_{FtQ,1/2}$ and/or of the function $F_{KFt}$ and/or of the profile modification and/or the first direction is/are optionally varied, and/or wherein the form of the coefficient functions $F_{FtC,1/2}$, $F_{FtL, 1/2}$, and/or $F_{FtQ,1/2}$ and/or the first direction of the first modification and/or the diagonal ratio and/or the axial cross angle during the diagonal generating method and/or the conical angle and/or the profile angle of the tool is/are optionally varied, wherein a diagonal ratio constant over the tool width is optionally varied or wherein the diagonal ratio is optionally varied as a non-constant function of the feed position.

10. A method in accordance with one of the preceding aspects, wherein the modification of the surface geometry of the tool is produced by the modification of a relative position between the tool and the dresser during dressing, with the dresser optionally being in line contact with the tool during dressing and/or the first direction of the modification of the surface geometry of the tool corresponding to the line of action of the dresser during dressing the tool and/or being specified by it; wherein the tool is optionally dressed in modified form by means of a profile roller dresser or form roller dresser; wherein further optionally the profile roller dresser or form roller dresser is in contact with the tooth of the tool during the dressing from the root region to the tip region so that the modification takes place over the total tooth depth in one stroke; or alternatively the profile roller dresser or form roller dresser is in contact with the tooth of the tool only in part regions between the root and the tip during dressing so that the specific modification takes place over the total tooth depth in a plurality of strokes and at a respective different relative positioning of the dresser, and/or wherein the specific modification of the surface geometry of the tool is produced by a change of the machine kinematics during the dressing process in dependence on the angle of rotation of the tool and/or on the tool width position, in particular in that at least three degrees of freedom, and optionally four or five degrees of freedom are used during the relative positioning between the dresser and the tool for producing the desired modification, with the degrees of freedom optionally being sellable independently of one another for producing the desired modification, and/or with them optionally being at least three, four or all of the following five degrees of freedom: angle of rotation of the tool; axial position of the tool; y position of the dresser; center distance and/or axial cross angle, with the axial position of the tool, i.e. the tool width position, optionally being used to displace the contact line of the dresser, and with two, three or four of the remaining four degrees of freedom being set independently of one another to produce the specific modification along the contact line; wherein a modified dressier is optionally additionally used to produce a profile modification.

11. A method in accordance with one of the preceding aspects, wherein an axial feed of the tool takes place using a diagonal ratio given by the ratio between the axial feed of the tool and the axial feed of the workpiece during the machining; and wherein the diagonal ratio is changed as part of the machining of a workpiece.

12. A method in accordance with one of the preceding aspects, wherein the tool has a conical base shape, with the conical angle of the tool being larger than 1', optionally larger than 30', further optionally larger than 1°, and/or with the conical angle of the tool being less than 50°, optionally less than 20°, further optionally less than 10°.

13. A gear manufacturing machine for carrying out a method for the production of a workpiece in accordance with one of the aspects 1 to 12, wherein the gear manufacturing machine advantageously has an input function and/or a calculation function via which the kinematic changes of the machine kinematics can be specified and/or determined during the machining process and/or dressing process, and/or a control function which changes the machine kinematics during the machining process and/or the dressing process, wherein the input function optionally allows the input of a desired modification and the calculation function determines the modifications required for its production and/or the changes of the machine kinematics during the machining process and/or the dressing process required for the production of the modifications.

14. A computer system and/or software program for the determination of the combination of modifications required for the production of a workpiece with a desired modification, having an input function for specifying a desired modification and having a resolving function; wherein the resolving function determines a combination of modifications which approximates the desired modification as optimally as possible and/or determines it exactly; wherein the resolving function determines a combination suitable for this purpose of a modification of the workpiece which can be produced by a specific modification of the surface geometry of the tool which can be described at least approximately in the generating pattern at least locally in a first direction of the tool by a linear and/or quadratic function, with the coefficients of this linear and/or quadratic functions being formed in a second direction of the tool which extends perpendicular to the first direction by coefficient functions $F_{FtC,1}$, $F_{FtL,1}$ and/or $F_{FtQ,1}$ and/or a modification whose pitch and/or crowning varies in dependence on the angle of rotation of the tool and/or on the tool width position with a profile modification and/or a modification caused by a change of the machine kinematics during the machining process, wherein the resolving function optionally resolves a specified, desired modification of the workpiece by a curve fitting and/or analytically at least approximately into two different modifications of the workpiece which can each be produced by a modification of the dressing process of the tool and/or of the dresser used for the dressing of the tool and/or of the machining process of the workpiece; wherein further optionally the resolving function resolves a specified desired modification at least approximately into at least two of the following modifications:

a first modification which can be described at least approximately at least locally in a first direction of the workpiece by a linear and/or quadratic function, with the coefficients of this linear and/or quadratic function being formed in a second direction of the workpiece which extends perpendicular to the first direction by coefficient functions $F_{FtC,2}$, $F_{FtL,2}$ and/or $F_{FtQ,2}$ and/or a modification whose pitch and/or crowning varies in dependence on the workpiece width position;

a second modification which is given by a pure profile modification; and/or a third modification which has a constant value in the generating pattern at least locally in a third direction of the workpiece and is given by a function $F_{KFt}$ in a fourth direction of the workpiece which extends perpendicular to the third direction, and optionally having a calculation function which determines the modification of the dressing process of the tool and/or of the dresser used for dressing the tool and/or of the machining process of the workpiece from the modifications of the workpiece and/or of the tool determined in this manner.

15. A computer system and/or software program for the determination of the combination of modifications required for the production of a workpiece with a desired modification, having a function for specifying a desired modification and having a determination function; wherein the determination function determines the shape of a specific modification of the surface geometry of the tool which can be described at least approximately in the generating pattern at least locally in a first direction of the tool by a linear and/or quadratic function, with the coefficients of this linear and/or quadratic function being formed in a second direction of the tool which extends perpendicular to the first direction by coefficient functions $F_{FtC,1}$, $F_{FtL,1}$ and/or $F_{FtQ,1}$ and/or a determines a modification whose pitch and/or crowning varies in dependence on the angle of rotation of the tool and/or on the tool width position; and at least one parameter, and optionally a plurality of parameters, of the macrogeometry of the tool and/or at least one parameter, and optionally a plurality of parameters, of a diagonal generating method by which the desired modification can be approximated as ideally as possible and/or can be produced exactly.

16. A computer system and/or software program in accordance with aspect 14 or aspect 15 which implements the calculation steps of a method in accordance with one of the aspects 1 to 12 and/or having an interface to or installable on a gear manufacturing machine in accordance with aspect 13 so that the changes of the machine kinematics during the machining process and/or the dressing process can be specified and/or determined by the computer system and/or software program.

B.III. Producible Geometries

0. A method of producing a toothed workpiece having a modified surface geometry by a diagonal generating method by means of a modified tool, wherein at least two different modifications which can be produced by a modification of the dressing process of the tool and/or of the dresser used for dressing the tool and/or of the machining process of the workpiece are superposed for the production of the modification of the workpiece; and/or wherein a tool is used for producing the modification of the workpiece whose surface geometry comprises a modification which can be described at least approximately at least locally in the generating pattern in a first direction of the tool by a linear and/or quadratic function; wherein the coefficients of this linear and/or quadratic function are formed in a second direction of the tool which extends perpendicular to the first direction by coefficient functions $F_{FtC,1}$, $F_{FtL,1}$ and/or $F_{FtQ,1}$ and/or a modification whose pitch and/or crowning varies in dependence on the angle of rotation of the tool and/or on the tool width position; wherein the desired modification of the workpiece can be specified in the generating pattern as a second degree polynomial in the rolling angle $w_F$ and in the workpiece width position $z_F$.

1. A method of producing a toothed workpiece having a modified surface geometry by a diagonal generating method by means of a modified tool, wherein a tool is used for producing the modification of the workpiece whose surface geometry comprises a modification which can be described at least approximately at least locally in the generating pattern in a first direction of the tool by a linear and/or quadratic function; wherein the coefficients of this linear and/or quadratic function are formed in a second direction of the tool which extends perpendicular to the first direction by coefficient functions $F_{FtC,1}$ for the constant portion and $F_{FtL,1}$ for the linear portion and/or $F_{FtQ,1}$ for the quadratic portion, with $F_{FtC,1}$ depending in a non-linear manner on the position in the second direction and $F_{FtL,1}$ being non-constant; and/or a modification whose pitch and/or crowning varies in dependence on the angle of rotation of the tool and/or on the tool width position; and whose tooth thickness varies in a non-linear manner in dependence on the angle of rotation of the tool and/or on the tool width position.

2. A method in accordance with aspect 0 or aspect 1, wherein the modification produced by the modified tool has a modification superposed on it which is produced by a change of the machine kinematics of the machining procedure of the workpiece.

3. A method in accordance with one of the preceding aspects, wherein a desired modification of the surface geometry of the workpiece is specifiable in the generating patterns as a second degree polynomial in the rolling angle $w_F$ and in the workpiece position $z_F$, with optionally at least one coefficient, and optionally a plurality and further optionally all coefficients of the polynomial being freely selectable within certain conditions.

4. A method of producing a toothed workpiece having a modified surface geometry by a diagonal generating method by means of a modified tool, wherein a specific modification of the surface geometry of the tool is produced in that the position of the dresser with respect to the tool is varied during dressing in line contact in dependence on the angle of rotation of the tool and/or on the tool width position; and/or wherein a tool is used whose surface geometry comprises a modification which can be described at least approximately in the generating pattern at least locally in a first direction of the tool by a constant, linear and/or quadratic function, with the coefficients of this constant, linear and/or quadratic function being formed in a second direction of the tool which extends perpendicular to the first direction by coefficient functions $F_{FtC,1}$, $F_{FtL,1}$ and/or $F_{FtQ,1}$, and/or wherein a tool is used whose surface geometry comprises a modification whose pitch and/or crowning varies in dependence on the angle of rotation of the tool and/or on the tool width position; wherein the desired modification of the workpiece is specifiable as a superposition of a plurality of crownings with directions freely selectable within specific conditions; and/or wherein a desired profile crowning is specifiable.

5. A method in accordance with one of the preceding aspects, wherein the surface geometry of the tool comprises a modification which can be described at least approximately in the generating pattern at least locally in a first direction of the tool by a linear function, with the coefficients of this linear function being formed in a second direction of the tool which extends perpendicular to the first direction y the coefficient functions $F_{FtC,1}$ for the constant portion and $F_{FtL,1}$ for the linear portion; and/or wherein the coefficient function $F_{FtC,1}$ optionally depends quadratically on the position in the second direction; and/wherein the coefficient function $F_{FtL,1}$ optionally linearly depends on the position in the second direction; and/or wherein the modification of the tool has a pitch which varies linearly in dependence on the angle of rotation of the tool and/or on the tool width position and the tooth thickness varies quadratically in dependence on the angle of rotation of the tool and/or on the tool width position; and/or wherein the desired modification is resoled into at least one first and one second modification; wherein the first modification can be described at least approximately in the generating pattern at least locally in a first direction of the workpiece by a linear function, with the coefficients of this linear function being formed in a second direction of the workpiece which extends perpendicular to the first direction by the coefficient functions $F_{FtC,2}$ for the constant portion and $F_{FtL,2}$ for the linear portion; and/or a modification whose pitch varies in dependence on the workpiece with position; wherein the coefficient function $F_{FtC,2}$ optionally depends quadratically on the position in the second direction; and/or wherein the coefficient function $F_{FtL,2}$ optionally depends linearly on the position in the second direction; and/or wherein the modification of the workpiece has a pitch which varies linearly in dependence on the angle of rotation of the workpiece and/or on the workpiece width position and the tooth thickness varies quadratically in dependence on the workpiece angle of rotation and/or on the workpiece width position; and wherein the second modification can be produced by change of the machine kinematics during the machining process and/or has a constant value in the generating pattern at least locally in a third direction of the workpiece and is given by a function $F_{KFt}$ in a fourth direction of the workpiece which extends perpendicular to the third direction, with the function $F_{KFt}$ optionally depending in a non-linear manner, and further optionally quadratically, on the position in the fourth direction.

6. A method in accordance with one of the preceding aspects, wherein the diagonal ratio is selectable during the diagonal generating machining of the workpiece at least within certain conditions independently of the desired modification of the workpiece and in particular independently of the direction of the desired crowning(s), and is in particular determined on the basis of the orientation of a further desired modification which is superposed by the desired modification of the workpiece specifiable as a second degree polynomial and/or as a superposition of crownings.

7. A method in accordance with one of the preceding aspects, wherein, in addition to the desired modification of the workpiece specifiable as a second degree polynomial and/or as a superposition of crownings, an additional modification is specifiable which is superposed with it, with the additional modification optionally having a marked direction and/or it being an end relief of the workpiece, with the orientation of the additional modification and in particular of the end relief being freely specifiable within certain conditions and in particular a triangular end relief optionally being specifiable, with the diagonal ratio further optionally being determined during the diagonal generating machining of the workpiece in dependence on a desired orientation of the additional modification and in particular of the end relief.

8. A method of producing a toothed workpiece having a modified surface geometry by a diagonal generating method by means of a modified tool and a modification of the machine kinematics during the machining process of the workpiece; wherein a determination is made from a desired modification of the surface geometry of the workpiece of a modification of the surface geometry of the tool suitable for producing said desired modification and of a suitable modification of the machine kinematics during the machining process; wherein the modification of the surface geometry of the tool can be produced in that the position of the dresser with respect to the tool is varied during dressing in line contact in dependence on the angle of rotation of the tool and/or the tool width position; and/or with the surface geometry of the tool comprising a modification which can be described at least approximately in the generating pattern at least locally in a first direction of the workpiece by a constant linear and/or quadratic function, with the coefficients of this constant, linear and/or quadratic function being formed in a second direction of the tool which extends perpendicular to the first direction by coefficient functions $F_{FtC,1}$, $F_{FtL,1}$ and/or $F_{FtQ,1}$: wherein the desired modification of the workpiece is specifiable as a superposition of at least one crowning with an end relief of the workpiece.

9. A method in accordance with aspect 8, wherein the orientation of the crowning and/or end relief is freely specifiable within specific conditions, and in particular a triangular end relief is specifiable; and/or wherein a plurality of crownings having freely selectable directions within certain conditions are specifiable; and/or wherein a desired profile crowning and/or a desired tooth trace crowning is/are specifiable.

10. A method in accordance with one of the preceding aspects, wherein the orientation of the end relief, i.e. the direction in which the end relief drops the most, has an angle of more than 30°, advantageously of more than 60°, further advantageously of more than 80°, to the line of action of the gear and optionally stands perpendicular thereon; and/or wherein a first direction of the end relief in which it can be described at least approximately by a constant, linear and/or quadratic function has an angle of less than 60°, advantageously of less than 30°, further advantageously of less than 10°, to the line of action of the gear and optionally extends in parallel therewith; and/or wherein different end reliefs are provided at the upper edge and lower edge, and in particular end reliefs having different orientations, with different diagonal ratios optionally being worked with for machining the two end reliefs.

11. A method of producing a toothed workpiece having a modified surface geometry by a diagonal generating method by means of a modified tool, wherein a specific modification of the surface geometry of the tool is produced in that the position of the dresser with respect to the tool is varied during dressing in line contact in dependence on the angle of rotation of the tool and/or on the tool width position; and/or wherein a tool is used whose surface geometry comprises a modification which can be described at least approximately in the generating pattern at least locally in a first direction of the tool by a constant, linear and/or quadratic function, with the coefficients of this constant, linear and/or quadratic function being formed in a second direction of the tool which extends perpendicular to the first direction by coefficient functions $F_{FtC,1}$, $F_{FtL,1}$ and/or $F_{FtQ,1}$; and/or wherein a tool is used whose surface geometry comprises a modification whose pitch and/or crowning varies in dependence on the angle of rotation of the tool and/or on the tool width position; and wherein the modification of the tool by the diagonal generating method produces a corresponding modification on the surface of the workpiece, wherein the desired modification of the workpiece is specifiable as a waviness having an amplitude which has a non-constant value transversely to the direction of propagation of the waviness.

12. A method in accordance with aspect 11, wherein an amplitude function is specifiable which has at least a linear and/or quadratic form transversely to the direction of propagation of the waviness and in particular along the wave peas, with one or more of the coefficients of the amplitude function optionally being freely selectable at least within certain conditions; and/or wherein the amplitude is specifiable such that it varies in every direction of the flank; and/or wherein the amplitude function is specifiable in the generating patter as a second degree polynomial at the rolling angle $w_F$ and is specifiable in the workpiece width position $z_F$: and/or wherein the orientation of the waviness is freely selectable at least within certain conditions.

13. A method of producing a toothed workpiece having a modified surface geometry by a diagonal generating method by means of a modified tool, wherein a specific modification of the surface geometry of the tool is produced in that the position of the dresser with respect to the tool is varied during dressing with line contact in dependence on the angle of rotation of the tool and/or the tool width position; wherein the modification of the tool by the diagonal generating method produces a corresponding modification on the surface of the workpiece; wherein the modification produced on the workpiece by the modified tool can be described at least approximately in the generating pattern at least locally in a first direction of the workpiece by a linear and/or quadratic function; wherein the coefficients of this linear and/or quadratic function are formed in a second direction of the workpiece which extends perpendicular to the first direction by coefficient functions $F_{FtC,2}$, $F_{FtL,2}$ and/or $F_{FtQ,2}$, and/or the modification produced on the workpiece by the modified tool in a first direction has a pitch and/or crowning which varies in dependence on the angle of rotation of the workpiece and/or on the workpiece width position; wherein the first direction extends on the workpiece at an angle of less than 60°, advantageously less than 30°, further advantageously less than 10°, further optionally in parallel with the line of action of the gear.

14. A method in accordance with one of the preceding aspects, wherein the modification of the surface geometry of the tool is produced by the modification of a relative position between the tool and the dresser during dressing, with the dresser optionally being in line contact with the tool during dressing and/or wherein the dressing takes place on one flank or on two flanks and/or wherein the first direction of the modification of the surface geometry of the tool corresponds to the line of action of the dresser on dressing the tool and/or is specified by it; wherein the tool is optionally dressed in modified form by means of a profile roller dresser or form roller dresser; wherein further optionally the profile roller dresser or form roller dresser is in contact with the tooth of the tool during the dressing from the root region to the tip region so that the modification takes place over the total tooth depth in one stroke; or alternatively the profile roller dresser or form roller dresser is in contact with the tooth of the tool only in part regions between the root and the tip during dressing so that the specific modification takes place over the total tooth depth in a plurality of strokes and at a respective different relative positioning of the dresser, and/or wherein the specific modification of the surface geometry of the tool is produced by a change of the machine kinematics during the dressing process in dependence on the angle of rotation of the tool and/or on the tool width position, in particular in that at least three degrees of freedom, and optionally four or five degrees of freedom are used during the relative positioning between the dresser and the tool for producing the desired modification, with the degrees of freedom optionally being settable independently of one another for producing the desired modification, and/or with them optionally being at least three, four or all of the following five degrees of freedom: angle of rotation of the tool; axial position of the tool; y position of the dresser; center distance and/or axial cross angle, with the axial position of the tool, i.e. the tool width position, optionally being used to displace the contact line of the dresser, and with two, three or four of the remaining four degrees of freedom being set independently of one another to produce the specific modification along the contact line.

15. A gear cutting machine for carrying out the method in accordance with one of the aspects 0 to 14, wherein the gear cutting machine has an input function via which the desired modification is specifiable and a control function which generates the desired modification by a corresponding control of the machine kinematics as part of the dressing of the tool and/or of the machining of a workpiece, with a calculation function optionally being provided which determines the modification of the tool suitable for producing the desired modification of the workpiece and/or the changes of the machine kinematics during the machining process and/or optionally during the dressing process required for producing the modifications.

16. A computer system and/or software program for determining the machining parameters for carrying out a method in accordance with one of the preceding aspects suitable for producing a workpiece with a desired modification; having a function for inputting a desired modification and having a calculation function which determines the parameters of the machining process of the workpiece required for the production of the desired modifications from the desired modification of the workpiece and/or the required modification of the tool and/or the modification of the dressing process and/or of the dresser required for the provision of the modification of the tool.

17. A computer system and/or software program in accordance with aspect 16 having an interface to or installable on a gear manufacturing machine so that the changes of the machine kinematics during the dressing process and/or the parameters of the machining process can be specified and/or determined by the computer system and/or the software program.

B.IV. Variation of the Diagonal Ratio

1. A method of producing a toothed workpiece, in particular a workpiece having a modified surface geometry, by a diagonal generating method, in particular by means of a modified tool, in particular in accordance with one of the preceding aspects, wherein an axial feed of the tool takes place during the machining with a diagonal ratio given by the relationship between the axial feed of the tool and the axial feed of the workpiece; and wherein the diagonal ratio is changed as part of the machining of a workpiece.

2. A method in accordance with aspect 1, wherein work is carried out with different diagonal ratios on the use of different regions of the tool for machining the same region of the workpiece; with work optionally being carried out with a constant diagonal ratio within the respective regions.

3. A method in accordance with aspect 1 or aspect 2, wherein work is carried out with different diagonal ratios for machining different regions of the workpiece; and/or wherein the diagonal ratio is changed while the width of the gear is optionally moved over as part of the gear manufacturing machining, with a constant diagonal ratio optionally being worked with within the respective regions.

4. A method in accordance with one of the preceding aspects, wherein the diagonal ratio is varied during the machining of the workpiece in dependence on the axial feed of the workpiece and/or of the tool, wherein the diagonal ratio is optionally given as a continuous non-constant function of the axial feed at least in a region of the axial feed; and/or wherein the variation of the diagonal ratio optionally takes place when sweeping over a modified region of the workpiece; and/or wherein the progression of at least one line of the modification on the workpiece is optionally specified, along which line the modification is given by a linear and/or quadratic function and the variation of the diagonal ratio is determined from this in dependence on the axial feed and in particular the continuous non-constant function by which it is given.

5. A method in accordance with one of the preceding aspects, wherein a change of the diagonal ratio takes place while the tool is guided along the workpiece in the width direction, wherein the tool has a conical basic shape, wherein the modifications which can be achieved by the change of the diagonal ratio are optionally specifically influenced by a suitable choice of at least one and optionally more parameters of the machining process and/or of the macrogeometry of the tool, in particular of the axial cross angle and/or of the center distance and/or of the conical angle and/or of the profile angle of the tool.

6. A method in accordance with one of the preceding aspects, wherein the tool has at least one modified region and one unmodified region and/or at least two regions having different modifications, in particular having modifications having different orientations, and/or two modified regions between which an unmodified region is disposed, wherein work is optionally carried out in at least two regions with different diagonal ratios.

7. A method in accordance with one of the preceding aspects, wherein the tool has at least two regions which are used after one another for machining the same region of the workpiece, in particular at least one rough machining region and at least one fine machining region, wherein the machining steps with the two regions, in particular the rough-machining step and the fine machining step, take place with different diagonal ratios, wherein the regions used for the machining optionally utilize the total tool width, and/or wherein at least one region, in particular the fine-machining region, is optionally modified, wherein for the case that both regions, in particular both the rough machining region and the fine machining region, are modified, the modification respectively has a different orientation, and/or the modification on the rough machining region only approximately produces the desired modification on the gear teeth.

8. A method in accordance with one of the preceding aspects, wherein the tool has at least two regions which are used after one another for machining different regions of the workpiece, wherein the machining in the one region takes place with a different diagonal ratio than in the other region, wherein the tool optionally has a modified and an unmodified region, wherein the diagonal ratio is optionally smaller in the unmodified region than in the modified region to reduce the width of the tool or wherein the diagonal ratio in the unmodified region is larger than in the modified region to reduce the load on the tool in this region.

9. A method in accordance with one of the preceding aspects, wherein the tool has two modified regions between which an unmodified region is disposed which are used after one another for machining different regions of the workpiece, wherein work is at least carried out with different diagonal ratios in the modified regions to produce different modifications, in particular modifications having different orientations, in the respective regions of the workpiece, wherein the regions are optionally arranged such that the progression of the contact point between the tool and the workpiece is disposed completely in the unmodified region in at least one grinding position.

10. A tool for carrying out a method in accordance with one of the preceding aspects having at least one modified region and one unmodified region, wherein the surface geometry of the modified region comprises a modification which can be described at least approximately at least locally in the generating pattern in a first direction of the tool by a linear and/or quadratic function; wherein the coefficients of this linear and/or quadratic function are formed in a second direction of the tool which extends perpendicular to the first direction by coefficient functions $F_{FtC,1}$, $F_{FtL,1}$ and/or $F_{FtQ,1}$ and/or whose pitch and/or crowning varies in dependence on the angle of rotation of the tool and/or on the tool width position.

11. A gear manufacturing machine for the carrying out of the method in accordance with one of the aspects 1 to 9, wherein the gear manufacturing machine advantageously has an input function and/or a calculation function via which different diagonal ratios and/or a variable diagonal ratio can be specified and/or determined and/or a control function which changes the diagonal ratio within the framework of the machining of a workpiece.

12. A gear manufacturing machine in accordance with aspect 11, wherein the control function carries out at least two machining steps which take place after one another and in which a respective other region of the tool is used for machining the same region of the workpiece, in particular at least one rough machining step and at least one fine machining step, wherein the machining steps, in particular the rough machining step and the fine machining step, take place with different diagonal ratios.

13. A gear manufacturing machine in accordance with aspect 11 or aspect 12, wherein the control function changes the diagonal ratio at least once in the course of a machining step and/or the diagonal ratio is changed while the width of the gear teeth is traveled over in the course of the gear tooth machining, wherein the control function optionally works with different diagonal ratios for machining different regions of the workpiece and further optionally works with a constant diagonal ratio within the respective regions, and/or wherein the control function varies the diagonal ratio during the machining of the workpiece in dependence on the axial feed of the workpiece and/or of the tool, wherein the diagonal ratio is given at least in one region of the axial feed as a non-constant and optionally continuous function of the axial feed.

B.V. Conical Tools

1. A method for producing a toothed workpiece, in particular a workpiece having a modified surface geometry, by a diagonal generating method, in particular by means of a modified tool, in particular in accordance with one of the preceding aspects, wherein the tool has a constant basic shape; wherein the conical angle of the tool is optionally larger than 1', further optionally larger than 30', further optionally larger than 1°; and/or wherein the conical angle of the tool is optionally less than 50°, optionally less than 20°, further optionally less than 10°.

2. A method in accordance with aspect 1, wherein different modifications are produced on the left and right tooth flanks of the workpiece, in particular modifications having different orientations; and/or wherein the gearing of the workpiece on the left and right tooth flanks is asymmetrical; and/or wherein the machining of the workpiece takes place on two flanks.

3. A method in accordance with one of the preceding aspects, wherein the workpiece has a cylindrical or a conical basic shape.

4. A method in accordance with one of the preceding aspects, wherein a desired orientation of the modifications on the left and right tooth flanks of the workpiece is achieved by the suitable choice of the conical angle of the tool.

5. A method in accordance with one of the preceding aspects, wherein the axial feed of the tool is superposed with a feed motion of the tool to the workpiece, wherein the superposed motion optionally takes place in the conical direction.

6. A tool for gear manufacturing machining of a workpiece by a diagonal generating method, in particular by a grinding worm, wherein the tool has a conical basic shape; and wherein the tool has a modification of its surface geometry which can be described at least approximately in the generating pattern at least locally in a first direction of the tool by a linear and/or quadratic function, with the coefficients of this linear and/or quadratic function being formed in a second direction of the tool which extends perpendicular to the first direction by coefficient functions $F_{FtC,1}$, $F_{FtL,1}$ and/or $F_{FtQ,1}$ and/or a modification whose pitch and/or crowning changes in dependence on the angle of rotation of the tool and/or on the tool width position; wherein the conical angle of the tool is optionally larger than 1', optionally larger than 30', further optionally larger than 1°; and/or wherein the conical angle of the tool is less than 50°, optionally less than 20°, further optionally less than 10°.

7. A gear manufacturing machine for the carrying out of the method in accordance with one of the aspects 1 to 6, wherein the gear manufacturing machine advantageously has an input function via which the conical angle and/or the profile angle of the tool and/or of the workpiece can be input and/or specified, and/or advantageously has a control function which controls the NC axes of the gear manufacturing machine such that a tool having a conical basic shape rolls off on the workpiece during diagonal generating processing during the machining, wherein the axial feed of the tool is optionally superposed with a feed motion of the tool toward the workpiece, wherein the superposed motion optionally takes place in the conical direction, and/or wherein the gear manufacturing machine has a control function which controls the NC axes of the gear manufacturing machine such that the dresser follows the conical basic shape during the dressing of a tool having a conical basic shape, and/or wherein the gear manufacturing machine comprises an input function which allows the input of a desired modification of the workpiece and a calculation function which determines the changes of the machine kinematics during the dressing process required for producing the modifications and/or the conical angle and/or the profile angle of the tool, and/or wherein the gear manufacturing machine comprises an input function by which a desired modification of the tool and/or the conical angle and/or the profile angle and/or the changes of the machine kinematics required for producing these modifications can be input during the dressing process, wherein a control function is optionally provided which correspondingly changes the machine kinematics during the machining process and/or the dressing process.

C. Further Aspects of Dressing

Dressing a worm for generating grinding a gearing with corrected dressing kinematics, wherein the profile shape or profile modification is specified at 4 rolling distances.

Dressing a worm for generating grinding a gearing, wherein the profile shape or profile modification is specified at 3 rolling distances and a radius on the dresser is associated with a radius on the worm.

Dressing a worm for generating grinding a gearing with corrected dressing kinematics, wherein the profile shape or profile modification is variably specified at 4 rolling distances over the worm width, with the option of also variably selecting these 4 rolling distances over the worm width.

Dressing a worm for generating grinding a gearing, wherein the profile shape or profile modification is variably specified at 3 rolling distances over the worm width and a radius on the dresser is associated with a radius on the worm, with the options of also variably selecting these 3 rolling distances over the worm width and/or of variably selecting the association of the radius on the dresser with the radius on the worm over the worm width.

Dressing in accordance with one of the preceding methods, wherein the region on the worm which is to be dressed is specifically specified.

Dividing the worm into a plurality of modified or non-modified regions which can be used as rough machining regions and/or fine machining regions, rough machining regions can in particular be placed between fine machining regions.

Special case of the profile crowning in an involute worm, in particular with the very good approximation according to equation (23), in particular in combination with variably placed profile modifications of dresser, optionally while taking account of the relative profile stretching.

Correction of the profile modification, in particular of a profile crowning, in particular by prior measurement of the profile in the gear cutting machine.

Approximating the desired modification (topologically or via simple profile modification), for example using curve fitting, in particular with specifiable weighting.

Using the method also on conical worms.

Dressing conical worms in general, also without modification.

Correcting the unwanted profile error with small worm diameters (e.g., worm diameters smaller than a threshold) and/or high numbers of starts (e.g., numbers of starts higher than a threshold).

Correcting the unwanted profile crowning with small worm diameters (e.g., worm diameters smaller than a threshold) and/or high numbers of starts (e.g., numbers of starts higher than a threshold) with and without matching the profile angles of involute cylindrical and conical worms.

Dressing in a plurality of strokes so that only a portion of the profile height is dressed per stroke and the present disclosure can be used in each of these regions with the options Displacing the regions dressed in one stroke over the worm width in order thus to produce topological modifications.

Varying the modification over the worm width in each region dressed per stroke.

Utilizing different regions on the dresser for different regions on the worm, wherein the individual regions on the dresser can have different modifications.

Using more than one dresser, wherein the different dressers can have different modifications and/or geometries.

Calculation unit/software for:

Calculating all profile modifications which can be produced for a given set of geometrical dresser sizes and worm sizes, in particular the $f_{iFS}$ for the 3 point method and 4 point method, in particular for maximum/minimal profile crowning which can be produced.

Calculating suitable geometrical values from a given profile modification, in particular from given $f_{iFS}$ for the 3 point method and the 4 point method, in particular a profile modification.

Transferring the last two points to topological modifications.

Selecting suitable worms and/or dressers from a database.

Using worms with omitted threads.

Taking account of errors in the profile caused by deviations in the axes in the calculation of the geometrical values.

Selecting suitable solutions for the coordinates $B_1, \ldots, B_{N_S}$ in movement apparatus which result in non-unambiguous solutions for the coordinates $B_1, \ldots, B_{N_S}$, in particular optimized such that the profile errors caused by deviations in the axes are minimized and/or no collisions are caused with the worm and/or the dresser and/or machine parts with other machine parts.

Calculating the deviations of the axes from errors in the profile/in topological modifications.

Specifically utilizing the profile stretching for profile modifications and topological modifications, including:

Selecting suitable worm and dresser geometries.

Matching the worm geometry when the worm becomes smaller, in particular matching the profile angle.

D. Further Aspects of Diagonal Generating Method

Machining gear teeth using a tool having a modification in accordance with equation (25) in the diagonal generating method for producing a modification on the gear teeth in accordance with equation (25). The machining can take place using methods which utilize a geared tool and the kinematics of a continuous generating gear train, for example using one of the following:

generating grinding;
gear hobbing;
skiving hobbing;
shaving; and
internal and external honing.

The method can be used on one flank and on two flanks.

The tool and the workpiece can be both conical and cylindrical.

The direction $\rho_F$ and the shape $F_{FtC}(X_F)$, $F_{FtL}(X_F)$, $F_{FtQ}(X_F)$ can be freely specified on both flanks.

Application examples include:

Crowning along any desired direction with a freely selectable diagonal ratio with one-flank or two-flank dressing.

Superposition of a plurality of crownings, optionally with superposition of a directed modification of any desired form which can be produced using the method described here, for example with an end relief or a triangular end relief with one-flank or two-flank dressing.

During generating grinding, dressable and non-dressable tools can be used. The dressing can take place on one flank, in specific cases, also on two flanks, with a profile roller dresser with line contact over the entire profile or in a plurality of strokes or in contour dressing.

With contour dressing or with non-dressable tools, the direction of constant modification given by $\rho_F$ can be selected freely in dependence on the production method of the tool.

Division of the tool into rough machining regions and fine machining regions, wherein the rough machining regions can be both modified and non-modified.

Production of the modification on the gearing during rough machining only approximately in order, for example, to optimize the load on or the division of the tool.

Production of the modification on the gearing only approximately to optimize the division of the tool. Setting of the diagonal ratio independently of the modifications. A direct dependence has previously been given here between the gear width and the "diagonal region" of the worm. Only in this way was it also possible to imagine a different diagonal over the workpiece width.

Superposition of the modification on the gearing in accordance with equation (25) with a simple profile modification and/or modification of corrected machining kinematics (equation (100)).

Exact or approximate resolution and determination of $F_{FtC}$, $F_{FtL}$, $F_{FtQ}$ and $\rho_F$, for example by curve fitting.

Exact or approximate resolution and determination of $F_{FtC}$, $F_{FtL}$, $F_{FtQ}$ and $\rho_F$ and/or $f_{PFt}$ and/or $F_{KFt}$, for example by curve fitting.

Exact or approximate resolution and determination of $F_{FtC}$, $F_{FtL}$, $F_{FtQ}$ and $\rho_F$ and/or $f_{PFt}$ and/or $F_{KFt}$, for example by curve fitting while taking account of technological aspects.

Division of the tooth flank into modified and non-modified regions, wherein the modifications on the modified regions can be described by different $\rho_F$. Setting different diagonal ratios during the machining.

Selection of the macrogeometry of the tool, in particular the number of starts and/or the basic helix angle and/or the base circle radii and/or the outer diameter (in the case of a conical tool to a defined z position) and/or of the conical angle such that the diagonal ratio calculated in accordance with the method described here adopts a given value or lies in a given range and/or the working region calculated in accordance with the method described here adopts a given value or lies in a given range.

Selection of the macrogeometry of the tool, in particular the number of starts and/or the basic helix angle and/or the base circle radii and/or the outer diameter (in the case of a conical tool to a defined z position) and/or of the conical angle of the dresser such that the required crownings along the contact line can be achieved during dressing; and the required linear portions can be achieved on the left and right flanks over the entire worm width on two-flank dressing.

Points specific to the variable diagonal ratio.

Generating grinding with a non-constant diagonal ratio to map straight lines on the worm onto a specifically specified progression on the workpiece so that the modification is given at least approximately by a second degree polynomial along this progression on the workpiece.

Selection of a suitable worm geometry, in particular of the conical angle, of the profile angle and of suitable grinding kinematics, in particular the axial cross angle, to influence the displacement of the progressions on one or both sides.

Curve fitting to determine $F_{zv1}$, $F_{Ft1C}$, $F_{Ft1L}$, $F_{Ft1Q}$, $f_{PFt}$, $F_{KFt}$ and the macrogeometry of the worm, in particular the conical angle and the profile angle, as well as the axial cross angle, during the machining to approximate the modification as well as possible.

Software for calculating possible progressions and their displacement/development for different $X_{F1}$, in particular for conical gear teeth, since this is then non-trivial. This development is only a displacement for cylindrical gear teeth. If grinding takes place with a conical worm, the direction in which displacement is carried out has to be calculated.

Software for calculating possible progressions during the two-flank grinding. In this case, the progression on the one flank influences the progression on the other flank.

The invention claimed is:

1. A method of manufacturing one or more workpieces having a desired gear geometry by means of a suitably dressed tool, wherein, after carrying out of one or more machining steps, a first dressing of the tool is respectively performed by a dresser of a dressing machine before further machining steps are carried out at a same workpiece or at further workpieces, wherein, in a later dressing procedure, a relative position between the dresser and the tool is changed with respect to a prior dressing procedure in addition to a smaller center distance resulting by a smaller tool diameter by a corresponding additional adjustment of axes of movement of the dressing machine, wherein the additional adjustment of the axes of movement of the dressing machine is in accordance with one or more of the following: the additional adjustment partly compensates modifications of a gear geometry which result by the smaller tool diameter; an adjustment with respect to a dressing without such an additional adjustment effecting a change of a profile crowning resulting during dressing; the additional adjustment is selected such that a deviation of the gear geometry resulting on the workpiece from the desired gear geometry is reduced and/or minimized; and the additional adjustment reduces or minimizes a deviation of the gear geometry produced on the tool by the dresser from the desired gear geometry.

2. The method in accordance with claim 1, wherein the tool is used having a conical base shape and is in accordance with one or more of the following: wherein the a conical angle is selected such that the gear geometry resulting on the workpiece has deviations from the desired gear geometry which are as small as possible; wherein a stretching and/or a compression of a modification produced on the tool by a modified dresser is reduced or minimized by a change of a profile angle of the tool, in production of an asymmetrical gear; and wherein a conical angle is changed with respect to the earlier dressing procedure in the later dressing procedure performed after the earlier dressing procedure.

3. The method in accordance with claim 1 for producing a plurality of workpieces, wherein the tool is respectively dressed after the production of the one or more workpieces before further workpieces are machined.

4. An apparatus for determining settings of axes of movement of a dressing machine used for multiple dressing of a tool, the apparatus comprising a processor, non-transitory memory, and instructions for executing the method of claim 1, wherein an input function is provided for inputting a first tool diameter of the first dressing; and a determination function is provided for determining the settings of the axes of movement of the dressing machine to be used for dressing the tool with the first tool diameter; wherein the input function is provided for inputting a smaller tool diameter with respect to which the dresser is configured; or wherein an input function is provided for inputting a desired gear geometry of the workpiece or of the tool.

5. A gear manufacturing machine including the apparatus in accordance with claim 4, wherein the gear manufacturing machine has a workpiece holder and a tool holder provided in addition to the tool holder of the dressing machine, and a gear manufacturing machining control system for controlling the workpiece holder and the tool holder for carrying out gear manufacturing machining.

6. A dressing machine having a tool holder for holding a tool to be dressed and having a dresser holder for holding a dresser used for this purpose, the dressing machine comprising:

an axis of rotation;
further axes of movement by which further degrees of freedom can be set independently of one another when dressing the tool in line contact with the dresser; and
a control system comprising a function, a processor, non-transitory memory, and instructions for carrying out dressing steps in the method in accordance with claim 1,
wherein the function carries out the first dressing and the later dressing of the tool with changed settings of the axes of movement of the dressing machine,
wherein the control system includes further instructions for in a later dressing procedure, changes to the relative position between the dresser and the tool with respect to the earlier dressing procedure performed before the later dressing procedure in addition to the smaller center distance resulting by the smaller tool diameter by the corresponding additional adjustment of the axes of movement of the dressing machine.

7. A gear manufacturing machine including the dressing machine in accordance with claim 6, wherein the gear manufacturing machine has a workpiece holder and a tool holder provided in addition to the tool holder of the dressing machine, and a gear manufacturing machining control system for controlling the workpiece holder and the tool holder for carrying out gear manufacturing machining.

8. A method of manufacturing one or more workpieces having a desired gear geometry by means of a suitably dressed tool, wherein, after carrying out of one or more machining steps, the tool is respectively dressed before further machining steps are carried out at a same workpiece or at further workpieces, wherein, in a later dressing procedure, a profile angle of the tool is changed with respect to an earlier dressing procedure so that the workpiece or workpieces is or are gear manufacturing machined with a different profile angle of gearing of the tool after the later dressing procedure than after the earlier dressing procedure performed before the later dressing procedure, wherein at least one out of the following conditions applies:

a) the profile angle is respectively selected such that a deviation of a gear geometry resulting on the workpiece is reduced or minimized with respect to the desired gear geometry; and
b) at least one out of a stretching and a compression of a modification produced on the tool by a modified dresser is reduced or minimized by the change of the profile angle.

9. The method in accordance with claim 8, wherein an asymmetrical gear is produced; and wherein at least one out of the following conditions applies:

a) the profile angle of the tool on right and left flanks is selected such that the deviation of the gear geometry resulting on the workpiece on the left and right flanks is reduced overall with respect to the desired gear geometry; and
b) the stretching or the compression of the modification on the left and right flanks produced on the tool by the modified dresser is reduced overall.

10. A method of manufacturing a workpiece having a desired gear geometry by means of a tool suitably dressed by a modified dresser, comprising the steps:

specifying the desired gear geometry of the workpiece; and
determining a suitable profile angle of the tool and a suitable relative position between the dresser and the tool during dressing of the tool for providing the desired gear geometry of the workpiece at least within a permitted tolerance in the machining by the tool, wherein the profile angle and the relative position between the dresser and the tool are determined during dressing such that a desired compression and/or stretching of a modification of the dresser results on the tool during dressing, with the profile angle being determined such that the compression and/or stretching of the modification of the dresser on the tool resulting by the relative position between the dresser and the tool is compensated by the profile angle.

11. An apparatus for determining a setting of axes of movement of a dressing machine and a geometry of a tool used for producing a workpiece having a desired gear geometry, the apparatus comprising:

a processor, non-transitory memory, and instructions for executing the method of claim 10;
an input function for inputting the desired gear geometry of the workpiece; and
a determination function for determining the suitable profile angle of the tool and the suitable relative position between the dresser and the tool during dressing for providing the desired gear geometry of the workpiece during machining by the tool.

12. A method for modified dressing of a tool used for gear manufacturing machining of a workpiece on a dressing machine, wherein a modified dresser is used for dressing the tool, wherein one or more axes of movement of the dressing machine, a macrogeometry of the tool, and a macrogeometry of the dresser are set during the dressing of the tool such that the modification of the dresser is applied to the tool compressed or stretched by a specified amount, wherein at least one out of a number of starts, a diameter, and a profile angle of the tool is selected such that the modification of the dresser is applied to the tool compressed or stretched by the specified amount.

13. An apparatus for determining a setting of axes of movement of a dressing machine or a geometry of a tool to be used for producing a workpiece having a desired gear geometry using a tool dressed by a dresser having a modification, the apparatus comprising:

a processor, non-transitory memory, and instructions for executing the method of claim 9;

an input function for inputting at least one out of the specified amount of stretching and compression of the modification of the dresser on the tool or workpiece; and a determination function providing the at least one out of the specified amount of stretching and compression of the modification of the dresser on the tool or workpiece; the function determining at least one out of the following:

the setting of axes of movement of the dressing machine when dressing the tool;

a macrogeometry of at least one out of the tool and of the dresser, the macrogeometry including at least one out of a number of starts, a diameter, a profile angle, a conical angle of the tool and a diameter of the dresser.

14. A method of manufacturing a workpiece having a desired gear geometry by means of a tool suitably dressed by a modified dresser, comprising the steps:

specifying the desired gear geometry of the workpiece; and determining a suitable profile angle of the tool and a suitable relative position between the dresser and the tool during the dressing of the tool for providing the desired gear geometry of the workpiece at least within a permitted tolerance in the machining by the tool, wherein a desired modification of the tool is in accordance with one or more of the following: the modification is specified at at least two rolling angles and is produced by a setting of axes of movement of a dressing machine; the relative position between the dresser and the tool is determined during dressing such that a desired profile crowning is produced on the tool; and wherein an association of a specific radius of the dresser with a specific radius of the tool is specified and is achieved by a corresponding setting of the axes of movement of the dressing machine.

15. The method in accordance with claim 14, wherein the desired modification of the tool is specified at three rolling angles.

* * * * *